(12) United States Patent
Mackay et al.

(10) Patent No.: US 12,458,704 B2
(45) Date of Patent: *Nov. 4, 2025

(54) MULTIMERIC ELASTIN-LIKE POLYPEPTIDES

(71) Applicant: University of Southern California, Los Angeles, CA (US)

(72) Inventors: John Andrew Mackay, Los Angeles, CA (US); Mihir Shah, Los Angeles, CA (US); Sarah F. Hamm-Alvarez, Los Angeles, CA (US); Hao Guo, Los Angeles, CA (US); Santosh Peddi, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 17/963,037

(22) Filed: Oct. 10, 2022

(65) Prior Publication Data

US 2023/0181752 A1  Jun. 15, 2023

Related U.S. Application Data

(63) Continuation of application No. 16/274,192, filed on Feb. 12, 2019, now Pat. No. 11,464,867.

(60) Provisional application No. 62/630,145, filed on Feb. 13, 2018.

(51) Int. Cl.
*A61K 47/68* (2017.01)
*A61K 38/13* (2006.01)
*C12N 15/62* (2006.01)
*C07K 16/28* (2006.01)

(52) U.S. Cl.
CPC ...... *A61K 47/6801* (2017.08); *A61K 47/6849* (2017.08); *A61K 38/13* (2013.01); *C07K 16/2887* (2013.01); *C12N 15/62* (2013.01)

(58) Field of Classification Search
None
See application file for complete search history.

(56) References Cited

U.S. PATENT DOCUMENTS

| | | | |
|---|---|---|---|
| 6,852,834 B2 | 2/2005 | Chilkoti | |
| 8,252,740 B2 | 8/2012 | Raucher et al. | |
| 8,367,626 B2 | 2/2013 | Furgeson et al. | |
| 8,513,380 B2 | 8/2013 | Barker | |
| 8,841,414 B1 | 9/2014 | Raucher et al. | |
| 9,102,763 B2 | 8/2015 | Mackay et al. | |
| 11,464,867 B2* | 10/2022 | Mackay | A61K 47/6801 |
| 2002/0013344 A1 | 1/2002 | Steiner et al. | |
| 2007/0265197 A1 | 11/2007 | Furgeson et al. | |
| 2008/0312156 A1 | 12/2008 | Setton et al. | |
| 2010/0048473 A1 | 2/2010 | Chaikof et al. | |
| 2010/0104554 A1 | 4/2010 | Scott et al. | |
| 2010/0119529 A1 | 5/2010 | Furgeson et al. | |
| 2010/0189643 A1 | 7/2010 | Chilkoti et al. | |
| 2011/0110866 A1 | 5/2011 | Chilkoti et al. | |
| 2011/0151006 A1 | 6/2011 | Weber et al. | |
| 2012/0213781 A1 | 8/2012 | Hilbert | |
| 2013/0196926 A1 | 8/2013 | Mackay et al. | |
| 2013/0210747 A1* | 8/2013 | Hamm-Alvarez ... | C07K 14/005 435/375 |
| 2014/0294932 A1 | 10/2014 | Kim et al. | |
| 2015/0209335 A1 | 7/2015 | Mackay et al. | |
| 2015/0218280 A1 | 8/2015 | Epstein et al. | |
| 2015/0238431 A1 | 8/2015 | Hamm-Alvarez et al. | |
| 2016/0017004 A1 | 1/2016 | Hamm-Alvarez et al. | |
| 2019/0022190 A1 | 1/2019 | Despanie et al. | |
| 2019/0247317 A1 | 8/2019 | Hamm-Alvarez et al. | |
| 2019/0282656 A1 | 9/2019 | Mackay et al. | |
| 2019/0290726 A1 | 9/2019 | Mackay et al. | |
| 2020/0079868 A1 | 3/2020 | Epstein et al. | |

FOREIGN PATENT DOCUMENTS

| | | |
|---|---|---|
| CN | 101544694 A | 9/2009 |
| WO | WO-95/33052 A1 | 12/1995 |
| WO | WO-2010/144612 | 12/2010 |
| WO | WO-2011/006069 A1 | 1/2011 |
| WO | WO-2013/016578 A2 | 1/2013 |
| WO | WO-2014/059384 A2 | 4/2014 |
| WO | WO-2014/059385 A1 | 4/2014 |
| WO | WO-2014/161004 | 10/2014 |
| WO | WO-2017/020686 A1 | 2/2017 |

OTHER PUBLICATIONS

Bowie et al. (Science, 1990, 247:1306-1310) (Year: 1990).*
Burgess et al. (J. Cell Biol. 111:2129-2138, 1990) (Year: 1990).*
Lazar et al. (Mol. Cell. Biol., 8:1247-1252, 1988) (Year: 1988).*
Bork (Genome Research, 2000, 10:398-400) (Year: 2000).*
Skolnick et al (Trends Biotechnol. Jan. 2000;18(1):34-9) (Year: 2000).*
Miosge (Proc Natl Acad Sci U S A. Sep. 15, 2015;112(37):E5189-98) (Year: 2015).*
Kulmanov et al (Bioinformatics, 34(4), 2018, 660-668) (Year: 2018).*
Esmaielbeiki et al (Brief Bioinform. Jan. 2016; 17(1): 117-131) (Year: 2016).*
Hamp et al (Bioinformatics, 31(10), 2015, 1521-1525) (Year: 2015).*
Fischman et al (Current Opinion in Structural Biology 2018, 51:156-162) (Year: 2018).*
Wagner et al (Structure 27, 1326-1335, Aug. 6, 2019) (Year: 2019).*
Roche et al (Int. J. Mol. Sci. 2015, 16, 29829-29842) (Year: 2015).*
Oshima et al (J Chem Inf Model. Aug. 17, 2020) (Year: 2020).*
Bai et al (Proc Natl Acad Sci, Dec. 13, 2016;113(50):E8051-E8058. Epub Nov. 29, 2016) (Year: 2016).*
Dhandhukia et al (Theranostics, 2017; 7(16): 3856-3872; published Aug. 29, 2017) (Year: 2017).*

(Continued)

*Primary Examiner* — Brian Gangle
*Assistant Examiner* — Andrea K Mccollum
(74) *Attorney, Agent, or Firm* — Foley & Lardner LLP

(57) ABSTRACT

This disclosure provides a novel compositions and methods to deliver cyclosporine A using genetically engineered protein polymers.

18 Claims, 32 Drawing Sheets

Specification includes a Sequence Listing.

(56) References Cited

OTHER PUBLICATIONS

Awasthi et al., "Biodistribution of Radioiodinated Adenovirus Fiber Protein Knob Domain after Intravenous Injection in Mice.," J. Virol., vol. 78, No. 12, Jun. 2004, pp. 6431-6438.
Bai, et al., "Elucidating the druggable interface of protein-protein interactions using fragment docking and coevolutionary analysis", PNAS, Nov. 29, 2016, E8051-E8058.
Bork, "Powers and Pitfalls in Sequence Analysis: The 70% Hurdle", Genome Research, vol. 10, 2000, pp. 398-400.
Bowie et al., "Deciphering the Message in Protein Sequences: Tolerance to Amino Acid Substitutions", Science, vol. 247, No. 4948, Mar. 16, 1990, pp. 1306-1310.
Burgess et al., "Possible Dissociation of the Heparin-binding and Mitogenic Activities of Heparin-binding (Acidic Fibroblast) Growth Factor-1 from Its Receptor-binding Activities by Site-directed Mutagenesis of a Single Lysine Residue", The Journal of Cell Biology, vol. 111, Nov. 1, 1990, pp. 2129-2138.
Chilkoti et al., "Design of thermally responsive, recombinant polypeptide carriers for targeted drug delivery.," Advanced Drug Delivery Reviews, vol. 54, No. 8, Jul. 1, 2002, pp. 1093-1111.
Chilkoti et al., "Stimulus responsive elastin biopolymers: applications in medicine and biotechnology", Current Opinion in Chemical Biology, vol. 10, No. 6, Dec. 1, 2006, pp. 652-657.
Database Geneseq [Online] Jun. 19, 2014 (Jun. 19, 2014), "ELP component reference polypeptide construct S48|48, SEQ ID 4 #1.", retrieved from EBI accession No. GSP:BBF47655 Database accession No. BBF47655, 1 page.
Despanie et al. "Elastin-like polypeptides: Therapeutic applications for an emerging class of nanomedicines," J Control Release, vol. 240, Nov. 11, 2015, pp. 93-108.
Dhandhukia et al., "Switchable elastin-like polypeptides that respond to chemical inducers of dimerization.," Biomacromolecules, vol. 14, No. 4, Apr. 8, 2013, pp. 976-985.
Dhandhukia, et al., "Berunda Polypeptides: Multi-Headed Fusion Proteins Promote Subcutaneous Administration of Rapamycin to Breast Cancer In Vivo", Theranostics, 2017, vol. 7, Issue 16, pp. 3856-3872.
DiJoseph et al., "CD20-Specific Antibody-Targeted Chemotherapy of Non-Hodgkins B-Cell Lymphoma Using Calicheamicin-Conjugated Rituximab.," Cancer Immunol. Immunother., vol. 56, No. 7, Dec. 12, 2006, pp. 1107-1117.
Dreher et al. Temperature triggered self-assembly of polypeptides into multivalent spherical micelles. J Am Chem Soc. Jan. 16, 2008;130(2):687-94. doi: 10.1021/ja0764862. Epub Dec. 18, 2007.
Dreher et al., "Temperature Triggered Self-Assembly of Polypeptides into Multivalent Spherical Micelles.," J Am Chem Soc., vol. 130, No. 2, Jan. 16, 2008, pp. 687-694.
Esmaielbeiki, et al., "Progress and challenges in predicting protein interfaces", Briefings in Bioinformatics, 71(1), 2016, pp. 117-131.
Final Office Action on U.S. Appl. No. 14/420,308 dated Jul. 23, 2018, 19 pages.
Fischman, et al., "Computational design of antibodies", Current Opinion in Structural Biology, 2018, vol. 51, pp. 156-162.
Floss et al., "Elastin-Like Polypeptides Revolutionize Recombinant Protein Expression and their Biomedical Application.," Trends in Biotechnology, vol. 28, No. 1, 2009, pp. 37-45.
Floss et al., "Expression and Immunogenicity of the Mycobacterial Ag85B/ESAT-6 Antigens Produced in Transgenic Plants by Elastin-Like Peptide Fusion Strategy", Journal of Biomedicine and Biotechnology, vol. 2010, Jan. 1, 2010, pp. 1-14.
Floss, et al., "Influence of Elastin-Like Peptide Fusions on the Quantity and Quality of a Tobacco-Derived Human Immunodeficiency Virus-Neutralizing Antibody", Plant Biotechnology Journal, vol. 7, No. 9, Aug. 7, 2009, pp. 899-913.
Guo et al., "Anti-CD20 Tetravalent Antibody and Preparation Method and Application Thereof"., Google.com/patents, 2009, pp. 1-19.
Hamm-Alvarez, "Design And Cellular Internalization of Genetically Engineered Polypeptide Nanoparticles Displaying Adenovirus Knob Domain." Utah Drug Delivery Conference, 15th International Symposium on Recent Advances in Drug Delivery Systems "Drug Delivery: New Directions in a New Decade". Salt Lake City, Utah, Feb. 13-16, 2011, 26 pages.
Hamm-Alvarez, "Design and Cellular Internalization of Genetically Engineered Polypeptide Nanoparticles Displaying Adenovirus Knob Domain." presented in Utah on Feb. 14, 2011, 34 pages.
Hamp, et al., "More challenges for machine-learning protein interactions", Bioinformatics, 31(10), 2015, pp. 1521-1525.
Hassouneh et al., "Fusions of elastin-like polypeptides to pharmaceutical proteins", Methods in Enzymology, vol. 502, 2012, pp. 215-237, NIH Public Access Author Manuscript Version internal pp. 1-24.
Hassouneh et al., "Fusions of Elastin-Like Polypeptides to Pharmaceutical Proteins", Methods of Enzymology, vol. 502, 2012, pp. 215-237.
Holliger et al., "Engineered antibody fragments and the rise of single domains", Nature Biotechnology, vol. 23, No. 9, Sep. 7, 2005, pp. 1126-1136.
Hsueh et al., "Development of Novel Peptide Nanoparticles Targeted to Coxsackievirus-Adenovirus Receptor Expressing Cells." AAPS 2011, Washington, DC, Oct. 23-27, 2011, 1 page.
Joensuu et al., "Expression and purification of an anti-Foot-and-mouth disease virus single-chain variable antibody fragment in tobacco plants", Transgenic Res., vol. 18, Apr. 3, 2009, pp. 685-696.
Jubala et al., "CD20 Expression in Normal Canine B Cells and in Canine non-Hodgkin Lymphoma", Vet Pathol., vol. 24, 2005, pp. 468-476.
Jubala et al., "CD20 Expression in Normal Canine B Cells and in Canine non-Hodgkin Lymphoma", Vet Pathol., vol. 42, 2005, pp. 468-476.
Lazar et al., "Transforming Growth Factor a: Mutation of Aspartic Acid 47 and Leucine 48 Results in Different Biological Activities", Molecular and Cellular Biology, vol. 8, No. 3, Mar. 1988, pp. 1247-1252.
MacCallum et al., "Antibody-antigen Interactions: Contact Analysis and Binding Site Topography", J. Mol. Biol., vol. 262, Jul. 30, 1996, pp. 732-745.
MacEwan et al., "Elastin-like polypeptides: biomedical applications of tunable biopolymers.," PeptideScience, vol. 94, No. 1, Oct. 8, 2009, pp. 60-77.
Mackay et al., "Genetically Engineered Polypeptide Nanoparticles." ACS Western Regional Meeting 2011, Pasadena, CA, Nov. 11, 2011, 31 pages.
Mackay et al., "Ocular Drug Delivery Using a Thermo-responsive Lacritin Fusion Protein," Abstract of presentation at ARVO 2012, Fort Lauderdale, FL (May 4-6, 2012), 2 pages.
Mackay, "Protein polymers—a platform for biopharmaceutical delivery and self-assembly." Keck Seminar, posted online Jun. 27, 2011, 53 pages.
McDaniel et al., "Drug delivery to solid tumors by elastin-like polypeptides.," Adv Drug Deliv Rev., vol. 62, No. 15, Dec. 30, 2010, pp. 1456-1467.
McDaniel et al., "Recursive Directional Ligation by Plasmid Reconstruction Allows Rapid and Seamless Cloning of Oligomeric Genes.," Biomacromolecules, vol. 11, No. 4, Apr. 12, 2010, pp. 944-952.
Meyer et al., "Purification of recombinant proteins by fusion with thermally-responsive polypeptides.," Nature Biotechnology, vol. 17, No. 11, Nov. 1999, pp. 1112-1115.
Non-Final Office Action for U.S. Appl. No. 16/274,192 dated Oct. 16, 2020 (24 pages).
Oshima, et al., "Prediction of Protein-Ligand Binding Pose and Affinity Using the gRest FEP Method", Journal of Chemical Information and Modeling, Jul. 31, 2020, 13 pages.
Putnam et al., "Primary structure of a human IgA1 immunoglobulin. IV. Streptococcal IgA1 protease, digestion, Fab and Fc fragments, and the complete amino acid sequence of the alpha 1 heavy chain." J. Biol. Chem., vol. 254, No. 8, Apr. 25, 1979, pp. 2865-2874.
Roche, et al., "Proteins and Their Interacting Partners: And Introduction to Protein-Ligand Binding Site Prediction Methods", International Journal of Molecular Sciences, vol. 16, 2015, pp. 29829-29842.

(56) References Cited

OTHER PUBLICATIONS

Rudikoff et al., "Single amino acid substitution altering antigen-binding specificity", Proc. Natl. Acad. Sci. USA, vol. 27, Mar. 1982, pp. 1979-1983.

Scheller et al., "Forcing Single-Chain Variable Fragment Production in Tobacco Seeds by Fusion to Elastin-like Polypeptides", Plant Biotech. Journ., vol. 4, Oct. 27, 2005, pp. 243-249.

Shah et al., "Biodegradation of elastin-like polypeptide nanoparticles.," Protein Sci., vol. 21, No. 6, Mar. 20, 2012, pp. 743-750.

Sheth et al., "Purification of monoclonal antibodies by affinity precipitation using thermally responsive elastin-like polypeptides(ELPs) fused to IgG binding domains: High-throughput analysis and scale up considerations.," Mar. 27, 2012, 1 page.

Shi et al., "Elastin-based protein polymer nanoparticles carrying drug at both corona and core suppress tumor growth in vivo.," J Control Release, vol. 171, No. 3, May 25, 2013, pp. 330-338.

Sun et al., "Design and cellular internalization of genetically engineered polypeptide nanoparticles displaying adenovirus knob domain" J Control Release., vol. 155, No. 2, Oct. 30, 2011, pp. 218-226.

Sun et al., "Genetically engineered polypeptide nanoparticles targeted to lacrimal gland acinar cells." Presented at ARVO 2011, Fort Lauderdale, FL, May 1-5, 2011, 1 page.

Supplement for Sun et al. "Design and cellular internalization of genetically engineered polypeptide nanoparticles displaying adenovirus knob domain" J Control Release., vol. 155, No. 2, Oct. 30, 2011, pp. 218-226.

Trabbic-Carlson et al., "Expression and purification of recombinant proteins from *Escherichia coli*: Comparison of an elastin-like polypeptide fusion with an oligohistidine fusion.," Protein Science, vol. 13, No. 12, 2004, pp. 3274-3284.

UniProtKB/Swiss-Prot Direct Submission P62937.2. Locus PPIA_Human. Oct. 3, 2012.[Retrieved from the Internet Jan. 17, 2014: <http://www.ncbi.nlm.nih.gov/protein/51702775?sat=16&satkey=10893480>], 10 pages.

UnitProt Accession No. P68871, accessed May 28, 2018 at URL .unitprot.org/unitprot/ P68871, 25 pages.

UnitProt Accession No. P69891, accessed May 28, 2018 at URL .unitprot.org/unitprot/ P69891, 5 pages.

UnitProt Accession No. P69905, accessed May 28, 2018 at URL .unitprot.org/unitprot/ P69905, 21 pages.

Urry. Physical Chemistry of Biological Free Energy Transduction as Demonstrated by Elastic Protein-Based Polymers. J. Phys. Chem. B 1997, 101, 51, 11007-11028. Publication Date:Dec. 18, 1997.

Vignot et al., "mTOR-targeted therapy of cancer with rapamycin derivatives.," Annals of Oncology, vol. 16, No. 4, Feb. 22, 2005, pp. 525-537.

Wagner, et al., "Continuous Evaluation of Ligand Protein Predictions: A Weekly Community Challenge for Drug Docking", Structure, vol. 27, Aug. 6, 2019, pp. 1326-1335.

Wang et al., "Control of Ocular Drug Bioavailability Using Thermal-Responsive Polypeptides." Controlled Release Meeting, Aug. 3, 2011, 1 page.

Welply et al., "A peptide isolated by phage display binds to ICAM-1 and inhibits binding to LFA-1", Proteins: Structure, Function and Genetics, vol. 26, May 21, 1996, pp. 262-270.

White KD and Capra JD. Targeting mucosal sites by polymeric immunoglobulin receptor-directed peptides. J Exp Med. 2002;196(4):551-555. doi:10.1084/jem.20020581. Aug. 19, 2002.

Wu et al., "Fabrication of elastin-like polypeptide nanoparticles for drug delivery by electrospraying," Biomacromolecules, vol. 10, No. 1, Jan. 12, 2009, pp. 19-24.

Wu et al., "Humanization of a Murine Monoclonal Antibody by Simultaneous Optimization of Framework and CDR Residues", J. Mol. Biol., vol. 294, 1999, pp. 151-162.

Wu et al., "Humanization of a Murine Monoclonal Antibody by Simultaneous Optimization of Framework and CDR Residues", J. Mol. Biol., vol. 294, Aug. 26, 1999, pp. 151-162.

Xie et al. Novel fiber-dependent entry mechanism for adenovirus serotype 5 in lacrimal acini.J Virol. Dec. 2006;80(23):11833-51. doi: 10.1128/JVI.00857-06. Epub Sep. 20, 2006.

Xie et al., "Novel Fiber-Dependent Entry Mechanism for Adenovirus Serotype 5 in Lacrimal Acini." J. Virol., vol. 80, No. 23, Dec. 2006, pp. 11833-11851.

Yampolsky et al., "The Exchangeability of Amino Acids in Proteins," Genetics, vol. 170, Aug. 2005, pp. 1459-1472.

Yeo et al., "Fabricated Elastin", Advanced Healthcare Materials, vol. 4, No. 16, Nov. 1, 2015, pp. 2530-2556.

\* cited by examiner

MULTIMERIC ELASTIN-LIKE POLYPEPTIDES

CROSS-REFERENCE TO RELATED APPLICATION

This application is a continuation of U.S. patent application Ser. No. 16/274,192, filed Feb. 12, 2019, now U.S. Pat. No. 11,464,656, issued Oct. 11, 2022, which in turn claims priority under 35 U.S.C. § 119(e) to U.S. Provisional Application No. 62/630,145, filed Feb. 13, 2018, the contents of which are hereby incorporated by reference in their entireties.

SEQUENCE LISTING

The instant application contains a Sequence Listing which has been filed electronically in XML format and is hereby incorporated by reference in its entirety. Said XML copy, created on Jan. 19, 2023, is named 064189-9172.xml and is 120,614 bytes in size.

BACKGROUND

Synthetic nanoparticles, such as dextran, PLGA, and liposomes have been designed as tissue and cell-specific targeting moieties. For example, bilayer phospholipid vesicles decorated with polyethylene glycol (PEG) or coated with charged polymers like poly (acrylic acid) and/or poly-allyl amine HCl (PAH) are currently used to encapsulate small molecule drugs. Other known methods include chemically synthesized block co-polymer nanoparticle poly(ethylene glycol)-b-poly((3-caprolactone) (PEG-PCL) to encapsulate small molecule drugs such as rapamycin by a co-solvent extraction technique. The nanoparticle performs a slow release with a half-life up to 39 hours. Immunosuppressive small molecule drugs have also been encapsulated in biodegradable polymers like acetylated dextran that forms microparticles following a single-emulsion production technique. The prior art compositions and therapies using the same suffer from dose-limiting toxicity, insufficient residence time in the body, and a lack of targeted delivery to intended tissues. This disclosure overcomes these limitations and provides related advantages as well.

SUMMARY

Derived from human tropoelastin, elastin-like polypeptides (ELPs) comprise, consist essentially of, or consist of pentameric repeats of (Val-Pro-Gly-Xaa-Gly)n (SEQ ID NO: 51) where Xaa is the guest residue and n is the length of the repetitive units. ELPs have a unique inverse transition behavior. Below their transition temperature (Tt), they are highly water soluble but once the temperature rises above their Tt, ELPs undergo a phase separation process and self-assemble into different kinds of coacervates including different size particles (Dhandhukia et al., 2013). This phase separation is a fully reversible process and can be used to effectively purify ELP-conjugated materials (Shah et al., 2013). Phase behavior can be precisely controlled by adjusting the hydrophobicity of guest residue "Xaa" and the number of pentapeptide repeats "n" (Urry, 1997). ELPs are biodegradable (Shah et al., 2012) and non-immunogenic (Shah, et al., 2013, Shi et al., 2013).

This disclosure provides an agent comprising, or consisting essentially of, or yet further consisting of a multimeric form of an elastin-like peptide (ELP) component that forms a drug binding domain stabilized by the ELP (also termed herein as an ELP agent or ELP fusion), a fragment or a biological equivalent thereof. The ELP is fused to two or more drug binding domains or drug carriers. In one aspect, at least one of the drug binding domains comprises cyclophilin A (SEQ ID NO: 22 or SEQ ID NO: 23), a fragment thereof, or a biological equivalent of cyclophilin A (SEQ ID NO: 22 or SEQ ID NO: 23).

The ELP fusion can further comprise, or consist essentially of, or yet further consist of, a therapeutic agent, e.g., cyclosporin A, prodrug or derivative thereof or a cathepsin S inhibitory peptide (CATSIP), which comprises, or alternatively consists essentially of, or yet further consists of the sequence NHLGDMTSEEVMSLTSS (SEQ ID NO: 30), or a biological equivalent of each thereof wherein a biological equivalent of cyclosporin A (also termed "reference peptide") or the cathepsin S inhibitory peptide (CATSIP) (also termed "reference peptide") is a peptide that has at least 80% sequence identity to the reference sequence or a peptide encoded by a polynucleotide that hybridizes under conditions of high stringency to a polynucleotide that encodes the reference peptide or its complement, wherein conditions of high stringency comprise hybridization reaction at about 60° C. in about 1×SSC, and binds cyclophilin A (SEQ ID NO: 22 or SEQ ID NO: 23).

In one aspect, the ELP component is of the group of: CA192 (SEQ ID NO: 3), CV96 (SEQ ID NO: 4), CAC (SEQ ID NO: 8), 3(CA)C (SEQ ID NO: 9) or a biological equivalent thereof, as well as dimers, trimers, tetramers and pentamers thereof.

These ELP fusions can be used to treat Sjorgren's syndrome, prevent immune system rejections, modulate inflammatory responses, treat autoimmune disorders, treat rheumatoid arthritis, and treats dry eye syndrome.

In another aspect, at least one of the two or more drug binding domains is the peptide prolyl isomerase protein (also known as reference peptide FK506 binding protein (FKBP) (an example of such is SEQ ID NO: 24)), a fragment or a biological equivalent thereof. A biological equivalent of the reference peptide is a peptide that has at least 80% sequence identity to the reference sequence or a peptide encoded by a polynucleotide that hybridizes under conditions of high stringency to a polynucleotide that encodes the reference peptide or its complement, wherein conditions of high stringency comprise hybridization reaction at about 60° C. in about 1×SSC and wherein the biological equivalent binds the ligand and/or the therapeutic agent. In one aspect, the ELP fusion further comprises a therapeutic agent such as rapamycin.

In addition to rapamycin, the therapeutic agent is of the group of everolimus, temsirolimus, ridaforolimus, tacrolimus, or cyclosporin A, and the drug binding domain for each comprises the reference peptide FK506 binding protein (FKBP or reference peptide), a fragment or a biological equivalent of each thereof, as defined herein, and wherein the biological equivalent binds the therapeutic agent of the group rapamycin, everolimus, temsirolimus, ridaforolimus, tacrolimus or cyclosporin A.

The ELP-FKBP fusion can further comprise a therapeutic agent, for example a small molecule drug. The FKPB specifically recognizes and binds the therapeutic agent, i.e., it comprises the cognate target of the therapeutic agent. In one aspect, fusion comprises the receptor for the therapeutic agent. Non-limiting examples of agent-ligand pairs include, without limitation rapamycin-FKBP, cyclosporinA-cyclophilin A, everolimus-FKBP, temsirolimus-FKBP, ridaforolimus-FKBP, tacrolimus-FKBP.

In one aspect, the ELP component is of the group of: CA192 (SEQ ID NO: 3), CV96 (SEQ ID NO: 4), 3(CA)C (SEQ ID NO: 9) or a biological equivalent thereof, as well as dimers, trimers, tetramers and pentamers thereof.

These ELP fusions can be used as immunosuppressant agents to suppress rejection after an organ transplant. Other uses include treatment of rheumatoid arthritis, psoriasis, Crohn's disease, nephrotic syndrome, keratoconjunctivitis sicca (dry eye). In another aspect, examples of additional disorders treatable can include, age-related macular degeneration, Sjögren's syndrome, autoimmune exocrinopathy, diabetic retinopathy, graft versus host disease (exocrinopathy associated with) retinal venous occlusions, retinal arterial occlusion, macular edema, postoperative inflammation, uveitis retinitis, proliferative vitreoretinopathy and glaucoma. In one embodiment, the disease is Sjögren's syndrome. In another embodiment, the disease is keratoconjunctivitis sicca (dry eye). In another embodiment the disease is scleritis. In another embodiment the disease is glaucoma.

In one aspect, these agents are useful to treat cancer, e.g., breast cancer. As is apparent to those of skill in the art, the cancer to be treated will vary with the therapeutic agent and the ELP fusion.

In another aspect, the at least one drug binding domain is a ligand that specifically targets and binds an ICAM-1 receptor. In certain embodiments, the ligand will target any cell or tissue that expresses an ICAM-1 receptor. Non-limiting examples of such cells include liver, heart, lacrimal gland, salivary gland, lung, brain, pancreatic acinar tissue, prostate or mucosal cells. In a related embodiment, the cell is a lacrimal acinar cell of the lacrimal gland. Non-limiting examples of ligands are human ICAM-1, murine ICAM-1, fragments or biological equivalents of each thereof. In one aspect, the ELP component is of the group of: CA192 (SEQ ID NO: 3), CV96 (SEQ ID NO: 4), 3(CA)C (SEQ ID NO: 9) or a biological equivalent thereof, as well as dimers, trimers, tetramers and pentamers thereof. These can also comprise a therapeutic agent such as peptidic protease inhibitors (e.g. cathepsin S inhibitory peptides), small molecules, or immunosuppressants for treating or ameliorating the symptoms of SjS. Thus, this disclosure also provides methods to treat or ameliorate the symptoms of SjS and associated disorders (e.g., autoimmune disorders) in a disease progression-oriented manner by targeting ICAM-1 receptors that are overexpressed on the surface of diseased lacrimal gland acinar cells. Since ICAM-1 receptor itself is internalized by endocytosis following ligand binding, this receptor is also an ideal target internalization of the targeted nanoparticles to the interior of the diseased acinar cells. The compositions also are useful to treat or ameliorate the symptoms of other autoimmune diseases, non-limiting examples of which include rheumatoid arthritis and systemic lupus erythematosus, or diseases eventually resulting in enhanced expression of ICAM-1 receptors.

In one embodiment, these agents can be used to treat a variety of autoimmune diseases, for example autoimmune diseases that include Coeliac disease, diabetes mellitus type 1 (IDDM), systemic lupus erythematosus (SLE), Sjögren's syndrome, Churg-Strauss Syndrome, Hasimoto's thyroiditis, Graves' disease, idiopathic thrombocytopenic purpura, and rheumatoid arthritis (RA).

In another aspect, the at least one drug binding domains is an antigen binding agent, such as an antibody fragment, e.g., a scFv reference peptide or an scFv peptide according to SEQ ID NO: 17 or SEQ ID NO: 18. In another aspect, the scFv is the single chain variable region of a reference anti-LGAC antibody, a reference anti-CD20 antibody or a biological equivalent of each thereof. A biological equivalent of the reference peptide is a peptide that has at least 80% sequence identity to the reference sequence or a peptide encoded by a polynucleotide that hybridizes under conditions of high stringency to a polynucleotide that encodes the reference peptide or its complement, wherein conditions of high stringency comprise hybridization reaction at about 60° C. in about 1×SSC and having similar activity as the reference peptide.

In one aspect, the ELP component is of the group of: CA192 (SEQ ID NO: 3), CV96 (SEQ ID NO: 4), 3(CA)C (SEQ ID NO: 9) or a biological equivalent thereof, as well as dimers, trimers, tetramers and pentamers thereof. These can be used to treat a disease or disorder that expresses the CD20 biomarker. In one aspect the disease is cancer such as lymphoma (non-Hodgkin's lymphoma) or CD20 expressing leukemia. In another aspect, the disease is an autoimmune disease such as Sjögren's syndrome, rheumatoid arthritis, coeliac disease, Crohn's disease and systemic lupus erythematosus. Tarella et al. (2013) Autoimmunity Reviews 12:802-813. In another aspect, a CD20-related disorder is any that has been treated by conventional CD20 antibody therapies such as rituximab.

In another aspect, the at least one of the drug binding domain is a ligand that specifically binds to a receptor selected from the group consisting of a reference CAR (GenBank acc. no. AF 200465.1) and a reference pIgR (NCBI Reference Sequence NM_002644.3), a fragment or a biological equivalent of each thereof. In another aspect, the drug binding domain is a ligand component selected from the group consisting of a reference knob ligand (SEQ ID NO: 26) and a reference mIgA ligand (SEQ ID NO: 27), a fragment or a biological equivalent thereof. A biological equivalent of the reference peptide is a peptide that has at least 80% sequence identity to the reference sequence or a peptide encoded by a polynucleotide that hybridizes under conditions of high stringency to a polynucleotide that encodes the reference peptide or its complement, wherein conditions of high stringency comprise hybridization reaction at about 60° C. in about 1×SSC and wherein the biological equivalent binds the at least one of the drug binding domains.

In one aspect, the ELP component is of the group of: CA192 (SEQ ID NO: 3), CV96 (SEQ ID NO: 4), 3(CA)C (SEQ ID NO: 9) or a biological equivalent thereof, as well as dimers, trimers, tetramers and pentamers thereof.

These fusions can be used to treat disorders of the eye and can optionally comprise, consist essentially of, or consist of a therapeutic agent and may be useful to encapsulate or attach drugs for treating disorders localized to the eye. By way of example, these disorders can include, age-related macular degeneration, Sjögren's syndrome, autoimmune exocrinopathy, diabetic retinopathy, graft versus host disease (exocrinopathy associated therewith) retinal venous occlusions, retinal arterial occlusion, macular edema, postoperative inflammation, uveitis retinitis, proliferative vitreoretinopathy and glaucoma. In one embodiment, the disease is Sjögren's syndrome. In another embodiment, the disease is keratoconjunctivitis sicca (dry eye). In another embodiment the disease is scleritis. In another embodiment the disease is glaucoma.

In one aspect, the ELP component is of the group of: 5FA (SEQ ID NO: 10), 5FV (SEQ ID NO: 11), FAF (SEQ ID NO: 25), or a biological equivalent thereof, as well as dimers, trimers, tetramers and pentamers thereof. In some embodiments, the drug binding domain comprises FKBP.

These ELP-FKBP fusions can be used to treat immune disorders and can optionally comprise, consist essentially of, or consist of a therapeutic agent and may be useful to encapsulate or attach drugs for treating disorders. These ELP fusions can be used as immunosuppressant agents to suppress rejection after an organ transplant. Other uses include treatment of rheumatoid arthritis, psoriasis, Crohn's disease, nephrotic syndrome, keratoconjunctivitis sicca (dry eye). In some embodiments, the disorder is any disorder known in the art to be treated with a rapalogue.

In addition to rapamycin, the therapeutic agent is of the group of everolimus, temsirolimus, ridaforolimus, or tacrolimus and the drug binding domain for each comprises the reference peptide FK506 binding protein (FKBP or reference peptide), a fragment or a biological equivalent of each thereof, as defined herein, and wherein the biological equivalent binds the therapeutic agent of the group rapamycin or an analog thereof, everolimus, temsirolimus, ridaforolimus, or tacrolimus.

The ELP-FKBP fusion can further comprise a therapeutic agent, for example a small molecule drug. The FKPB specifically recognizes and binds the therapeutic agent, i.e., it comprises the cognate target of the therapeutic agent. In one aspect, fusion comprises the receptor for the therapeutic agent. Non-limiting examples of agent-ligand pairs include, without limitation rapamycin-FKBP, cyclosporinA-cyclophilin A, everolimus-FKBP, temsirolimus-FKBP, ridaforolimus-FKBP, tacrolimus-FKBP.

In one aspect, the ELP component is 4PA (SEQ ID NO: 15) or a biological equivalent thereof, as well as dimers, trimers, tetramers and pentamers thereof.

In some embodiments, the drug binding domain comprises two or more, three or more, four or more, or five or more of a reference PIN1 peptide (SEQ ID NO: 31), a fragment, or an equivalent thereof. A biological equivalent of the reference peptide is a peptide that has at least 80% sequence identity to the reference sequence or a peptide encoded by a polynucleotide that hybridizes under conditions of high stringency to a polynucleotide that encodes the reference peptide or its complement, wherein conditions of high stringency comprise hybridization reaction at about 60° C. in about 1×SSC and wherein the biological equivalent retains similar biological activity.

These ELP-PIN1 fusions can be used to treat cancers and can optionally comprise, consist essentially of, or consist of a therapeutic agent and may be useful to encapsulate or attach drugs for treating acne or cancers. Non-limiting examples of these cancers include acute promyelocytic leukemia (APL), breast cancer, neuroblastoma, and myeloma. In some embodiments, the ELP further comprises a therapeutic agent of all-trans retinoic acid (ATRA). In some embodiments, the disorder treated is any disorder known in the art to be treated with all-trans retinoic acid (ATRA).

The two or more drug binding domains of the ELP fusions can be the same or different from each other.

In each of the above noted aspects, the agent may optionally comprise, or alternatively consist essentially of, or yet further consist of a detectable label.

In each of the above noted aspects, the agent may optionally comprise, or alternatively consist essentially of, or yet further consist of a linker that links the carrier drug binding domain to the therapeutic agent. Non-limiting examples of such include a thiol reactive linker, cleavable disulfide linker, a hydrophilic flexible linker comprised of amino acids (GGGGS (SEQ ID NO: 50))n or a rigid linker comprised of amino acids (EAAAK)n (SEQ ID NO: 33), wherein the subscript "n" denotes the number of repeats. In one aspect the peptide can be repeated from 2 to 10, or from 2 to 8, or from 3 to 8, or from 3 to 7, or 3 to 5, or 3 times.

Yet further provided are isolated polynucleotides encoding the ELP fusions. The isolated polynucleotide can optionally be operatively linked to regulatory or expression elements that facilitate recombinant expression of the polynucleotide, such as promoters, enhancers, etc. Also provided are isolated vectors and isolated host cells comprising, or alternatively consisting essentially of, or yet further consisting of the isolated polynucleotide. Also provided are methods for preparing an ELP fusion, the methods comprising, or alternatively consisting essentially of, or yet further consisting of expressing the isolated polynucleotide and optionally isolating the ELP fusion from the cell or cell supernatant.

In one embodiment, a substantially homogenous composition of the ELP fusion alone or in combination with the therapeutic agent is provided. These compositions can be combined with a carrier. In another embodiment, a substantially homogenous composition of the polynucleotides encoding an ELP fusion is provided.

The therapeutic agents and compositions such as substantially homogenous compositions of the multimers can be combined with carriers, such as pharmaceutically acceptable carriers, and the compositions can be further processed for ease of administration, e.g., by combining with stabilizer, preservatives or other active agents. In a further aspect, the compositions are processed for freezing or freeze-drying.

In one embodiment, this disclosure also provides a method for delivering a therapeutic agent in vitro or in vivo, the method comprising, or alternatively consisting essentially of, or yet further consisting of, contacting a tissue expressing a receptor for the ELP fusion (such as the receptor for cyclosporine A) with the ELP. Also provided are methods for delivering a drug in vivo, the methods comprising, or alternatively consisting essentially of, or yet further consisting of administering to a subject or patient an effective amount of the ELP fusion as disclosed herein. In one embodiment, also provided are methods for ameliorating the symptoms of a disease or condition or for treating a disease or condition, comprising, or alternatively consisting essentially of, or yet further consisting of, administering an effective amount of an ELP fusion disclosed herein to a subject or patient in need thereof.

In one embodiment, further provided is a kit for ameliorating the symptoms of a disease or condition or treating a disease, the kit comprising, consisting essentially of, or yet further consisting of an ELP fusion. The kit can optionally provide instructions for use of the ELP fusion.

BRIEF DESCRIPTION OF DRAWINGS

(FIG. 1A) Cartoon depicting a mono ELP fusion protein, CA192 (SEQ ID NO: 3) bound to CsA (FIG. 1B) SDS-PAGE of purified CA192 (SEQ ID NO: 3) (91.6 kDa) stained with copper chloride demonstrating a molecular weight shift upon fusing CypA to A192 (73.6 kDa).

(FIG. 2B) The concentration-temperature phase diagram was determined for both ELPs, and fit to the following equation: $T_t=b-mLog_{10}[C_{ELP}]$. The 95% CI around each best-fit line is indicated with dashed lines. The values of slope, m, and intercept, b, are shown in Table 1. (FIG. 2C) The phase transition behavior of CA192 (SEQ ID NO: 3) relative to A192 is shown. The data was obtained after size exclusion chromatography of CA192 (SEQ ID NO: 3) and the sample of CA192 (SEQ ID NO: 3) consists essentially of dimerized CA192 (SEQ ID NO: 3).

(FIG. 3B) and a half-life of 52 hr (95% CI: 44 to 61 hr) at 37° C. (FIG. 3C). As a comparison, the free CsA release profile follows a two-phase decay with a burst release due to precipitation along with buffer exchange. The terminal half-life during the second slower decay is 6.3 hr (95% CI: 2.7 to 99.0 hr) at 4° C. and 1.1 hr (95% CI: 0.8 to 1.6 hr) at 37° C.

(FIG. 4A) After loading with a 6× excess of free drug, the loading ratio of CsA to CA192 (SEQ ID NO: 3) (250 μM) or human Albumin (250 μM) was estimated. CA192 (SEQ ID NO: 3) entrapped significantly more drug than albumin (p<0.0001). Per molecule of protein, CA192 (SEQ ID NO: 3) binds 10× more drug than albumin. (FIG. 4B) Human albumin (1 mM) was unable to extract CsA from CA192 (SEQ ID NO: 3) the fusion over period of 48 h. The half-life was found to be 525.3 h, which was even higher than the release half-life estimated by dialysis. Briefly, human albumin was dissolved into a PBS solution of CsA-loaded CA192 (SEQ ID NO: 3), and the albumin concentration was adjusted to 1 mM, which is near the physiological concentration of albumin. The mixture was incubated at 37° C. and samples were collected at different time points up to 48 h. The ELP phase separation was induced to purify CA192 (SEQ ID NO: 3) from the mixture with Albumin, which was—followed by RP-HPLC analysis. (FIG. 4C) Instead of albumin, lipoproteins in the plasma, mainly high-(HDL) and low-(LDL) density lipoprotein, predominantly bind to cyclosporine in the plasma. Thus, CA192-CsA was also tested against mouse plasma over a period of 48 hr. Despite an initial drug loss due to incomplete isolation during the hot spin, more than 50% of CsA was maintained as CA192 (SEQ ID NO: 3) bound after 48 hr incubation at 37° C.

(FIG. 5A) Dynamic light scattering (DLS) intensity data reveals that unloaded CA192 (SEQ ID NO: 3) has a mean $R_h$ of 64.8±0.7 nm (p<0.05), significantly outsizing plain A192 with a $R_h$ 7.3±0.4 nm (p<0.05). Drug-loaded CA192 (SEQ ID NO: 3) has a mean $R_h$ of 64.5±0.5 nm (p<0.05). (FIG. 5B) The stability assay revealed that the $R_h$ of CA192 (SEQ ID NO: 3) is maintained throughout 48 h, suggesting good stability of this constructed fusion protein and stable aggregation at physiological temperature. (FIG. 5C) Size Exclusion Chromatography (SEC) was conducted to fractionate CA192 (SEQ ID NO: 3) depending on their particle size. Two fractions were observed. (FIG. 5D) 99.2% by mass of fraction 2 was found to have a $R_h$ of 6.5±0.1 nm (p<0.05), which is consistent with a monomer or dimer of CA192 (SEQ ID NO: 3). In contrast, the fraction 1 contains a mixture of larger aggregates.

(FIG. 11A) Treatment with Sandimmune and CsA/CA192 enhance tear production using a thread test. A t-test between Sandimmune and CA192 (SEQ ID NO: 3) shows a significant difference (p=0.016), while the difference between CsA/CA192 and CA192 (SEQ ID NO: 3) trends towards a significant value (p=0.055). (FIG. 111B) On the day of euthanasia, tears were collected after stimulating the LG topically with carbachol. CA192-CsA treated mice exhibited a significant increase in tear volume relative to CA192 (SEQ ID NO: 3) control (P=0.014). Error bars here represent mean±SD from n=15.

FIG. 19.-19B: Plasmid map depicting pET-25b (+) vector encoding high capacity ELP fusions, which each contain 5 FKBP domains that are linked by elastin-like polypeptide. FIG. 19A 5FA contains 5 FKBP domains linked by an ELP known as A24, which remains soluble at physiological temperatures. FIG. 19B 5FV contains 5 FKBP domains linked by an ELP known as V24, which is expected to phase separate at physiological temperatures.

FIG. 22A: MDA-MB-468 cells were transfected with a split luciferase reporter that enables the specific detection of Rapa within the cytosol. When incubated with cells, free drug resulted in rapid luciferase activity consistent with diffusion across the plasma membrane as the mechanism of cellular entry. In contrast, FAF/Rapa produced luminescence only after 30-minutes, a period of time consistent with cellular uptake. FIG. 22B: Addition of the macropinocytosis inhibitor amiloride completely blocks cytosolic detection of Rapa from FAF/Rapa. Free Rapa luminescence kinetics were unaffected by amiloride. (Mean±95% CI, n=6).

FIG. 23A: Identity, purity and fluorescence of FAF, FAF-Rapa and rhodamine-labeled FAF-Rapa (Rho-FAF-Rapa) were analyzed by Comassie blue staining and fluorescence imaging of SDS-PAGE. FIG. 23B: One LG from each mouse was collected at the conclusion of the study. Sections from $25^{th}$, $50^{th}$ and $75^{th}$ percentile sections from each LG were quantified by a blinded observer to determine the average percentage area of infiltrate per gland. Glands from 4 treatment groups (n=15) were compared. Inflamed LG show areas of purple nuclear staining, which indicate foci of infiltrating lymphocytes (outlined in blue). Severe lymphocytic infiltration was reduced by FAF-Rapa (middle panel). Scale bar represents 200 μm. FIG. 23C: The percent area of infiltration was calculated using ImageJ (mean±SD). A Kruskal-Wallis non-parametric test was used to compare groups.

FIG. 24A shows data for the first ten hours are shown in the inset. SC administration yielded significantly higher Rho-FAF concentrations at 36, 48 and 72 hr (mean±SD). A student T-test was used to compare groups. FIG. 24B shows Data were well-fit by either a one-compartment (IV) or three-compartment (SC) pharmacokinetic model as indicated. $k_{abs}=k_{absorption}$.

DETAILED DESCRIPTION

Definitions

Figure 1A:
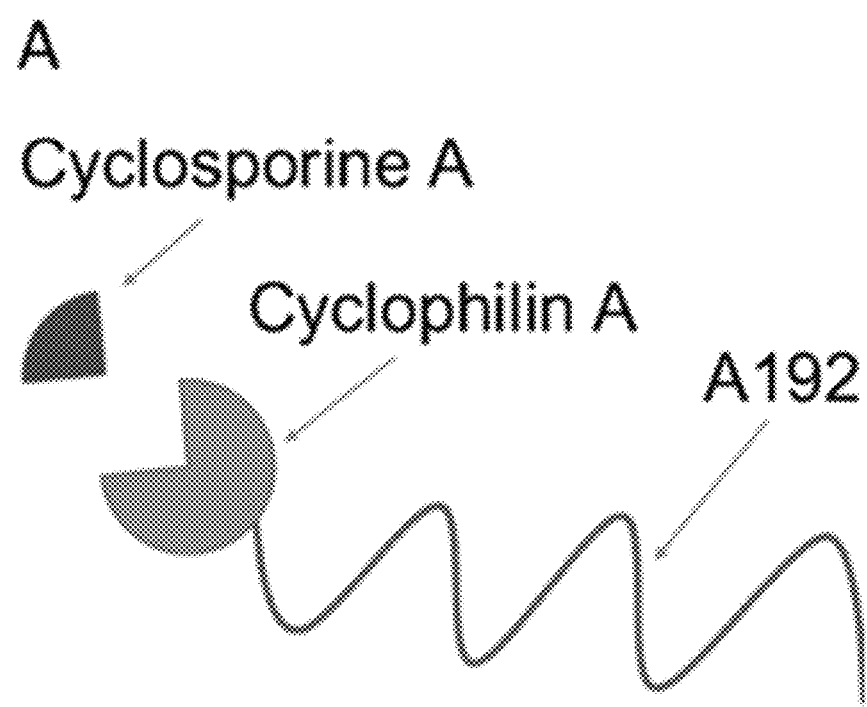
FIGS. 1A-1B: Construction of a mono cyclophilin-ELP fusion to solubilize cyclosporin A.

The practice of the present disclosure will employ, unless otherwise indicated, conventional techniques of tissue culture, immunology, molecular biology, microbiology, cell biology and recombinant DNA, which are within the skill of the art. See, e.g., Sambrook et al., (1989) Molecular Cloning: A Laboratory Manual, 2nd edition; Ausubel et al., eds. (1987) Current Protocols In Molecular Biology; MacPherson, B. D. Hames and G. R. Taylor eds., (1995) PCR 2: A Practical Approach; Harlow and Lane, eds. (1988) Antibodies, A Laboratory Manual; Harlow and Lane, eds. (1999) Using Antibodies, a Laboratory Manual; and R.I. Freshney, ed. (1987) Animal Cell Culture.

All numerical designations, e.g., pH, temperature, time, concentration, and molecular weight, including ranges, are approximations which are varied (+) or (−) by increments of 1.0 or 0.1, as appropriate. It is to be understood, although not always explicitly stated that all numerical designations are preceded by the term "about". It also is to be understood, although not always explicitly stated, that the reagents described herein are merely exemplary and that equivalents of such are known in the art.

As used in the specification and claims, the singular form "a," "an" and "the" include plural references unless the context clearly dictates otherwise.

As used herein, the term "comprising" is intended to mean that the compositions and methods include the recited elements, but do not exclude others. "Consisting essentially of" when used to define compositions and methods, shall mean excluding other elements of any essential significance to the combination when used for the intended purpose. Thus, a composition consisting essentially of the elements as defined herein would not exclude trace contaminants or inert carriers. "Consisting of" shall mean excluding more than trace elements of other ingredients and substantial method steps. Embodiments defined by each of these transition terms are within the scope of this disclosure.

A "composition" is also intended to encompass a combination of active agent and another carrier, e.g., compound or composition, inert (for example, a detectable agent or label)

or active, such as an adjuvant, diluent, binder, stabilizer, buffers, salts, lipophilic solvents, preservative, adjuvant or the like. In the context of this application, the active agent is the ELP-containing a ligand and therapeutic agent as described herein. Carriers also include pharmaceutical excipients and additives proteins, peptides, amino acids, lipids, and carbohydrates (e.g., sugars, including monosaccharides, di-, tri-, tetra-, and oligosaccharides; derivatized sugars such as alditols, aldonic acids, esterified sugars and the like; and polysaccharides or sugar polymers), which can be present singly or in combination, comprising, or alternatively consisting essentially of, or yet further consisting of alone or in combination 1-99.99% by weight or volume. Exemplary protein excipients include serum albumin such as human serum albumin (HSA), recombinant human albumin (rHA), gelatin, casein, and the like. Representative amino acid/antibody components, which can also function in a buffering capacity, include alanine, glycine, arginine, betaine, histidine, glutamic acid, aspartic acid, cysteine, lysine, leucine, isoleucine, valine, methionine, phenylalanine, aspartame, and the like. Carbohydrate excipients are also intended within the scope of this disclosure, examples of which include but are not limited to monosaccharides such as fructose, maltose, galactose, glucose, D-mannose, sorbose, and the like; disaccharides, such as lactose, sucrose, trehalose, cellobiose, and the like; polysaccharides, such as raffinose, melezitose, maltodextrins, dextrans, starches, and the like; and alditols, such as mannitol, xylitol, maltitol, lactitol, xylitol sorbitol (glucitol) and myoinositol.

A "pharmaceutical composition" is intended to include the combination of an active agent with a carrier, inert or active, making the composition suitable for diagnostic or therapeutic use in vitro, in vivo or ex vivo.

The term "pharmaceutically acceptable carrier" (or medium), which may be used interchangeably with the term biologically compatible carrier or medium, refers to reagents, cells, compounds, materials, compositions, and/or dosage forms that are not only compatible with the cells and other agents to be administered therapeutically, but also are, within the scope of sound medical judgment, suitable for use in contact with the tissues of human beings and animals without excessive toxicity, irritation, allergic response, or other complication commensurate with a reasonable benefit/risk ratio. Pharmaceutically acceptable carriers suitable for use in the present disclosure include liquids, semi-solid (e.g., gels) and solid materials (e.g., cell scaffolds and matrices, tubes sheets and other such materials as known in the art and described in greater detail herein). These semi-solid and solid materials may be designed to resist degradation within the body (non-biodegradable) or they may be designed to degrade within the body (biodegradable, bioerodable). A biodegradable material may further be bioresorbable or bioabsorbable, i.e., it may be dissolved and absorbed into bodily fluids (water-soluble implants are one example), or degraded and ultimately eliminated from the body, either by conversion into other materials or breakdown and elimination through natural pathways.

As used herein, the term "patient" or "subject" intends an animal, a mammal or yet further a human patient. For the purpose of illustration only, a mammal includes but is not limited to a human, a feline, a canine, a simian, a murine, a bovine, an equine, a porcine or an ovine.

The term "purified protein or peptide" as used herein, is intended to refer to a composition, isolatable from other components, wherein the protein or peptide is purified to any degree relative to its naturally-obtainable state. A purified protein or peptide therefore also refers to a protein or peptide, free from the environment in which it may naturally occur.

The term "therapeutic" refers to an agent or component capable of inducing a biological effect in vivo and/or in vitro. The biological effect may be useful for treating and/or preventing a condition, disorder, or disease in a subject or patient. A therapeutic may include, without limitation, a small molecule, a nucleic acid, or a polypeptide. Non-limiting examples of such include rapamycin and cyclosporin A, prodrugs and pharmaceutically acceptable salts thereof.

As used herein, the term "elastin-like peptide (ELP) component" intends a polypeptide that forms stable drug binding domain (which is in some embodiments a nanoparticle or a micelle). In one aspect, the ELP component comprises, or alternatively consists essentially of, or yet further consists of the polypeptide as noted above, either (VPGXG)n (SEQ ID NO: 51) or G(Val-Pro-Gly-Xaa-Gaa)n (SEQ ID NO: 52), or, wherein Xaa is any amino acid, or alternatively Gly, Ala, Ser, Ile or Val, and wherein n is an integer that denotes the number of repeats, and can be from about between 2 and 400, alternatively between about 2 and about 300, or alternatively from about 2 to about 200, or from about 2 to 125, or from about 2 to 100, or from about 5 and about 300, or alternatively from about 5 to about 200, or from about 5 to 125, or from about 5 to 100, or from about 10 to 200, or from about 10 to 125, or from about 10 to 100, or alternatively between about 25 and about 250, or alternatively between about 180 to about 250, or from about 195 to about 225, or from about 190 to about 195, or from about 75 to 125, or from about 85 to 115, or from about 90 to about 100, or from about 92 to about 98, or from about 5 to about 150, or from about 6 to about 200, or alternatively from about 15 to 195, or alternatively from 40 to about 195, from 60 to 195, or alternatively from 70 to 195, or alternatively from 80 to 195, or alternatively from 90 to 195, or alternatively from 92 to 195, or alternatively from 92 to 192, or alternatively from 100 to 195, or alternatively from 105 to 192, or alternatively from 110 to 195, or alternatively from 120 to 195, or alternatively from 150 to 195, or alternatively about 24, or alternatively about 48, or alternatively about 96, or alternatively about 192. In one aspect, the ELP is A192 (SEQ ID NO: 1): (VPGAG)$_{192}$ (SEQ ID NO: 34) (FIG. 1A, Table 1) or A96: (VPGAG)$_{96}$ (SEQ ID NO: 35), or V96 (SEQ ID NO: 2): (VPGVG)96, or an equivalent of each thereof. In another aspect the ELP has the sequence selected from the group of: (VPGAG)n(VPGIG)n (SEQ ID NO: 53), (VPGAG)n (SEQ ID NO: 54), or (VPGVG)n (SEQ ID NO: 55) (wherein n is an integer that denotes the number of repeats, and can be from about 2 and 400, alternatively between 2 and 300, or alternatively from about 2 to about 200, or from about 2 to 125, or from about 2 to 100, or from about 5 and 400, alternatively between 5 and 300, or alternatively from about 5 to about 200, or from about t to 125, or from about 5 to 100, or from about 10 to 200, or from about 10 to 125, or from about 10 to 100, or alternatively between 25 and 250, or alternatively between 25 and 150, or from about 6 to about 200, or alternatively from about 15 to 195, or alternatively from 40 to about 195, from 60 to 195, or alternatively from 70 to 195, or alternatively from 80 to 195, or alternatively from 90 to 195, or alternatively from 92 to 195, or alternatively from 92 to 192, or alternatively from 100 to 195, or alternatively from 105 to 192, or alternatively from 110 to 195, or alternatively from 120 to 195, or alternatively from 150 to 195, or alternatively about 24, or alternatively about 48, or alternatively about 96, or alternatively about 192. In one aspect, the ELP comprises, or alternatively consists essentially of, or yet further consists of A96I96: (VPGAG)$_{96}$(VPGIG)$_{96}$ (SEQ ID NO: 36), A192: (VPGAG)$_{192}$ (SEQ ID NO: 1), A96: (VPGAG)$_{96}$ (SEQ ID NO: 35), A24: (VPGAG)$_{24}$ (SEQ ID NO: 37), V96: (VPGVG)$_{96}$ (SEQ ID NO: 2), V24: G(VPGVG)$_{24}$ (SEQ ID NO: 38) or a biological equivalent of each thereof. A biological equivalent of an ELP polypeptide is a peptide that has at least 80% sequence identity to the ELP or a peptide encoded by a polynucleotide that hybridizes under conditions of high stringency to a polynucleotide that encodes the ELP or its complement, wherein conditions of high stringency comprise hybridization reaction at about 60° C. in about 1×SSC.

As used herein, the term "biological equivalent thereof" is used synonymously with "equivalent" unless otherwise specifically intended. When referring to a reference protein, polypeptide or nucleic acid, intends those having minimal homology while still maintaining desired structure or functionality. Unless specifically recited herein, it is contemplated that any polynucleotide, polypeptide or protein mentioned herein also includes equivalents thereof. For example, an equivalent intends at least about 60%, or 65%, or 70%, or 75%, or 80% homology or identity and alternatively, at least about 85%, or alternatively at least about 90%, or alternatively at least about 95%, or alternatively 98% percent homology or identity and exhibits substantially equivalent biological activity to the reference protein, polypeptide or nucleic acid. Alternatively, a biological equivalent is a peptide encoded by a nucleic acid that hybridizes under stringent conditions to a nucleic acid or complement that encodes the peptide or with respect to polynucleotides, those hybridize under stringent conditions to the reference polynucleotide or its complement. Hybridization reactions can be performed under conditions of different "stringency". In general, a low stringency hybridization reaction is carried out at about 40° C. in about 10×SSC or a solution of equivalent ionic strength/temperature. A moderate stringency hybridization is typically performed at about 50° C. in about 6×SSC, and a high stringency hybridization reaction is generally performed at about 60° C. in about 1×SSC. Hybridization reactions can also be performed under "physiological conditions" which is well known to one of skill in the art. A non-limiting example of a physiological condition is the temperature, ionic strength, pH and concentration of $Mg^{2+}$ normally found in a cell.

A polynucleotide or polynucleotide region (or a polypeptide or polypeptide region) having a certain percentage (for example, about 60%, 65%, 70%, 75%, 80%, 85%, 90%, 95% or 97%) of "sequence identity" to another sequence means that, when aligned, that percentage of bases (or amino acids) are the same in comparing the two sequences. The alignment and the percent homology or sequence identity can be determined using software programs known in the art, for example those described in Current Protocols in Molecular Biology (Ausubel et al., eds. 1987) Supplement 30, section 7.7.18, Table 7.7.1. Preferably, default parameters are used for alignment. A preferred alignment program is BLAST, using default parameters. In particular, preferred programs are BLASTN and BLASTP, using the following default parameters: Genetic code=standard; filter=none; strand=both; cutoff=60; expect=10; Matrix=BLOSUM62; Descriptions=50 sequences; sort by=HIGH SCORE; Databases=non-redundant, GenBank+EMBL+DDBJ+PDB+GenBank CDS translations+SwissProtein+SPupdate+PIR. Details of these programs can be found at the following Internet address: ncbi.nlm.nih.gov/cgi-bin/BLAST.

"Homology" or "identity" or "similarity" refers to sequence similarity between two peptides or between two nucleic acid molecules. Homology can be determined by comparing a position in each sequence which may be aligned for purposes of comparison. When a position in the compared sequence is occupied by the same base or amino acid, then the molecules are homologous at that position. A degree of homology between sequences is a function of the number of matching or homologous positions shared by the sequences. An "unrelated" or "non-homologous" sequence shares less than 40% identity, or alternatively less than 25% identity, with one of the sequences of the present disclosure.

An "equivalent" of a polynucleotide or polypeptide refers to a polynucleotide or a polypeptide having a substantial homology or identity to the reference polynucleotide or polypeptide. In one aspect, a "substantial homology" is greater than about 60%, 65%, 70%, 75%, 80%, 85%, 90%, 95% or 98% homology.

"Substantially homogenous" when referring to a composition intends greater than about 50%, or about 60%, or about 65%, or about 70%, or about 75%, or about 80%, or about 85%, or about 90%, or about 95% or about 98%, or about 100% homogenous.

As used herein, "expression" refers to the process by which polynucleotides are transcribed into mRNA and/or the process by which the transcribed mRNA is subsequently being translated into peptides, polypeptides, or proteins. If the polynucleotide is derived from genomic DNA, expression may include splicing of the mRNA in a eukaryotic cell.

The term "encode" as it is applied to polynucleotides refers to a polynucleotide which is said to "encode" a polypeptide if, in its native state or when manipulated by methods well known to those skilled in the art, it can be transcribed and/or translated to produce the mRNA for the polypeptide and/or a fragment thereof. The antisense strand is the complement of such a nucleic acid, and the encoding sequence can be deduced therefrom.

"Regulatory polynucleotide sequences" intends any one or more of promoters, operons, enhancers, as known to those skilled in the art to facilitate and enhance expression of polynucleotides.

An "expression vehicle" is a vehicle or a vector, non-limiting examples of which include viral vectors or plasmids, that assist with or facilitate expression of a gene or polynucleotide that has been inserted into the vehicle or vector.

A "delivery vehicle" is a vehicle or a vector that assists with the delivery of an exogenous polynucleotide into a target cell. The delivery vehicle may assist with expression or it may not, such as traditional calcium phosphate transfection compositions.

"An effective amount" refers to the amount of an active agent or a pharmaceutical composition sufficient to induce a desired biological and/or therapeutic result. That result can be alleviation of the signs, symptoms, or causes of a disease, or any other desired alteration of a biological system. The effective amount will vary depending upon the health condition or disease stage of the subject being treated, timing of administration, the manner of administration and the like, all of which can be determined readily by one of ordinary skill in the art.

As used herein, the terms "treating," "treatment" and the like are used herein to mean obtaining a desired pharmacologic and/or physiologic effect. The effect may be prophylactic in terms of completely or partially preventing a disorder or sign or symptom thereof, and/or may be therapeutic in terms of a partial or complete cure for a disorder and/or adverse effect attributable to the disorder. In one aspect, the terms "treating" and "treatment" excludes prevention or prophylaxis.

As used herein, to "treat" further includes systemic amelioration of the symptoms associated with the pathology and/or a delay in onset of symptoms. Clinical and subclinical evidence of "treatment" will vary with the pathology, the subject and the treatment.

"Administration" can be effected in one dose, continuously or intermittently throughout the course of treatment. Methods of determining the most effective means and dosage of administration are known to those of skill in the art and will vary with the composition used for therapy, the purpose of the therapy, the target cell being treated, and the subject being treated. Single or multiple administrations can be carried out with the dose level and pattern being selected by the treating physician. Suitable dosage formulations and methods of administering the agents are known in the art. Route of administration can also be determined and method of determining the most effective route of administration are known to those of skill in the art and will vary with the composition used for treatment, the purpose of the treatment, the health condition or disease stage of the subject being treated, and target cell or tissue. Non-limiting examples of route of administration include oral administration, nasal administration, injection, topical application, intraperitoneal, intravenous and by inhalation. An agent of the present disclosure can be administered for therapy by any suitable route of administration. It will also be appreciated that the preferred route will vary with the condition and age of the recipient, and the disease being treated.

The agents and compositions of the present disclosure can be used in the manufacture of medicaments and for the treatment of humans and other animals by administration in accordance with conventional procedures, such as an active ingredient in pharmaceutical compositions.

As used herein, the term "patient" or "subject" intends an animal, a mammal or yet further a human patient. For the purpose of illustration only, a mammal includes but is not limited to a human, a feline, a canine, a simian, a murine, a bovine, an equine, a porcine or an ovine. In terms of cells, the term "mammalian cells" includes, but is not limited to cells of the following origin: a human, a feline, a canine, a simian, a murine, a bovine, an equine, a porcine or an ovine.

As used herein, the term "detectable label" intends a directly or indirectly detectable compound or composition that is conjugated directly or indirectly to the composition to be detected, e.g., N-terminal histidine tags (N-His), magnetically active isotopes, e.g., $^{115}$Sn, $^{117}$Sn and $^{119}$Sn, a non-radioactive isotope such as $^{13}$C and $^{15}$N, polynucleotide or protein such as an antibody so as to generate a "labeled" composition. The term also includes sequences conjugated to the polynucleotide that will provide a signal upon expression of the inserted sequences, such as green fluorescent protein (GFP) and the like. The label may be detectable by itself (e.g. radioisotope labels or fluorescent labels) or, in the case of an enzymatic label, may catalyze chemical alteration of a substrate compound or composition that is detectable. The labels can be suitable for small-scale detection or more suitable for high-throughput screening. As such, suitable labels include, but are not limited to magnetically active isotopes, non-radioactive isotopes, radioisotopes, fluorochromes, luminescent compounds, dyes, and proteins, including enzymes. The label may be simply detected or it may be quantified. A response that is simply detected generally comprises a response whose existence merely is confirmed, whereas a response that is quantified generally comprises a response having a quantifiable (e.g., numerically reportable) value such as intensity, polarization, and/or other property. In luminescence or fluorescence assays, the detectable response may be generated directly using a luminophore or fluorophore associated with an assay component actually involved in binding, or indirectly using a luminophore or fluorophore associated with another (e.g., reporter or indicator) component.

Examples of luminescent labels that produce signals include, but are not limited to bioluminescence and chemiluminescence. Detectable luminescence response generally comprises a change in, or an occurrence of, a luminescence signal. Suitable methods and luminophores for luminescent labeling assay components are known in the art and described for example in Haugland, Richard P. (1996) Handbook of Fluorescent Probes and Research Chemicals ($6^{th}$ ed.). Examples of luminescent probes include, but are not limited to, aequorin and luciferases.

Examples of suitable fluorescent labels include, but are not limited to, fluorescein, rhodamine, tetramethylrhodamine, eosin, erythrosin, coumarin, methyl-coumarins, pyrene, Malacite green, stilbene, Lucifer Yellow, Cascade Blue™, and Texas Red™. Other suitable optical dyes are described in the Haugland, Richard P. (1996) Handbook of Fluorescent Probes and Research Chemicals ($6^{th}$ ed.).

In another aspect, the fluorescent label is functionalized to facilitate covalent attachment to a cellular component present in or on the surface of the cell or tissue such as a cell surface marker. Suitable functional groups, including, but not are limited to, isothiocyanate groups, amino groups, haloacetyl groups, maleimides, succinimidyl esters, and sulfonyl halides, all of which may be used to attach the fluorescent label to a second molecule. The choice of the functional group of the fluorescent label will depend on the site of attachment to either a linker, the agent, the marker, or the second labeling agent.

The term "scFv" refers to a single-chain variable fragment. scFv is a fusion protein of the variable regions of the heavy (VH) and light chains (VL) of immunoglobulins, connected with a linker peptide. The linker peptide can be from about 5 to 40 amino acids or from about 10 to 30 amino acids or about 5, 10, 15, 20, 25, 30, 35, or 40 amino acids in length. Single-chain variable fragments lack the constant Fc region found in complete antibody molecules, and, thus, the common binding sites (e.g., Protein G) used to purify antibodies. These fragments can often be purified or immobilized using Protein L, since Protein L interacts with the variable region of kappa light chains. More commonly, scientists incorporate a six histidine tag (SEO ID NO: 56) on the c-terminus of the scFv molecule and purify them using immobilized metal affinity chromatography (IMAC). For unknown reasons, some scFv can also be captured by Protein A.

As used herein, the term CD20+ or CD20-related disorder intends a disease or condition marked by the expression of the CD20 receptor on the diseased or cell or tissue. In one aspect the disease is cancer such as lymphoma (non-Hodgkin's lymphoma) or CD20 expressing leukemia. In another aspect, the disease is an autoimmune disease such as Sjögren's syndrome, rheumatoid arthritis, coeliac disease, Crohn's disease and systemic lupus erythematosus. Tarella et al. (2013) Autoimmunity Reviews 12:802-813. In another aspect, a CD20-related disorder is any that has been treated by conventional CD20 antibody therapies such as rituximab. ELP fusions comprising an anti-CD20 antibody fragment are useful to treat these disorders.

As used herein, an "antibody" includes whole antibodies and any antigen binding fragment or a single chain thereof. Thus the term "antibody" includes any protein or peptide containing molecule that comprises at least a portion of an immunoglobulin molecule. Examples of such include, but are not limited to a complementarity determining region (CDR) of a heavy or light chain or a ligand binding portion thereof, a heavy chain or light chain variable region, a heavy chain or light chain constant region, a framework (FR) region, or any portion thereof, or at least one portion of a binding protein, any of which can be incorporated into an antibody of the present invention. The term "antibody" is further intended to encompass digestion fragments, specified portions, derivatives and variants thereof, including antibody mimetics or comprising portions of antibodies that mimic the structure and/or function of an antibody or specified fragment or portion thereof, including single chain antibodies and fragments thereof. It also includes in some aspects, antibody variants, polyclonal antibodies, human antibodies, humanized antibodies, chimeric antibodies, antibody derivatives, a bispecific molecule, a multispecific molecule, a heterospecific molecule, heteroantibodies and human monoclonal antibodies.

Examples of binding fragments encompassed within the term "antigen binding portion" of an antibody include a Fab fragment, a monovalent fragment consisting of the $V_L$, $V_H$, $C_L$ and CH, domains; a F(ab')2 fragment, a bivalent fragment comprising two Fab fragments linked by a disulfide bridge at the hinge region; a Fd fragment consisting of the $V_H$ and $C_H$, domains; a Fv fragment consisting of the $V_L$ and $V_H$ domains of a single arm of an antibody, a dAb fragment (Ward et al. (1989) Nature 341:544-546), which consists of a $V_H$ domain; and an isolated complementarity determining region (CDR). Furthermore, although the two domains of the Fv fragment, $V_L$ and $V_H$, are coded for by separate genes, they can be joined, using recombinant methods, by a synthetic linker that enables them to be made as a single protein chain in which the $V_L$ and $V_H$ regions pair to form monovalent molecules (known as single chain Fv (scFv)). Bird et al. (1988) Science 242:423-426 and Huston et al. (1988) Proc. Natl. Acad Sci. USA 85:5879-5883. Single chain antibodies are also intended to be encompassed within the term "fragment of an antibody." Any of the above-noted antibody fragments are obtained using conventional techniques known to those of skill in the art, and the fragments are screened for binding specificity and neutralization activity in the same manner as are intact antibodies.

Cyclosporin A is a cyclic undecapeptide from an extract of soil fungi. It is a powerful immunosuppressant with a specific action on T-lymphocytes. It is used for the prophylaxis of graft rejection in organ and tissue transplantation. (From Martindale, The Extra Pharmacopoeia, 30th ed). The IUPAC name is cyclo[((2S)-2-aminobutyryl)-sarcosyl-N-methyl-L-leucyl-L-valyl-N-methyl-L-leucyl-L-alanyl-D-alanyl-N-methyl-L-leucyl-N-methyl-L-leucyl-N-methyl-L-valyl-N-methyl-(4R)-4-[(E)-but-2-enyl]-4-methyl-L-threonyl] (SEQ ID NO: 39) or (3S,6S,9S,12R,15S,18S,21S,24S,30S,33S)-30-ethyl-33-[(E,1R,2R)-1-hydroxy-2-methylhex-4-enyl]-1,4,7,10,12,15,19,25,28-nonamethyl-6,9,18,24-tetrakis(2-methylpropyl)-3,21-di(propan-2-yl)-1,4,7,10,13,16,19,22,25,28,31-undecazacyclotritriacontane-2,5,8,11,14,17,20,23,26,29,32-undecone. The undecapeptide has the structure:

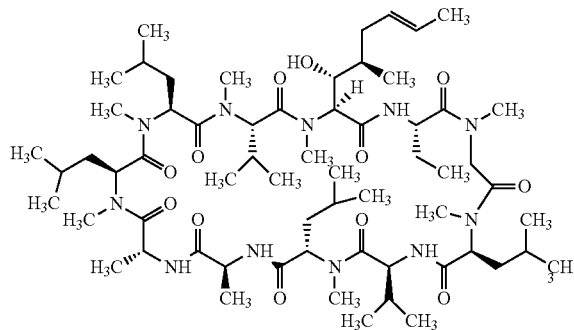

Cyclosporin A has the amino acid sequence: 0 D-Ala 1 Leu 2 Leu 3 Val 4 Thr 5 Abu 6 Sar 7 Leu 8 Val 9 Leu 10 Ala (Cyclization: 0-10) (SEQ ID NO: 39).

All trans retinoic acid (ALTA), as used herein, is a medication used for the treatment of acne, acute promyelocytic leukemia and other cancers as described herein. ALTA has the structure:

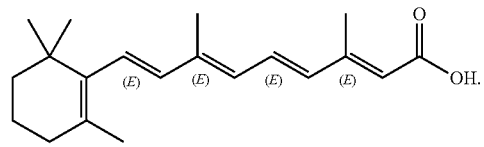 [SMILES: CC1=C(/C=C/C(C)=C/C=C/C(C)=C/C(=O)O)C(C)(C)CCC1]

Cyclophilin A (SEQ ID NO: 22 or SEQ ID NO: 23) is also known as peptidylprolyl isomerase A. It is found in the cytosol. The sequence of the human protein and polynucleotide encoding the protein is disclosed under GenBank Accession No.: NP_066953 (last accessed on Oct. 7, 2013).

As used herein "CA96C" refers to a polynucleotide encoding the ELP fusion protein of amino acid sequence SEQ ID NO: 8, or to the protein itself.

As used herein "3(CA24)C" refers to a polynucleotide encoding the ELP fusion protein of amino acid sequence SEQ ID NO: 9, or to the protein itself.

As used herein "5FA" refers to a polynucleotide encoding the ELP fusion protein of amino acid sequence SEQ ID NO: 10, or to the protein itself.

As used herein "5FV" refers to a polynucleotide encoding the ELP fusion protein of amino acid sequence SEQ ID NO: 11, or to the protein itself.

As used herein "4PA" refers to a polynucleotide encoding the ELP fusion protein of amino acid sequence SEQ ID NO: 15, or to the protein itself.

As used herein "FAF" refers to a polynucleotide encoding the ELP fusion protein of amino acid sequence SEQ ID NO: 25, or to the protein itself.

FK506 Binding protein 12 (FKBP (SEQ ID NO: 24)) is a protein that has prolylisomerase activity and is related to the cyclophilins in function. Along with cyclophilin, FKBP belongs to the imimunophilin family. The gene that enccodes for FKBP is FRAP1, having GenBank Accession No.: T1584057.1. A published amino acid sequence comprises, or alternatively consists essentially of, or yet further consists of that according to SEQ ID NO: 24.

"PIN1" or peptidyl-prolyl cis/trans isomerase (PPIase), isomerizes only phospho-Serine/Threonine-Proline motifs. The enzyme binds to a subset of proteins and thus plays a role as a post phosphorylation control in regulating protein function. The amino acid sequence of PIN1 is:

ADEEKLPPGWEKRMSRSSGRVYYFNHITNASQW ER PSGNSSSGGKNGQGEPARVRCSH LLVKISQS RRPS SW-RQEKITRTKEEALELiNGYIQKIKSGEEDFESLA SQFSDCSSAKARG DLGAFSRGQMQKPFEDASFALRT-GEMSGPVFTDSGIHIILRTEG (SEQ ID NO: 31). The sequence of the polynucleotide encoding this protein can be found under Gen Bank Accession Nos. NM006221, NM_023371, and NM_001364495.

In some embodiments, therapeutic agents for use in the ELP fusions are cathepsin S inhibitory peptides (CATSIP) that comprise, or alternatively consist essentially of, or yet further consist of the sequence NHLGDMTSEEVMSLTSS (SEQ ID NO: 30) or a biological equivalent thereof. The polynucleotide encoding the therapeutic agent (and therefore the polypeptide upon expression of the polynucleotide) can be fused to the N-terminal or C-terminal end of the ELP fusion or within it. In one embodiment, the therapeutic agent is trapped within a stable nanoparticle formed by the ELP when the environmental temperature is above the transition temperature of the ELP.

ICAM-1 also is known as intercellular adhesion molecule 1 and major group rhinovirus receptor, CD54 antigen. ICAMs are members of the Ig superfamily of calcium-independent transmembrane glycoproteins. ICAM-1 is a ligand for lymphocyte function-associated (LFA) and Mac-1 integrins and the major human rhinovirus receptor. The primary function of ICAM-1 is to provide adhesion between endothelial cells and leukocytes after stress or injury. The human ICAM-1 gene codes for a 505 amino acid transmembrane glycoprotein containing a 29 amino acid cytoplasmic domain, a 23 amino acid transmembrane domain, and a 453 amino acid extracellular domain. Recombinant human ICAM-1 is a 49.5 kDa glycoprotein comprising the extracellular domain (453 amino acid residues) of ICAM-1. Monomeric glycosylated ICAM-1 migrates at an apparent molecular weight of approximately 72.0-80.0 kDa by SDS-PAGE analysis under reducing conditions. The protein is available commercially from PeproTech (Cat. #150-05). A published amino acid sequence is: QTSVSPSKVI LPRGGSVLVT CSTSCDQPKL LGIETPLPKK ELLLPGNNRK VYELSNVQED SQPMCYSNCP DGQSTAKTFL TVYWTPERVE LAPLPSWQPV GKNLTLRCQV EGGAPRANLT VVLLRGEKEL KREPAVGEPA EVTTTVLVRR DHHGANFSCR TELD-LRPQGL ELFENTSAPY QLQTFVLPAT PPQLVSPRVL EVDTQGTVVC SLDGLFPVSE AQVHLALGDQ RLNPTVTYGN DSFSAKASVS VTAEDEGTQR LTCAVTLGNQ SQETLQTVTI YSFPAPNVIL TKPE-VSEGTE VTVKCEAHPR AKVTLNGVPA QPLGPRAQLL LKATPEDNGR SFSCSATLEV AGQ-LIHKNQT RELRVLYGPR LDERDCPGNW TWPENSQQTP MCQAWGNPLP ELKCLKDGTF PLPIGESVTV TRDLEGTYLC RARSTQGEVT RKVTVNVLSP RYE (SEQ ID NO: 32).

ICAM-1 has been shown to bind to CD11a, EZR and CD18. CD11a is Integrin, alpha L (antigen CD11A (p180), lymphocyte function-associated antigen 1; alpha polypeptide), also known as ITGAL, is a human gene that functions in the immune system. It is involved in cellular adhesion and costimulatory signaling. It is the target of the drug Efalizumab. Efalizumba (trade name Raptiva, marketed by Genentech, Merck Serono) is used to treat autoimmune diseases such as psoriasis. It is a recombinant humanized monoclonal antibody which acts by inhibiting lymphocyte activation and cell migration out of blood vessels into tissues. ITGAL encodes the integrin alpha L chain. EZR or Ezrin also known as cytovillin or villin-2 is a protein that in humans is encoded by the EZR gene. The cytoplasmic peripheral membrane protein encoded by this gene functions as a protein-tyrosine kinase substrate in microvilli. As a member of the ERM protein family, this protein serves as an intermediate between the plasma membrane and the actin cytoskeleton. It plays a key role in cell surface structure adhesion, migration, and organization. CD18 is also known as integrin beta-2. It is encoded by the ITGB2 gene. It is reported as the beta subunit of four different structures: LFA-1 (paired with CD11a); Macrophage-1 antigen (paired with CD11b); Integrin alphaXbeta2 (paired with CD11c); and Integrin alphaDbeta2 (paired with CD11d). The ITGB2 protein product is the integrin beta chain beta 2. Integrins are integral cell-surface proteins composed of an alpha chain and a beta chain. A given chain may combine with multiple partners resulting in different integrins. For example, beta 2 combines with the alpha L chain to form the integrin LFA-1, and combines with the alpha M chain to form the integrin Mac-1. Integrins are known to participate in cell adhesion as well as cell-surface mediated signaling. In humans lack of CD18 causes Leukocyte Adhesion Deficiency, a disease defined by a lack of leukocyte extravasation from blood into tissues.

In one aspect, the ELP comprises a carrier agent that binds the ICAM-1 receptor, an example of such that comprises, or alternatively consists essentially of, or consists of the amino acid sequence FEGFSFLAFEDFVSSI (SEQ ID NO: 28) or a biological equivalent thereof. A biological equivalent of this ELP fusion is a peptide that has at least 80% sequence identity to FEGFSFLAFEDFVSSI (SEQ ID NO: 28) or a peptide encoded by a polynucleotide that hybridizes under conditions of high stringency to a polynucleotide that encodes FEGFSFLAFEDFVSSI (SEQ ID NO: 28) or its complement, wherein conditions of high stringency comprise hybridization reaction at about 60° C. in about 1×SSC. The biological equivalent will retain the characteristic or function of binding to the receptor.

In another aspect, the ELP comprises a carrier agent that binds the ICAM-1 receptor, an example of such as the agent that comprises, or alternatively consists essentially of, or yet further consists of, the amino acid sequence EWCEYLG-GYLRCYA (SEQ ID NO: 29) or a biological equivalent thereof. A biological equivalent of EWCEYLGGYLRCYA (SEQ ID NO: 29) is a peptide that has at least 80% sequence identity to EWCEYLGGYLRCYA (SEQ ID NO: 29) or a peptide encoded by a polynucleotide that hybridizes under conditions of high stringency to a polynucleotide that encodes EWCEYLGGYLRCYA (SEQ ID NO: 29) or its complement, wherein conditions of high stringency comprise hybridization reaction at about 60° C. in about 1×SSC. The biological equivalent will retain the characteristic or function of binding to the receptor.

Rapamycin is a small molecule drug with the IUPAC name (3S,6R,7E,9R,10R,12R,14S,15E,17E,19E,21S,23S,26R,27R,34aS)-9,10,12,13,14,21,22,23,24,25,26,27,32,33,34,34a-hexadecahydro-9,27-dihydroxy-3-[(1R)-2-[(1S,3R,4R)-4-hydroxy-3-methoxycyclohexyl]-1-methylethyl]-10,21-dimethoxy-6,8,12,14,20,26-hexamethyl-23,27-epoxy-3H-pyrido[2,1-c][1,4]-oxaazacyclohentriacontine-1,5,11,28,29 (4H,6H,31H)-pentoneis). It is an immunosuppressant drug used to prevent rejection in organ transplantation and has been used in the treatment of cancers. It is marketed under the trade name Rapamune™ by Pfizer.

The mammalian target of rapamycin is known as mTOR or FK506 binding protein 12-rapamycin associated protein 1 (FRAP1, referenced herein is FK506 Binding Protein or "FKBP"), is a protein that in humans is encoded by the FRAP1 gene. The protein and gene sequence encoding the protein are disclosed under GenBank Accession No. NG_033239 (last accessed on Sep. 6, 2013). mTOR is a serine/threonine protein kinase that regulates cell growth, proliferation, cell survival, protein synthesis among other functions.

Everolimus is the 40-O-(2-hydroxyethyl) derivative of sirolimus and works similarly to sirolimus as an inhibitor of the mammalian target of rapamycin. It is marketed under the tradenames Zortress™ (USA) and Certican™ (Europe and other countries) in transplantation medicine, and Afinitor™Min oncology. Everolimus also is available with Biocon with the brand name of Evertor-M. It is used as an immunosuppressant to prevent rejection of organ transplants and the treatment of tumors such as renal cell cancer. The compound also is known as dihydroxy-12-[(2R)-1-[(1S,3R, 4R)-4-(2-hydroxyethoxy)-3-methoxycyclohexyl]propan-2-yl]-19,30-dimethoxy-15,17,21,23,29,35-hexamethyl-11,36-dioxa-4-azatricyclo [30.3.1.0 hexatriaconta-16,24,26,28-tetraene-2,3,10,14,20-pentone.

Temsirolimus is (CCI-779) is a derivative of sirolimus and is sold as Torisel™. It is an intravenous drug for the treatment of renal cell carcinoma, developed by Wyeth Pharmaceuticals. It also is approved by the European Medicines Agency (EMEA) on November 2007. The compound also is known as (1R,2R,4S)-4-{(2R)-2-[(3S,6R,7E,9R,10R, 12R,14S,15E, 17E,19E,21S,23S,26R,27R,34aS)-9,27-dihydroxy-10,21-dimethoxy-6,8, 12, 14,20,26-hexamethyl-1,5, 11,28,29-pentaoxo-1,4,5,6,9,10,11,12,13,14,21,22,23,24, 25,26,27,28,29,31,32,33,34,34a-tetracosahydro-3H-23,27-epoxypyrido[2,1-c][1,4]oxazacyclohentriacontin-3-yl]propyl}-2-methoxycyclohexyl 3-hydroxy-2-(hydroxymethyl)-2-methylpropanoate.

Ridaforolimus (also known as AP23573 and MK-8669; formerly known as Deforolimus) is an investigational targeted and small-molecule inhibitor of the protein mTOR. The compound also is known as (1R,2R,4S)-4-[(2R)-2-[(1R, 9S,12S,15R,16E,18R,19R,21R,23S,24E,26E,28Z,30S,32S, 35R)-1,18-dihydroxy-19,30-dimethoxy-15,17,21,23,29,35-hexamethyl-2,3,10,14,20-pentaoxo-11,36-dioxa-4-azatricyclo[30.3.1.0$^{4,9}$]hexatriaconta-16,24,26,28-tetraen-12-yl]propyl]-2-methoxycyclohexyl dimethylphosphinate.

Tacrolimus (also FK-506 or fujimycin, trade names Prograf™, Advagraf™ Protopic™) is an immunosuppressive drug that is mainly used after allogeneic organ transplant to reduce patient rejection. The drug also is known as 3S[3R*[E (1S*,3S*,4S*)],4S*,5R*,8S*,9E,12R*, 14R*, 15S*, 16R*, 18S*, 19S*,26aR*5,6,8,11,12,13,14, 15,16,17, 18,19,24,25,26,26a-hexadecahydro-5, 19-dihydroxy-3-[2-(4-hydroxy-3 methoxycyclohexyl)-1-methylethenyl]-14,16-dimethoxy-4,10,12,18-tetramethyl-8-(2-propenyl)-15,19-epoxy-3H-pyrido [2,1-c][1,4] oxaazacyclotricosine-1,7,20, 21 (4H,23H)-tetrone, monohydrate.

The term "coxsackievirus and adenovirus receptor" or "CAR" refers to a high affinity receptor that is present in many human tissues, including liver, heart, lacrimal gland, salivary gland, lung, and brain, pancreas and prostate. In humans CAR exists in various isoforms as follows:

```
Isoform 1:
                                        (SEQ ID NO: 40)
MALLLCFVLL CGVVDFARSL SITTPEEMIE KAKGETAYLP

CKFTLSPEDQ GPLDIEWLIS PADNQKVDQV IILYSGDKIY

DDYYPDLKGR VHFTSNDLKS GDASINVTNL QLSDIGTYQC

KVKKAPGVAN KKIHLVVLVK PSGARCYVDG SEEIGSDFKI

KCEPKEGSLP LQYEWQKLSD SQKMPTSWLA EMTSSVISVK

NASSEYSGTY SCTVRNRVGS DQCLLRLNVV PPSNKAGLIA

GAIIGTLLAL ALIGLIIFCC RKKRREEKYE KEVHHDIRED

VPPPKSRTST ARSYIGSNHS SLGSMSPSNM EGYSKTQYNQ

VPSEDFERTP QSPTLPPAKV AAPNLSRMGA IPVMIPAQSK

DGSIV

Isoform 2:
                                        (SEQ ID NO: 41)
MALLLCFVLL CGVVDFARSL SITTPEEMIE KAKGETAYLP

CKFTLSPEDQ GPLDIEWLIS PADNQKVDQV IILYSGDKIY

DDYYPDLKGR VHFTSNDLKS GDASINVTNL QLSDIGTYQC

KVKKAPGVAN KKIHLVVLVK PSGARCYVDG SEEIGSDFKI

KCEPKEGSLP LQYEWQKLSD SQKMPTSWLA EMTSSVISVK

NASSEYSGTY SCTVRNRVGS DQCLLRLNVV PPSNKAGLIA

GAIIGTLLAL ALIGLIIFCC RKKRREEKYE KEVHHDIRED

VPPPKSRTST ARSYIGSNHS SLGSMSPSNM EGYSKTQYNQ

VPSEDFERTP QSPTLPPAKF KYPY

Isoform 3:
                                        (SEQ ID NO: 42)
MALLLCFVLL CGVVDFARSL SITTPEEMIE KAKGETAYLP

CKFTLSPEDQ GPLDIEWLIS PADNQKVDQV GRCATSKEPY

VHCQKLHRQ

Isoform 4:
                                        (SEQ ID NO 43)
MALLLCFVLL CGVVDFARSL SITTPEEMIE KAKGETAYLP

CKFTLSPEDQ GPLDIEWLIS PADNQKVDQV IILYSGDKIY

DDYYPDLKGR VHFTSNDLKS GDASINVTNL QLSDIGTYQC

KVKKAPGVAN KKIHLVVLGK MCHLQRAVRP LPEATSAVII

HPWGPCLLPT WKDIPRLSIT KYQVKTLNAL LRVRLSHLLR

Isoform 5:
                                        (SEQ ID NO: 44)
MALLLCFVLL CGVVDFARSL SITTPEEMIE KAKGETAYLP

CKFTLSPEDQ GPLDIEWLIS PADNQKVDQV IILYSGDKIY

DDYYPDLKGR VHFTSNDLKS GDASINVTNL QLSDIGTYQC

KVKKAPGVAN KKIHLVVLVK PSGARCYVDG SEEIGSDFKI

KCEPKEGSLP LQYEWQKLSD SQKMPTSWLA GKMCHLQRAV

RPLPEATSAV IIHPWGPCLL PTWKDIPRLS ITKYQVKTLN

ALLRVRLSHL

Isoform 6:
                                        (SEQ ID NO 45)
MALLLCFVLL CGVVDFARSL SITTPEEMIE KAKGETAYLP

CKFTLSPEDQ GPLDIEWLIS PADNQKVDQV IILYSGDKIY

DDYYPDLKGR VHFTSNDLKS GDASINVTNL QLSDIGTYQC

KVKKAPGVAN KKIHLVVLVK PSGARCYVDG SEEIGSDFKI
```

-continued

KCEPKEGSLP LQYEWQKLSD SQKMPTSWLA EMTSSVISVK

NASSEYSGTY SCTVRNRVGS DQCLLRLNVV PPSNKAGLIA

GAIIGTLLAL ALIGLIIFCC RKKRREEKYE KEVHHDIRED

VPPPKSRTST ARSYIGSNHS SLGSMSPSNM EGYSKTQYNQ

VPSEDFERTP QSPTLPPAKF KYPYKTDGIT

Isoform 7:
(SEQ ID NO: 46)
MALLLCFVLL CGVVDFARSL SITTPEEMIE KAKGETAYLP

CKFTLSPEDQ GPLDIEWLIS PADNQKVDQV IILYSGDKIY

DDYYPDLKGR VHFTSNDLKS GDASINVTNL QLSDIGTYQC

KVKKAPGVAN KKIHLVVLVK PSGARCYVDG SEEIGSDFKI

KCEPKEGSLP LQYEWQKLSD SQKMPTSWLA ASNKAGLIAG

AIIGTLLALA LIGLIIFCCR KKRREEKYEK EVHHDIREDV

PPPKSRTSTA RSYIGSNHSS LGSMSPSNME GYSKTQYNQV

PSEDFERTPQ SPTLPPAKVA APNLSRMGAI PVMIPAQSKD

GSIV

The term "Polymeric Immunoglobulin Receptor" or "pIgR" refers to a high affinity receptor that is expressed by human mucosal cells. pIgR has the sequence of: MLLFVLT-CLL AVFPAISTKS PIFGPEEVNS VEGNSVSITC YYPPTSVNRH TRKYWCRQGA RGGCITLISS EGYVSSKYAG RANLTNFPEN GTFVVNIAQL SQDDS-GRYKC GLGINSRGLS FDVSLEVSQG PGLLNDTKVY TVDLGRTVTI NCPFKTENAQ KRKSLYKQIG LYPVLVIDSS GYVNPNYTGR IRLDIQGTGQ LLFSV-VINQL RLSDAGQYLC QAGDDSNSNK KNADLQVLKP EPELVYEDLR GSVTFHCALG PEVAN-VAKFL CRQSSGENCD VVVNTLGKRA PAFEGRILLN PQDKDGSFSV VITGLRKEDA GRYLCGAHSD GQLQEGSPIQ AWQLFVNEES TIPRSPTVVK GVAGGSVAVL CPYNRKESKS IKYWCLWEGA QNGRCPLLVD SEGWVKAQYE GRLSLLEEPG NGTFTVILNQ LTSRDAGFYW CLTNGDTLWR TTVEIKIIEG EPNLKVPGNV TAVLGETLKV PCHFPCKFSS YEKYWCKWNN TGCQALPSQD EGPSKAFVNC DENSRLVSLT LNLVTRADEG WYWCGVKQGH FYGETAAVYV AVEERKAAGS RDVSLAKADA APDEKVLDSG FREIENKAIQ DPRL-FAEEKA VADTRDQADG SRASVDSGSS EEQGGSSRAL VSTLVPLGLV LAVGAVAVGV ARAR-HRKNVD RVSIRSYRTD ISMSDFENSR EFGANDNMGA SSITQETSLG GKEEFVATTE STTETKEPKK AKRSSKEEAE MAYKDFLLQS STVAAEAQDG PQEA (SEQ ID NO: 47)

"LGAC" or "lacrimal gland acinar cell" is a specific cell type of the lacrimal gland that expresses CAR and pIgR on the cell surface. These cells are also sometimes referred to lacrimal acinar epithelial cells.

"Knob" as used herein refers to the knob domain of Human adenovirus C serotype 5 (HAdV-5) (Human adenovirus 5) having the sequence:

(SEQ ID NO: 26)
GAITVGNKNNDKLTLWTTPAPSPNCRLNAEKDAKLTLVLTKCGSQILATV

SVLAVKGSLAPISGTVQSAHLIIRFDENGVLLNNSFLDPEYWNFRNGDLT

EGTAYTNAVGFMPNLSAYPKSHGKTAKSNIVSQVYLNGDKTKPVTLTITL

NGTQETGDTTPSAYSMSFSWDWSGHNYINEIFATSSYTFSYIAQE.

The term "mIgA" refers to the pIgR-binding site in the Cα3 domain of dimeric human IgA. The Cα3 domain is represented by the protein sequence: RP EVHLLPPPSE ELALNELVTL TCLARGFSPK DVLVRWLQGS QEL-PREKYLT WASRQEPSQG TTTFAVTSIL RVAAE-DWKKG DTFSCMVGHE ALPLAFTQKT ID (SEQ ID. NO: 27) (See for e.g. Frank W. Putnam, et al. J. Biol. Chem. 254, 2865-2874).

In further embodiments, the ELP comprises a mIgA ligand or double mIgA ligand. This ligand is represented by the amino acid sequence TWASRQEPSQGTTTFAVTS (SEQ ID. NO: 48) or a biological equivalent thereof. In one embodiment, the mIgA ligand comprises a polypeptide having the sequence of TWASRQEPSQGTTTFAVTS (SEQ ID NO: 49) or a biological equivalent thereof. The term "biological equivalent" is defined above. In one aspect, a biological equivalent is a peptide encoded by a nucleic acid that hybridizes to a nucleic acid that encodes the mIgA ligand or double mIgA ligand or its complement under conditions of a high stringency hybridization reaction, that is performed at about 60° C. in about 1×SSC that has substantial identical biological activity to the above-noted sequence. In certain embodiments, the ELP comprises the mIgA ligand or a polypeptide with at least 80% identity to mIgA. Alternatively, the polypeptide has about at least 85% or about at least 90% or about at least 95%, or about at least 99% identity to mIgA.

"Rapalogue" as used herein, refers to analogues of rapamycin. Analogues may include substitution of one or more positions of rapamycin with alternate functional groups. In general, "substitution" refers to substitution of a rapamycin-like compound (e.g., Rapamycin, Everolimus, Temsirolimus, Ridaforolimus, Tacrolimus) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted rapamycin-like compound will be substituted with one or more substituents, unless otherwise specified. In some embodiments, a substituted compound is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitrites (i.e., CN); and the like. In one embodiment the rapalogue is Rapamycin, Everolimus, Temsirolimus, Ridaforolimus or Tacrolimus.

ELP Compositions

This disclosure provides an isolated agent comprising, or alternatively consisting essentially of, or yet further consisting of a multimeric elastin-like peptide (ELP) component that forms a drug binding domain stabilized by the ELP fused to a drug binding domain such as cyclophilin A (SEQ ID NO: 22 or SEQ ID NO: 23) or a fragment thereof, or an equivalent of each thereof, and optionally, a therapeutic agent. Therapeutic agents would include small molecule drugs capable of binding to the ELP fusion. For example, if the ELP contained cyclophilin, then it can be used to carry cyclosporine A. Alternatively, if the ELP fusion contains the FKBP (SEQ ID NO: 24) protein, it could carry a member of the drug family known as the rapalogues. Alternatively, if the ELP fusion contains the PIN1 protein, it could carry all-trans retinoic acid.

In contrast to prior ELP compositions, the agents of this disclosure exists in a dimeric, trimeric or other multimeric form, wherein the ELP components are conjugated to each other in solution. The molecular weight of the dimeric form of the agent is from about 170 kD to about 200 kD, or from about 180 kD to about 190 kD, or about 185 kD, or about 180 kD, or about 181 kD, or about 182 kD, or about 183 kD, or about 184 kD (+/−4.133%). In one aspect the polymeric form of the ELP is a dimer, a trimer, or a tetramer, or a pentamer of the ELP-cyclophilin A construct.

The molecular weight of the trimeric form of the agent is from about 270 kD (+/−4.133%).

The molecular weight of the quaternary form of the agent is from about 360 kD (+/−4.133%).

In some embodiments, the agent comprises 1 ELP. In some embodiments, the agent comprises 2 ELPs. In some embodiments, the agent comprises 3 ELPs. In some embodiments, the agent comprises 4 ELPs. In some embodiments, the agent comprises 5 ELPs.

In some embodiments, the agent comprises 1 drug binding domain. In some embodiments, the agent comprises 2 drug binding domains. In some embodiments, the agent comprises 3 drug binding domains. In some embodiments, the agent comprises 4 drug binding domains. In some embodiments, the agent comprises 5 or more drug binding domains.

Also provided is a substantially homogenous composition of ELP fusion agents.

Applicants have found that the multimeric agent has superior drug solubility, absorption, bioavailability, and reduce clearance once in the blood. Therefore, this polymeric form enables intermuscular, intraperitoneal, and subcutaneous administration. Thus, the use of the polymeric form also reduces dose frequency.

Drug Binding Domains

Cyclophilin A

In one aspect, the at least one of the two or more drug binding domains is cyclophilin A (SEQ ID NO: 22 or SEQ ID NO: 23), a fragment or an equivalent of each thereof. In one aspect, two, three, four or all of the two or more drug binding domains in the ELP fusion are cyclophilin A (SEQ ID NO: 22 or SEQ ID NO: 23), a fragment or an equivalent of each thereof. Cyclophilin A (SEQ ID NO: 22 or SEQ ID NO: 23) binds to cyclosporine, its cognate receptor. Cyclophilin A (SEQ ID NO: 22 or SEQ ID NO: 23) also binds to cell surface receptor, CD147. In one aspect, an equivalent of cyclophilin A (SEQ ID NO: 22 or SEQ ID NO: 23) or its fragment binds to cyclosporine or CD147. In one aspect, a therapeutic agent is bound to or trapped within the ELP or coacervate formed by the ELP, which in one aspect, is when the ELP is above the transition temperature. The cyclophilin-ELP fusion can be noncovalently complexed with the therapeutic agent, such that it promotes drug solubility, absorption, and bioavailability following administration. In another aspect, the ELP is selected for its ability to form a nanoparticle or coacervate at body temperature, such that duration of drug efficacy is extended, thus reducing the frequency of administration, such as parenteral administration.

In another aspect, the ELP fusion further comprises a therapeutic agent that binds to cyclophilin A (SEQ ID NO: 22 or SEQ ID NO: 23) and is selected to treat one or more of organ rejection in patients receiving liver, kidney, or heart transplant; Graft-versus-host disease, particularly in bone-marrow transplantation; Rheumatoid arthritis, and related diseases, Psoriasis, Persistent nummular keratitis, Atopic dermatitis, Kimura disease, Pyoderma gangrenosum, chronic autoimmune urticaria, Acute systemic mastocytosis, and, Dry eyes, Sjögren's syndrome, autoimmune disorders such as acute severe ulcerative colitis, systemic lupus erythematosus, and autoimmune urticaria that do not respond to treatment with steroids; posterior or intermediate uveitis with noninfective cause; and atopic dermatitis (veterinary use), neuronal cellular damage and reperfusion injury in traumatic brain injury, and cardiac hypertrophy.

In a yet further aspect, the therapeutic agent is cyclosporin A, a prodrug or a pharmaceutically acceptable salt thereof, and wherein biological equivalent of cyclosporin A or the fragment thereof is a peptide that has at least 80% sequence identity to cyclosporin A or the fragment, or a peptide encoded by a polynucleotide that hybridizes under conditions of high stringency to a polynucleotide that encodes cyclophilin A (SEQ ID NO: 22 or SEQ ID NO: 23), the fragment or their complements, wherein conditions of high stringency comprise hybridization reaction at about 60° C. in about 1×SSC and binds cyclophilin A. Examples of the peptide sequence of cyclosporin A are provided herein.

Cyclosporin A (CsA) is a well-known lipophilic cyclic immunosuppressant peptide containing 11 amino acids and works by blocking T-cell proliferation and inhibiting the release of inflammatory cytokines, such as IL-2 and IFN-7 (Stevenson et al., 2012). It has been widely used in prevention of rejection after organ transplantation and in modulation of inflammatory responses in several autoimmune disorders, such as rheumatoid arthritis and psoriasis (Colombo and Ammirati, 2011).

When administrated topically, CsA has been broadly used to treat dry eye syndrome (DES), a multifactorial disease of the ocular surface caused by decreased tear production which affects an estimated 5-30% of the population (Cornec et al., 2015, Janine, 2007), by suppressing ocular surface inflammation. Because of its hydrophobic property, the only commercially available topical administration form of CsA is as an oil-in-water emulsion eye drop, which leads to poor ocular tolerance, low bioavailability, and instability (Gupta and Chauhan, 2011). In addition, when administrated through intravenous injection, CsA can potentially lead to a number of serious adverse drug reactions (ADRs) because of its narrow therapeutic window (Mahalati et al., 2001). Below the therapeutic window, CsA cannot effectively inhibit T cell proliferation and the release of related cytokines, its major therapeutic actions, while above the therapeutic window, it is known to elicit severe side effects including nephrotoxicity and neurotoxicity (Survase et al., 2011). Thus, the disclosed ELP fusions comprising CsA can be used for treatment of the same diseases or disorders as CsA.

In one embodiment, the therapeutic agent is selected from Rapamycin, Everolimus, Temsirolimus, Ridaforolimus, or Tacrolimus. In one embodiment, the therapeutic agent is a rapamycin analog or rapalogue.

In a further aspect, the therapeutic agent is an agent that is selected from the group of: an agent that treats Sjögren's Syndrome, an agent that prevents immune rejection, an agent that modulates inflammatory responses, an agent that treats autoimmune disorders, an agent that treats rheumatoid arthritis, an agent that treats psoriasis, an agent to treat dry eye syndrome (DES). In another aspect, the therapeutic agent is a peptide that treats or ameliorates the symptoms of Sjögren's Syndrome ("SjS") and comprises a cathepsin S inhibitory peptide (CATSIP), which comprises, or alternatively consists essentially of, or yet further consists of the sequence NHLGDMTSEEVMSLTSS (SEQ ID NO: 30), a fragment or a biological equivalent of each thereof. In one aspect, a therapeutic agent is bound to or trapped within the ELP or coacervate formed by the ELP, which in one aspect, is when the ELP is above the transition temperature. The cyclophilin-ELP fusion can be noncovalently complexed with the therapeutic agent, such that it promotes drug solubility, absorption, and bioavailability following administration. In another aspect, the ELP is selected for its ability to form a nanoparticle or coacervate at body temperature, such that duration of drug efficacy is extended, thus reducing the frequency of administration, such as parenteral administration.

In one aspect, the ELP fusions are useful for delivering a therapeutic agent in vitro by contacting a tissue expressing the receptor the drug binding domain with the agent. In one aspect, a method for delivering a drug in vivo is provided comprising administering an effective amount of the ELP fusion to a subject. In one aspect, a method for ameliorating the symptoms of a disease or condition or for treating a disease or condition is provided, comprising administering an effective amount of the ELIP fusion to a subject suffering from the disease or condition or susceptible to the disease or condition.

In one aspect, the disease or condition is of the group of organ transplant rejection, rheumatoid arthritis, psoriasis, Crohn's disease, nephrotic syndrome, or keratoconjunctivitis sicca (dry eye).

Antigen Binding Peptides

In another aspect, the at least one, or alternatively at least two, three, four or all of the two or more drug binding domains at least one of the two or more drug binding domains are polypeptides comprising, or alternatively consisting essentially of, or yet further consisting of an antigen binding peptide, e.g., a scFv, or a biological equivalent of the scFv. The scFv is a polypeptide that recognizes, has affinity, and/or binds to a specific antigen. In one aspect, all of the two or more drug binding domains in the ELP fusion antigen binding peptides, fragments or equivalents thereof.

In one embodiment, the scFv comprises, or alternatively consists essentially of or yet further consists of the single chain variable region from the anti-CD20 antibody or an antibody that bind LGAC. Examples of the single chain variable region from the scFv include the polypeptides of SEQ ID NOS: 17 and 18. In certain embodiments, the scFv comprises, or alternatively consists essentially of or yet further consists of the sequence of SEQ ID NO: 17 or SEQ ID NO: 18 or a biological equivalent thereof. In further embodiments, the scFv-ELP polypeptide corresponds to a sequence selected from the group consisting of SEQ ID NOS: 19, 20, and 21 or a biological equivalent thereof.

The scFv can have a peptide linker between the heavy and light chains. The linker is variable in length and, in certain embodiments, comprise amino acid residues such as glycine or serine. It is also within the scope of this disclosure to have scFvs with linker peptides that are too short for the two variable regions to fold together (about five amino acids), forcing scFvs to dimerize. This type is known as diabodies. Diabodies have been shown to have dissociation constants up to 40-fold lower than corresponding scFvs, meaning that they have a much higher affinity to their target. Consequently, diabody drugs could be dosed much lower than other therapeutic antibodies and are capable of highly specific targeting of tumors in vivo. Still shorter linkers (one or two amino acids) lead to the formation of trimers, so-called triabodies or tribodies. Tetrabodies have also been produced. They exhibit an even higher affinity to their targets than diabodies. All of these formats can be composed from variable fragments with specificity for two different antigens, in which case they are types of bispecific antibodies.

The ELP fusions can further comprise a therapeutic agent. In one aspect, a therapeutic agent is bound to or trapped within the ELP or coacervate formed by the ELP, which in one aspect, is when the ELP is above the transition temperature. The ELP fusion can be noncovalently complexed with the therapeutic agent, such that it promotes drug solubility, absorption, and bioavailability following administration. In another aspect, the ELP is selected for its ability to form a nanoparticle or coacervate at body temperature, such that duration of drug efficacy is extended, thus reducing the frequency of administration, such as parenteral administration.

The scFv polypeptides described herein are useful for the specific targeting of scFv-ELPs to cells. One aspect relates to a method for targeting a scFv-ELP to a cell comprising, or alternatively consisting essentially of, or yet further consisting of: contacting the cell with an effective amount of the scFv-ELP polypeptide, wherein the scFv component of the scFv-ELP binds to a cellular component of the cell. The contacting can be to a cell in vitro or in vivo. In one embodiment, the scFv component binds to a cell surface receptor of the cell. In a further embodiment, the scFv component binds to a intercellular receptor or a cellular component found on the surface or inside of the cell. These polypeptides may be used to target cell populations with a specific component by using a scFv that recognizes the specific component. The targeting can facilitate drug delivery by conjugating a drug to the scFv-ELP or facilitate cellular signaling by agonizing or antagonizing a cellular receptor. The cellular signaling may induce a specific cellular response. In the case of CD20, multivalent biding of the anti-CD20 to the cell-surface receptor induces apoptosis of the cell. Accordingly, one aspect relates to a method for inducing apoptosis of a CD20+ cell comprising contacting the cell with an effective amount of the scFv-ELP polypeptide wherein the scFv component comprises, or alternatively consists essentially of or yet further consists of the single chain variable region from the anti-CD20 antibody. In a related embodiment, the cell is a malignant B-cell. In another aspect, the compositions are useful to treat a CD20-related disease or disorder, e.g., a CD20-expressing cancer, by administering to a patient in need of such treatment the polypeptide of any one of the compositions of this disclosure. In one aspect, the CD2-expressing cancer is non-Hodgkin lymphoma.

In some embodiments of the disclosure, the entire anti-CD20 antibody is linked to the ELP. Linking the entire antibody to the ELP may provide additional benefits to therapeutic applications utilizing the anti-CD20 antibody alone. For example, the ELP-conjugated CD20 antibody may provide a more efficient mechanism for crosslinking the antibody. Since activation of apoptosis in CD20+ cells requires multivalent binding of the CD20 cell surface antigen, the ELP-conjugated anti-CD20 antibody may provide more efficient activation of apoptosis. In one aspect, a portion of the anti-CD20 antibody is used, such as the scFV fragment.

A further aspect relates to a method for treating a CD20 expressing cancer, comprising administering to a patient in need of such treatment the scFv-ELP fusion wherein the scFv component comprises, or alternatively consists essentially of or yet further consists of the single chain variable region from the anti-CD20 antibody or a polynucleotide encoding such polypeptide. One example of a CD20 expressing cancer is non-Hodgkin lymphoma. Another example is CD20-expressing leukemia.

LGAC-Targeting Ligands

In certain embodiments of the invention, the drug binding domain is at least one of LGAC-targeted ligands. A LGAC-targeted ligand is a peptide, polypeptide, or molecule that targets the ELP to the LGAC. In one embodiment, the at least one, or alternatively at least two, three, four or all of the two or more drug binding domains of the ELP fusion is the adenovirus knob domain (Knob), which is a LGAC-targeted ligand. This domain is represented by the protein sequence: GAITVGNKNNDKLTLWTTPAPSPNCRLNAEKDAK-LTLVLTKCGSQILATVSVLAVKGSL APISGTVQSAHL-IIRFDENGVLLNNSFLDPEYWNFRNGDLTEGTAYT-NAVGFMPNLSAY PKSHGKTAKSNIVSQVYLN- GDKT KPVTLTITLNGTQETGDTTPSAYSMSFSWDWSGHN YINEIFATSSYTFSYIAQE (SEQ ID NO: 26), a fragment or a biological equivalent thereof. The term "biological equivalent" is defined above. In one aspect, a biological equivalent is a peptide encoded by a nucleic acid that hybridizes to a nucleic acid that encodes the LGAC-targeted ligand 2 or its complement under conditions of a high stringency hybridization reaction, that is performed at about 60° C. in about 1×SSC that has substantial identical biological activity to the above-noted sequence. In a further aspect, the ELP fusion further comprise a therapeutic agent.

In further embodiments, the at least one, or alternatively at least two, three, four or all of the two or more drug binding domains comprise a mIgA ligand or double mIgA ligand or a fragment or a biological equivalent of each thereof. These drug binding domains can be represented by the amino acid sequence: TWASRQEPSQGTTTFAVTS (SEQ ID. NO: 48) and TWASRQEPSQGTTTFAVTS (SEQ ID NO: 49), respectively, or a fragment or a biological equivalent thereof.

The term "biological equivalent" is defined above. In one aspect, a biological equivalent is a peptide encoded by a nucleic acid that hybridizes to a nucleic acid that encodes the mIgA ligand or double mIgA ligand or its complement under conditions of a high stringency hybridization reaction, that is performed at about 60° C. in about 1×SSC that has substantial identical biological activity to the above-noted sequence. In certain embodiments, the ELP fusion comprises the mIgA ligand or a polypeptide with at least 80% identity to mIgA or the fragment thereof. Alternatively, the polypeptide has about at least 85% or about at least 90% or about at least 95%, or about at least 99% identity to mIgA or the fragment.

Still further, there is provided a method for delivering a therapeutic agent comprising an ELP fusion to a cell, the method comprising, or alternatively consisting essentially of, or yet further consisting of, administering an (ELP) component and a ligand component to the cell; wherein the drug binding domain is the knob ligand or mIgA ligand.

The contacting can be in vitro or in vivo. In one embodiment, the drug is in contact with the ocular surface of the eye. Transcytosis allows the drug to have access to the ocular surface of the eye. The transcytosis property enables treatment of the surface of the eye for a variety of conditions like dry eye, scleritis, and the like.

In yet another aspect, provided is a method for treating a disease of the lacrimal gland, comprising, or alternatively consisting essentially of, or yet further consisting of, administering to a patient in need of such treatment one or more of the ELP fusion comprising a ligand component that specifically binds to knob, thereby treating the patient. In one aspect, the disease is cancer.

In certain embodiments, the cell is any cell that expresses a CAR or pIGR receptor. Non-limiting examples include liver, heart, lacrimal gland, salivary gland, lung, brain, pancreatic acinar tissue, prostate or mucosal cells. In a related embodiment, the cell is the lacrimal acinar cell of the lacrimal gland (LGAC). CAR is detected in liver and lacrimal gland as well as in human umbilical vein endothelial cells and pancreatic acinar tissue (acinar cells and islets), as well as in prostate. Most mucosal epithelial cells display pIgR including the cells lining the gut, pulmonary epithelial cells, acinar cells (salivary, lacrimal gland) and other barrier epithelial tissues responsible for maintaining mucosal immunity. Accordingly, in one embodiment, the drug is released from interstitial to luminal surfaces on a mucosal epithelial cell.

In a yet further aspect, the ELP fusions further comprise a therapeutic agent, e.g., cyclosporin A, rapamycin or an analog thereof, a prodrug or a pharmaceutically acceptable salt thereof.

These ELP fusions are useful ameliorating the symptoms of disease for treating disease. Non-limiting examples of such include cancer, an autoimmune disease, age-related macular degeneration, Sjögren's syndrome, autoimmune exocrinopathy, diabetic retinopathy, graft versus host disease, exocrinopathy, retinal venous occlusions, retinal arterial occlusion, macular edema, postoperative inflammation, uveitis retinitis, proliferative vitreoretinopathy, glaucoma, keratoconjunctivitis sicca (dry eye), scleritis or glaucoma.

In one aspect, the ELP fusion treats or ameliorates symptoms of diseases or disorders of the eye. The lacrimal gland acinar cell targeted ELPs provide a site-specific target therapeutic. Accordingly, these ELP nanoparticles may be useful to encapsulate or attach drugs for treating disorders localized to the eye. By way of example, these disorders can include, age-related macular degeneration, Sjögren's syndrome, autoimmune exocrinopathy, diabetic retinopathy, graft versus host disease (exocrinopathy associated with) retinal venous occlusions, retinal arterial occlusion, macular edema, postoperative inflammation, uveitis retinitis, proliferative vitreoretinopathy and glaucoma. In one embodiment, the disease is Sjögren's syndrome. In another embodiment, the disease is keratoconjunctivitis sicca (dry eye). In another embodiment the disease is scleritis. In another embodiment the disease is glaucoma.

ICAM-1

In one aspect, the at least one, or alternatively at least two, three, four or all of the two or more drug binding domains are ligands are selected for targeting the mammalian ICAM-1 receptor. In another aspect, all drug binding domains of the ELP fusion are ligands are selected for targeting the mammalian ICAM-1 receptor. In certain aspects, either mouse ICAM-1 targeting peptides, FEGFS-FLAFEDFVSSI (SEQ ID NO: 28), or human ICAM-1 targeting peptides, EWCEYLGGYLRCYA (SEQ ID NO: 29), fragments or biological equivalents of each thereof are the drug binding domains. Examples of biological equivalents include peptides having at least at least 80% identity to knob. Alternatively, the polypeptide has about at least 85% or about at least 90% or about at least 95%, or about at least 99% identity to the ligands or a peptides encoded by polynucleotides that hybridize under conditions of high stringency to a reference polypeptide that encodes FEGFS-FLAFEDFVSSI (SEQ ID NO: 28) or EWCEYLG-GYLRCYA (SEQ ID NO: 29) or their complements and retain the ability to selectively bind a ICAM-1 receptor. Conditions of high stringency and methods to determine sequence identity are disclosed herein and known in the art.

In one aspect, the therapeutic agent comprises a cathepsin S inhibitory peptide (CATSIP) of the reference sequence NHLGDMTSEEVMSLTSS (SEQ ID NO: 30), a fragment or a biological equivalent of each thereof, wherein a biological equivalent of the reference peptide is a peptide that has at least 80% sequence identity to the reference sequence or a peptide encoded by a polynucleotide that hybridizes under conditions of high stringency to a polynucleotide that encodes the reference peptide or its complement, wherein conditions of high stringency comprise hybridization reaction at about 60° C. in about 1×SSC.

In another aspect, these ELP fusions are useful in a method for delivering a drug or therapeutic agent to the luminal area of LGACs by transcytosis, the methods comprising, or alternatively consisting of, or yet further consisting of, contacting the LGAC with the ELP fusion. In one aspect, the ELP fusion is in contact with the ocular surface of the eye. In another aspect, the ELP fusion is releases the therapeutic agent from interstitial to luminal surfaces on a mucosal epithelial cell. In another aspect, the cell is one or more of a mucosal cell, an epithelial cell or a hepatocyte and/or contained within a lacrimal gland or tissue. The contacting can be in vitro or in vivo.

In a further aspect, the ELP fusions are useful to treat a disease of the lacrimal gland, comprising, or alternatively consisting essentially of, or yet further consisting of, administering to a patient in need of such treatment an ELP fusion. In one aspect, the disease is cancer or Sjorgren's Syndrome. In another aspect, the administration is by inhalation or via injection.

In another aspect, the ELP fusions are useful to treat of rheumatoid arthritis, psoriasis, Crohn's disease, nephrotic syndrome, keratoconjunctivitis sicca (dry eye). In another aspect the ELP fusions are useful to treat acne, acute promyelocytic leukemia (APL), breast cancer, neuroblastoma, and myeloma.

ELPs

The ELP fusions contain an elastin-like-polypeptide (ELP) component. ELPS are a genetically engineered polypeptide with unique phase behavior (see for e.g. S. R. MacEwan, et al., Biopolymers 94(1) (2010) 60-77), which promotes recombinant expression, protein purification, and self-assembly of nanostructures (see for e.g. A. Chilkoti, et al., Advanced Drug Delivery Reviews 54 (2002) 1093-1111). ELPs are artificial polypeptides composed of repeated pentapeptide sequences, (Val-Pro-Gly-Xaa-Gly)n (SEQ ID NO: 51) derived from human tropoelastin, where Xaa is the "guest residue" which is any amino acid, an amino acid analog or amino acid derivative thereof. In one embodiment, Xaa is any amino acid except proline. In another aspect, the guest residue is Ile, Val, Ala or Ser. This peptide motif displays rapid and reversible de-mixing from aqueous solutions above a transition temperature, $T_t$. Below $T_t$, ELPs adopt a highly water soluble random coil conformation; however, above $T_t$, they separate from solution, coalescing into a second aqueous phase. The $T_t$ of ELPs can be tuned by choosing the guest residue and ELP chain length as well as fusion peptides at the design level (see for e.g. MacEwan S R, et al., Biopolymers 94(1):60-77). The ELP phase is both biocompatible and highly specific for ELPs or ELP fusion proteins, even in complex biological mixtures. Genetically engineered ELPs are monodisperse, biodegradable, non-toxic. Throughout this description, ELPs are identified by the single letter amino acid code of the guest residue followed by the number of repeat units, n.

In one aspect, the ELP component comprises, or alternatively consists essentially of, or yet further consists of the polypeptide as noted above, more specifically (VPGXG)n (SEQ ID NO: 51), or G(VPGXG)n (SEQ ID NO: 58), or G(VPGXG)nY (SEQ ID NO: 59), wherein X is any amino acid, or alternatively Ala, Ser, Ile or Val, and wherein n is an integer that denotes the number of repeats, and can be from about between 5 and 400, alternatively between about 2 and about 300, or alternatively between about 25 and about 250, or alternatively between about 180 to about 250, or from about 195 to about 225, or from about 190 to about 195, or from about 75 to 125, or from about 85 to 115, or from about 90 to about 100, or from about 92 to about 98, or from about 5 to about 150, or from about 6 to about 200, or alternatively from about 15 to 195, or alternatively from 40 to about 195, from 60 to 195, or alternatively from 70 to 195, or alternatively from 80 to 195, or alternatively from 90 to 195, or alternatively from 92 to 195, or alternatively from 92 to 192, or alternatively from 100 to 195, or alternatively from 105 to 192, or alternatively from 110 to 195, or alternatively from 120 to 195, or alternatively from 150 to 195, or alternatively about 24, or alternatively about 48, or alternatively about 96, or alternatively about 192. In another aspect, the ELP is CV192: $(VPGAG)_{192}$ (SEQ ID NO: 34) (FIG. 1A, Table 1) or A96: $(VPGAG)_{96}$ (SEQ ID NO: 35), or V96 $(VPGVG)_{96}$ (SEQ ID NO: 2), or an equivalent of each thereof, (wherein n is an integer that denotes the number of repeats, and can be from about 2 and 400, alternatively between 2 and 300, or alternatively between 25 and 250, or alternatively between 25 and 150, or from about 6 to about 200, or alternatively from about 15 to 195, or alternatively from 40 to about 195, from 60 to 195, or alternatively from 70 to 195, or alternatively from 80 to 195, or alternatively from 90 to 195, or alternatively from 92 to 195, or alternatively from 92 to 192, or alternatively from 100 to 195, or alternatively from 105 to 192, or alternatively from 110 to 195, or alternatively from 120 to 195, or alternatively from 150 to 195, or alternatively about 24, or alternatively about 48, or alternatively about 96, or alternatively about 192. In another aspect the ELP has the sequence selected from the group of: (VPGAG)n(VPGIG)n (SEQ ID NO: 53), (VPGAG)n (SEQ ID NO: 54), or $(VPGVG)_{96}$ (SEQ ID NO: 2) (wherein n is an integer that denotes the number of repeats, and can be from about 2 and 400, alternatively between 2 and 300, or alternatively between 25 and 250, or alternatively between 25 and 150, or from about 6 to about 200, or alternatively from about 15 to 195, or alternatively from 40 to about 195, from 60 to 195, or alternatively from 70 to 195, or alternatively from 80 to 195, or alternatively from 90 to 195, or alternatively from 92 to 195, or alternatively from 92 to 192, or alternatively from 100 to 195, or alternatively from 105 to 192, or alternatively from 110 to 195, or alternatively from 120 to 195, or alternatively from 150 to 195, or alternatively about 24, or alternatively about 48, or alternatively about 96, or alternatively about 192. In one aspect, the ELP comprises, or alternatively consists essentially of, or yet further consists of A96I96: $(VPGAG)_{96}$ $(VPGIG)_{96}$ (SEQ ID NO: 36), A96: $(VPGAG)_{96}$ (SEQ ID NO: 35), or V96 $(VPGVG)_{96}$ (SEQ ID NO: 2) or a biological equivalent of each thereof. A biological equivalent of an ELP polypeptide is a peptide that has at least 80% sequence identity to the reference polypeptide or a peptide encoded by a polynucleotide that hybridizes under conditions of high stringency to a polynucleotide that encodes ELP polypeptide or its complement, wherein conditions of high stringency comprise hybridization reaction at about 60° C. in about 1×SSC.

The guest residue X may be a non-classical (non-genetically encoded) amino acid. Examples of non-classical amino acids include: D-isomers of the common amino acids, 2, 4-diaminobutyric acid, α-amino isobutyric acid, A-aminobutyric acid, Abu, 2-amino butyric acid, γ-Abu, ε-Ahx, 6-amino hexanoic acid, Aib, 2-amino isobutyric acid, 3-amino propionic acid, ornithine, norleucine, norvaline, hydroxyproline, sarcosine, citrulline, homocitrulline, cysteic acid, t-butylglycine, t-butylalanine, phenylglycine, cyclohexylalanine, β-alanine, fluoro-amino acids, designer amino acids such as β-methyl amino acids, C α-methyl amino acids, N α-methyl amino acids, and amino acid analogs in general.

Selection of X is independent in each ELP structural unit (e.g., for each structural unit defined herein having a guest residue X). For example, X may be independently selected for each structural unit as an amino acid having a positively charged side chain, an amino acid having a negatively charged side chain, or an amino acid having a neutral side chain, including in some embodiments, a hydrophobic side chain.

In each embodiment, the structural units, or in some cases polymeric or oligomeric repeats, of the ELP sequences may be separated by one or more amino acid residues that do not eliminate the overall effect of the molecule, that is, in imparting certain improvements to the therapeutic component as described. In certain embodiments, such one or more amino acids also do not eliminate or substantially affect the phase transition properties of the ELP component (relative to the deletion of such one or more amino acids).

The ELP component in some embodiments is selected or designed to provide a $T_t$ ranging from about 10 to about 80° C., such as from about 35 to about 60° C., or from about 38 to about 45° C. In some embodiments, the $T_t$ is greater than about 40° C. or greater than about 42° C., or greater than about 45° C., or greater than about 50° C. The transition temperature, in some embodiments, is above the body temperature of the subject or patient (e.g., >37° C.) thereby remaining soluble in vivo, or in other embodiments, the $T_t$ is below the body temperature (e.g., <37° C.) to provide alternative advantages, such as in vivo formation of a drug depot for sustained release of the therapeutic agent.

The Tt of the ELP component can be modified by varying ELP chain length, as the Tt generally increases with decreasing MW. For polypeptides having a molecular weight >100,000, the hydrophobicity scale developed by Urry et al. (PCT/US96/05186, which is hereby incorporated by reference in its entirety) is preferred for predicting the approximate Tt of a specific ELP sequence. However, in some embodiments, ELP component length can be kept relatively small, while maintaining a target Tt, by incorporating a larger fraction of hydrophobic guest residues (e.g., amino acid residues having hydrophobic side chains) in the ELP sequence. For polypeptides having a molecular weight <100,000, the Tt may be predicted or determined by the following function:

$$T_t = T_c + m\ln(C) + n\frac{1}{l} + k\frac{1}{l}\ln(C)$$

where Tc is a critical transition temperature, m is the dependence on the natural logarithm of concentration, n is the dependence on the inverse of the ELP length l, and k is an interaction term between length and concentration. A summary of values for Tc, m, n, and k for Xaa=Val, Ile, Ser, and Ala are presented in Table 1.

TABLE 1

Multivariate fit parameters describing the phase diagram of ELP monoblock copolymers

| Monoblock Library | $T_c$ [° C.] | m [° C./ln(μM)] | n [° C. pentamers] | K [° C. pentamers/ln(μM)] |
|---|---|---|---|---|
| (Val-Pro-Gly-Ser-Gly) (SEQ ID NO: 60) | 63.6 ± 1.1 | −1.86 ± 0.31 | 0 | 0 |
| (Val-Pro-Gly-Ala-Gly) (SEQ ID NO: 61) | 40.5 ± 1.6 | 0 | 7009 ± 345 | −850.1 ± 51.5 |
| (Val-Pro-Gly-Val-Gly) (SEQ ID NO: 62) | 21.2 ± 0.9 | 0 | 1607 ± 90 | −163.1 ± 23.3 |
| (Val-Pro-Gly-Ile-Gly) (SEQ ID NO: 63) | 13.0 ± 0.6 | 0 | 760 ± 30 | −81.2 ± 7.9 |

While the $T_t$ of the ELP component, and therefore of the ELP component coupled to a therapeutic component, is affected by the identity and hydrophobicity of the guest residue, X, additional properties of the molecule may also be affected. Such properties include, but are not limited to solubility, bioavailability, persistence, and half-life of the molecule.

In another aspect, the ELP comprises, or alternatively consists essentially of, or yet further consists of reference sequence G(VPGXG)n (SEQ ID NO: 58) or G(VPGXG)nY (SEQ ID NO: 59), (wherein n is an integer that denotes the number of repeats and X is an amino acid, such as for example A, I, S or V, or a biological equivalent thereof, wherein a biological equivalent of the reference is a peptide that has at least 80% sequence identity to reference peptide or a peptide encoded by a polynucleotide that hybridizes under conditions of high stringency to a polynucleotide that encodes the reference or its complement, wherein conditions of high stringency comprise hybridization reaction at about 60° C. in about 1×SSC. In one aspect, n is from about 180 to about 250, or from about 175 to about 225, or from about 190 to about 195, or about 192, or from about 75 to about 125, or from about 85 to about 115, or from about 90 to about 100, or from about 92 to about 98, or about 96. In one aspect, X is A and n is from about 180 to about 250, or from about 175 to about 225, or from about 190 to about 195, or about 192. In another aspect, X is V and n is from about 75 to about 125, or from about 85 to about 115, or from about 90 to about 100, or from about 92 to about 98, or about 96.

In a yet further aspect, the ELP-cyclophilin A fusion is CA192 (SEQ ID NO: 3), CV96 (SEQ ID NO: 4) (SEQ ID NO: 4), 3(CA)C (SEQ ID NO: 9) or a biological equivalent thereof, as well as dimers, trimers, tetramers and pentamers of them, as well as substantially purified compositions containing same. The hydrodynamic radius of the dimers range from about 5 nm to about 10 nm, or about 6 nm to about 9 nm, or about 6 nm, or about 7 nm, or about 8 nm. In a further aspect, the ELP fusion is a dimer and has a hydrodynamic radius of from about 5 nm to about 10 nm, or about 6 nm to about 9 nm, or about 6 nm, about 7 nm, or about 8 nm.

In a further aspect, the ELP-FKBP fusion is 5FA (SEQ ID NO: 10), 5FV (SEQ ID NO: 11), FAF (SEQ ID NO: 25), or a biological equivalent thereof, as well as dimers, trimers, tetramers and pentamers thereof. The hydrodynamic radius of the the ELP-FKBP fusion, or dimer, trimer, tetramer, or pentamer thereof ranges from about 5 nm to about 10 nm, or about 6 nm to about 9 nm, or about 6 nm, or about 7 nm, or about 8 nm. In a further aspect, the ELP fusion is a dimer and has a hydrodynamic radius of from about 5 nm to about 10 nm, or about 6 nm to about 9 nm, or about 6 nm, about 7 nm, or about 8 nm.

In a further aspect, the ELP-PIN1 fusion is 4PA (SEQ ID NO: 15) or a biological equivalent thereof, as well as dimers, trimers, tetramers and pentamers thereof. The hydrodynamic radius of the ELP-PIN1 fusion, or dimer, trimer, tetramer, or pentamer thereof ranges from about 5 nm to about 10 nm, or about 6 nm to about 9 nm, or about 6 nm, or about 7 nm, or about 8 nm. In a further aspect, the ELP fusion is a dimer and has a hydrodynamic radius of from about 5 nm to about 10 nm, or about 6 nm to about 9 nm, or about 6 nm, about 7 nm, or about 8 nm.

In one aspect, Applicants have prepared the substantially homogenous compositions by use of a gel filtration column to isolate dimerized CA192 (SEQ ID NO: 3) from aggregated CA192 (SEQ ID NO: 3). Before isolation, gel filtration column is conditioned with 2 column volumes of phosphate buffered saline (PBS). The loading of CA192 (SEQ ID NO: 3) into the column is followed by an isocratic flow of one column volume of PBS. The elution is detected by a UV detector at 210 nm. Fractions with an UV absorption above 10 mAU are collected by an automatic fraction collector. As is apparent to the skilled artisan, this method is useful to isolate and purify compositions of other multimer fusions.

ELPs have potential advantages over chemically synthesized polymers as drug delivery agents. First, because they are biosynthesized from a genetically encoded template, ELPs can be made with precise molecular weight. Chemical synthesis of long linear polymers does not typically produce an exact length, but instead a range of lengths. Consequently, fractions containing both small and large polymers yield mixed pharmacokinetics and bio-distribution. Second, ELP biosynthesis produces very complex amino acid sequences with nearly perfect reproducibility. This enables very precise selection of the location of drug attachment. Thus drug can be selectively placed on the outside, buried in the core, or dispersed equally throughout any complexes. Third, ELPs can modulate the self-assembly of fusion proteins into multivalent nanostructures (dimers, trimers, tetramers, and micelles with higher aggregation numbers) that can have excellent site-specific accumulation and drug carrying properties. Fourth, because ELPs can be designed from directly using native amino acid sequences found extensively in the human body they are biodegradable, biocompatible, and tolerated by the immune system. Fifth, ELPs undergo an inverse phase transition temperature, $T_t$, above which they phase separate into large aggregates. Upon introduction into the body, optimized ELPs can thus be tuned to assemble a depot, which can release active drug for significantly extended durations.

In some embodiments the ELP comprises 5-100 kDa and connects multiple drug binding domains. In some embodiments, the ELP imparts aqueous solubility to the agent. In some embodiments, the ELP is charge neutral. The mass of the ELP(s) may be selected so that the agent has a mass of 60-200 kDa. In some embodiments, the ELP has a critical solution temperature that is low to facilitate extended release of a therapeutic agent.

In addition to therapeutics, the ELPs may also be associated with a detectable label that allows for the visual detection of in vivo uptake of the ELPs. Suitable labels include, for example, fluorescein, rhodamine, tetramethylrhodamine, eosin, erythrosin, coumarin, methyl-coumarins, pyrene, Malacite green, Alexa-Fluor®, stilbene, Lucifer Yellow, Cascade Blue™, and Texas Red™. Other suitable optical dyes are described in Haugland, Richard P. (1996) Molecular Probes Handbook.

Expression of Recombinant Proteins

This disclosure also provides a polynucleotide expressing ELP fusions as described herein. The ELP fusions and other recombinant proteins described herein can be prepared by expressing polynucleotides encoding the ELP fusion (the ELP and the drug binding domain, e.g., cyclophilin A (SEQ ID NO: 22 or SEQ ID NO: 23) polypeptide sequences of this disclosure) in an appropriate host cell, i.e., a prokaryotic or eukaryotic host cell. This can be accomplished by methods of recombinant DNA technology known to those skilled in the art. It is known to those skilled in the art that modifications can be made to any peptide to provide it with altered properties. Polypeptides of the disclosure can be modified to include unnatural amino acids. Thus, the peptides may comprise D-amino acids, a combination of D- and L-amino acids, and various "designer" amino acids (e.g., β-methyl amino acids, C-α-methyl amino acids, and N-α-methyl amino acids, etc.) to convey special properties to peptides. Additionally, by assigning specific amino acids at specific coupling steps, peptides with α-helices, β turns, β sheets, α-turns, and cyclic peptides can be generated. Generally, it is believed that beta-turn spiral secondary structure or random secondary structure is preferred. The complements and equivalents of these polynucleotides are further provided herein.

Thus, in one aspect, provided herein is an isolated polynucleotide encoding the ELP fusion, e.g., comprising a polynucleotide encoding cyclophilin A (SEQ ID NO: 22 or SEQ ID NO: 23), a fragment thereof or an equivalent thereof, and the ELP, a fragment or an equivalent of each thereof. In a yet further aspect, the polynucleotide further comprises, or alternatively consists essentially of, or yet further consists of a detectable label. In a yet further aspect, the polynucleotide further comprises, or alternatively consists essentially of, or yet further consists of an expression vector and regulatory sequences for expression in the appropriate host cell system. The vector can be a plasmid. As is understood by those of skill in the art, the regulatory sequences are positioned to drive expression of the polynucleotide encoding the ligand and ELP. The polynucleotides and expression vectors can be incorporated into a host cell. Plasmid, viral vectors and other expression vectors are known in the art.

The ELPs can be expressed and purified from a suitable host cell system. Suitable host cells include prokaryotic and eukaryotic cells, which include, but are not limited to bacterial cells, yeast cells, insect cells, animal cells, mammalian cells, murine cells, rat cells, sheep cells, simian cells and human cells. Examples of bacterial cells include *Escherichia coli, Salmonella enterica* and *Streptococcus gordonii*. In one embodiment, the host cell is *E. coli*. The cells can be purchased from a commercial vendor such as the American Type Culture Collection (ATCC, Rockville Maryland, USA) or cultured from an isolate using methods known in the art. Examples of suitable eukaryotic cells include, but are not limited to 293T HEK cells, as well as the hamster cell line BHK-21; the murine cell lines designated NIH3T3, NS0, C127, the simian cell lines COS, Vero; and the human cell lines HeLa, PER.C6 (commercially available from Crucell) U-937 and Hep G2. A non-limiting example of an insect cell includes *Spodoptera frugiperda*. Examples of yeast useful for expression include, but are not limited to *Saccharomyces, Schizosaccharomyces, Hansenula, Candida, Torulopsis, Yarrowia,* or *Pichia*. See e.g., U.S. Pat. Nos. 4,812,405; 4,818,700; 4,929,555; 5,736,383; 5,955, 349; 5,888,768 and 6,258,559.

Yet further provided are methods to prepare the ELP fusions, e.g., CA192 (SEQ ID NO: 3), CV96 (SEQ ID NO: 4), 3(CA)C (SEQ ID NO: 9), 5FA (SEQ ID NO: 10), 5FV (SEQ ID NO: 11), FAF (SEQ ID NO: 25), 4PA (SEQ ID NO: 15) or a fragment thereof, as well as dimers, trimers, tetramers and pentamers thereof or an equivalent thereof through genetic recombination by expressing a polynucleotide encoding such in a suitable host cell. The polynucleotide is inserted into the host cell and the cell is grown under conditions that favor expression of the polynucleotide. In a further aspect, the ELP fusion is purified from the host cell system. Dimers, trimers, tetramers and pentamers of the fusion proteins may be formed through said expression of the monomeric form of the ELP fusion protein from the polynucleotide encoding the same, followed by subjecting the expressed monomer to conditions readily determined by the skilled artisan or described in the Examples herein to promote dimerization, trimerization, tetramerization, or pentamerization.

Protein Purification

The phase transition behavior of the ELPs allows for easy purification. The ELPs may also be purified from host cells using methods known to those skilled in the art. These techniques involve, at one level, the crude fractionation of the cellular milieu to polypeptide and non-polypeptide fractions. Having separated the polypeptide from other proteins, the polypeptide of interest may be further purified using chromatographic and electrophoretic techniques to achieve partial or complete purification (or purification to homogeneity). Analytical methods particularly suited to the preparation of a pure peptide or polypeptide are filtration, ion-exchange chromatography, exclusion chromatography, polyacrylamide gel electrophoresis, affinity chromatography, or isoelectric focusing. A particularly efficient method of purifying peptides is fast protein liquid chromatography or even HPLC. In the case of ELP compositions protein purification may also be aided by the thermal transition properties of the ELP domain as described in U.S. Pat. No. 6,852,834.

Generally, "purified" will refer to a protein or peptide composition that has been subjected to fractionation to remove various other components, and which composition substantially retains its expressed biological activity. Where the term "substantially purified" is used, this designation will refer to a composition in which the protein or peptide forms the major component of the composition, such as constituting about 50%, about 60%, about 70%, about 80%, about 90%, about 95%, about 98%, or 100% or more of the fusions in the composition.

Various methods for quantifying the degree of purification of the fusion protein or peptide will be known to those of skill in the art in light of the present disclosure. These include, for example, determining the specific activity of an active fraction, or assessing the amount of polypeptides within a fraction by SDS/PAGE analysis. A preferred method for assessing the purity of a fraction is to calculate the specific activity of the fraction, to compare it to the specific activity of the initial extract, and to thus calculate the degree of purity, herein assessed by a "[n]-fold purification number" wherein "n" is an integer. The actual units used to represent the amount of activity will, of course, be dependent upon the particular assay technique chosen to follow the purification and whether or not the expressed protein or peptide exhibits a detectable activity.

Various techniques suitable for use in protein purification will be well known to those of skill in the art. These include, for example, precipitation with ammonium sulfate, PEG, antibodies and the like or by heat denaturation, followed by centrifugation; chromatography steps such as ion exchange, gel filtration, reverse phase, hydroxyapatite and affinity chromatography; isoelectric focusing; gel electrophoresis; and combinations of such and other techniques. As is generally known in the art, it is believed that the order of conducting the various purification steps may be changed, or that certain steps may be omitted, and still result in a suitable method for the preparation of a substantially purified protein or peptide.

To purify ELP fusions, e.g., with cyclophilin, such as CA192 (SEQ ID NO: 3), it is necessary to remove nanoaggregates (50-100 nm in hydrodynamic radius) from the major fraction that contains the dimeric CA192 (SEQ ID NO: 3). This is achieved using size exclusion liquid chromatography with packing media (such as a HiLoad™ 26/600 Superdex™ 200 pg) capable of retaining the monomer, dimer, trimeric, and tetrameric assemblies of CA192 (SEQ ID NO: 3), which have expected molecular weights up to about 400 kD. Prior to loading a sample, a size exclusion chromatography column (60 cm by 26 mm) is washed with two columns of phosphate buffered saline. A sample containing CA192 (SEQ ID NO: 3) (100 mg) is injected into the column (5 mL) peaks are eluted by an isocratic flow (2.6 mL/min) of one column volume of PBS. The elution can be followed using UV spectrophotometry at 214 nm. Fractions with an UV absorption above a baseline threshold (such as 10 mAU) can be collected by an automatic fraction collector. Due to their larger hydrodynamic radius, CA192 (SEQ ID NO: 3) nanoaggregates are not retained by the resin, and they flow through in the void volume as a first fraction. Upon further elution, the purified dimeric CA192 (SEQ ID NO: 3) peak fraction can be obtained and loaded with CsA.

Pharmaceutical Compositions

Pharmaceutical compositions are further provided. The compositions comprise a carrier the ELP fusion or a polynucleotide encoding the ELP fusion, as described herein or other compositions (e.g., polynucleotide, vector system, host cell) as described herein. The carriers can be one or more of a solid support or a pharmaceutically acceptable carrier. In one aspect, the compositions are formulated with one or more pharmaceutically acceptable excipients, diluents, carriers and/or adjuvants. In addition, embodiments of the compositions include ELPs, formulated with one or more pharmaceutically acceptable auxiliary substances.

The disclosure provides pharmaceutical formulations in which the one or more of an agent, ELP-fusion with a therapeutic agent, or a polynucleotide, vector or host cells can be formulated into preparations for injection or other appropriate route of administration in accordance with the disclosure by dissolving, suspending or emulsifying them in an aqueous or nonaqueous solvent, such as vegetable or other similar oils, synthetic aliphatic acid glycerides, esters of higher aliphatic acids or propylene glycol; and if desired, with conventional additives such as solubilizers, isotonic agents, suspending agents, emulsifying agents, stabilizers and preservatives or other antimicrobial agents.

Aerosol formulations provided by the disclosure can be administered via inhalation. For example, embodiments of the pharmaceutical formulations of the disclosure comprise a compound of the disclosure formulated into pressurized acceptable propellants such as dichlorodifluoromethane, propane, nitrogen and the like.

Embodiments of the pharmaceutical formulations of the disclosure include those in which the composition is formulated in an injectable composition. Injectable pharmaceutical formulations of the disclosure are prepared as liquid solutions or suspensions; or as solid forms suitable for solution in, or suspension in, liquid vehicles prior to injection. The preparation may also be emulsified or the active ingredient encapsulated in liposome vehicles in accordance with other embodiments of the pharmaceutical formulations of the disclosure.

Suitable excipient vehicles are, for example, water, saline, dextrose, glycerol, ethanol, or the like, and combinations thereof. In addition, if desired, the vehicle may contain minor amounts of auxiliary substances such as wetting or emulsifying agents or pH buffering agents. Methods of preparing such dosage forms are known, or will be apparent upon consideration of this disclosure, to those skilled in the art. See, e.g., Remington's Pharmaceutical Sciences, Mack Publishing Company, Easton, Pennsylvania, 17th edition, 1985. The composition or formulation to be administered will, in any event, contain a quantity of the compound adequate to achieve the desired state in the subject being treated.

Routes of administration applicable to the methods and compositions described herein include intranasal, intraperitoneal, intramuscular, subcutaneous, intradermal, topical application, intravenous, nasal, oral, inhalation, intralacrimal, retrolacrimal perfusion along the duct, intralacrimal, and other enteral and parenteral routes of administration. Routes of administration may be combined, if desired, or adjusted depending upon the agent and/or the desired effect. An active agent can be administered in a single dose or in multiple doses. Embodiments of these methods and routes suitable for delivery, include systemic or localized routes. In one embodiment, the composition comprising, or alternatively consisting essentially of, or yet further consisting of the ELP and agent is administered intralacrimally through injection. In further embodiments, the composition is administered systemically, topically on top of the eye, by retrolacrimal perfusion, or intranasally.

Encapsulation and Release of Therapeutic Agents

This disclosure also provides a method to encapsulate therapeutic agents within the nanoparticles. A two phase method can be used. An aqueous phase PBS containing the ELP is mixed with an organic phase hexane/EtOH containing the therapeutic agent in a small glass vial. A nitrogen flow is applied to facilitate the evaporation of the hexane/EtOH phase. Centrifugation is performed to remove any insoluble drug after the organic phase evaporated out. 100 µL of the sample is filtered and injected into a C-18 reverse phase HPLC column to analyze the amount of the drug that is initially encapsulated. RP-HPLC can be used to determine the amount of drug that is retained inside the ELP fusion protein.

Alternatively, an aqueous phase phosphate-buffered saline (PBS) containing the ELP is s mixed with an organic phase 90% hexane/10% EtOH containing the therapeutic agent or drug. Under a nitrogen environment and constant stirring, along with the evaporation of organic solvent, the drug is gradually released into the aqueous phase and encapsulated by the fusion protein. This is followed by high-speed centrifugation and filtration to remove the excess insoluble drug. To determine the encapsulation efficiency and characterize the release profile, Applicants use a reversed-phase high-performance liquid chromatography (RP-HPLC) analysis method to measure the CsA concentration in the ELP, as described in the experimental section below.

Treatment of Disease

This disclosure also provides a method for delivering a therapeutic agent in vitro comprising, or alternatively consisting essentially of, or yet further consisting of contacting a tissue expressing the receptor for the drug binding domain, e.g., for CSA with an ELP-cyclophilin containing agent as described herein. The cells can be eukaryotic or prokaryotic. Non-limiting examples of eukaryotic cells include animal cells, mammalian cells and human cells. Further provided is a method for delivering a therapeutic agent in vivo comprising, or alternatively consisting essentially of, or yet further consisting of administering an effective amount of the agent as described herein to a subject. In one aspect, the subject is an animal, such as a mammal or human subject.

Further provided is a method for ameliorating the symptoms of a disease or condition or for treating a disease or condition, comprising, or alternatively consisting essentially of, or yet further consisting of administering an effective amount of the agent ELP-containing agent as described herein to a subject suffering from the disease or condition or susceptible to the disease or condition. In one aspect, the subject is an animal, such as a mammal or human subject. Non-limiting examples of such diseases or conditions include, for example, cancer, organ rejection, e.g., in patients receiving liver, kidney, or heart transplant; Graft-versus-host disease, particularly in bone-marrow transplantation; Rheumatoid arthritis, and related diseases, Psoriasis, Persistent nummular keratitis, Atopic dermatitis, Kimura disease, Pyoderma gangrenosum, chronic autoimmune urticaria, Acute systemic mastocytosis, and, Dry eyes, Sjögren's syndrome, autoimmune disorders such as systemic lupus erythematosus (SLE), acute severe ulcerative colitis and autoimmune urticaria that do not respond to treatment with steroids; posterior or intermediate uveitis with noninfective cause; and atopic dermatitis (veterinary use), neuronal cellular damage and reperfusion injury in traumatic brain injury, and cardiac hypertrophy.

Administration can be by any acceptable route, and can be local or systemic. The route of administration, the dose and dosing schedule can be determined by the treating veterinarian or physician.

The agents can be co-administered with other agents known for the treatment of disease, e.g., a steroid composition, or immunotherapy or chemotherapy for the treatment of cancer. Administration can be concurrent or sequential and multiple doses can be administered.

Use of Compounds for Preparing Medicaments

The ELPs of the present disclosure are also useful in the preparation of medicaments to treat a variety of pathologies as described herein. The methods and techniques for preparing medicaments of a composition are known in the art. For the purpose of illustration only, pharmaceutical formulations and routes of delivery are detailed herein. In one aspect when the ELP is combined with another therapy or therapeutic agent, provided herein the compositions are useful in the preparation of combination compositions that can be simultaneously or concurrently administered.

Thus, one of skill in the art would readily appreciate that any one or more of the compositions described above, including the many specific embodiments, can be used by applying standard pharmaceutical manufacturing procedures to prepare medicaments to treat the many disorders described herein. Such medicaments can be delivered to the subject by using delivery methods known in the pharmaceutical arts.

Kits

The ELPs as described herein, can be provided in kits. The kits can further contain additional therapeutics and optionally, instructions for making or using the ELPs. In a further aspect, the kit contains reagents and instructions to perform a screen as detailed herein.

Screening Assays

This disclosure also provides screening assays to identify potential therapeutic agents of known and new compounds and combinations. For example, one of skill in the art can also determine if the ELP provides a therapeutic benefit in vitro by contacting the ELP or combination comprising, or alternatively consisting essentially of, or yet further consisting of the ELP with a sample cell or tissue to be treated. The cell or tissue can be from any species, e.g., simian, canine, bovine, ovine, rat, mouse or human.

The contacting can also be performed in vivo in an appropriate animal model or human patient. When performed in vitro, the ELPs can be directly added to the cell culture medium. When practiced in vitro, the method can be used to screen for novel combination therapies, formulations or treatment regimens, prior to administration to an animal or a human patient.

In another aspect, the assay requires contacting a first sample comprising, or alternatively consisting essentially of, or yet further consisting of suitable cells or tissue ("control sample") with an effective amount of an ELP as disclosed herein and contacting a second sample of the suitable cells or tissue ("test sample") with the ELP, agent or combination to be assayed. In one aspect in the case of cancer, the inhibition of growth of the first and second cell samples are determined. If the inhibition of growth of the second sample is substantially the same or greater than the first sample, then the agent is a potential drug for therapy. In one aspect, substantially the same or greater inhibition of growth of the cells is a difference of less than about 1%, or alternatively less than about 5% or alternatively less than about 10%, or alternatively greater than about 10%, or alternatively greater than about 20%, or alternatively greater than about 50%, or alternatively greater than about 90%. The contacting can be in vitro or in vivo. Means for determining the inhibition of growth of the cells are well known in the art.

In a further aspect, the test agent is contacted with a third sample of cells or tissue comprising, or alternatively consisting essentially of, or yet further consisting of normal counterpart cells or tissue to the control and test samples and selecting agents that treat the second sample of cells or tissue but does not adversely affect the third sample. For the purpose of the assays described herein, a suitable cell or tissue is described herein such as cancer or other diseases as described herein. Examples of such include, but are not limited to cancer cell or tissue obtained by biopsy, blood, breast cells, colon cells.

Efficacy of the test composition is determined using methods known in the art which include, but are not limited to cell viability assays or apoptosis evaluation.

In yet a further aspect, the assay requires at least two cell types, the first being a suitable control cell.

The assays also are useful to predict whether a subject will be suitably treated by this disclosure by delivering an ELP to a sample containing the cell to be treated and assaying for treatment, which will vary with the pathology, or for screening for new drugs and combinations.

In one aspect, the cell or tissue is obtained from the subject or patient by biopsy. This disclosure also provides kits for determining whether a pathological cell or a patient will be suitably treated by this therapy by providing at least one composition of this disclosure and instructions for use.

The test cells can be grown in small multi-well plates and is used to detect the biological activity of test compounds. For the purposes of this disclosure, the successful ELP or other agent will block the growth or kill the cancer cell but leave the control cell type unharmed.

Combination Treatments

Administration of the therapeutic agent or substance of the present disclosure to a patient will follow general protocols for the administration of that particular secondary therapy, taking into account the toxicity, if any, of the treatment. It is expected that the treatment cycles would be repeated as necessary. It also is contemplated that various standard therapies, as well as surgical intervention, may be applied in combination with the described therapy.

As is apparent to those skilled in the art, the combination therapy can take the form of a combined therapy for concurrent or sequential administration.

The following examples are included to demonstrate some embodiments of the disclosure. However, those of skill in the art should, in light of the present disclosure, appreciate that many changes can be made in the specific embodiments which are disclosed and still obtain a like or similar result without departing from the spirit and scope of the disclosure.

EXPERIMENTAL METHODS

Example 1

The following methods are merely exemplary. Applicants designed the encoding sequence of cyclosporin A (CypA) using *Escherichia coli* biased codons. As indicated as follows, the custom encoding sequence flanked by restriction recognition sites of NdeI and BamHI at the 5' and 3' ends was ordered from Integrated DNA Technologies (IDT) as follows:

```
                                          (SEQ ID NO: 64)
5'-CATATGGTTAACCCGACCGTTTTCTTCGACATCGCTGTTGACGGTGA

ACCGCTGGGTCGTGTTTCTTTCGAACTGTTCGCTGACAAAGTTCCGAAAA

CCGCTGAAAACTTCCGTGCTCTGTCTACCGGTGAAAAAGGTTTCGGTTAC

AAAGGTTCTTGCTTCCACCGTATCATCCCGGGTTTCATGTGCCAGGGTGG

TGACTTCACCCGTCACAACGGTACCGGTGGTAAATCTATCTACGGTGAAA

AATTCGAAGACGAAAACTTCATCCTGAAACACACCGGTCCGGGTATCCTG
```

-continued
```
TCTATGGCTAACGCTGGTCCGAACACCAACGGTTCTCAGTTCTTCATCTG

CACCGCTAAAACCGAATGGCTGGACGGTAAACACGTTGTTTTCGGTAAAG

TTAAAGAAGGTATGAACATCGTTGAAGCTATGGAACGTTTCGGTTCTCGT

AACGGTAAAACCTCTAAAAAAATCACCATCGCTGACTGCGGTCAGCTGGA

AGGTTACTGATCTCCTCGGATCC-3'
```

The NdeI and BamHI restriction sites enabled the insertion of the sequence into the pET-25b(+) vector. Besides these two sites, BseRI restriction site was placed right ahead of the BamHI restriction site, enabling the ligation of the A192 encoding sequence, which was synthesized by recursive directional ligation in a modified pET-25b(+) vector (Janib et al., 2014). After verifying the correct sequence through DNA sequencing, the resulted plasmid with the fusion protein sequence was first amplified in TOP10 competent cells and then transfected into BLR competent cells for expression. After expression, centrifugation and lysis, the CA192 fusion protein was further purified by inverse transition cycling (ITC) (Sun et al., 2011) using the unique thermal responsiveness of ELPs.

The molecular weight of purified fusion protein was verified by SDS-PAGE stained with copper chloride ($CuCl_2$). The parent ELP, A192, served as a control. CypA has a molecular weight of 18 kDa. Combined with the 73.6 kDa molecular weight of A192, the molecular weight of CA192 (SEQ ID NO: 3) should be around 91.6 kDa. This shift for the CA192 (SEQ ID NO: 3) is seen on SDS-PAGE (FIG. 1).

Figure 2A:
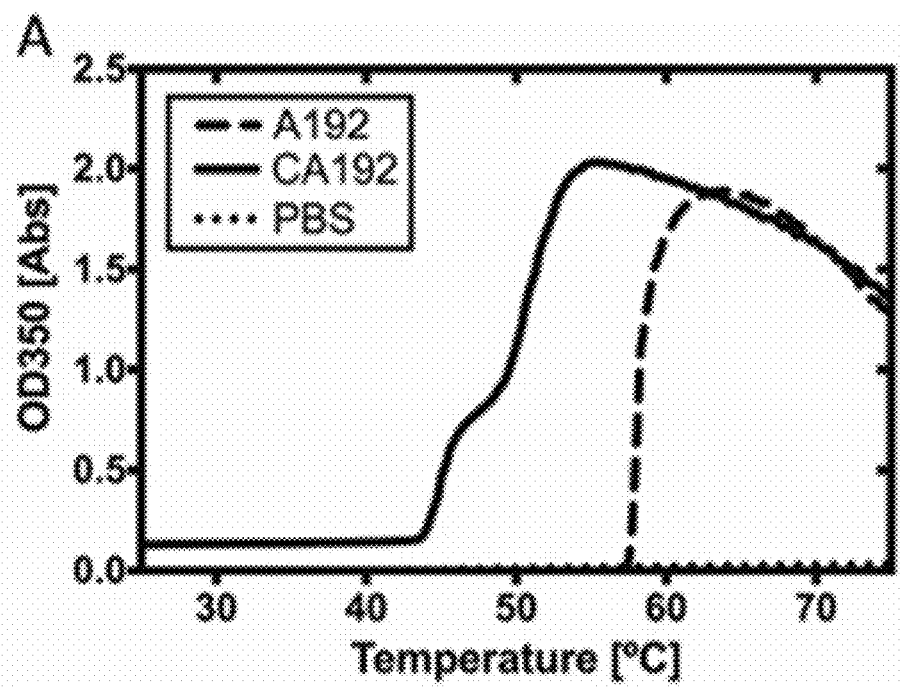
FIGS. 2A-2C: A192 Fusion to CypA reduces the phase transition temperature relative to the free ELP and the phase transition behavior of A192 relative to CA192 (SEQ ID NO: 3) is shown, this data was obtained on CA192 (SEQ ID NO: 3) before size exclusion chromatography (SEC) (FIG. 2A). Optical density was determined as a function of temperature (1° C./min) for 25 µM CA192 (SEQ ID NO: 3), free A192, and a PBS control. The temperature with the maximum positive slope was defined as the phase transition temperature for each condition.
Figure 2B:
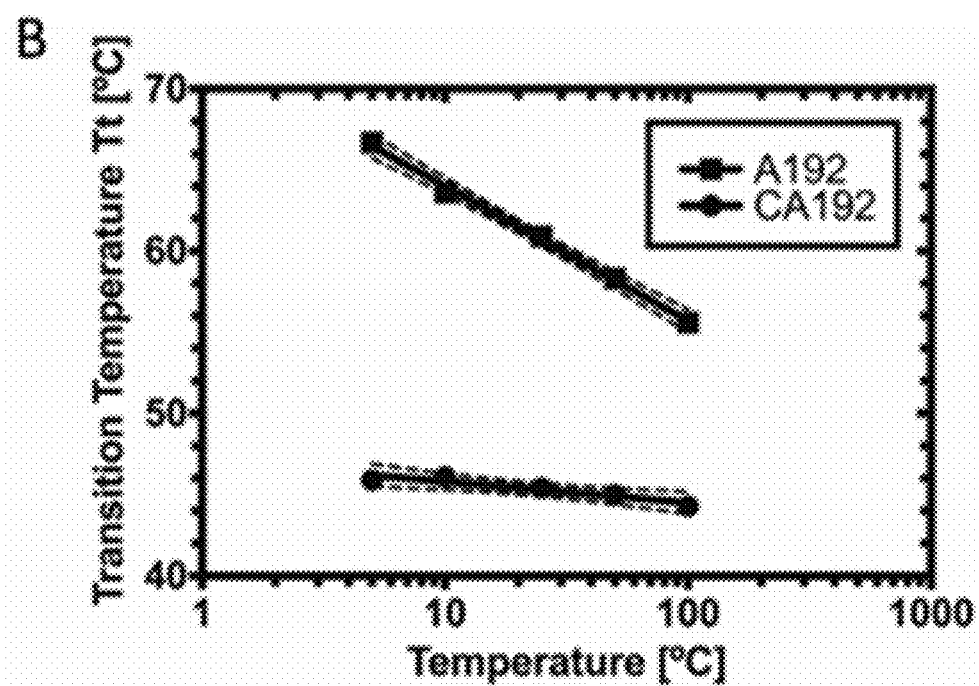
Figure 2C:
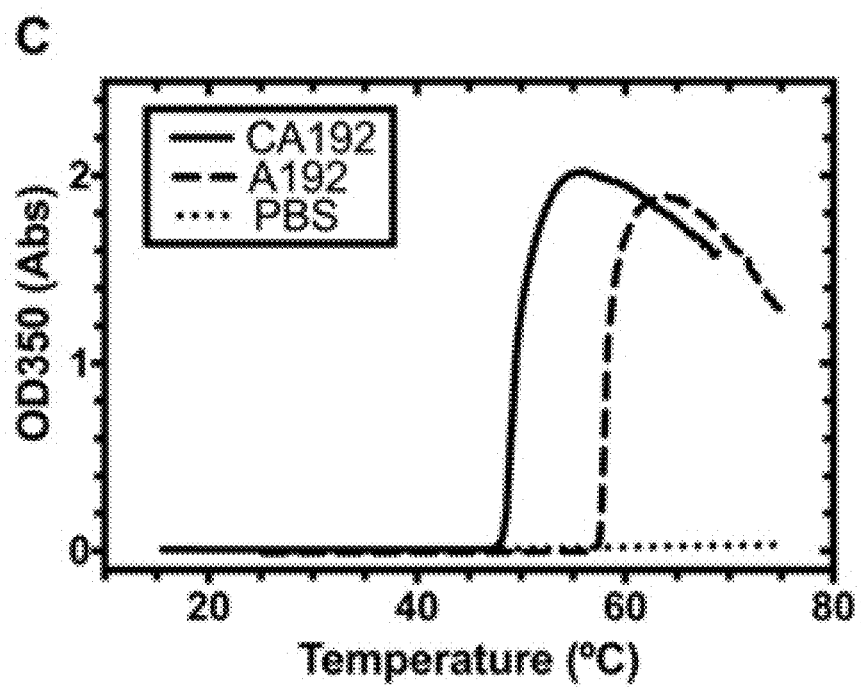

The thermal responsiveness property of CA192 (SEQ ID NO: 3), along with the parent A192, was characterized using UV-Vis by measuring their optical density of these constructs at 350 nm, where neither fusion protein nor plain A192 contributes significant absorption. The CA192 (SEQ ID NO: 3) used had not been subjected to size exclusion chromatography. Both ELPs at different concentrations (5 pM to 100 pM) were subject to a precisely controlled temperature increase from 25 to 75° C. at a rate of 1° C./min. The optical density profile representing the ELP phase separation behavior is shown in FIG. 2A. The Tt of ELPs is defined as the temperature at which the first derivative of the optical density with respect to the temperature reaches a maximum. At 25 pM concentration, the Tt of CA192 (SEQ ID NO: 3) was found to be 45.4° C. Consistent with our previous finding (Wang et al., 2015), the Tt of CA192 (SEQ ID NO: 3) was also found to be a function of concentration: $T_t = b - m\text{Log}_{10}[C_{ELP}]$, where the intercept "b" is equal to 47.1, the slope "m" equals to 1.3 and $[C_{ELP}]$ represents the fusion protein concentration (FIG. 2B, Table 1). Finally, CA192 (SEQ ID NO: 3) exhibited a two-phase transition, distinct from A192. Thus, CA192 (SEQ ID NO: 3) subjected to size exclusion chromatography (SEC) and dimerized CA192 (SEQ ID NO: 3) isolated as one of two fractions. The dimerized CA192 (SEQ ID NO: 3) and A192 ELPs at different concentrations (5 pM to 100 pM) were subject to a precisely controlled temperature increase from 25 to 75° C. at a rate of 1° C./min. The optical density profile representing the ELP phase separation behavior is shown in FIG. 2C. At 25 μM concentration, the Tt of dimerized CA192 was found to be 49.3° C., notably shifted from that of CA192 of 45.4° C. These findings suggest that the CypA moiety was interacting to modulate the properties of A192 to change the properties of this nanoparticle.

TABLE 2

Protein-polymers evaluated in this Example

| Label | Amino Acid Sequence | Exp. M.W. [kDa] | $^a$Slope, m [° C./ $\text{Log}_m$ (μM)] | $^b$Intercept, b [° C.] | $^c$Purity [%] |
|---|---|---|---|---|---|
| A192 | (VPGAG)$_{192}$ (SEQ ID NO: 1) MVNPTVFFDIAVDGEPLGRVSFELFADKVP KTAENFRALSTGEKGFGYKGSCFHRIIPGF MCQGGDFTRHNGTGGKSIYGEKFEDENFIL K | 73.6 | 8.3 ± 0.28 | 72.3 ± 0.41 | 98.1 |
| CA192 | HTGPGILSMANAGPNTNGSQFFICTAKTEW LDGKHVVFGKVKEGMNIVEAMERFGSRNGK TSKKITIADCGQLE-G(VPGAG)$_{192}$Y (SEQ ID NO: 3) | 91.6 | 1.3 ± 0.27 | 47.1 ± 0.39 | 98.8 |

$^{a,b}$The ELP phase diagram as a function of temperature, $T_t$, and concentration, $C_{ELP}$, was fit to the following relationship: $T_t = b - m\text{Log}_{10}[C_{ELP}]$ where b is the intercept at 1 μM and m are ° C. change for a 10-fold change in concentration. mean ± 95% CI.
$^c$Polypeptide purity was assessed using SDS-PAGE and subsequent densitometry of copper chloride stained gel.

CsA was encapsulated in the fusion protein based on a previously reported two-phase solvent evaporation method (Shi, et al., 2013). Briefly, an aqueous phase phosphate-buffered saline (PBS) containing 300 pM CA192 was mixed with an organic phase 90% hexane/10% EtOH containing 900 pM CsA. Under a nitrogen environment and constant stirring, along with the evaporation of organic solvent, CsA was gradually released into the aqueous phase and encapsulated by the fusion protein. This was followed by high-speed centrifugation and filtration to remove the excess insoluble drug. To determine the encapsulation efficiency and characterize the release profile, Applicants established a reversed-phase high-performance liquid chromatography (RP-HPLC) analysis method to measure the CsA concentration in CA192. Briefly, CsA separation and detection was achieved on a C4 reverse-phase HPLC column (150×4.6 mm, particle size 5 μm) at 210 nm. The mobile phase flow rate was set to 1.0 ml/min. The linear gradient from 20% to 95% of methanol was applied from 0 to 5 min. Then the mobile phase was changed to 95% methanol isocratic flow for 10 min. The elution time is 9.5 min.

Figure 3A:
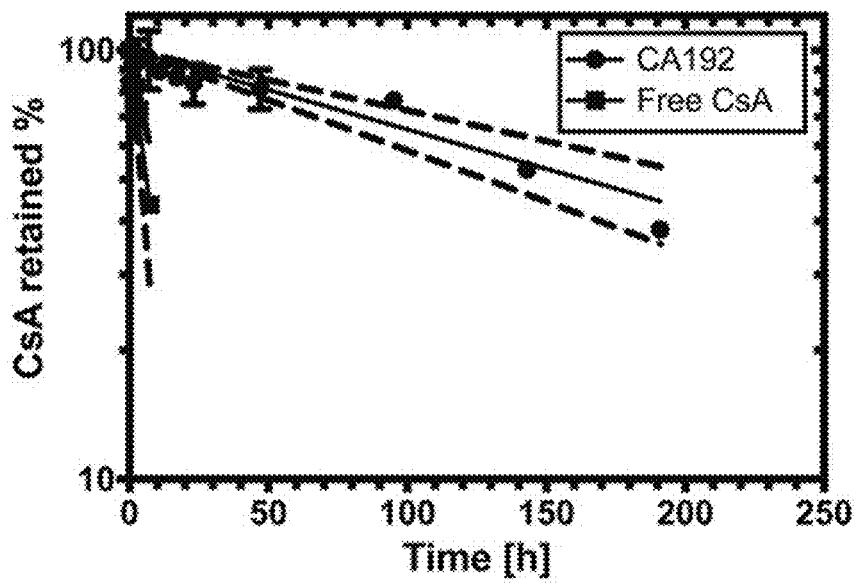
FIGS. 3A-3C: CA192 (SEQ ID NO: 3) solubilizes CsA and reduces its release under dialysis compared to free drug. CsA-bound CA192 (SEQ ID NO: 3) (150 μM) solutions were loaded into a 10,000 MWCO dialysis cassette, dialyzed under sink-conditions against PBS at 4° C., sampled over a period of one week (n=3), and quantified using a calibrated RP-HPLC assay. As a control, free drug release was also conducted. Methanol was used to solubilize CsA in a solution of PBS. For each condition, drug concentration decreased according to a one-phase exponential decay. A best-fit line for each is indicated along with a 95% CI in dashed lines is shown in FIG. 3A. The release half-life for CsA from CA192 (SEQ ID NO: 3) was 163.6 (CI: 128.8 to 214.3) h, which was much slower than for free drug loaded in Methanol/PBS, 6.1 (CI: 4.1 to 9.9) h. This data was obtained with CA192 (SEQ ID NO: 3) not yet subjected to SEC. Dimerized CA192 (SEQ ID NO: 3) was isolated and tested. The drug release from dimerized CA192 (SEQ ID NO: 3) fits a one-phase decay model with a half-life of 954 hr (95% CI: 553 to 3219 hr), of roughly 40 days, at 4° C.
Figure 3B:
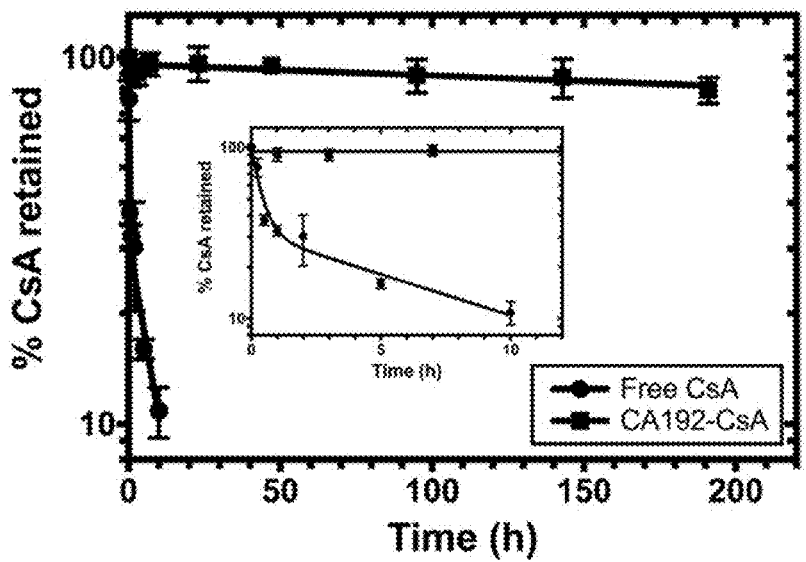
Figure 3C:
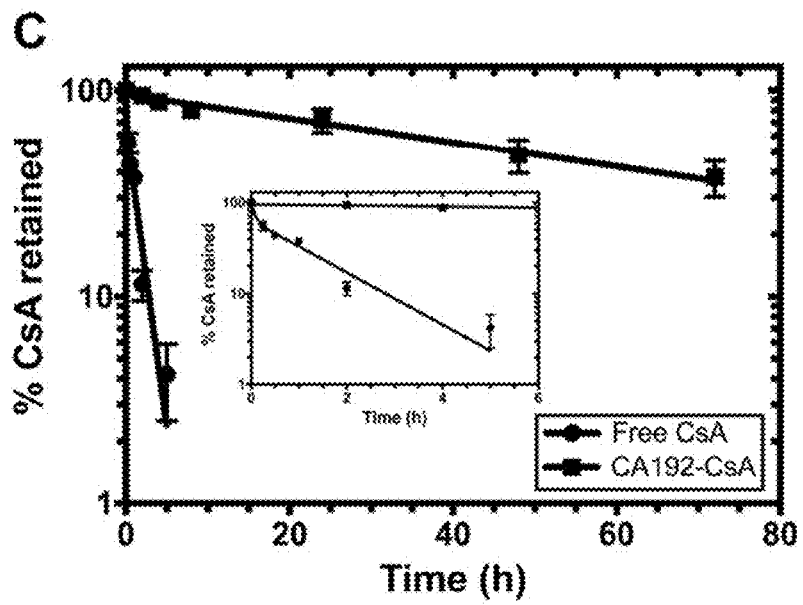
Figure 4A:
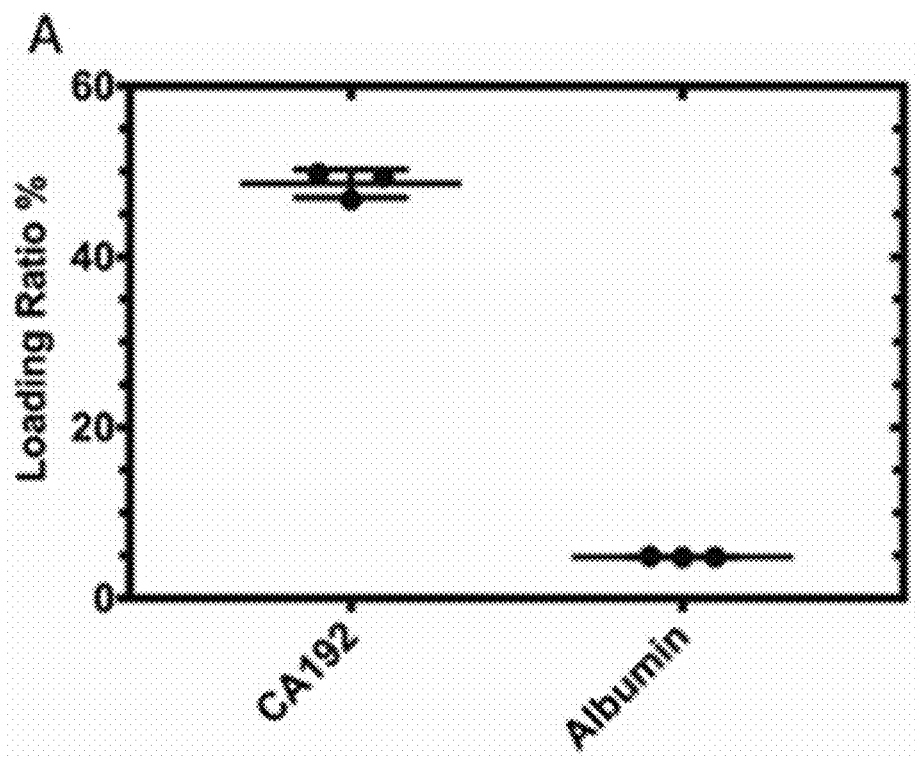
FIGS. 4A-4C: CA192 (SEQ ID NO: 3) resists transfer of CsA to albumin.
Figure 4B:
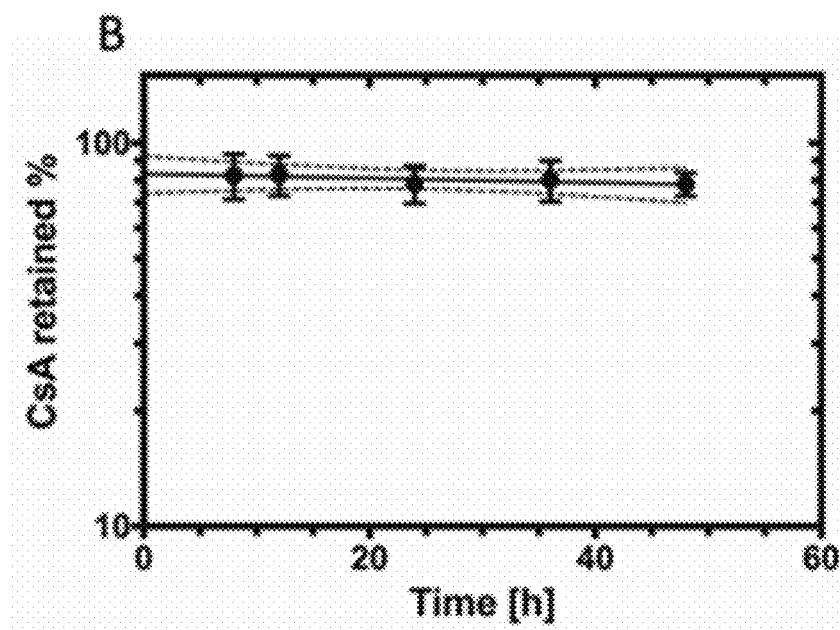
Figure 4C:
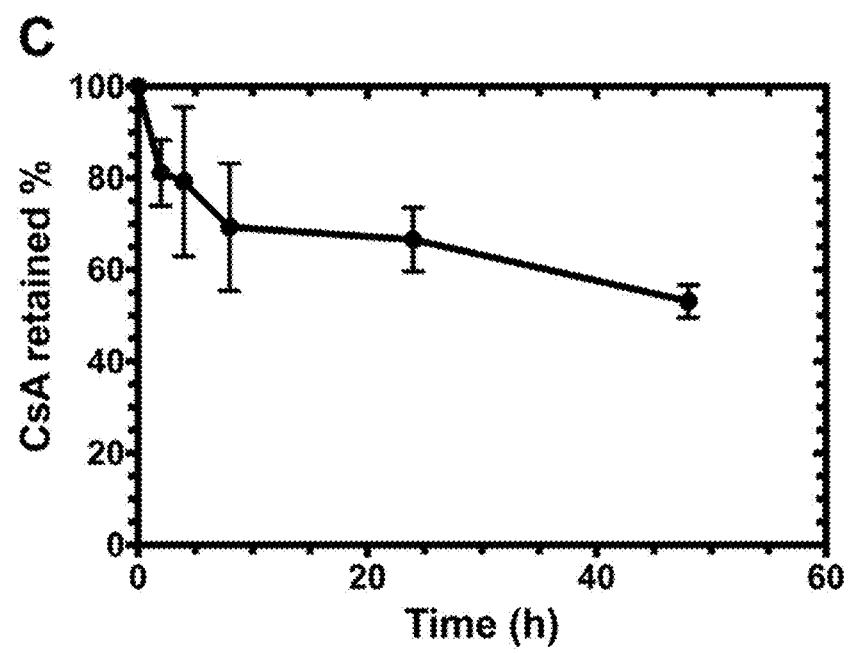

To evaluate the characteristics of CsA released from CA192 (not yet subjected to SEC) in vitro, its release profile from the fusion protein was characterized by performing dialysis against PBS at 4° C. Samples were collected from the dialysis cassette at different time points between 0 and 192 h and analyzed by RP-HPLC. The release profile fits a one-phase decay model with a half-life of 163.6 h (FIG. 3A). The same drug release experiment was performed using CA192 dimer obtained via SEC. Dialysis was performed against PBS at 37° C. (FIG. 3B) and 4° C. (FIG. 3C). To further validate the release profile, as a control group, with the same encapsulation method, human albumin was explored to load CsA. The entrapment efficiency was determined to be 4.8%, significantly lower than CA192 (FIG. 4A). In order to mimic the physiological situation where fusion-loaded drug could be displaced by albumin, Applicants dissolved human albumin into a PBS solution of CsA-loaded CA192 and adjusted the albumin concentration to 1 mM, the physiological concentration of albumin. The mixture was incubated at 37° C. and samples were collected at different time points up to 48 h. Another round of ITC was performed to purify CA192 from the mixture, followed by RP-HPLC analysis. No significant drug loss from fusion carrier to albumin was observed within 2 days (FIG. 4B). Albumin cannot deplete CsA from CA192 carrier effectively within a 48 h period, suggesting the high binding affinity between CsA and CA192 is likely to be maintained when administrated systemically. Similar to this competition method against albumin, 300 μM CA192-CsA in PBS was diluted 1:1 in mouse plasma to achieve a final concentration of 150 μM. Similarly, the mixture was incubated at 37° C. and sampled from 8 to 48 h (FIG. 4C). The phase separation of CA192 was induced with 1 M NaCl at 37° C. and the ELP was isolated by centrifugation. The pellet following centrifugation was resuspended for RP-HPLC analysis to measure the remaining CsA bound to CA192.

Figure 5A:
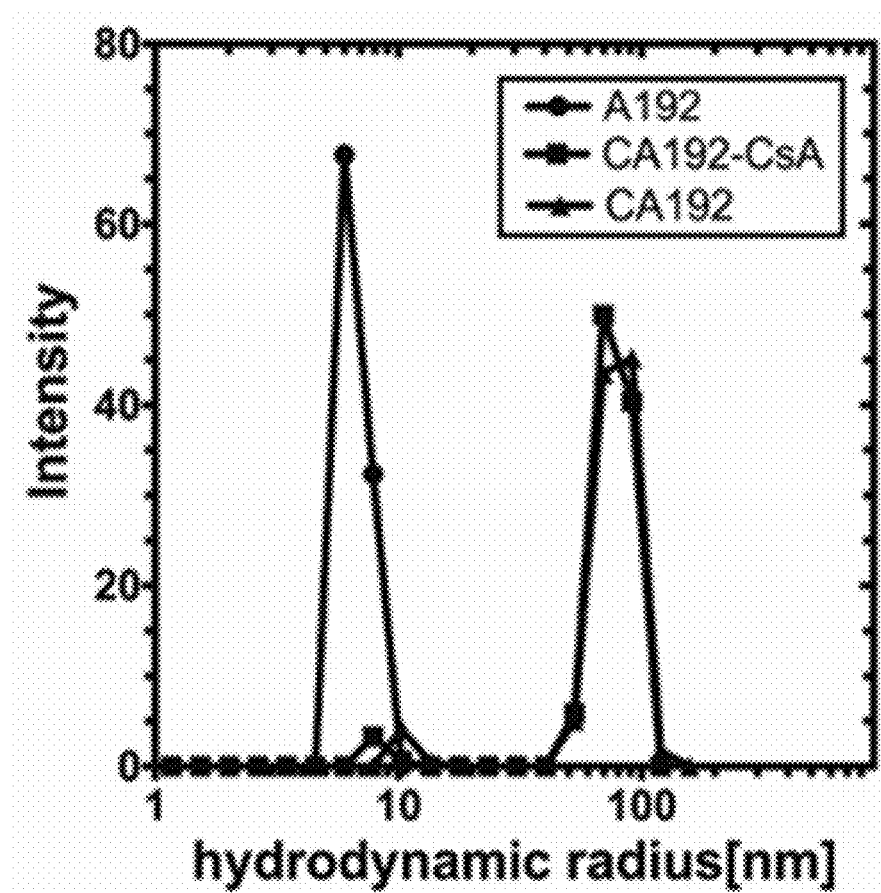
FIGS. 5A-5D: CA192 (SEQ ID NO: 3) has a good stability in terms of hydrodynamic radius. There are two fractions present in the CA192 (SEQ ID NO: 3) solution: an aggregated form and dimeric form. A dimerized form has similar hydrodynamic radius, $R_h$ as A192.
Figure 5B:
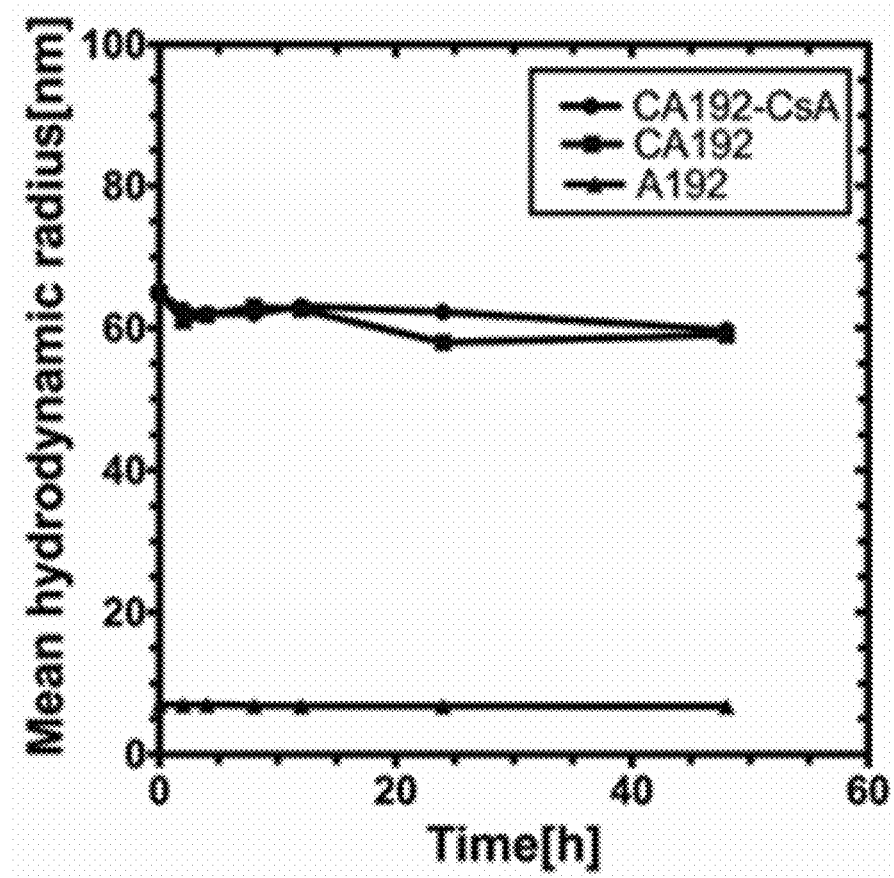
Figure 5C:
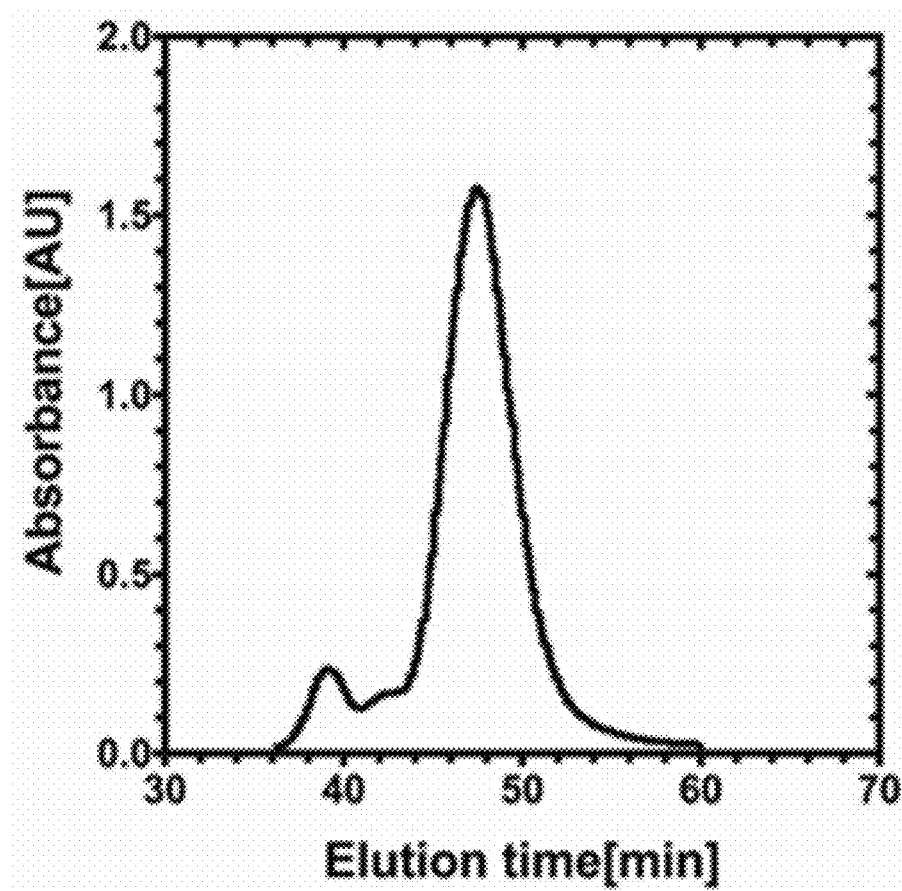
Figure 5D:
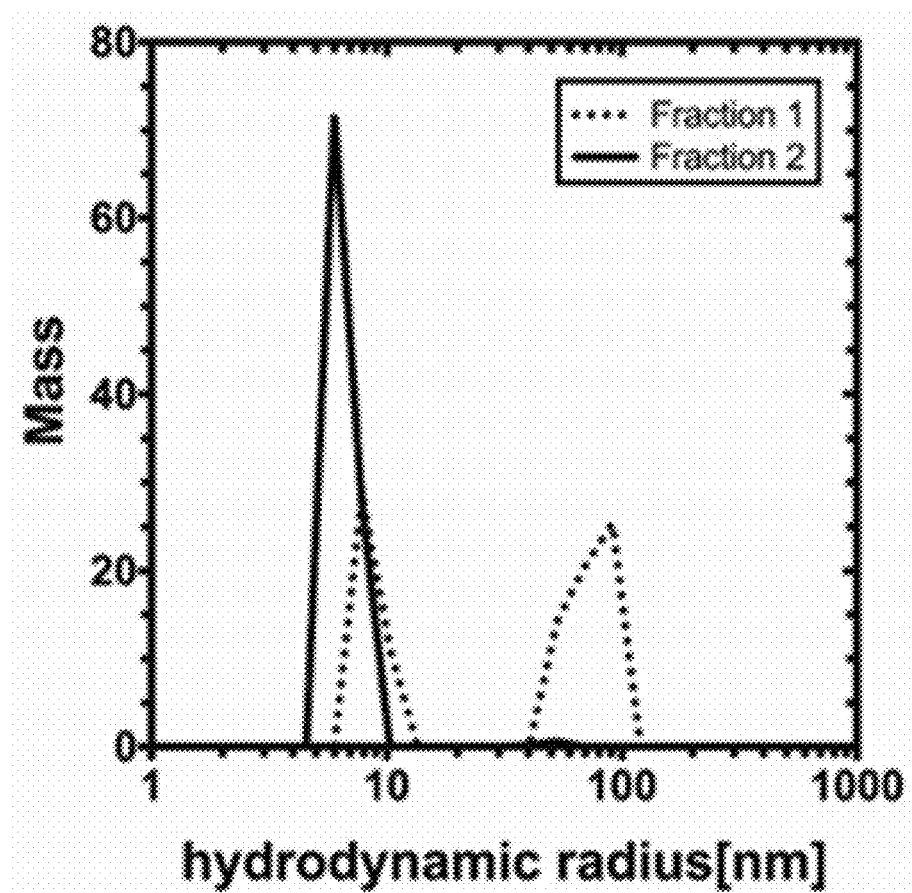

The hydrodynamic radius ($R_h$) of both the loaded and unloaded fusion protein, along with plain A192, was measured via dynamic light scattering (DLS) using a DynaPro Plate Reader II from Wyatt Technology. Before the DLS measurement, solutions were filtered through 0.2 pM pore size filters. The concentration of each solution was then adjusted to 20 pM. 60 μL from each sample was pipetted into three different wells on the plate reader and covered by 15 μL mineral oil each to avoid solvent evaporation. Centrifugation was then performed to remove air bubbles. DLS intensity revealed that unloaded CA192 has a mean $R_h$ of around 64.8±0.7 nm ($p<0.05$), significantly outsizing that of the plain A192 of 7.3±0.6 nm ($p<0.05$) (FIG. 5A). Based on this DLS method, Applicants performed a stability assay to explore the stability of the fusion protein by measuring the mean $R_h$ shift during incubation at physiological temperature. Briefly, the fusion solution was incubated at 37° C. for different periods of time up to 48 h and the mean $R_h$ of CA192 at these different time points was measured with DLS. This assay demonstrated that the mean $R_h$ of CA192 is well maintained throughout 48 h, suggesting good stability and stable aggregation status at physiological temperature (FIG. 5B). There might be some slight aggregation occurring in the CA192 protein solution. Through contributing most of the intensity, this aggregated form could lead to the significantly bigger mean size of CA192 than plain A192. To determine if this was the case, further separation was conducted with size exclusion chromatography (SEC). This process was performed at 4° C. using a Hiload 26/600 column (26×600 mm, particle size 24-44 pM). Elution was achieved with an isocratic flow rate of 2.6 mL/min and the detection wavelength of 214 nm. Fragments with absorption above 10 mAu were collected and concentrated with a Spin-X concentrator (pore size 10 kDa). Two fractions were observed after SEC separation (FIG. 5C). Both species were reanalyzed through DLS, demonstrating that 99.2% by mass of fraction 2 exhibited a $R_h$ of 6.5±0.1 nm ($p<0.05$) and seemed fairly monodisperse. Fraction 1, on the other hand, exhibited significantly higher heterogeneity. (FIG. 5D) Through measuring the CA192 concentration of both fractions, Applicants determined that 20.8% by mass in solution is represented by the multimerized particles. Multi-Angle static Light Scattering (MALS) was then applied to evaluate the aggregation and oligomeric state of CA192. The molecular weight of fraction 2 was determined to be 181.0±5.6 kDa ($p<0.05$), suggesting that a dimerization process was occurring in the solution. Thus, it was concluded that the CA192 fusion protein is mostly maintained as dimerized nanoparticles with a 6.5 nm hydrodynamic radius.

As shown in FIG. 5C, Size Exclusion Chromatography (SEC) has identified the presence of two fractions of CA192 in solution (FIG. 5C). To further evaluate the aggregation and oligomeric state of each fraction, Multi-Angle Static Light Scattering (MALS) was then used to measure the molecular weight of both peaks. The molecular weight of fraction 2 was determined to be 181.0±5.6 kDa (±4.133%), which roughly doubles that of CA192 monomer, suggesting that fraction 2 is actually dimerized CA192. Similarly, fraction 1 was identified as aggregated form. There is no monomeric form of CA192 existing in solution.

Figure 6:
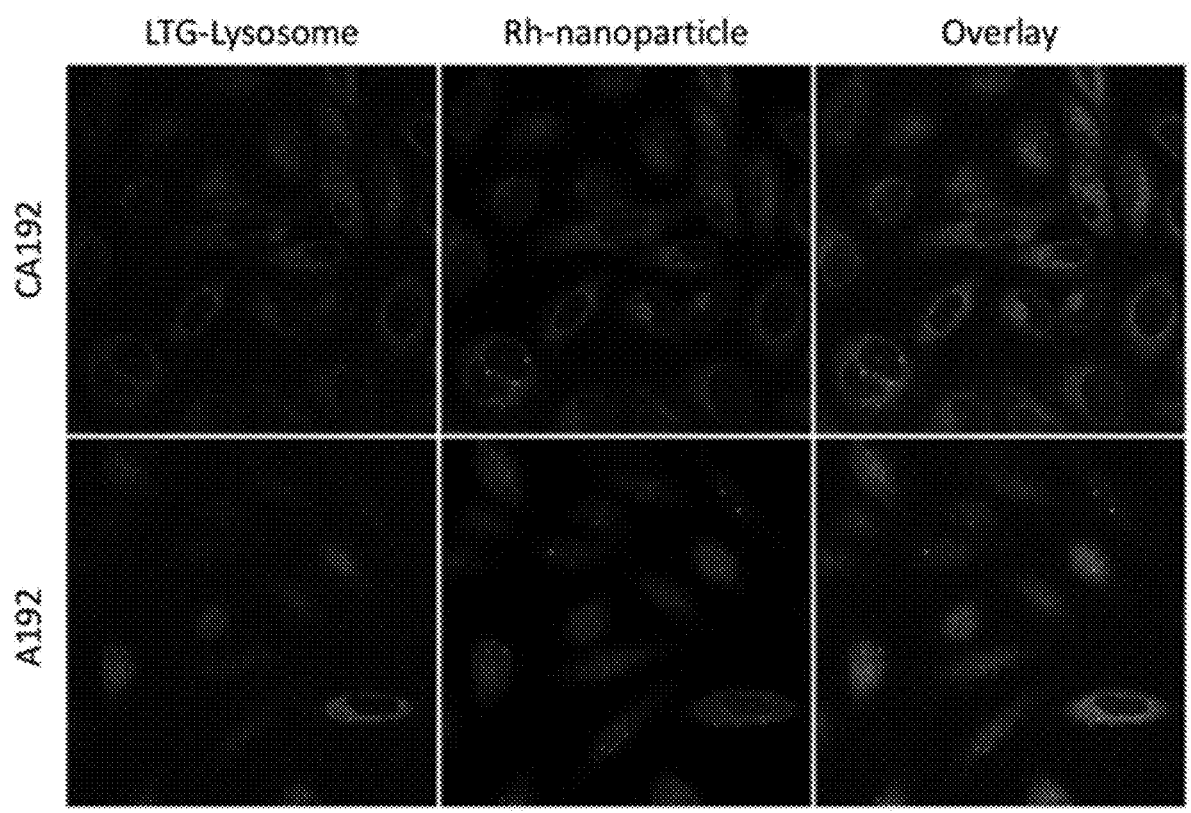
FIG. 6: Both A192 and CA192 (SEQ ID NO: 3) co-localizing with lysosomes in HeLa cells. Lysosomes were labeled by LysoTracker™ Green. ELP constructs were labeled covalently with rhodamine. Cells were imaged by confocal laser scanning microscopy.
Figure 7A:
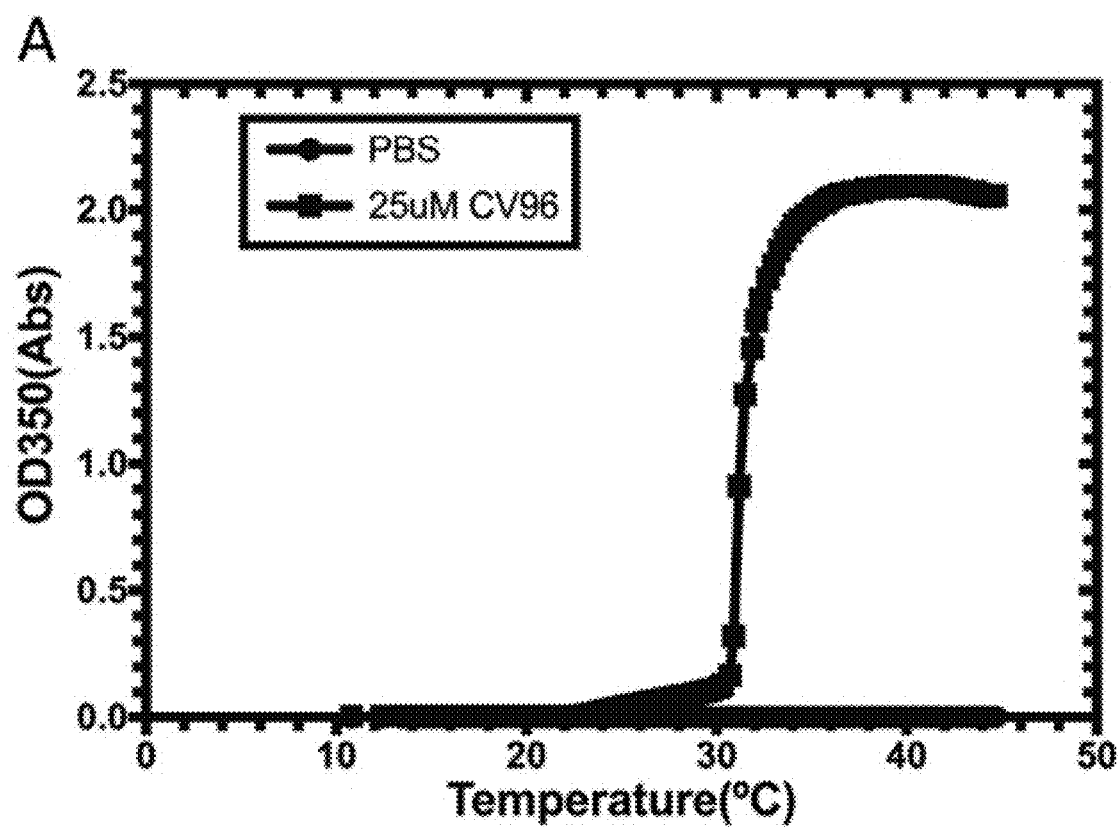
FIGS. 7A-7B: CA192 (SEQ ID NO: 3), CV96 (SEQ ID NO: 4) has a transition temperature (Tt) of 31.2° C. at 25 μM (FIG. 7A), which is well lower than physiological temperature, suggesting that CV96 (SEQ ID NO: 4) may form a depot after s.c. injection. The optical density profile representing the CV96 (SEQ ID NO: 4) phase separation behavior is shown in FIG. 7B.
Figure 7B:
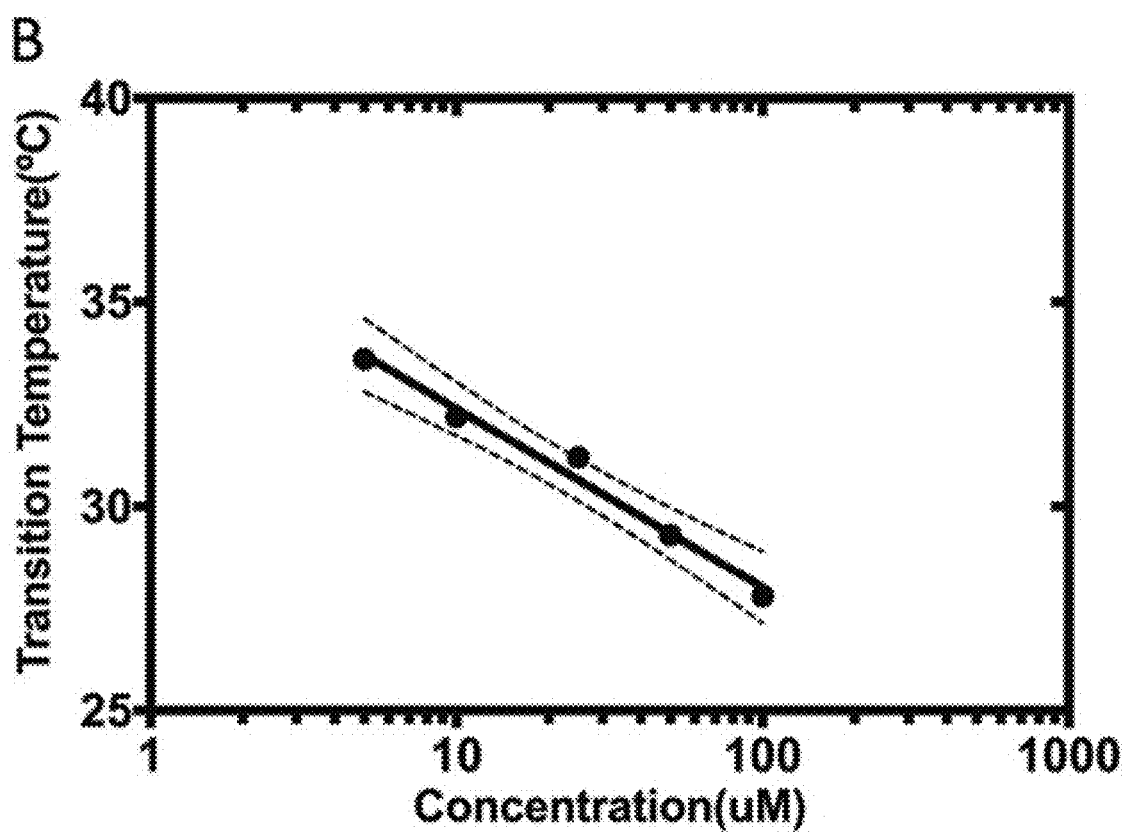

In order to further validate the potential efficacy of CA192 working as a potent drug binding domain, an in vitro cell uptake study was performed. Briefly, CA192 and A192 was labeled with rhodamine and HeLa cell lysosome with LysoTracker™ Green (LTG). For the treatment group, HeLa cells were incubated with 30 UM of rhodamine-labeled (rh)-CA192 and 70 nM of LTG for 120 min. For the control group, HeLa cells were incubated with 30 uM of rhodamine-labeled (rh)-A192 and 70 nM of LTG for 120 min. Cells were then rinsed with warm HBSS three times, maintained in the fresh culture medium, and imaged by confocal microscopy. Images were acquired using a Zeiss laser scanning microscope 510 Meta NLO confocal imaging system equipped with Argon, red HeNe, green HeNe laser, and a Coherent Chameleon Ti-Sapphire laser (LSM) mounted on a vibration-free table (Carl Zeiss, Thornwood, NY). All images were acquired using a Plan-Apochromat 63x Oil immersion lens with a working distance of 0.19 mm. As shown in FIG. 6, both CA192 and A192 shown obvious co-localization with lysosome, suggesting efficient cell uptake when administrated.

In summary, using molecular cloning, Applicants successfully constructed an ELP-based CsA carrier, CA192. It maintains both the phase transition property characteristic of ELPs and the CsA binding affinity of CypA. In comparison with its parent ELP, A192, the constructed CA192 has a lower transition temperature that, however, is still well above physiological temperature. CsA encapsulation efficiency of CA192 was determined to be 48.6±4.0%, significantly higher than that of albumin. The half-life of CsA drug release from CA192 was determined to be 128.3 h. DLS-based stability assay demonstrated that throughout 48 h at 37° C., no significant hydrodynamic radius shift was occurring in the solution, implying good stability of the construct. In addition, like A192, CA192 co-localized with lysosomes in HeLa cells, which implies that both constructs are endocytosed.

Figure 1B:
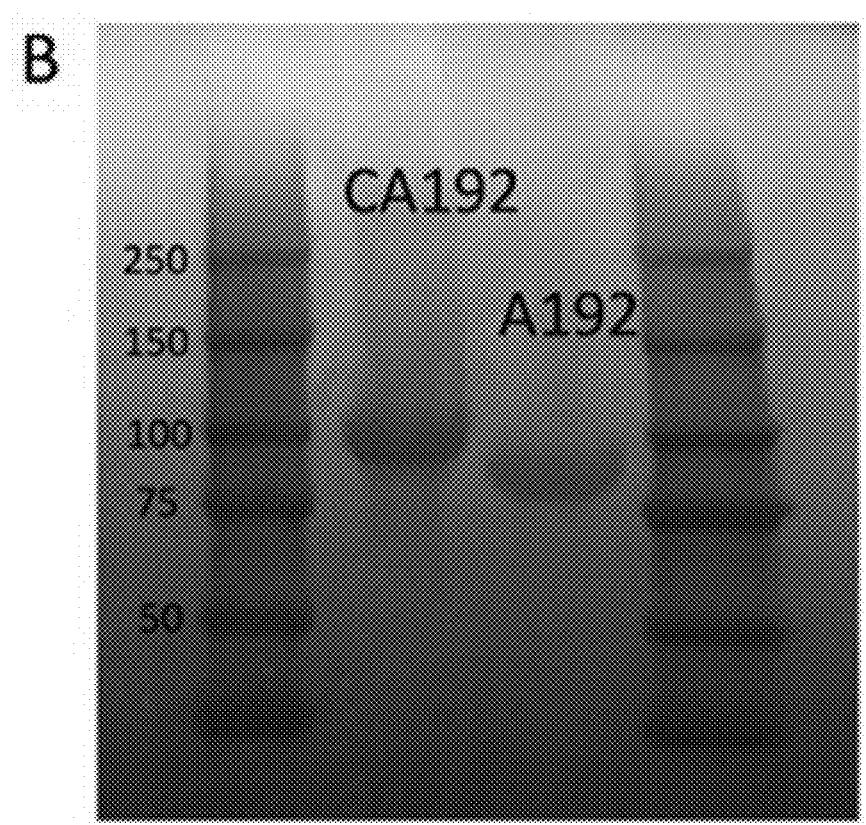
Figure 8:
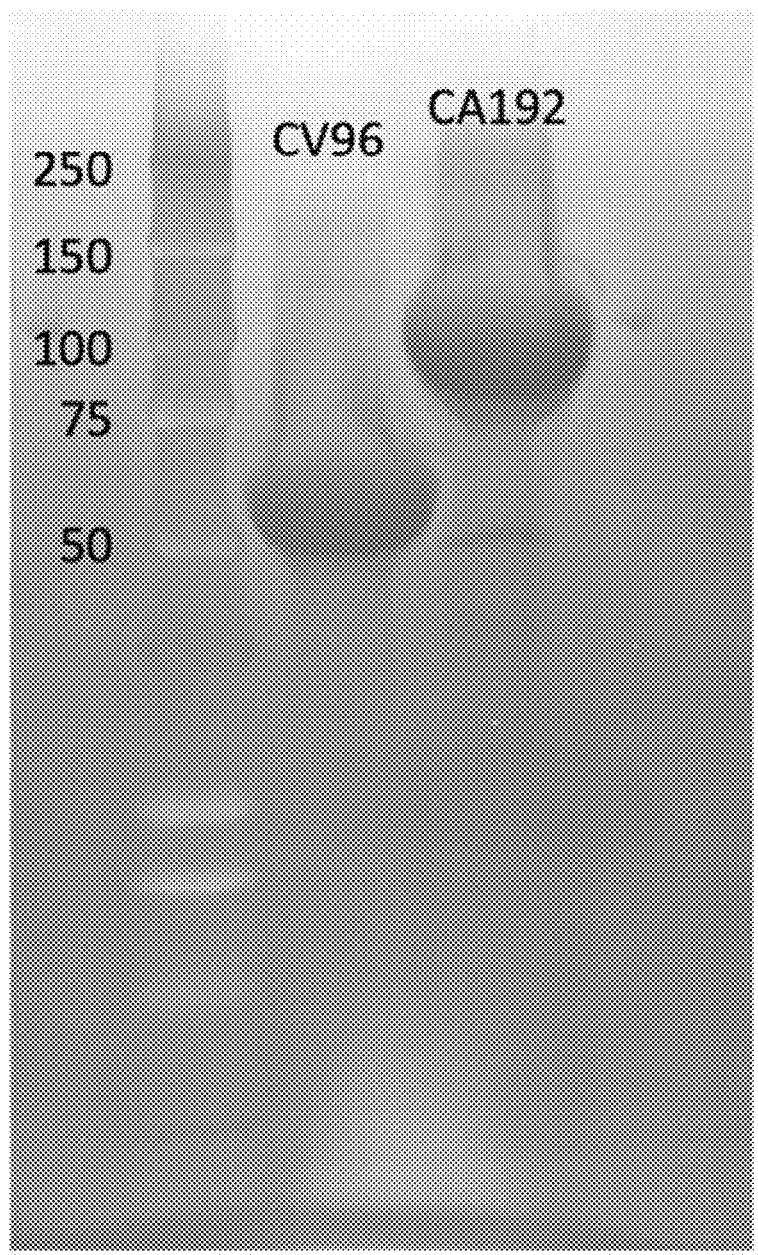
FIG. 8: The molecular weight of purified CV96 (SEQ ID NO: 4) was verified by SDS-PAGE stained with copper chloride ($CuCl_2$).
Figure 9:
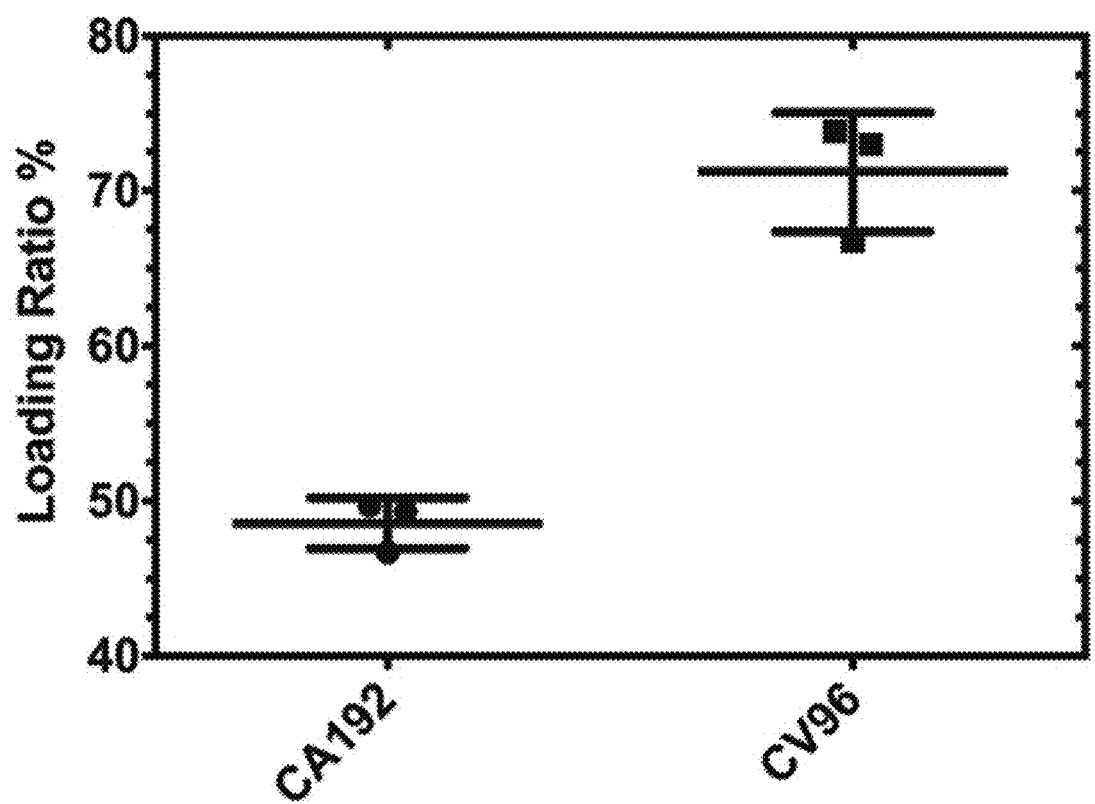
FIG. 9: Despite its lower phase transition temperature CV96 (SEQ ID NO: 4) has a similar capacity to load CsA in comparison with CA192 (SEQ ID NO: 3). ELP fusions that phase separate below physiological temperature can potentially contribute to reducing injection frequency.

Through molecular cloning, Applicants successfully fused the cytosolic sequence of the human receptor of CsA, cyclophilin A (SEQ ID NO: 22 or SEQ ID NO: 23) (CypA), to a particular ELP, A192, which has the amino acid sequence of G(VPGAG)192Y (SEQ ID NO: 65) (FIG. 1A, Table 2). The CypA-A192 (CA192) fusion protein is designed to help in solubilizing the poorly soluble CsA and to function as a drug binding domain to improve the CsA safety profile when administered systemically. Unlike free CsA, as the molecular weight of CA192 well exceeds the renal filtration cutoff, fusion-bound drug should have significantly reduced renal clearance. The results reported herein describe the physical properties of the resulting carrier as well as the release characteristics of CsA bound to CA192.

transition temperature (Tt) of 31.2° C. at 25 pM (FIG. 8A), which is well lower than physiological temperature, suggesting that CV96 will form a depot after s.c. injection. The optical density profile representing the CV96 phase separation behavior is shown in FIG. 8B. The Tt of CV96 was also found to be a function of concentration: $T_t = b - mLog_{10}[C_{ELP}]$, where the intercept "b" is equal to 36.8, the slope "m" equals to 4.4 and $[C_{ELP}]$ represents the CV96 concentration.

TABLE 3

Protein-polymers evaluated in this Example

| Label | Amino Acid Sequence | Exp. M.W. [kDa] | $^a$Slope, m [° C./ $Log_m(\mu M)$] | $^b$Intercept, b [° C.] | $^c$Purity [%] |
|---|---|---|---|---|---|
| CV96 | MVNPTVFFDIAVDGEPLGRVSFELFAD KVPKTAENFRALSTGEKGFGYKGSCFH RIIPGFMCQGGDFTRHNGTGGKSIYGE KFEDENFILKHTGPGILSMANAGPNTN GSQFFICTAKTEWLDGKHVVFGKVKEG MNIVEAMERFGSRNGKTSKKITIADCG QLEG(VPGVG)$_{96}$Y (SEQ ID NO: 4) | 57.7 | 4.4 | 36.8 | 95.9 |

$^{a,b}$The ELP phase diagram as a function of temperature, $T_t$, and concentration, $C_{ELP}$, was fit to the following relationship: $T_t = b - mLog_{10}[C_{ELP}]$, where b is the intercept at 1 µM and m are ° C. change for a 10-fold change in concentration.
$^c$Polypeptide purity was assessed using SDS-PAGE and subsequent densitometry of copper chloride stained gel.

As a potent macrolide immunosuppressant, cyclosporin A (CsA) is used to treat multiple autoimmune diseases, including autoimmune-mediated dry eye disease, rheumatoid arthritis and psoriasis. Despite its potency, CsA has poor solubility, poor bioavailability, and induces serious adverse drug reactions, including nephrotoxicity and neurotoxicity. To overcome these limitations, CsA has been formulated for systemic and topical delivery using advanced drug binding domains including emulsions and liposomes. Applicants disclose a new strategy to carry CsA that utilizes its human target, a protein called cyclophilin, to which CsA binds with a Kd of 36.8 nM. Due to its low MW (1.2 kD), cyclophilin is below the renal filtration cutoff (<40 kD) and would be rapidly filtered from the blood by the kidneys. To overcome this limitation, Applicants used recombinant protein-engineering to increase the molecular weight of cyclophilin through recombinant fusion with a 73 kD elastin-like polypeptide (ELP). Surprisingly, this fusion protein (CA192) promoted assembly of nanoparticles with stability over 2 days. Most importantly, these fusion proteins efficiently solubilize CsA, which they released with a half-life of 163.6 h under dialysis and in incubation with an excess concentration of albumin.

Figure 10:
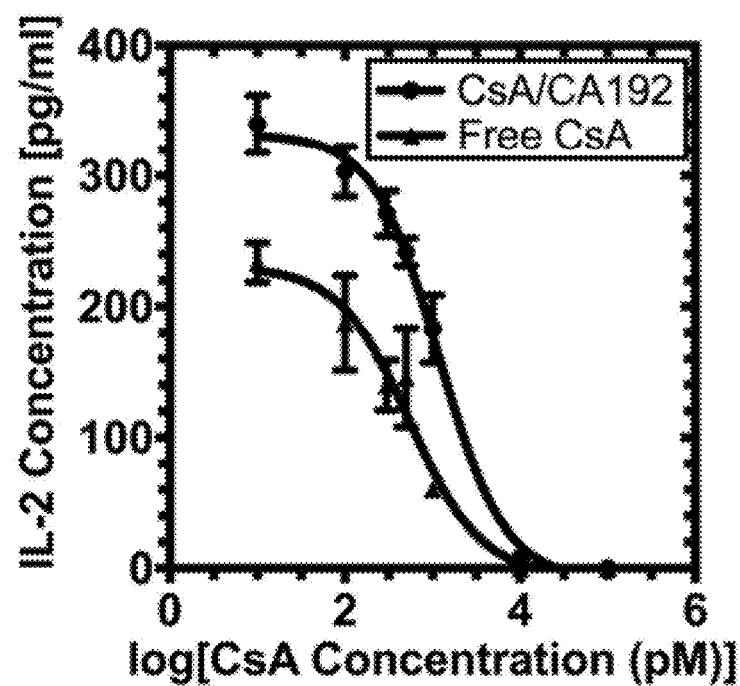
FIG. 10: CsA/CA192 exhibit comparable IL-2 inhibition efficacy. Upon stimulation, Jurkat cells produce IL-2. CsA, as an immunosuppressant, can effectively reduce IL-2 gene expression and secretion. The inhibitory concentration that blocks half of activation (IC50) of CsA/CA192 is 1239±391 pM, slightly higher than free CsA with an IC50 of 522±152 pM (n=3, mean±SD).

In terms of patient compliance, Applicants built another injectable prolonged release elastin-like polypeptide (ELP)-based Cyclosporin A (CsA) carrier, which requires less injection frequency. This Thus, IL-2 secretion assay will be utilized to quantify the efficacy of CsA/CA192. Jurkat cells are activated by the combined stimulation of Phorbol 12-myristate 13-acetate (PMA) and Ionomycin, immediately followed by treatment of free CsA, CsA/CA192 or CA192 control for 6 h. IL-2 concentration in culture media is then assessed using ELISA assay. The IC50 of CsA/CA192 has been demonstrated by IL-2 secretion assay to be 1239±391 pM, slightly higher than free CsA with an IC50 of 522±152 pM (n=3, mean SD) (FIG. 10).

Figure 11A:
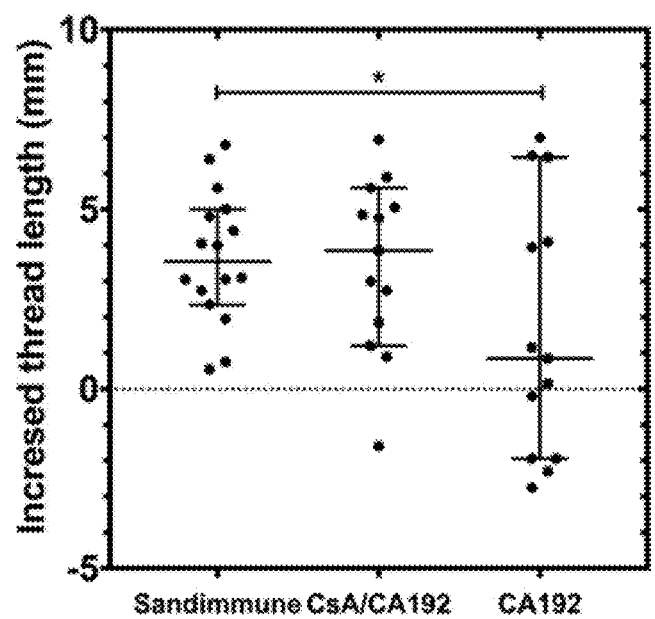
FIG. 11A-11B.
Figure 11B:
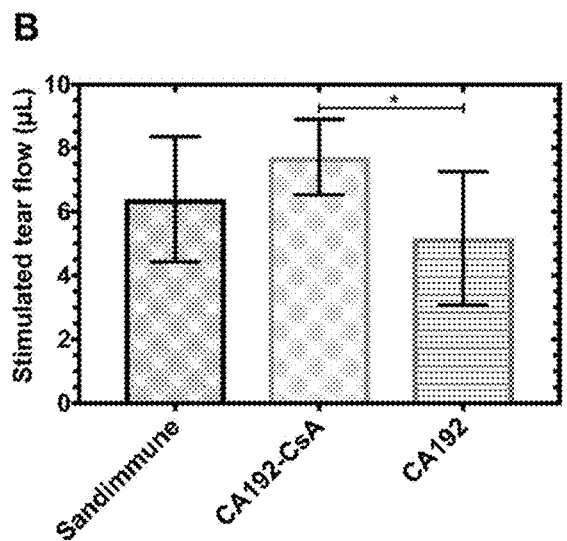
Figure 12:
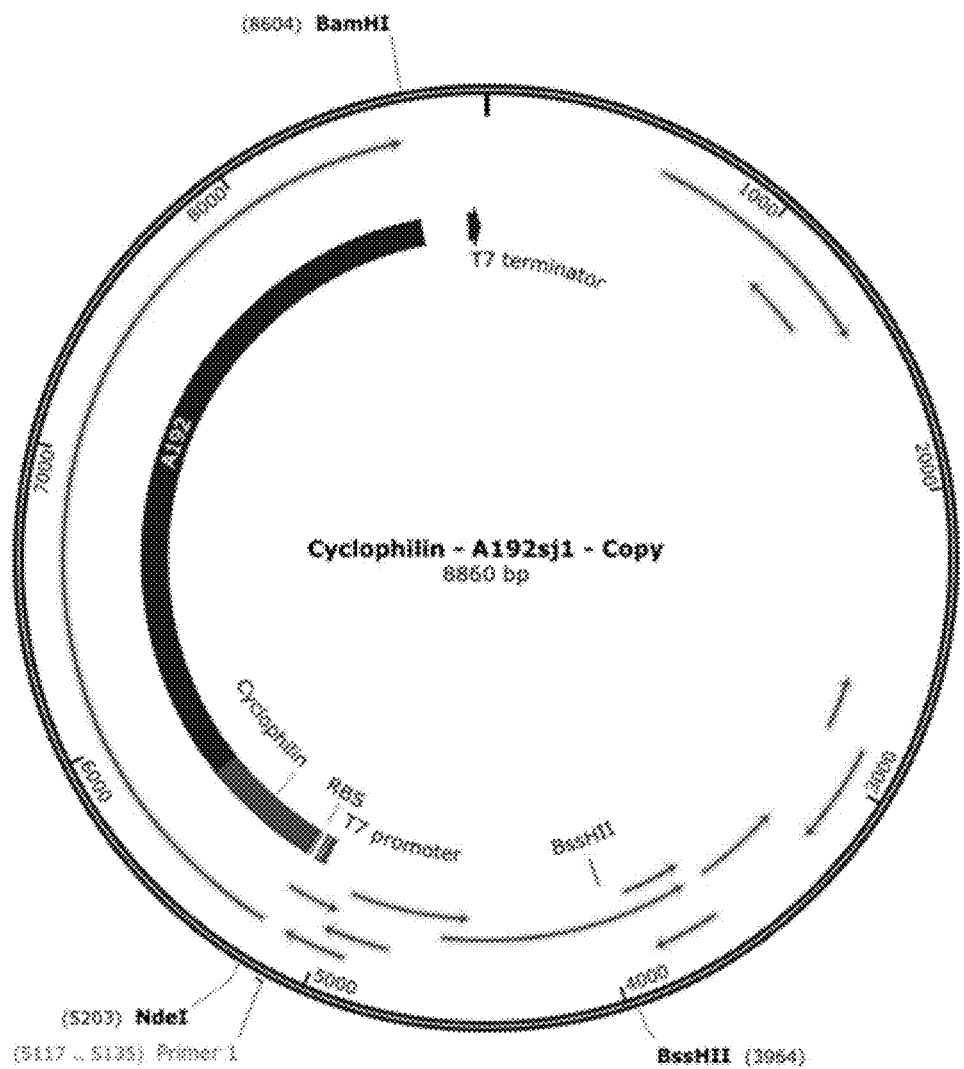
FIG. 12 is a map of the CA192 (SEQ ID NO: 3) plasmid.
Figure 13:
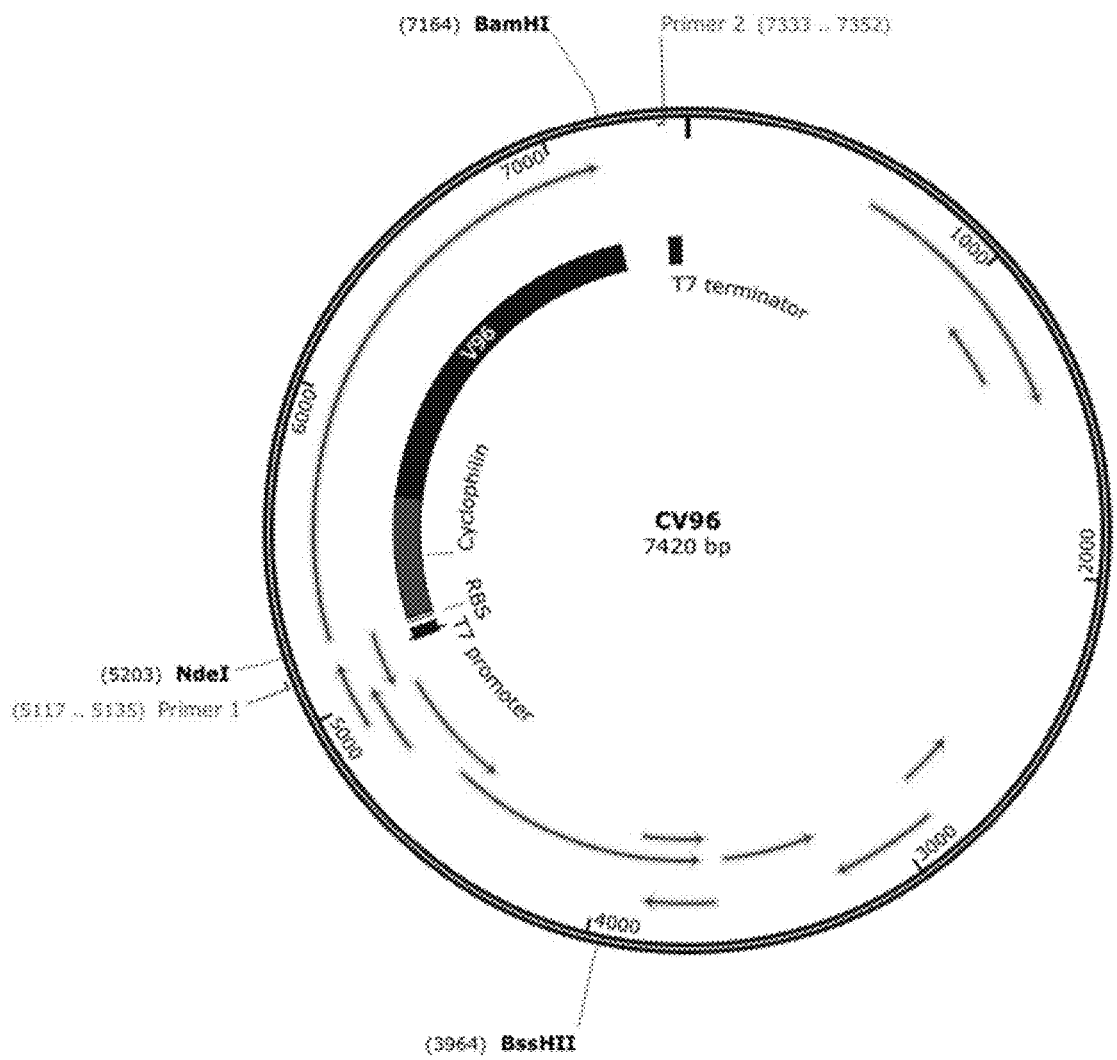
FIG. 13 is a map of the CV96 (SEQ ID NO: 4) plasmid.
Figure 14:
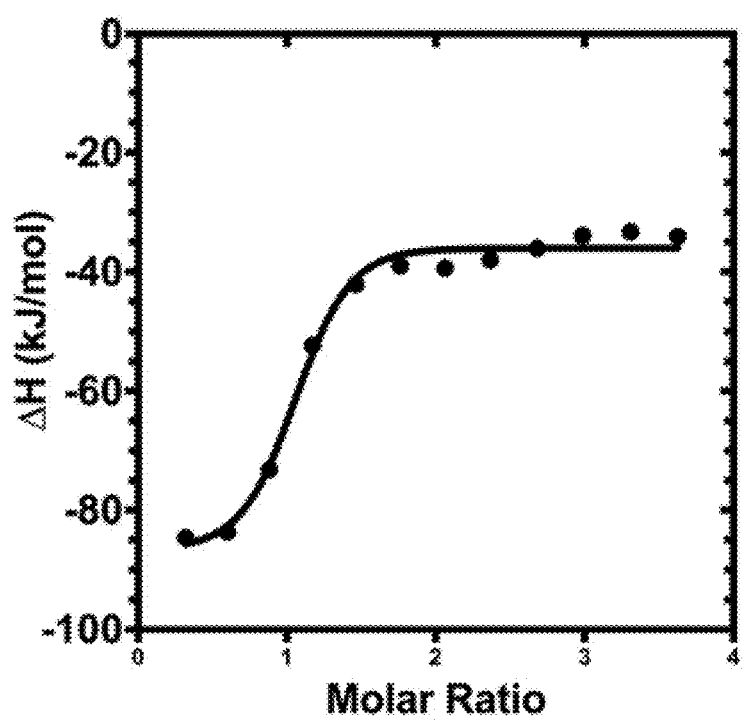
FIG. 14: Isothermal Titration Calorimetry (ITC) demonstrated that dimerized CA192 (SEQ ID NO: 3) is the functional fraction to bind cyclosporine A (CsA) with a dissociation constant of 343±175 nM (n=3, mean±SD) at 25° C. Dimerized CA192 (SEQ ID NO: 3) was repeatedly titrated into the cell prefilled with CsA. The released heat from binding upon each injection was recorded, represented by each point in the figure. The binding affinity was then interpreted based on the inverse slope of the inflection. Similarly, the dissociation constant of CV96 (SEQ ID NO: 4) to CsA was also determined to be 230±57.8 nM.
Figure 15:
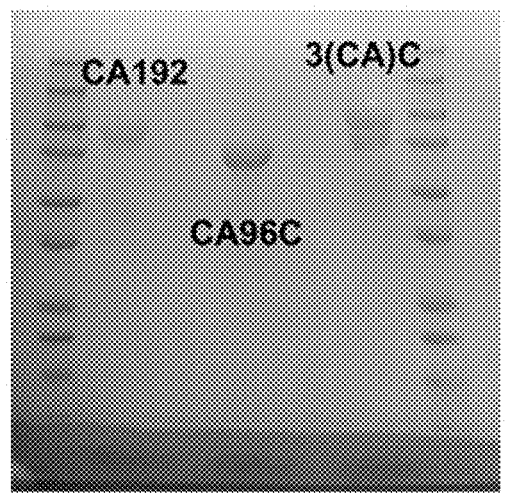
FIG. 15: SDS-PAGE demonstrating that three generations of ELP-based CsA carriers are successfully cloned, expressed and purified.
Figure 16:
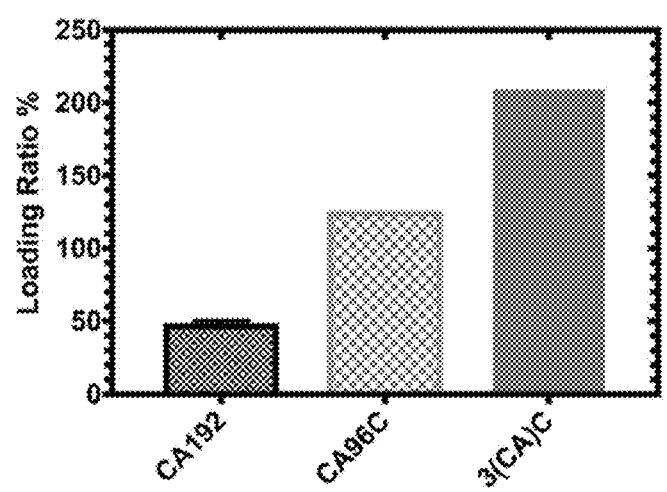
FIG. 16: The CsA loading ratio was significantly increased to 127.5% by $2^{nd}$ generation carrier, CA96C, and to 209.0% by 3rd gen carrier, 3(CA)C (SEQ ID NO: 9), from 48.6% 1.63% (mean±SD, n==3) of CA192 (SEQ ID NO: 3).

Tear Stimulation effect of CA192/CsA on NOD mice model. As a preliminary therapeutic study, 2.5 mg/kg CsA/CA192 was given s.c. to 14-week-old male NOD mice every other day for 2 weeks. The basal tear production was measured before and after treatment. Sandimmune (CsA formulated for IV injection) was introduced as a positive control, while CA192 without drug binding was used as a negative vehicle control. CsA treatments (Sandimmune and CsA/CA192) benefited more mice than CA192 vehicle control in terms of tear production (FIG. 11). The increased wet lengths in Sandimmune group is significantly higher than CA192 group (p=0.016). CsA/CA192 nearly approached significance relative to CA192 group (p=0.055); furthermore, a higher powered study may be capable of detecting this effect. Stimulated tear collection was conducted under full anesthesia as a terminal procedure. After intraperitoneal injection with a mixture of ketamine/xylazine at concentrations of 100 mg/kg and 10 mg/kg, respectively, mice were subjected to a small bilateral incision on the axis between the outer junction of the eyelid and the ear to expose the LG on both sides. Then 3 µL of 50 µM carbachol (CCh) was applied directly onto the LG to stimulate tear secretion, followed by tear collection from both eyes using 2 µL micro-capillary tubes, which were placed at the tear meniscus in the medial canthus for 5 min. This stimulation and collection procedure was repeated two more times and the volume of collected tears was recorded.

Synthesis and drug release testing of $2^{nd}$ and $3^{rd}$ generation ELP fusion proteins. Progressing from CypA-ELPs, such as CA192 and CV96, where only one receptor was fused to one ELP backbone, the feasibility to clone and express ELP-based CsA carriers with significantly higher drug loading ratio was also accomplished. These $2^{nd}$ generation carriers have one CypA on the N-terminus and another on the C-terminus of the ELP backbone, sequenced as CypA-ELPs-CypA. As the design suggested, these carriers are able to deliver 2× CsA than $1^{st}$ generation CypA-ELPs described above. When using shorter ELPs as the backbones, the drug loading ratio can be further improved by stitching multiple $1^{st}$ and $2^{nd}$ generation carriers together through molecular cloning, evolving into a $3^{rd}$ generation of constructs, for example, CypA-ELPs-CypA-ELPs-CypA-ELPs-CypA.

CypA-A96-CypA (CA96C) and CypA-A24-CypA-A24-CypA-A24-CypA (3(CA)C) were made as representatives of 2nd and 3rd generation carriers, respectively. These two carriers have been successfully cloned, expressed and purified (FIG. 15). The cloning methods are detailed below. Then they can be expressed and purified using the same method of Sun et al., 2011 and Janib et al., 2014 discussed above and as used for CA192.

The drug loading capability of 2nd and 3rd generation carriers were also tested using the same encapsulation method detailed above employing the method of Shi, et al., 2013. This data was compared with that of CA192. As shown in FIG. 16, 2nd generation carriers are able to increase the loading ratio by 1-fold, and 3rd generation carriers by 3-fold.

To make CA96C, another CypA needs to be fused to the C-terminus of CA96, which requires a slightly modified CypA, "CypA_C-term," sequenced as below:

5'-TCTAGAAATAATTTTGTTTAACTTTAAGAAG GAGGAGTACATATGGGTATGGTTAA CCCG ACCG TTTTCTTCGACATCGCTGTTGACGGTGAACCG CT GG GTCGTGTTTCTTT CGAACTGTTCGCTGAC AAAGTTCCGAAAACCGCTGAAAACTTCC GTGCT CTGTCTA CCGGTGAAAAAGGTTTCGGTTACAAA GGTTCTTGCTTCCACCGTATCATCCCGGGT TTCA TGTGCCAGGGTGGTGACTTCACCCGTCACAAC GGTACCGGTGGTAAATCTAT CTACGGTGAAAAAT-TCGAAGACGAAAACTTCATCCTGAAACACA CCG GTCCGGGT ATCCTGTCTATGGCTAACGC TGGTCCG AACACCAACGGTTCTCAGTTCTTCATCTGC ACCG CTAAAACCGAATGGCTGGACGGTAAACACGTTGT TTTCGGTAAAGTTAAAG AAGGTATGAACATCGTT-GAAGCTATGGAACGTTTCGGTTCTCGTAA CGGTAAAACC TCTAAAAAAATCACCATCGCTGA CTGCGGTCAGCTGGAAGGTTGATAATGATCTTC AGGATCC-3' (SEQ ID NO: 5). Flanked by restriction sites of XbaI and BamHI at the 5' and 3' ends enabling the insertion to intact pET-25b(+) vector, CypA_C-term (SEQ ID NO: 5) has a BserI recognition site whose restriction site locates right after the start codon, ATG, of the encoding sequence, to enable the C-terminus insertion.

CypA_C-term (SEQ ID NO: 5) was first inserted to intact pET-25b(+) vector using XbaI and BamHI. The resultant CypA_C-term on intact pET-25b(+) vector and the pET-25b (+) vector with the encoding sequence of CA96 were digested differently by BssHII and BserI, and, BssHII and AcuI, respectively. After verifying the correct sequence through DNA sequencing, the resultant plasmid with CA96C protein sequence was amplified and expressed using the same method of Sun et al., 2011 and Janib et al., 2014.

```
To make 3(CA)C of sequence:
MGMVNPTVFFDIAVDGEPLGRVSFELFADKVPKTAENFRALSTGEKGFGY

KGSCFHRIIPGFMCQGGDFTRHNGTGGKSIYGEKFEDENFILKHTGPGIL

SMANAGPNTNGSQFFICTAKTEWLDGKHVVFGKVKEGMNIVEAMERFGSR

NGKTSKKITIADCGQLEG- (VPGAG)24-
                                      (SEQ ID NO: 9)
MVNPTVFFDIAVDGEPLGRVSFELFADKVPKTAENFRALSTGEKGFGYKG

SCFHRIIPGFMCQGGDFTRHNGTGGKSIYGEKFEDENFILKHTGPGILSM

ANAGPNTNGSQFFICTAKTEWLDGKHVVFGKVKEGMNIVEAMERFGSRNG

KTSKKITIADCGQLEG-(VPGAG)24-MVNPTVFFDIAVDGEPLGRVSFE

LFADKVPKTAENFRALSTGEKGFGYKGSCFHRIIPGFMCQGGDFTRHNGT

GGKSIYGEKFEDENFILKHTGPGILSMANAGPNTNGSQFFICTAKTEWLD

GKHVVFGKVKEGMNIVEAMERFGSRNGKTSKKITIADCGQLEG- (VPGAG)24-MVNPTVFFDIAVDGEPLGRVSFELFADKVPKTAENFRALS

TGEKGFGYKGSCFHRIIPGFMCQGGDFTRHNGTGGKSIYGEKFEDENFIL

KHTGPGILSMANAGPNTNGSQFFICTAKTEWLDGKHVVFGKVKEGMNIVE
```

-continued

AMERFGSRNGKTSKKITIADCGQLEG,

CA24CA24CA24 of sequence:
(SEQ ID NO: 57)
MG-[MVNPTVFFDIAVDGEPLGRVSFELFADKVPKTAENFRALSTGEKGF

GYKGSCFHRIIPGFMCQGGDFTRHNGTGGKSIYGEKFEDENFILKHTGPG

ILSMANAGPNTNGSQFFICTAKTEWLKHVVFGKVKEGMNIVEAMERFGSR

NGKTSKKITIADCGQLEG- (VPGAG)$_{24}]_3$, needs to be first synthesized by recursive directional ligation in a modified pET-25b(+) vector (Janib, et al., 2014; Meyer, et al., 2002) from CA24, which requires another modified CypA, "CypA_extra glycine." As sequenced below, CypA_extra glycine has three more base pairs, GGT, encoding an extra glycine, right after start codon, ATG. Using CypA_extra glycine, CA24 was first cloned using the same method employing methods of Sun et al., 2011 and Janib et al., 2014, which was further synthesized into CA24CA24CA24 by recursive directional ligation in a modified pET-25b(+) vector (Janib, et al., 2014; Meyer, et al., 2002). Lastly, another CypA_C-term (SEQ ID NO: 5) was inserted to the C-terminus of CA24CA24CA24 to make CA24CA24CA24C (3(CA)C), using the same method described above for fusing CypA to the C-terminus of CA96.

TABLE 4

Multi-Angle Static Light Scattering (MALS) demonstrated that the dimeric form of CA192 accounts for approximately 90% of the total mass of CA192 in solution.

| | Fraction 1 (Nano-aggregated form) | Fraction 2 (Dimeric form) |
|---|---|---|
| Molar mass moments (g/mol) | $8.511 \times 10^7$ (±2.539%) | $1.810 \times 10^5$ (±4.133%) |
| Calculated Mass (μg) | 31.67 | 282.73 |
| Mass Fraction (%) | 10.1 | 89.9 |

Example 2: High Capacity, 3$^{rd}$ Generation FKBP-ELP Carriers to Facilitate Delivery of Rapalogues Rapalogues bind the cytosolic protein called FKBP12 and modulate mTOR (rapamycin, everolimus, temsirolimus or calcineurin (tacrolimus) signaling. FDA-approved rapalogues have indications from transplant surgery, to autoimmune disease, to cancer. Despite clinical successes, these drugs are limited by low solubility, poor oral bioavailability (~15%), and variability in pharmacokinetics. Additionally, major clinical studies show consistent adverse events of rapalogues, including stomatitis, pulmonary toxicity, fatigue, anemia, infection, hyperlipidemia, hypercholesterolemia, and acute kidney injury. Strategies to mitigate these side-effects could have a major impact in breast cancer and prevention of transplant rejection. The incidence of breast cancer remains significant with nearly a quarter of a million new cases of invasive breast cancer diagnosed annually. While the survival rates of early stage breast cancer are relatively high, advanced disease kills nearly 40,000 women per year in the USA. The rapalogue everolimus (Eve) was approved in combination with exemestane for hormone (estrogen/progesterone) receptor positive HR+/HER2− breast cancer patients. Despite tripling progression free survival, the pivotal BOLERO-2 clinical trial reported adverse events necessitating dose reduction, discontinuation of treatment for 75%, 10% of patients respectively. Better delivery strategies could significantly improve compliance and efficacy within this clinically-validated population. Another rapalogue tacrolimus (Tac) is used as an immunosuppressive in nearly 90% of transplant recipients. Of organ transplants (~32,000) per year in the USA, the majority (~18,000) are kidney transplants. While all rapalogues bind FKBP, only tacrolimus acts through the calcineurin pathway. The toxicity profile of tacrolimus thus includes other side effects (nephrotoxicity, hypertension, heart failure, arrhythmia, neurotoxicity, pure red cell aplasia), which suggest that it too may benefit from carrier-assisted delivery. Moreover, the ADMIRAD study identified low adherence to tacrolimus with a 20% discontinuation rate 6 months' post-transplant, thereby resulting in an 8-fold increase in chance of rejection.

To improve the current status of rapalogue therapy, we propose an intelligent drug-carrier system that leverages human FKBP protein using elastin-like polypeptides (ELPs). ELPs are high molecular weight polypeptides derived from human tropoelastin and consist of a pentameric sequence, [Val-Pro-Gly-Xaa-Gly]n (SEQ ID NO: 51), where Xaa can be any amino acid and n specifies the number of repeats. As a function of Xaa and n, ELP fusion proteins display a characteristic inverse phase transition temperature (Tt) above which they transform into a reversible gel-like coacervate. As polypeptides, they can be recombinantly expressed as fusion proteins, including FKBP-ELP drug binding domains. While FKBP mediates high affinity binding and solubilization of rapalogues, ELP's heat-responsive property can be tuned to assemble a drug depot at body temperature. Such depots are retained for weeks at injection sites and elute with near zero-order kinetics that may enable patient compliant low frequency self-administration. Moreover, FKBP-ELPs are designed to efficiently sequester, slowly release and retarget free rapalogues to disease sites, each of which is aimed towards improving their toxicity profile. Recently, Applicant has characterized new high-capacity FKBP-ELP formulations, 5FA and 5FV, which remain soluble or assemble into a depot at body temperature. These high capacity carriers solubilize rapalogues up to 5% by mass.

Figure 17:
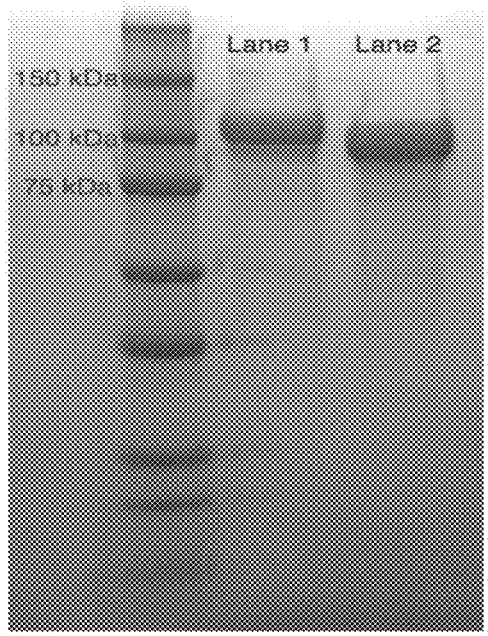
FIG. 17: SDS PAGE was used to estimate the purity and identity of high capacity FKBP-ELP fusions 5FA and 5FV.

Molecular cloning, bacterial expression and purification. Both 5FA and 5FV were successfully cloned by Recursive Directional Ligation by plasmid reconstruction (RDL), a strategy developed to facilitate cloning of oligomeric genes. The proteins were expressed in E. coli and purified by inverse transition cycling, a non-chromatographic purification strategy utilizing unique biophysical properties of ELPs, specifically their responsiveness to heat and ionic strength. ELPs appended to FKBP retained their stimulus sensing properties and three rounds of purification resulted in >90% pure protein, as visualized by copper stained SDS-PAGE gel (FIG. 17). The proteins demonstrate high production yields (180 mg/L and 90 mg/L of bacterial culture in case of 5FA and 5FV respectively), and their molecular weights agree with molecular weights predicted based on amino acid sequence (99.5 kDa and 102 kDa for 5FA and 5FV respectively).

Figure 18A:
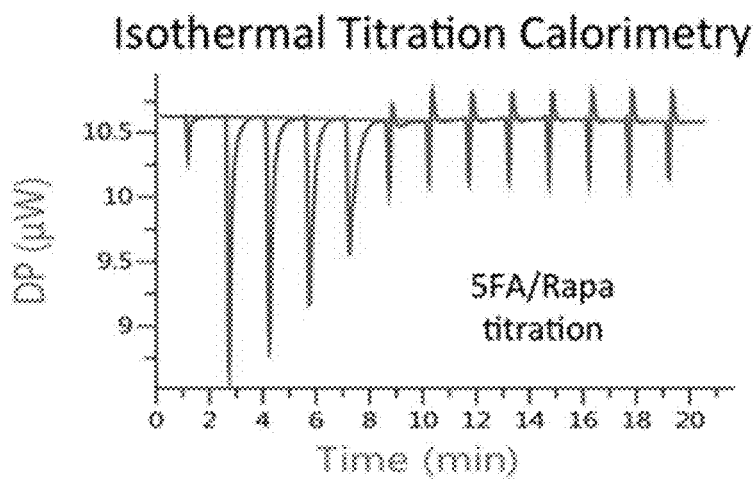
FIGS. 18A-18B: Results of Isothermal Titration Calorimetry used to confirm that all five FKBP domains on 5FA bind rapamycin.
Figure 18B:
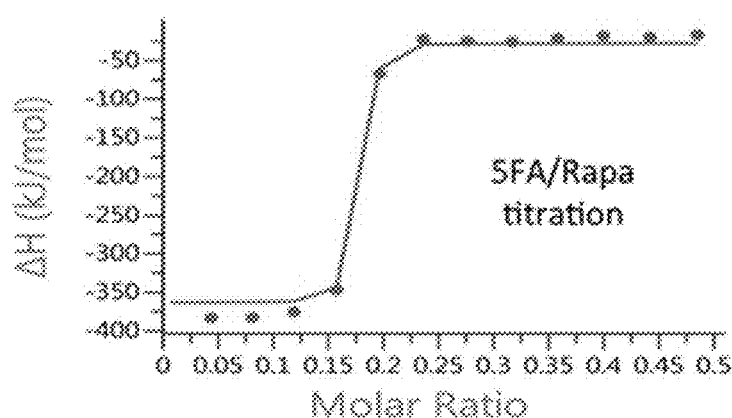
Figure 19A:
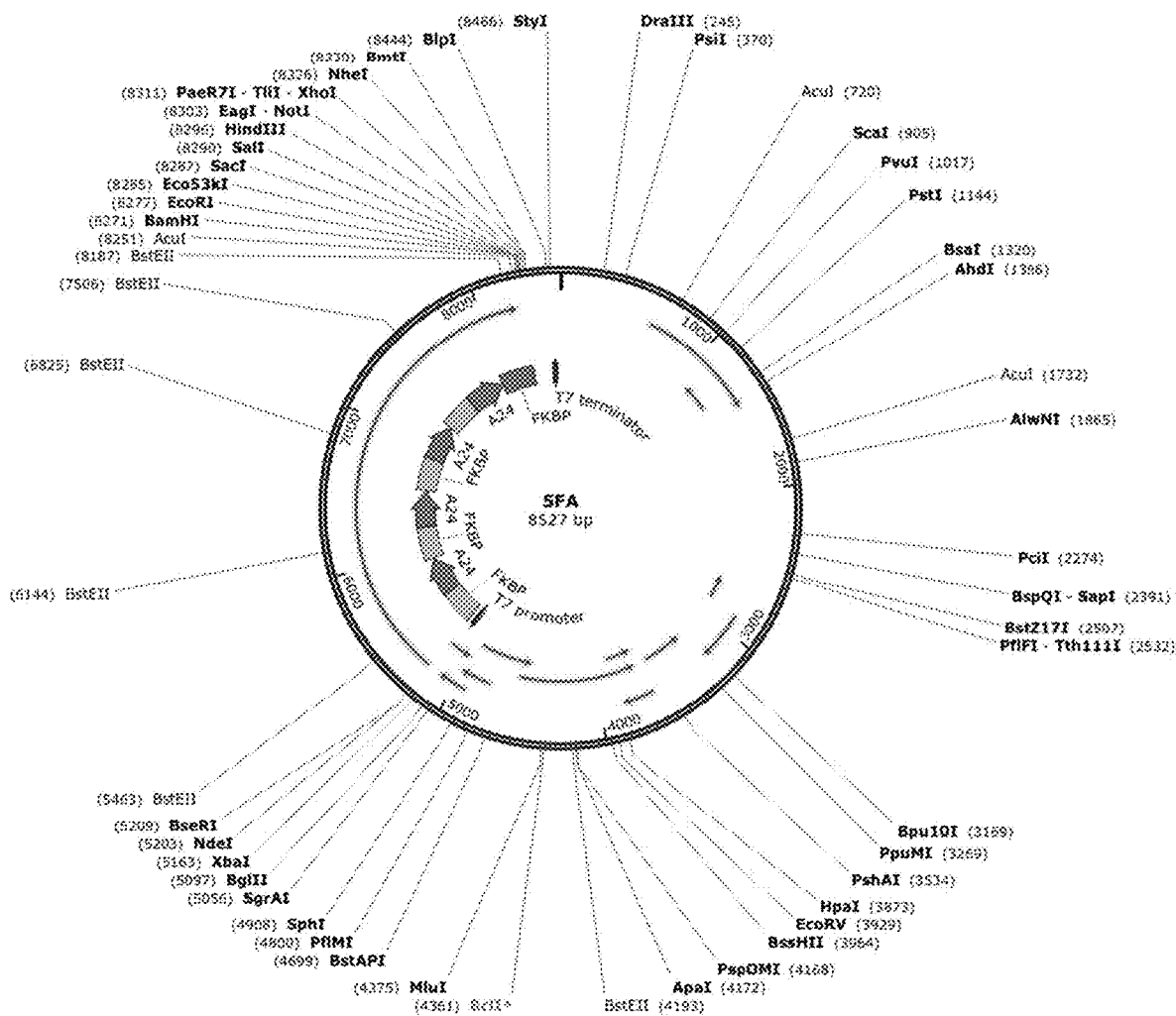
Figure 19B:
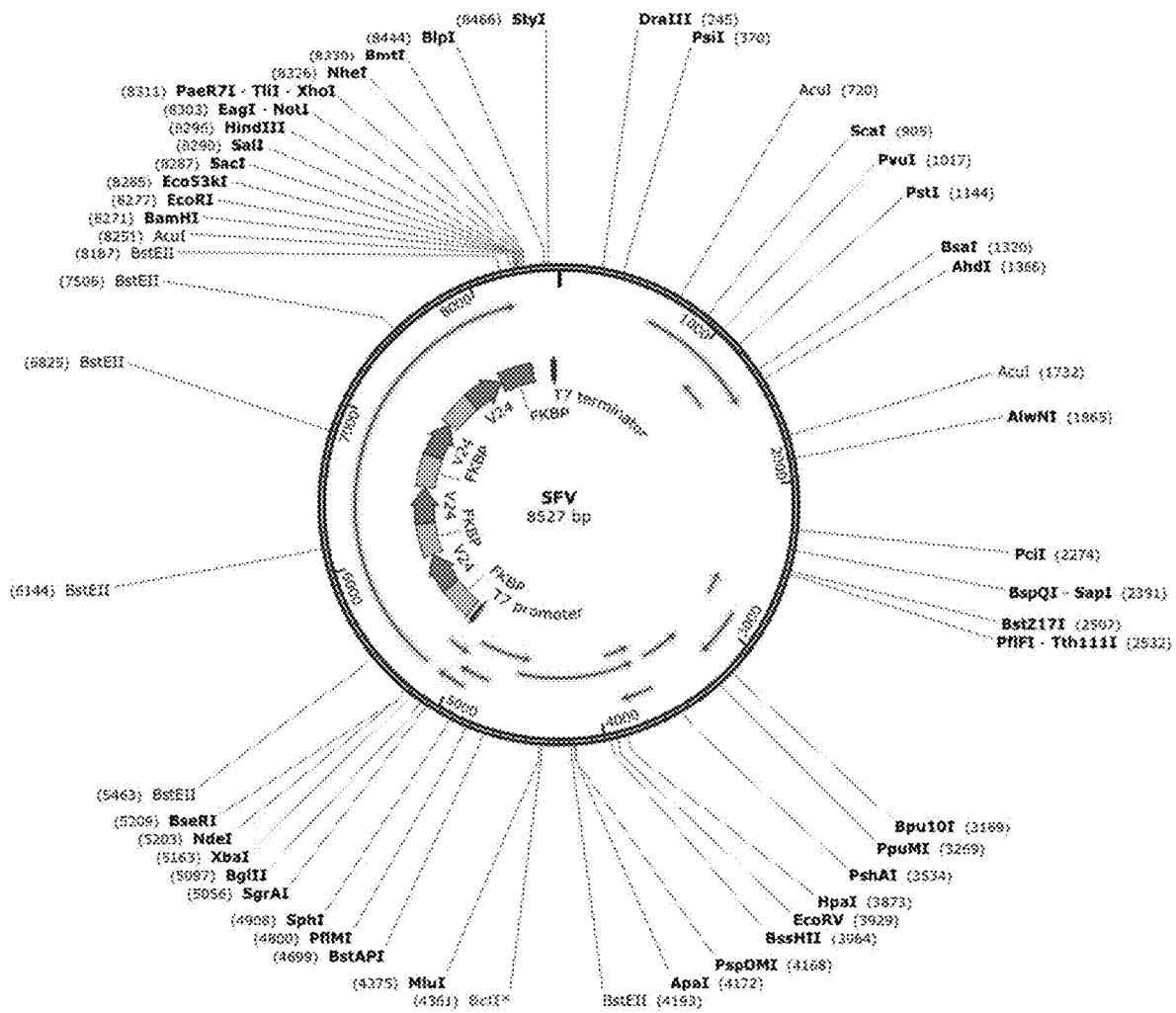
Figure 20:
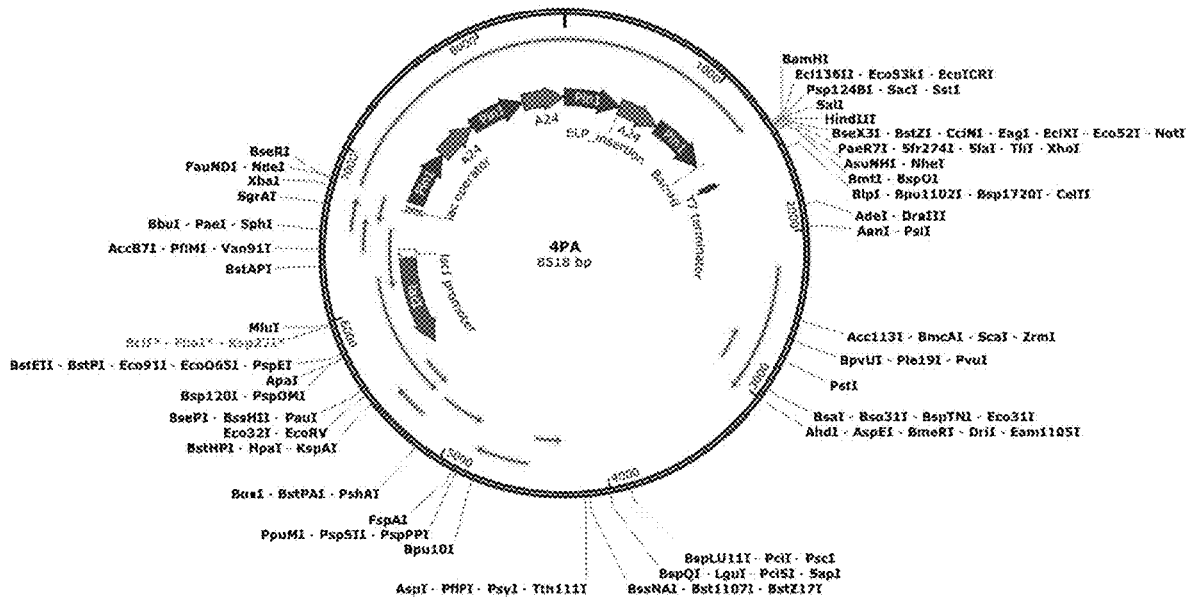
FIG. 20: Plasmid map depicting pET-25b (+) vector encoding 4PA24, which contains 4 Pin1 domains for every fusion protein, which are linked by elastin-like polypeptide known as A24.

Drug binding to a model rapalogue rapamycin. Using Isothermal Titration Calorimetry (ITC), the binding stoichiometry of 5FA/Rapa interaction was estimated to be 5. This suggests all the FKBPs in 5FA are properly folded and retain their ability to bind to rapamycin. Though the equilibrium dissociation constant ($K_D$) was estimated to be 1.5 nM (FIG. 18), the true $K_D$ is likely much lower and beyond the limit of detection of ITC (low nM range). In terms of binding thermodynamics, a negative binding enthalpy (FIG. 18B) (−58 kJ/mol interactions) suggests an exothermic binding, and a negative TΔS (−48 kJ/mol interactions) suggests an entropic cost associated with binding, which can be explained by rapamycin transitioning from a free, unbound state in solution to a more ordered FKBP bound state. An overall negative Gibbs free energy (−10 kJ/mol interactions) indicates FKBP/Rapa binding is thermodynamically favorable.

Drug encapsulation. A working formulation of rapamycin encapsulated in 5FA or 5FV was prepared by a two phase encapsulation method. To 10 mL 300 μM 5FA or 5FV in buffer, 3× molar excess Rapa (LC Laboratories, Woburn, MA) in hexane/EtOH mixture (7:3 v/v) was added. After evaporation of the organic phase at 4° C. using a rotary evaporator, the aqueous suspension was centrifuged at 13,000 g to pellet unbound Rapa precipitate. The supernatant was subjected to additional rounds of centrifugation until no pellet was observed. The formulation was added to a 10 kDa MWCO dialysis bag (Thermo Fischer Scientific, Waltham, MA) and dialyzed against PBS (1:750 sample: dialysate) for 12 hours to remove free Rapa and residual solvent. After removal of un-encapsulated drug, HPLC was used to simultaneously determine 5FA or 5FV and Rapa concentrations, and the encapsulation ratio (ER) was calculated as $C_{Rapa}/C_{carrier}$. Following a large scale encapsulation, an ER of 4.4 was achieved, the theoretical maximum being 5.

i) extremely short 45-minute half-life ii) water insolubility iii) variable bioavailability and PK, and most importantly iv) induction of its own metabolism causing decreased drug exposure with repeated administration. With daily treatment, ATRA plasma concentrations decline rapidly, with AUC on $28^{th}$ day of administration only 10% of AUC on day 1 of treatment. This results in progressively low plasma concentrations and development of drug resistance and disease relapse. Pin1, a human protein belonging to the prolyl-isomerases family binds to ATRA with a sun-micromolar affinity and hence can be used to bind and deliver ATRA. Pin1-ELPs can potentially improve the current status of ATRA treatment by solubilizing and enabling non-oral administration, improving half-life by reducing drug accessibility to metabolizing enzymes and allowing on-target effect.

Figure 21:
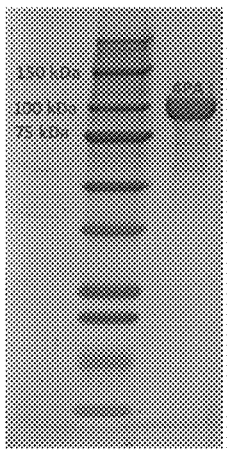
FIG. 21: SDS PAGE was used to resolve the purified 4PA fusion protein. To formulate ATRA-loaded 4PA, a two phase encapsulation method was adopted. After removing undissolved drug, HIPLC was used to quantify 4PA and ATRA concentrations. Encapsulation ratio, defined as CATRA/C4PA was 2.7, theoretical maximum being 4. When encapsulation was performed using a control ELP) A192, ATRA peak was not detectable on HPLC, thereby proving the solubilization process is mediated by Pin1-ATRA binding.

Purification. The high capacity Pin1 carrier 4PA was successfully cloned by Recursive Directional Ligation by plasmid reconstruction (RDL), a strategy developed to facilitate cloning of oligomeric genes. The protein was expressed in *E. Coli* Shuffle T7 Express cells and purified by inverse transition cycling (ITC), a non-chromatographic purification strategy utilizing unique biophysical properties of ELPs, specifically their responsiveness to heat and ionic strength. Three rounds of ITC purification resulted in >90% pure protein, as visualized by copper stained SDS-PAGE gel (FIG. 21) with a production yield of 85 mg/L of bacterial culture.

TABLE 5

$2^{nd}$ and $3^{rd}$ generation drug-carriers with multiple drug-binding domains per polypeptide

| Title | *Amino acid sequence | **Expected M.W. [kDa] | drug-binding domains per molecule | Transition temperature at 25 μM [° C.] |
|---|---|---|---|---|
| 3(CA24)C | MG-[CypA-(VPGAG) (SEQ ID NO: 37)]$_3$-CypA | 99.9 | 4 | expected >50 |
| CA96C | M-CypA-(VPGAG)$_{96}$ (SEQ ID NO: 35)-CypA | 72.9 | 2 | expected >50 |
| FAF | MG-FKBP-(VPGAG)$_{192}$ (SEQ ID NO: 1)-FKBP (SEQ ID NO: 25) | 97.0 | 2 | 55.1 |
| 5FA | MG-[FKBP-(VPGAG)$_{24}$ (SEQ ID NO: 37)]$_4$-FKBP (SEQ ID NO: 10) | 99.5 | 5 | 53.2 |
| 5FV | MG-[FKBP-(VPGVG)$_{24}$ (SEQ ID NO: 67)]$_4$-FKBP (SEQ ID NO: 11) | 102.0 | 5 | 27.7 |
| 4PA | MG-[Pin1-(VPGAG)$_{24}$ (SEQ ID NO:37]$_3$-Pin1 (SEQ ID NO: 15) | 100.4 | 4 | 52.8 |

**Expected molecular weight based on the open reading frame for the expressed protein.

Example 3: High Capacity $3^{rd}$ Generation Pin1-ELP Carriers (4PA) to Facilitate Delivery of all-Trans Retinoic Acid (ATRA)

ATRA is an FDA approved treatment for acute promyelocytic leukemia (APL). Apart from APL, ATRA is under clinical trials for breast, melanoma, neuroblastoma, myeloma and few other cancers as a stand-alone or combination therapy. Though being actively pursued, ATRA's poor drug like properties limit its clinical efficacy, especially Example 4: FKBP Elastin-Like Polypeptide Fusions for Sustained Delivery of mTOR Inhibitors By fusing FKBP12, the cognate receptor for Rapamycin (Rapa) to each termini of the ELP A192 [(VPGAG)$_{192}$ (SEQ ID NO: 1)], FAF was generated. While FKBP mediates high affinity drug binding and solubilization, the high molecular weight A192 is designed to reduce carrier renal clearance and improve plasma half-life. FAF also sequesters free circulating Rapamycin, thereby arresting drug accumulation in non-target organs and reducing toxicity.

Figure 22A:
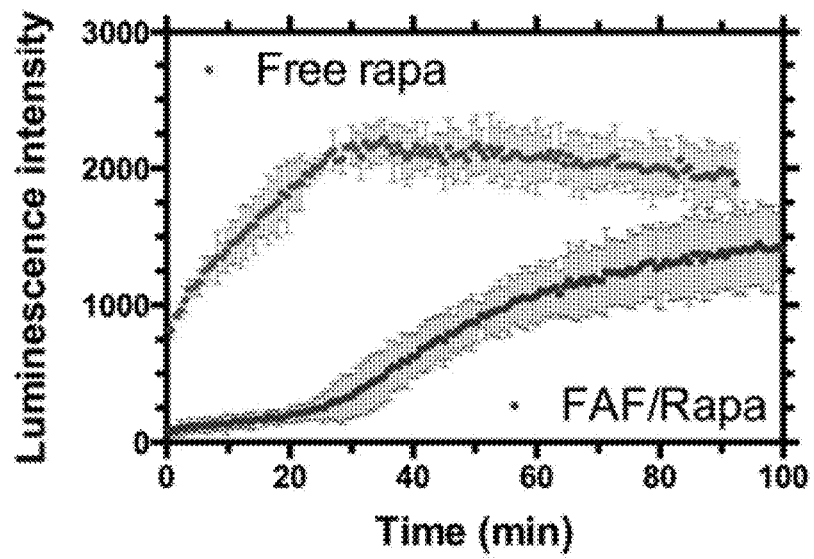
FIGS. 22A-22B: FAF delays the access of Rapa to the cytosol in a manner consistent with macropinocytosis.
Figure 22B:
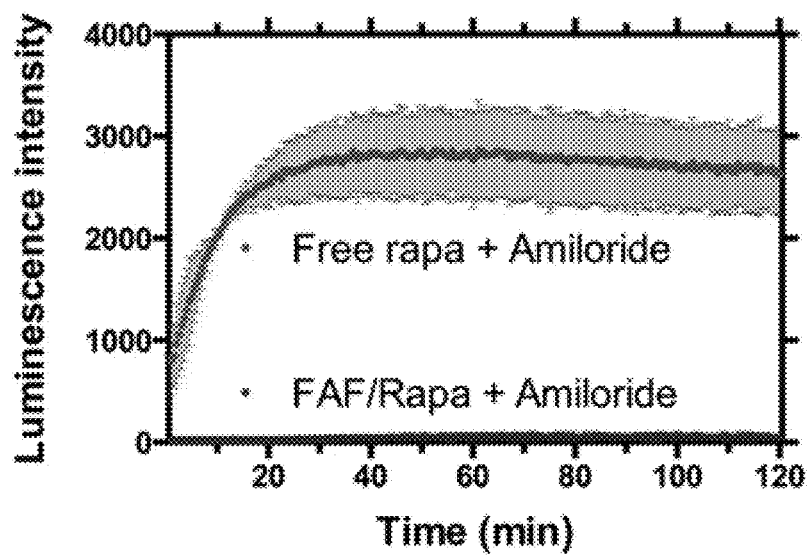

Using the MDA-MB-468 cell line as the model system, Applicant studied mechanisms of cellular uptake and drug release from high-affinity FAF/Rapa complexes. Cellular uptake of FAF showed no dose-dependent saturation at concentrations up to 100 μM, suggesting a role for fluid phase endocytosis. Rho-FAF did colocalize with dextran, a marker of fluid phase endocytosis. To understand drug release, cells were engineered to express a luciferase reporter for cytosolic Rapamycin. In this assay, FAF delayed the cytosolic access of Rapa in comparison to free drug by about a half-hour (FIG. 22A). A specific macropinocytosis inhibitor, amiloride, completely suppressed the cytosolic delivery of Rapamycin from FAF (FIG. 22B). Each of these results are consistent with macropinocytosis as the mechanism of cellular uptake necessary for the hand-off of Rapamycin from FAF to endogenous FKBP12 in the cytosol. This is evidence that FAF dominates the intracellular delivery of rapalogues.

Figure 25A:
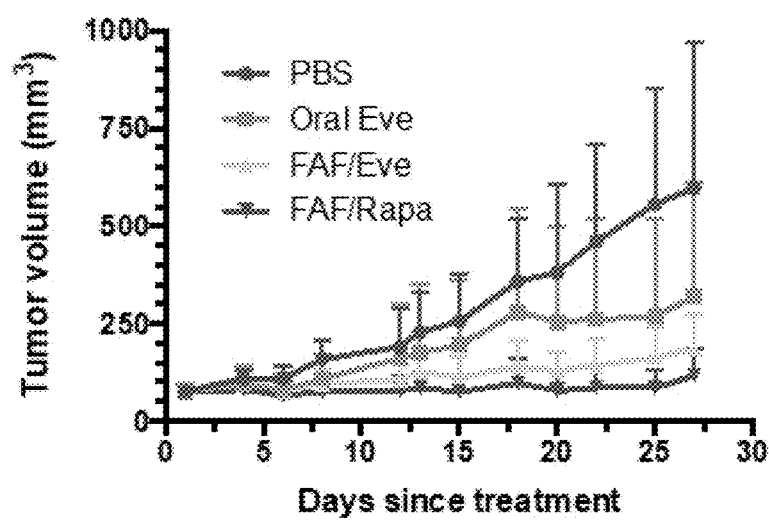
FIGS. 25A-25B: show results of administration of FAF formulations when tested for efficacy and safety in nude mice bearing orthotopic tumors of BT-474 cell line. Oral Eve at the same drug dose served as a clinically relevant control. Mice bearing tumors of average size 100 mm$^3$ were randomized and treated with either oral Eve, FAF/Rapa or FAF/Eve at 1 mg/kg dose every other day for 4 weeks (FIG. 25A). Compared to PBS treated mice, only FAF/Eve and FAF/Rapamycin groups suppressed tumor growth significantly (FIG. 25B).
Figure 25B:
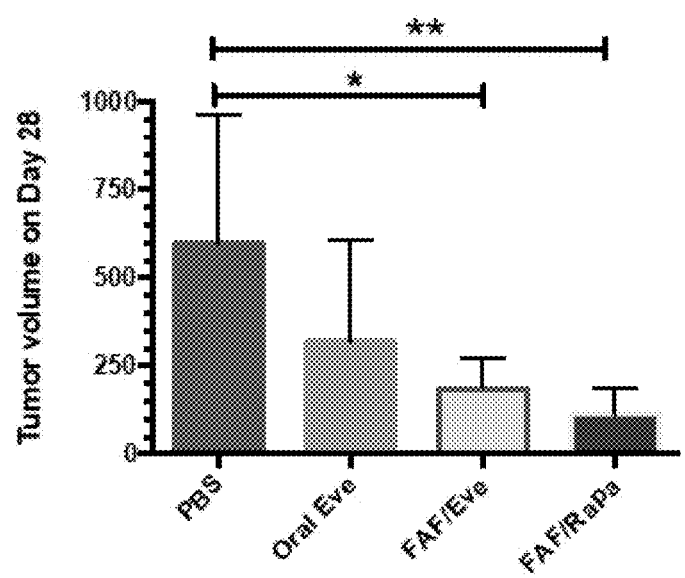

Breast cancer efficacy. Accounting for nearly 40,000 deaths per year, breast cancer is the second deadliest cancer affecting American women. Everolimus (Eve), an analog of Rapamycin is approved to treat HR+/HER2− subtype in combination with exemestane. Currently administered as an oral formulation, Eve suffers from poor physico-chemical properties and toxicity issues like Rapamycin. Novel FAF formulations were tested for efficacy and safety in nude mice bearing orthotopic tumors of BT-474 cell line. Being a HR+ cell line, BT-474 represents nearly 80% of clinically diagnosed breast cancer. Oral Eve at the same drug dose served as a clinically relevant control. Mice bearing tumors of average size 100 mm$^3$ were randomized and treated with either oral Eve, FAF/Rapa or FAF/Eve at 1 mg/kg dose every other day for 4 weeks (FIG. 25A). Compared to PBS treated mice, only FAF/Eve and FAF/Rapamycin groups suppressed tumor growth significantly (FIG. 25B). While the mean tumor volume of oral Eve group was lower than PBS group, the difference was not statistically significant. This is presumably a result of Eve's poor oral bioavailability. Additionally, no significant weight loss was observed across groups, suggesting all 3 formulations were reasonably tolerated. This study demonstrates that everolimus and rapamycin have similar efficacy, that SC FAF does a better job than oral administration, and shows in an HR+ cell line it remains effective. Everolimus is currently approved in HR+ populations, so this suggests FAF delivery could be effective in the same patient population already approved.

Efficacy in the non-obese diabetic (NOD) mouse of dacryoadenitis, a model relevant to Sjögren's Syndrome (SS). One symptom of this systemic autoimmune disease model is lymphocyte infiltration into the tear-producing lacrimal gland, which is associated with severe dry eyes. To confirm that subcutaneous FAF-Rapa depots can treat this model, this aim will compare treated and untreated male NOD mice for inflammation of the lacrimal gland with respect to lymphocytic infiltration, a Cathepsin-S biomarker for SS, corneal staining that identifies defects consistent with dry eye disease, and the volume of basal tear production using a thread test.

Figure 23A:
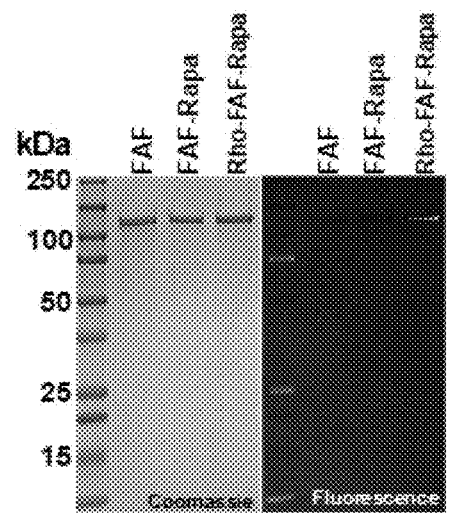
FIGS. 23A-23C: FAF-Rapa reduces lymphocytic infiltration in the LG of male NOD mice.
Figure 23B:
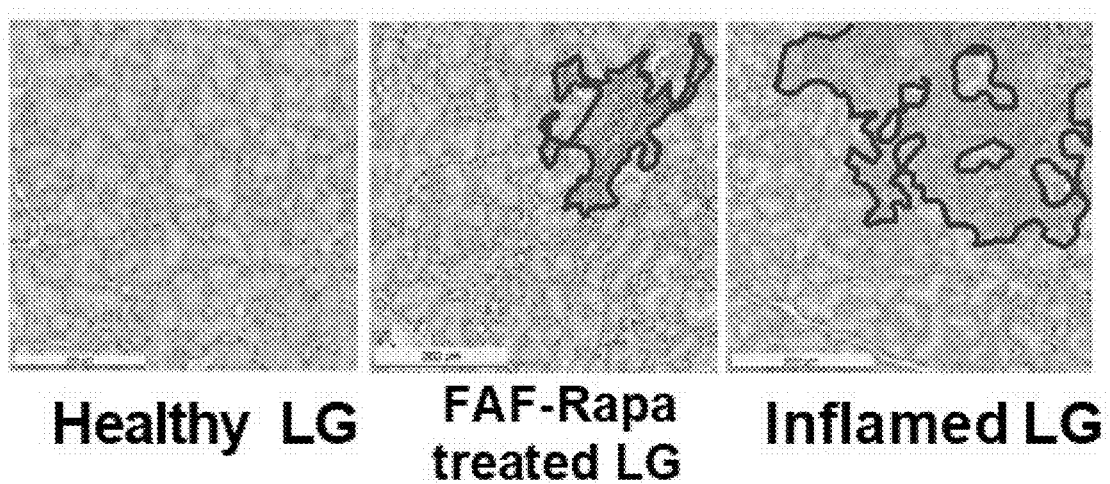
Figure 23C:
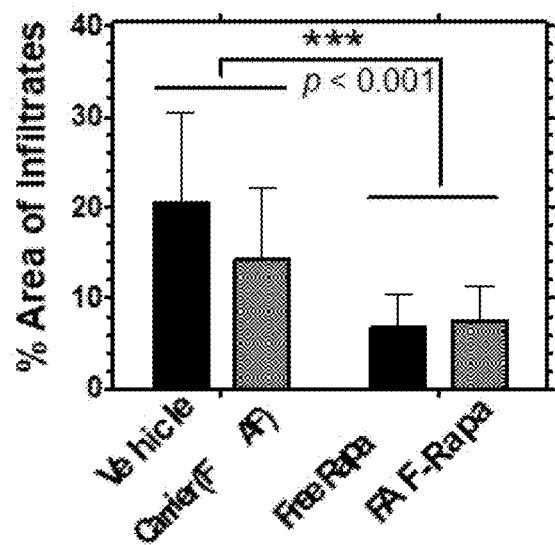

Efficacy in a mouse model of Sjögren's Syndrome (SS). SS is a chronic autoimmune disease that affects about 4 million people in the US. Lymphocytic infiltration and inflammation in the exocrine glands, mainly lacrimal gland (LG) and salivary gland causes severe forms of dry eyes and dry mouth. Current treatment strategies provide short-term symptomatic relief and are not generally efficacious in severe forms of dry eye. To assess immunosuppressive efficacy of FAF/Rapa in SS, we used male Non-obese diabetic (NOD) mice, a well-established model of dry eye disease. Four groups of mice received either vehicle, free Rapa, carrier (FAF only) or FAF/Rapa subcutaneously at a dose of 1.0 mg Rapa/kg every other day for 2 weeks. Following this, the LG from all mice were sectioned, stained and lymphocytic infiltration was quantified. Both free Rapa and FAF-Rapa significantly suppressed lymphocytic infiltration compared to vehicle only controls (2.7 and 1.9 fold respectively), with no difference in inhibition between free Rapa and FAF/Rapa (FIG. 23). Histopathological analysis of excised organs and serum chemistry panels suggested FAF/Rapa is free from acute toxicities.

Figure 24A:
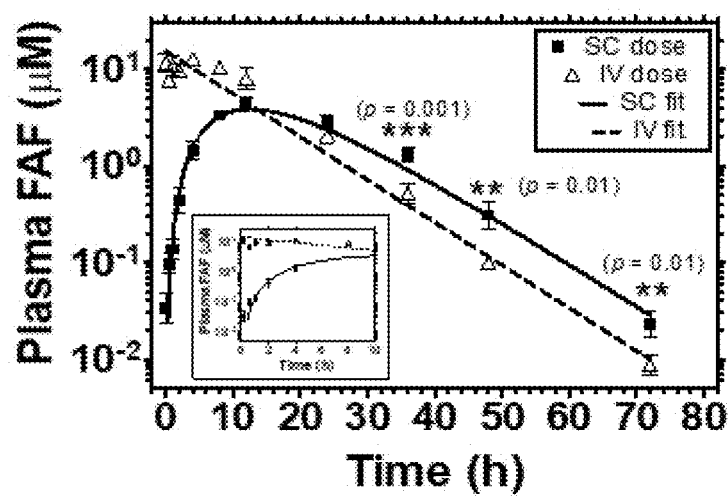
FIGS. 24A-24B: Compartmental modeling accurately fits Plasma Conc. Vs. Time profiles of IV and SC administered FAF 1.0 mg Rapa/kg BW of Rho-F AF-Rapa was injected either IV (n=4) or SC (n=5) to male NOD mice.
Figure 24B:
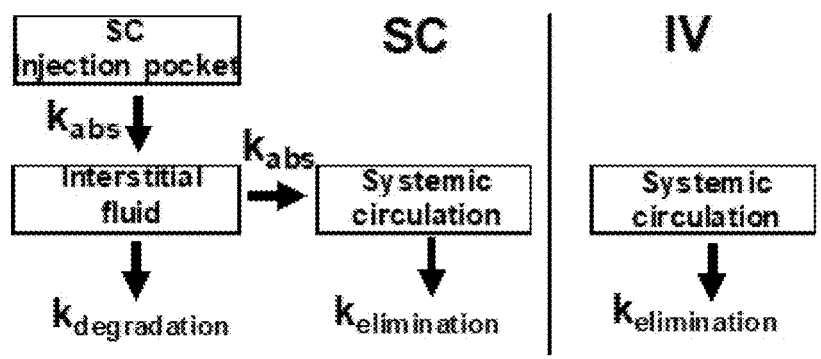

Pharmacokinetics (PK). An in-depth PK analysis of FAF was carried out in NOD mice using rhodamine labeled FAF. Concentration vs. time profiles were plotted for IV and SC administered FAF by measuring plasma fluorescence of rhodamine probe at various time points. For compartmental modeling, a one- and three-compartment model depicted in FIG. 24B could fit the observed data well. IV FAF demonstrated an elimination half-life of about 7 hrs. Additionally, SC FAF resulted in statistically significantly higher plasma concentration compared to IV FAF during the elimination phase (36 hr∼ 72 hr, FIG. 24A) suggesting a sustained release capability for FAF when administered subcutaneously. SC FAF reached $C_{max}$ 12 hrs after injection, followed by a mono-exponential decay thereafter (FIG. 24B). The mean absorption time and mean residence time were calculated as 9.6 hrs and 20.3 hrs respectively (Table 6). The bioavailability of SC FAF-Rapa was 52.7-65.5%. This study shows clearly how FAF maintains very excellent absorption from an SC site, maintain drug levels above those for free Rapa alone.

TABLE 6

Pharmacokinetic parameters of intravenously- or subcutaneously-delivered FAF-Rapa analyzed using compartmental analysis and non-compartmental analysis.

| | Route of Administration | | | |
|---|---|---|---|---|
| | Intravenous (IV) | Subcutaneous (SC) | Intravenous (IV) | Subcutaneous (SC) |
| | Preferred Model | | | |
| Parameter (Unit) | 1 Compartment | 3 Compartments | Non-compartment | |
| AUC (μM · hr) | 141.1 ± 15.5 | 92.4 ± 18.7 | 206.5 ± 33.4 | 108.8 ± 13.9 |
| AUMC (μM · hr$^2$) | nd* | nd* | 2,207 ± 344 | 2,214 ± 328 |
| F (%) | 100 | 65.5 ± 13.2 | 100 | 52.7 ± 6.7 |
| CL (mL/hr) | 0.15 ± 0.01 | 0.15 ** | 0.10 ± 0.01 | 0.09 ± 0.01 |
| CL/F (mL/hr) | 0.15 ± 0.01 | 0.23 ± 0.04 | 0.10 ± 0.01 | 0.18 ± 0.03 |
| $V_d$ (mL) ** | 1.46 ± 0.2 | 1.46 *** | 0.88 ± 0.1 | 0.85 ± 0.1 |

TABLE 6-continued

Pharmacokinetic parameters of intravenously- or subcutaneously-delivered FAF-Rapa analyzed using compartmental analysis and non-compartmental analysis.

| | Route of Administration | | | |
|---|---|---|---|---|
| | Intravenous (IV) | Subcutaneous (SC) | Intravenous (IV) | Subcutaneous (SC) |
| | Preferred Model | | | |
| Parameter (Unit) | 1 Compartment | 3 Compartments | Non-compartment | |
| $C_{max}$ (µM) | 13.4 ± 2.4 | 3.3 ± 0.1 | 11.7 ± 2.9 | 4.4 ± 0.7 |
| $T_{max}$ (hr) | 0.0 | 12.4 ± 0.7 | 0.0 | 12.0 |
| MRT (hr) | nd* | nd* | 10.7 ± 0.3 | 20.3 ± 1.1 |
| MAT (hr) | — | nd* | — | 9.6 ± 1.1 |
| $T_{1/2, Absorption}$ (hr) | — | 4.2 ± 0.4 | — | — |
| $T_{1/2, Elimination}$ (hr) | 6.9 ± 0.5 | 6.9 *** | 6.2 ± 0.4 | 6.4 ± 0.7 |
| $k_{absorption}$ (hr$^{-1}$) | — | 0.16 **** | — | — |
| $k_{elimination}$ (h$^{-1}$) | 0.10 ± 0.008 | 0.10 *** | 0.11 ± 0.01 | 0.11 ± 0.01 |
| $k_{degradation}$ (hr$^{-1}$) | — | 0.09 ± 0.05 | — | N/A |

*not determined
** The volume of distribution indicates the volume of the plasma compartment, $V_1$, for the Compartmental fits and the $V_{area}$ for the noncompartmental analysis.
*** compartmental values from IV analysis are adopted to estimate SC parameters
**** to fit the observed time to peak concentration, the assumption was required that $k_{absorption} = k_{Injection\ site \to Interstitial\ fluid} = k_{Interstitial\ fluid \to Systemic\ circulation}$.

EQUIVALENTS

It should be understood that although the present invention has been specifically disclosed by preferred embodiments and optional features, modification, improvement and variation of the inventions embodied therein herein disclosed may be resorted to by those skilled in the art, and that such modifications, improvements and variations are considered to be within the scope of this invention. The materials, methods, and examples provided here are representative of preferred embodiments, are exemplary, and are not intended as limitations on the scope of the invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

In addition, where features or aspects of the invention are described in terms of Markush groups, those skilled in the art will recognize that the invention is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

SEQUENCE LISTING

A192: (VPGAG)$_{192}$ (SEQ ID NO: 1)

V96: (VPGVG)$_{96}$ (SEQ ID NO: 2)

Cyclophilin-A192
MVNPTVFFDIAVDGEPLGRVSFELFADKVPKTAENFRALSTGEKGFGYKGSCFHRIIPGF
MCQGGDFTRHNGTGGKSIYGEKFEDENFILKHTGPGILSMANAGPNTNGSQFFICTAKTE
WLDGKHVVFGKVKEGMNIVEAMERFGSRNGKTSKKITIADCGQLE-G(VPGAG)$_{192}$Y
(SEQ ID NO: 3)

Cyclophilin-V96
MVNPTVFFDIAVDGEPLGRVSFELFADKVPKTAENFRALSTGEKGFGYKGSCFHRIIPGF
MCQGGDFTRHNGTGGKSIYGEKFEDENFILKHTGPGILSMANAGPNTNGSQFFICTAKTE
WLDGKHVVFGKVKEGMNIVEAMERFGSRNGKTSKKITIADCGQLEG(VPGVG)$_{96}$Y (SEQ ID NO: 4)
Gyp AC-term nucleotide
5'-TCTAGAAATAATTTTGTTTAACTTTAAGAAGGAGGAGTACATATGGGTATGGTTAAC
CCGACCGTTTTCTTCGACATCGCTGTTGACGGTGAACCGCTGGGTCGTGTTTCTTTCG
AACTGTTCGCTGACAAAGTTCCGAAAACCGCTGAAAACTTCCGTGCTCTGTCTACCG
GTGAAAAAGGTTTCGGTTACAAAGGTTCTTGCTTCCACCGTATCATCCCGGGTTTCA
TGTGCCAGGGTGGTGACTTCACCCGTCACAACGGTACCGGTGGTAAATCTATCTACG
GTGAAAAATTCGAAGACGAAAACTTCATCCTGAAACACACCGGTCCGGGTATCCTG
TCTATGGCTAACGCTGGTCCGAACACCAACGGTTCTCAGTTCTTCATCTGCACCGCT
AAAACCGAATGGCTGGACGGTAAACACGTTGTTTTCGGTAAAGTTAAAGAAGGTAT
GAACATCGTTGAAGCTATGGAACGTTTCGGTTCTCGTAACGGTAAAACCTCTAAAAA
AATCACCATCGCTGACTGCGGTCAGCTGGAAGGTTGATAATGATCTTCAGGATCC-3'
(SEQ ID NO: 5)

SEQUENCE LISTING

CypA_extra glycine
5'-TATGGGTATGGTTAACCCGACCGTTTTCTTCGACATCGCTGTTGACGGTGAACCGCT
GGGTCGTGTTTCTTTCGAACTGTTCGCTGACAAAGTTCCGAAAACCGCTGAAAACTT
CCGTGCTCTGTCTACCGGTGAAAAAGGTTTCGGTTACAAAGGTTCTTGCTTCCACCG
TATCATCCCGGGTTTCATGTGCCAGGGTGGTGACTTCACCCGTCACAACGGTACCGG
TGGTAAATCTATCTACGGTGAAAAATTCGAAGACGAAAACTTCATCCTGAAACACA
CCGGTCCGGGTATCCTGTCTATGGCTAACGCTGGTCCGAACACCAACGGTTCTCAGT
TCTTCATCTGCACCGCTAAAACCGAATGGCTGGACGGTAAACACGTTGTTTTCGGTA
AAGTTAAAGAAGGTATGAACATCGTTGAAGCTATGGAACGTTTCGGTTCTCGTAACG
GTAAAACCTCTAAAAAAATCACCATCGCTGACTGCGGTCAGCTGGAAGGTTACTGAT
CTCCTCGGATC-3' (SEQ ID NO: 6)

Custom encoding sequence flanked by restriction recognition sites of
NdeI and BamHI at the 5' and 3' ends was ordered from Integrated
DNA Technologies (IDT)

5'-CATATGGTTAACCCGACCGTTTTCTTCGACATCGCTGTTGACGGTGAACCGCTGGGT
CGTGTTTCTTTCGAACTGTTCGCTGACAAAGTTCCGAAAACCGCTGAAAACTTCCGT
GCTCTGTCTACCGGTGAAAAAGGTTTCGGTTACAAAGGTTCTTGCTTCCACCGTATC
ATCCCGGGTTTCATGTGCCAGGGTGGTGACTTCACCCGTCACAACGGTACCGGTGGT
AAATCTATCTACGGTGAAAAATTCGAAGACGAAAACTTCATCCTGAAACACACCGG
TCCGGGTATCCTGTCTATGGCTAACGCTGGTCCGAACACCAACGGTTCTCAGTTCTTC
ATCTGCACCGCTAAAACCGAATGGCTGGACGGTAAACACGTTGTTTTCGGTAAAGTT
AAAGAAGGTATGAACATCGTTGAAGCTATGGAACGTTTCGGTTCTCGTAACGGTAA
AACCTCTAAAAAAATCACCATCGCTGACTGCGGTCAGCTGGAAGGTTACTGATCTCC
TCGGATCC-3' (SEQ ID NO: 7)

Amino acid sequence encoded by 2$^{nd}$ generation CA96C
MMVNPTVFFDIAVDGEPLGRVSFELFADKVPKTAENFRALSTGEKGFGYKGSCFHRIIPG
FMCQGGDFTRHNGTGGKSIYGEKFEDENFILKHTGPGILSMANAGPNTNGSQFFICTAKT
EWLDGKHVVFGKVKEGMNIVEAMERFGSRNGKTSKKITIADCGQLEG-(VPGAG)$_{96}$-
MVNPTVFFDIAVDGEPLGRVSFELFADKVPKTAENFRALSTGEKGFGYKGSCFHRIIPGF
MCQGGDFTRHNGTGGKSIYGEKFEDENFILKHTGPGILSMANAGPNTNGSQFFICTAKTE
WLDGKHVFGKVKEGMNIVEAMERFGSRNGKTSKKITIADCGQLEG (SEQ ID NO: 8)

Amino acid sequence encoded by 3$^{rd}$ generation 3(CA24)C:
MGMVNPTVFFDIAVDGEPLGRVSFELFADKVPKTAENFRALSTGEKGFGYKGSCFHRIIP
GFMCQGGDFTRHNGTGGKSIYGEKFEDENFILKHTGPGILSMANAGPNTNGSQFFICTA
KTEWLDGKHVVFGKVKEGMNIVEAMERFGSRNGKTSKKITIADCGQLEG-(VPGAG)$_{24}$-
MVNPTVFFDIAVDGEPLGRVSFELFADKVPKTAENFRALSTGEKGFGYKGSCFHRIIPGF
MCQGGDFTRHNGTGGKSIYGEKFEDENFILKHTGPGILSMANAGPNTNGSQFFICTAKTE
WLDGKHVVFGKVKEGMNIVEAMERFGSRNGKTSKKITIADCGQLEG-(VPGAG)$_{24}$-
MVNPTVFFDIAVDGEPLGRVSFELFADKVPKTAENFRALSTGEKGFGYKGSCFHRIIPGF
MCQGGDFTRHNGTGGKSIYGEKFEDENFILKHTGPGILSMANAGPNTNGSQFFICTAKTE
WLDGKHVVFGKVKEGMNIVEAMERFGSRNGKTSKKITIADCGQLEG-(VPGAG)$_{24}$-
MVNPTVFFDIAVDGEPLGRVSFELFADKVPKTAENFRALSTGEKGFGYKGSCFHRIIPGF
MCQGGDFTRHNGTGGKSIYGEKFEDENFILKHTGPGILSMANAGPNTNGSQFFICTAKTE
WLDGKHVVFGKVKEGMNIVEAMERFGSRNGKTSKKITIADCGQLEG (SEQ ID NO: 9)

Amino acid sequence encoded by 5FA:
MGVQVETISPGDGRTFPKRGQTCVVHYTGMLEDGKKFDSSRDRNKPFKFMLGKQEVIR
GWEEGVAQMSVGQRAKLTISPDYAYGATGHPGIIPPHATLVFDVELLKLE-(VPGAG)$_{24}$
GVQVETISPGDGRTFPKRGQTCVVHYTGMLEDGKKFDSSRDRNKPFKFMLGKQEVIRG
WEEGVAQMSVGQRAKLTISPDYAYGATGHPGIIPPHATLVFDVELLKLE-(VPGAG)$_{24}$
GVQVETISPGDGRTFPKRGQTCVVHYTGMLEDGKKFDSSRDRNKPFKFMLGKQEVIRG
WEEGVAQMSVGQRAKLTISPDYAYGATGHPGIIPPHATLVFDVELLKLE-(VPGAG)$_{24}$
GVQVETISPGDGRTFPKRGQTCVVHYTGMLEDGKKFDSSRDRNKPFKFMLGKQEVIRG
WEEGVAQMSVGQRAKLTISPDYAYGATGHPGIIPPHATLVFDVELLKLE-(VPGAG)$_{24}$
GVQVETISPGDGRTFPKRGQTCVVHYTGMLEDGKKFDSSRDRNKPFKFMLGKQEVIRG
WEEGVAQMSVGQRAKLTISPDYAYGATGHPGIIPPHATLVFDVELLKLE (SEQ ID NO: 10)

Amino acid sequence encoded by 5FV:
MGVQVETISPGDGRTFPKRGQTCVVHYTGMLEDGKKFDSSRDRNKPFKFMLGKQEVIR
GWEEGVAQMSVGQRAKLTISPDYAYGATGHPGIIPPHATLVFDVELLKLE-(VPGVG)$_{24}$
GVQVETISPGDGRTFPKRGQTCVVHYTGMLEDGKKFDSSRDRNKPFKFMLGKQEVIRG
WEEGVAQMSVGQRAKLTISPDYAYGATGHPGIIPPHATLVFDVELLKLE-(VPGVG)$_{24}$
GVQVETISPGDGRTFPKRGQTCVVHYTGMLEDGKKFDSSRDRNKPFKFMLGKQEVIRG
WEEGVAQMSVGQRAKLTISPDYAYGATGHPGIIPPHATLVFDVELLKLE-(VPGVG)$_{24}$
GVQVETISPGDGRTFPKRGQTCVVHYTGMLEDGKKFDSSRDRNKPFKFMLGKQEVIRG
WEEGVAQMSVGQRAKLTISPDYAYGATGHPGIIPPHATLVFDVELLKLE-(VPGVG)$_{24}$
GVQVETISPGDGRTFPKRGQTCVVHYTGMLEDGKKFDSSRDRNKPFKFMLGKQEVIRG
WEEGVAQMSVGQRAKLTISPDYAYGATGHPGIIPPHATLVFDVELLKLE (SEQ ID NO: 11)

Exemplary DNA sequence encoding for FKBP:
5'-ATGGGTGTTCAGGTTGAAACCATCTCTCCGGGTGACGGTCGTACCTTCCCGAAACGT
GGTCAGACCTGCGTTGTTCACTACACCGGTATGCTGGAAGACGGTAAAAAATTCGAC
CGTGGTTGGGAAGAAGGTGTTGCTCAGATGTCTGTTGGTCAGCGTGCTAAACTGACC

SEQUENCE LISTING

ATCTCTCCGGACTACGCTTACGGTGCTACCGGTCACCCGGGTATCATCCCGCCGCAC
GCTACCCTGGTTTTCGACGTTGAACTGCTGAAACTGGAAGGTTAC-3' (SEQ ID NO: 12)

DNA sequence encoding for (VPGAG)24 (SEQ ID NO: 37):
5'-GTTCCGGGCGCTGGTGTACCAGGTGCAGGTGTACCGGGTGCCGGCGTACCTGGCGC
AGGTGTCCCGGGTGCCGGTGTTCCGGGTGCTGGTGTTCCGGGCGCTGGTGTACCAGG
TGCAGGTGTACCGGGTGCCGGCGTACCTGGCGCAGGTGTCCCGGGTGCCGGTGTTCC
GGGTGCTGGTGTTCCGGGCGCTGGTGTACCAGGTGCAGGTGTACCGGGTGCCGGCGT
ACCTGGCGCAGGTGTCCCGGGTGCCGGTGTTCCGGGTGCTGGTGTTCCGGGCGCTGG
TGTACCAGGTGCAGGTGTACCGGGTGCCGGCGTACCTGGCGCAGGTGTCCCGGGTG
CCGGTGTTCCGGGTGCTGGT-3' (SEQ ID NO: 13)

DNA sequence encoding for (VPGVG)4 (SEQ ID NO: 67):
5'-GTTCCGGGCGTGGGTGTACCAGGTGTCGGTGTACCGGGTGTCGGCGTACCTGGCGTC
GGTGTCCCGGGTGTTGGTGTTCCGGGTGTAGGTGTTCCGGGCGTGGGTGTACCAGGT
GTCGGTGTACCGGGTGTCGGCGTACCTGGCGTCGGTGTCCCGGGTGTTGGTGTTCCG
GGTGTAGGTGTTCCGGGCGTGGGTGTACCAGGTGTCGGTGTACCGGGTGTCGGCGTA
CCTGGCGTCGGTGTCCCGGGTGTTGGTGTTCCGGGTGTAGGTGTTCCGGGCGTGGGT
GTACCAGGTGTCGGTGTACCGGGTGTCGGCGTACCTGGCGTCGGTGTCCCGGGTGTT
GGTGTTCCGGGTGTAGGT-3* (SEQ ID NO: 14)

4PA encoded amino acid sequence:
MADEEKLPPGWEKRMSRSSGRVYYFNHITNASQWERPSGNSSSGGKNGQGEPARVRCS
HLLVKHSQSRRPSSWRQEKITRTKEEALELINGYIQKIKSGEEDFESLASQFSDCSSAKAR
GDLGAFSRGQMQKPFEDASFALRTGEMSGPVFTDSGIHIILRTE-(VPGAG)24-
ADEEKLPPGWEKRMSRSSGRVYYFNHITNASQWERPSGNSSSGGKNGQGEPARVRCSH
LLVKHSQSRRPSSWRQEKITRTKEEALELINGYIQKIKSGEEDFESLASQFSDCSSAKARG
DLGAFSRGQMQKPFEDASFALRTGEMSGPVFTDSGIHIILRTE-(VPGAG)24-
ADEEKLPPGWEKRMSRSSGRVYYFNHITNASQWERPSGNSSSGGKNGQGEPARVRCSH
LLVKHSQSRRPSSWRQEKITRTKEEALELINGYIQKIKSGEEDFESLASQFSDCSSAKARG
DLGAFSRGQMQKPFEDASFALRTGEMSGPVFTDSGIHIILRTE-(VPGAG)24-
ADEEKLPPGWEKRMSRSSGRVYYFNHITNASQWERPSGNSSSGGKNGQGEPARVRCSH
LLVKHSQSRRPSSWRQEKITRTKEEALELINGYIQKIKSGEEDFESLASQFSDCSSAKARG
DLGAFSRGQMQKPFEDASFALRTGEMSGPVFTDSGIHIILRTE (SEQ ID NO: 15)

DNA sequence encoding for Pin1:
5'-ATGGGTGCTGACGAAGAGAAGTTACCTCCAGGCTGGGAAAAACGTATGTCTCGTTC
GAGCGGCAGAGTCTATTACTTCAACCACATTACCAACGCATCCCAGTGGGAGCGGC
CCTCCGGGAATTCTTCTAGCGGTGGCAAAAACGGTCAGGGTGAACCAGCCAGAGTG
CGCTGTTCCCACTTGTTAGTTAAACACTCTCAAAGCCGTCGCCCCTCATCTTGGAGA
CAGGAGAAAATTACTCGGACCAAGGAAGAGGCCCTTGAACTTATCAATGGCTACAT
TCAGAAGATTAAGAGCGGGGAAGAGGATTTCGAATCCCTGGCGAGTCAATTCTCGG
ATTGTTCGAGTGCTAAAGCGCGGGGAGATCTTGGAGCATTCAGTCGTGGGCAAATG
CAAAAACCTTTTGAGGACGCTTCCTTTGCCTTGAGAACTGGGGAAATGTCCGGTCCA
GTTTTCACAGACTCTGGCATCCACATCATCCTGCGTACTGAG-3' (SEQ ID NO: 16)

scFv synthetic polypeptide
Gln Val Gln Leu Gln Gln Pro Gly Ala Glu Leu Val Lys Pro Gly
Ala Ser Val Lys Met Ser Cys Lys Ala Ser Gly Tyr Thr Phe Thr Ser
Tyr Asn Met His Trp Val Lys Gln Thr Pro Gly Arg Gly Leu Glu
Trp Ile Gly Ala Ile Tyr Pro Gly Asn Gly Asp Thr Ser Tyr Asn
Gln Lys Phe Lys Gly Lys Ala Thr Leu Thr Ala Asp Lys Ser
Ser Ser Thr Ala Tyr Met Gln Leu Ser Ser Leu Thr Ser Glu
Asp Ser Ala Val Tyr Tyr Cys Ala Arg Ser Thr Tyr Tyr Gly Gly
Asp Trp Tyr Phe Asn Val Trp Gly Ala Gly Thr Thr Val Thr Val
Ser Ala Gly Gly Gly Gly Ser Gly Gly Gly Gly Ser Gly Gly
Gly Gly Ser Gln Ile Val Leu Ser Gln Ser Pro Ala Ile Leu Ser
Ala Ser Pro Gly Glu Lys Val Thr Met Thr Cys Arg Ala Ser Ser
Ser Val Ser Tyr Ile His Trp Phe Gln Gln Lys Pro Gly Ser Ser Pro
Lys Pro Trp Ile Tyr Ala Thr Ser Asn Leu Ala Ser Gly Val Pro Val
Arg Phe Ser Gly Ser Gly Ser Gly Thr Ser Tyr Ser Leu Thr Ile Ser
Arg Val Glu Ala Glu Asp Ala Ala Thr Tyr Tyr Cys Gln Gln Trp Thr
Ser Asn Pro Pro Thr Phe Gly Gly Gly Thr Lys Leu Glu Ile Lys Arg
Thr Gly (SEQ ID NO: 17)

scFv synthetic polypeptide
Gln Val Gln Leu Gln Gln Pro Gly Ala Glu Leu Val Lys Pro Gly Ala
Ser Val Lys Met Ser Cys Lys Ala Ser Gly Tyr Thr Phe Thr Ser Tyr
Asn Met His Trp Val Lys Gln Thr Pro Gly Arg Gly Leu Glu Trp
Ile Gly Ala Ile Tyr Pro Gly Asn Gly Asp Thr Ser Tyr Asn Gln
Lys Phe Lys Gly Lys Ala Thr Leu Thr Ala Asp Lys Ser Ser
Ser Thr Ala Tyr Met Gln Leu Ser Ser Leu Thr Ser Glu Asp Ser Ala
Val Tyr Tyr Cys Ala Arg Ser Thr Tyr Tyr Gly Gly Asp Trp Tyr
Phe Asn Val Trp Gly Ala Gly Thr Thr Val Thr Val Ser Ala Gly
Gly Gly Gly Ser Gly Gly Gly Gly Ser Gly Gly Gly Ser Gly
Gly Gly Gly Ser Gln Ile Val Leu Ser Gln Ser Pro Ala Ile Leu
Ser Ala Ser Pro Gly Glu Lys Val Thr Met Thr Cys Arg Ala Ser

SEQUENCE LISTING

```
Ser Ser Val Ser Tyr Ile His Trp Phe Gln Gln Lys Pro Gly Ser
Ser Pro Lys Pro Trp Ile Tyr Ala Thr Ser Asn Leu Ala Ser Gly Val
Pro Val Arg Phe Ser Gly Ser Gly Ser Gly Thr Ser Tyr Ser Leu Thr
Ile Ser Arg Val Glu Ala Glu Asp Ala Ala Thr Tyr Tyr Cys Gln
Gln Trp Thr Ser Asn Pro Pro Thr Phe Gly Gly Gly Thr Gly Leu Glu
Ile Gly Arg Thr Gly (SEQ ID NO: 18)

scFv-ELP fusion polypeptide
Met Gly Gln Val Gln Leu Gln Gln Pro Gly Ala Glu Leu Val Lys Pro
Gly Ala Ser Val Lys Met Ser Cys Lys Ala Ser Gly Tyr Thr Phe Thr
Ser Tyr Asn Met His Trp Val Lys Gln Thr Pro Gly Arg Gly Leu Glu
Trp Ile Gly Ala Ile Tyr Pro Gly Asn Gly Asp Thr Ser Tyr Asn Gln
Lys Phe Lys Gly Lys Ala Thr Leu Thr Ala Asp Lys Ser Ser Ser Thr
Ala Tyr Met Gln Leu Ser Ser Leu Thr Ser Glu Asp Ser Ala Val Tyr
Tyr Cys Ala Arg Ser Thr Tyr Tyr Gly Gly Asp Trp Tyr Phe Asn Val
Trp Gly Ala Gly Thr Thr Val Thr Val Ser Ala Gly Gly Gly Gly Ser
Gly Gly Gly Gly Ser Gly Gly Gly Gly Ser Gln Ile Val Leu Ser Gln
Ser Pro Ala Ile Leu Ser Ala Ser Pro Gly Glu Lys Val Thr Met Thr
Cys Arg Ala Ser Ser Ser Val Ser Tyr Ile His Trp Phe Gln Gln Lys
Pro Gly Ser Ser Pro Lys Pro Trp Ile Tyr Ala Thr Ser Asn Leu Ala
Ser Gly Val Pro Val Arg Phe Ser Gly Ser Gly Ser Gly Thr Ser Tyr
Ser Leu Thr Ile Ser Arg Val Glu Ala Glu Asp Ala Ala Thr Tyr Tyr
Cys Gln Gln Trp Thr Ser Asn Pro Pro Thr Phe Gly Gly Gly Thr Lys
Leu Glu Ile Lys Arg Thr Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ile Gly Val Pro Gly Ile
Gly Val Pro Gly Ile Gly Val Pro Gly Ile Gly Val Pro Gly Ile Gly
Val Pro Gly Ile Gly Val Pro Gly Ile Gly Val Pro Gly Ile Gly Val
Pro Gly Ile Gly Val Pro Gly Ile Gly Val Pro Gly Ile Gly Val Pro
Gly Ile Gly Val Pro Gly Ile Gly Val Pro Gly Ile Gly Val Pro Gly
Ile Gly Val Pro Gly Ile Gly Val Pro Gly Ile Gly Val Pro Gly Ile
Gly Val Pro Gly Ile Gly Val Pro Gly Ile Gly Val Pro Gly Ile Gly
Val Pro Gly Ile Gly Val Pro Gly Ile Gly Val Pro Gly Ile Gly Val
Pro Gly Ile Gly Val Pro Gly Ile Gly Val Pro Gly Ile Gly Val Pro
Gly Ile Gly Val Pro Gly Ile Gly Val Pro Gly Ile Gly Val Pro Gly
Ile Gly Val Pro Gly Ile Gly Val Pro Gly Ile Gly Val Pro Gly Ile
Gly Val Pro Gly Ile Gly Val Pro Gly Ile Gly Val Pro Gly Ile Gly
Val Pro Gly Ile Gly Val Pro Gly Ile Gly Val Pro Gly Ile Gly Val
Pro Gly Ile Gly Val Pro Gly Ile Gly Val Pro Gly Ile Gly Val Pro
Gly Ile Gly Val Pro Gly Ile Gly Val Pro Gly Ile Gly Val Pro Gly
Ile Gly Val Pro Gly Ile Gly Val Pro Gly Ile Gly Val Pro Gly Ile
Gly Val Pro Gly Ile Gly Val Pro Gly Ile Gly Val Pro Gly Ile Gly
Val Pro Gly Ile Gly Val Pro Gly Ile Gly Val Pro Gly Ile Gly Val
Pro Gly Ile Gly Val
Pro Gly Ile Gly Val Pro Gly Ile Gly Val Pro Gly Ile Gly Val
Pro Gly Ile Gly Val Pro Gly Ile Gly Val Pro Gly Ile Gly Val
Pro Gly Ile Gly Val Pro Gly Ile Gly Val Pro Gly Ile Gly Val
Pro Gly Ile Gly Val Pro Gly Ile Gly Val Pro Gly Ile Gly Val
Pro Gly Ile Gly Val Pro Gly Ile Gly Val Pro Gly Ile Gly Val
```

SEQUENCE LISTING

```
Pro Gly Ile Gly Val Pro Gly Ile Gly Val Pro Gly Ile Gly Val
Pro Gly Ile Gly Val Pro Gly Ile Gly Val Pro Gly Ile Gly Val
Pro Gly Ile Gly Val Pro Gly Ile Gly Val Pro Gly Ile Gly Val
Pro Gly Ile Gly Val Pro Gly Ile Gly Val Pro Gly Ile Gly Val
Pro Gly Ile Gly Val Pro Gly Ile Gly Val Pro Gly Ile Gly Val
Pro Gly Ile Gly Val Pro Gly Ile Gly Val Pro Gly Ile Gly Val
Pro Gly Ile Gly Val Pro Gly Ile Gly Val Pro Gly Ile Gly Val
Pro Gly Ile Gly Tyr (SEQ ID NO: 19)

scFv-ELP fusion synthetic polypeptide
Met Gly Gln Val Gln Leu Gln Gln Pro Gly Ala Glu Leu Val Lys Pro
Gly Ala Ser Val Lys Met Ser Cys Lys Ala Ser Gly Tyr Thr Phe Thr
Ser Tyr Asn Met His Trp Val Lys Gln Thr Pro Gly Arg Gly Leu Glu
Trp Ile Gly Ala Ile Tyr Pro Gly Asn Gly Asp Thr Ser Tyr Asn Gln
Lys Phe Lys Gly Lys Ala Thr Leu Thr Ala Asp Lys Ser Ser Ser Thr
Ala Tyr Met Gln Leu Ser Ser Leu Thr Ser Glu Asp Ser Ala Val Tyr
Tyr Cys Ala Arg Ser Thr Tyr Tyr Gly Gly Asp Trp Tyr Phe Asn Val
Trp Gly Ala Gly Thr Thr Val Thr Val Ser Ala Gly Gly Gly Gly Ser
Gly Gly Gly Gly Ser Gly Gly Gly Gly Ser Gln Ile Val Leu Ser Gln
Ser Pro Ala Ile Leu Ser Ala Ser Pro Gly Glu Lys Val Thr Met Thr
Cys Arg Ala Ser Ser Ser Val Ser Tyr Ile His Trp Phe Gln Gln Lys
Pro Gly Ser Ser Pro Lys Pro Trp Ile Tyr Ala Thr Ser Asn Leu Ala
Ser Gly Val Pro Val Arg Phe Ser Gly Ser Gly Ser Gly Thr Ser Tyr
Ser Leu Thr Ile Ser Arg Val Glu Ala Glu Asp Ala Ala Thr Tyr Tyr
Cys Gln Gln Trp Thr Ser Asn Pro Pro Thr Phe Gly Gly Gly Thr Lys
Leu Glu Ile Lys Arg Thr Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val Pro
Gly Ala Gly Val Pro Gly Ala Gly Val Pro Gly Ala Gly Val Pro Gly
Ala Gly Val Pro Gly Ala Gly Val Pro Gly Ala Gly Val Pro Gly Ala
Gly Val Pro Gly Ala Gly Val Pro Gly Ala Gly Val Pro Gly Ala Gly
Val Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
```

SEQUENCE LISTING

```
Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
Pro Gly Ala Gly Val Pro Gly Ala Gly Val Pro Gly Ala Gly Val
(SEQ ID NO: 20)

scFv-ELP fusion synthetic polypeptide
Met Gly Gln Val Gln Leu Gln Gln Pro Gly Ala Glu Leu Val Lys Pro
Gly Ala Ser Val Lys Met Ser Cys Lys Ala Ser Gly Tyr Thr Phe Thr
Ser Tyr Asn Met His Trp Val Lys Gln Thr Pro Gly Arg Gly Leu Glu
Trp Ile Gly Ala Ile Tyr Pro Gly Asn Gly Asp Thr Ser Tyr Asn Gln
Lys Phe Lys Gly Lys Ala Thr Leu Thr Ala Asp Lys Ser Ser Ser Thr
Ala Tyr Met Gln Leu Ser Ser Leu Thr Ser Glu Asp Ser Ala Val Tyr
Tyr Cys Ala Arg Ser Thr Tyr Tyr Gly Gly Asp Trp Tyr Phe Asn Val
Trp Gly Ala Gly Thr Thr Val Thr Val Ser Ala Gly Gly Gly Gly Ser
Gly Gly Gly Gly Ser Gly Gly Gly Gly Ser Gln Ile Val Leu Ser Gln
Ser Pro Ala Ile Leu Ser Ala Ser Pro Gly Glu Lys Val Thr Met Thr
Cys Arg Ala Ser Ser Ser Val Ser Tyr Ile His Trp Phe Gln Gln Lys
Pro Gly Ser Ser Pro Lys Pro Trp Ile Tyr Ala Thr Ser Asn Leu Ala
Ser Gly Val Pro Val Arg Phe Ser Gly Ser Gly Ser Gly Thr Ser Tyr
Ser Leu Thr Ile Ser Arg Val Glu Ala Glu Asp Ala Ala Thr Tyr Tyr
Cys Gln Gln Trp Thr Ser Asn Pro Pro Thr Phe Gly Gly Gly Thr Lys
Leu Glu Ile Lys Arg Thr Gly Val Pro Gly Ser Gly Val Pro Gly Ser
Gly Val Pro Gly Ser Gly Val Pro Gly Ser Gly Val Pro Gly Ser Gly
Val Pro Gly Ser Gly Val Pro Gly Ser Gly Val Pro Gly Ser Gly Val
Pro Gly Ser Gly Val Pro Gly Ser Gly Val Pro Gly Ser Gly Val Pro
Gly Ser Gly Val Pro Gly Ser Gly Val Pro Gly Ser Gly Val Pro Gly
Ser Gly Val Pro Gly Ser Gly Val Pro Gly Ser Gly Val Pro Gly Ser
Gly Val Pro Gly Ser Gly Val Pro Gly Ser Gly Val Pro Gly Ser Gly
Val Pro Gly Ser Gly Val Pro Gly Ser Gly Val Pro Gly Ser Gly Val
Pro Gly Ser Gly Val Pro Gly Ser Gly Val Pro Gly Ser Gly Val Pro
Gly Ser Gly Val Pro Gly Ser Gly Val Pro Gly Ser Gly Val Pro Gly
Ser Gly Val Pro Gly Ser Gly Val Pro Gly Ser Gly Val Pro Gly Ser
Gly Val Pro Gly Ser Gly Val Pro Gly Ser Gly Val Pro Gly Ser Gly
Val Pro Gly Ser Gly Val Pro Gly Ser Gly Val Pro Gly Ser Gly Val
Pro Gly Ser Gly Val Pro Gly Ser Gly Val Pro Gly Ser Gly Val Pro
Gly Ser Gly Val Pro Gly Ser Gly Val Pro Gly Ser Gly Val Pro Gly
Phe Gly Val Pro Gly Ser Gly Val Pro Gly Ile Gly Val Pro Gly Ile
Gly Val Pro Gly Ile Gly Val Pro Gly Ile Gly Val Pro Gly Ile Gly
Val Pro Gly Ile Gly Val Pro Gly Ile Gly Val Pro Gly Ile Gly Val
Pro Gly Ile Gly Val Pro Gly Ile Gly Val Pro Gly Ile Gly Val Pro
Gly Ile Gly Val Pro Gly Ile Gly Val Pro Gly Ile Gly Val Pro Gly
Ile Gly Val Pro Gly Ile Gly Val Pro Gly Ile Gly Val Pro Gly Ile
Gly Val Pro Gly Ile Gly Val Pro Gly Ile Gly Val Pro Gly Ile Gly
Val Pro Gly Ile Gly Val Pro Gly Ile Gly Val Pro Gly Ile Gly Val
Pro Gly Ile Gly Val Pro Gly Ile Gly Val Pro Gly Ile Gly Val Pro
Gly Ile Gly Val Pro Gly Ile Gly Val Pro Gly Ile Gly Val Pro Gly
Ile Gly Val Pro Gly Ile Gly Val Pro Gly Ile Gly Val Pro Gly Ile
Gly Val Pro Gly Ile Gly Val Pro Gly Ile Gly Val Pro Gly Ile Gly
Val Pro Gly Ile Gly Val Pro Gly Ile Gly Val Pro Gly Ile Gly Val
Pro Gly Ile Gly Val Pro Gly Ile Gly Val Pro Gly Ile Gly Val Pro
Gly Ile Gly Val Pro Gly Ile Gly Val Pro Gly Ile Gly Val Pro Gly
Ile Gly Val Pro Gly Ile Gly Tyr (SEQ ID NO: 21)
```

Exemplary Cyclophilin Polynucleotide Sequences and Comparison of
WT Cyclophilin to Optimized Sequence

```
Opt.Seq    1  CATATGGTTAACCCGACCGTTTTCTTCGACATCGCTGTTGACGGTGAACC   50
              ||||·|||||·||||||·|||||||||||·||·||·||||||·||·||
PPIA_WT    1  ---atggtcaaccccaccgtgttcttcgacattgccgtcgacggcgagcc   47

Opt.Seq   51  GCTGGGTCGTGTTTCTTTCGAACTGTTCGCTGACAAAGTTCCGAAAACCG  100
              ··|||·||·||·||·||·|||||·||·|||||·||·||·||·||·|
PPIA_WT   48  cttgggccgcgtctcctttgagctgtttgcagacaaggtcccaaagacag   97

Opt.Seq  101  CTGAAAACTTCCGTGCTCTGTCTACCGGTGAAAAAGGTTTCGGTTACAAA  150
              |·|||||·||·|||||||||···||·||·||·|||||·||·||||||·|·
PPIA_WT   98  cagaaaatttcgtgctctgagcactggagagaaaggatttggttataag  147

Opt.Seq  151  GGTTCTTGCTTCCACCGTATCA-TCCCGGGTTTCATGTGCCAGGGTGGTG  199
              ||||||·||||||·|||·|·||·| |||·|||||| |||||·|||||||||
PPIA_WT  148  ggttcctgctttcacagaattattccagggttt-atgtgtcagggtggtg  196
```

-continued

SEQUENCE LISTING

```
Opt.Seq  200  ACTTCACCCGTCACAACGGTACCGGTGGTAAATCTATCTACGGTGAAAAA  249
              |||||||.||.||.||.||.||.|||||.||.||.|||||.||.||.|||
PPIA_WT  197  acttcacacgccataatggcactggtggcaagtccatctatggggagaaa  246

Opt.Seq  250  TTCGAAGACGAAAACTTCATCCTGAAACACACCGGTCCGGGTATCCTGTC  299
              ||.|||||.||.||||||||||||.||.||.||.|||||.||.|||.||||
PPIA_WT  247  tttgaagatgagaacttcatcctaaagcatacgggtcctggcatcttgtc  296

Opt.Seq  300  TATGGCTAACGCTGGTCCGAACACCAACGGTTCTCAGTTCTTCATCTGCA  349
              .|||||.||.|||||.||.|||||.||.||||||.||||.||||||||||
PPIA_WT  297  catggcaaatgctggacccaacacaaatggttcccagttttcatctgca  346

Opt.Seq  350  CCGCTAAAACCGAATGGCTGGACGGTAAACACGTTGTTTTCGGTAAAGTT  399
              |.||.||.||.||.|||.|||||.||.||.||.|||.||.||.|||||.
PPIA_WT  347  ctgccaagactgagtggttggatggcaagcatgtggtgtttggcaaagtg  396

Opt.Seq  400  AAAGAAGGTATGAACATCGTTGAAGCTATGGAACGTTTCGGTTCTCGTAA  449
              ||||||||.|||||.||.||.||.||.|||||.||.||.||.||..|.||
PPIA_WT  397  aaagaaggcatgaatattgtggaggccatggagcgctttgggtccaggaa  446

Opt.Seq  450  CGGTAAAACCTCTAAAAAAATCACCATCGCTGACTGCGGTCAGCTGGAAG  499
              .||.||.|||...||.||.|||||||||.||||||||.||.||.||.|||
PPIA_WT  447  tggcaagaccagcaagaagatcaccattgctgactgtggacaactcgaa-  
              (SEQ ID NO: 495)

Opt.Seq  500  GTTACTGATCTCCTCGGATCC  520   (SEQ ID NO: 22)
              |.|
PPIA_WT  496  -taa-----------------  498   (SEQ ID NO: 23)
```

Exemplary FKBP protein sequence:
VQVETISPGDGRTFPKRGQTCVVHYTGMLEDGKKFDSSRDRNKPFKFMLGKQEVIRGWEEGVAQMSVGQ
RAKLTISPDYAYGATGHPGIIPPHATLVFDVELLKLEG (SEQ ID NO: 24)

REFERENCES

1. Colombo D. and Ammirati E. (2011) Cyclosporin in transplantation—a history of converging timelines. *Journal of biological regulators and homeostatic agents*, 25, 493.
2. Cornec D., Saraux A., Jousse-Joulin S., Pers J.-O., Boisram6-Gastrin S., Renaudineau Y., Gauvin Y., Roguedas-Contios A.-M., Genestet S. and Chastaing M. (2015) The differential diagnosis of dry eyes, dry mouth, and parotidomegaly: a comprehensive review. *Clinical reviews in allergy & immunology*, 49, 278-287.
3. Dhandhukia J., Weitzhandler I., Wang W. and MacKay J. A. (2013) Switchable elastin-like polypeptides that respond to chemical inducers of dimerization. *Biomacromolecules*, 14, 976-985.
4. Gupta C. and Chauhan A. (2011) Ophthalmic delivery of cyclosporin A by punctal plugs. *J Control Release*, 150, 70-76.
5. Janib S. M., Pastuszka M., Aluri S., Folchman-Wagner Z., Hsueh P. Y., Shi P., Yi A., Cui H. and Mackay J. A. (2014) A quantitative recipe for engineering protein polymer nanoparticles. *Polym Chem*, 5, 1614-1625.
6. Janine A. (2007) The epidemiology of dry eye disease: report of the epidemiological subcommittee of the international dry eye workshop. *Ocul Surf*, 5, 93-107.
7. Mahalati K., Belitsky P., West K., Kiberd B., Fraser A., Sketris I., Macdonald A. S., McAlister V. and Lawen J. (2001) Approaching the therapeutic window for cyclosporin in kidney transplantation: a prospective study. *Journal of the American Society of Nephrology*, 12, 828-833.
8. Shah M., Edman M. C., Janga S. R., Shi P., Dhandhukia J., Liu S., Louie S. G., Rodgers K., MacKay J. A. and Hamm-Alvarez S. F. (2013) A rapamycin-binding protein polymer nanoparticle shows potent therapeutic activity in suppressing autoimmune dacryoadenitis in a mouse model of Sjögren's syndrome. *Journal of Controlled Release*, 171, 269-279.
9. Shah M., Hsueh P. Y., Sun G., Chang H. Y., Janib S. M. and MacKay J. A. (2012) Biodegradation of elastin-like polypeptide nanoparticles. *Protein Science*, 21, 743-750.
10. Shi P., Aluri S., Lin Y. A., Shah M., Edman M., Dhandhukia J., Cui H. and MacKay J. A. (2013) Elastin-based protein polymer nanoparticles carrying drug at both corona and core suppress tumor growth in vivo. *J Control Release*, 171, 330-338.
11. Stevenson W., Chauhan S. K. and Dana R. (2012) Dry eye disease: an immune-mediated ocular surface disorder. *Archives of Ophthalmology*, 130, 90-100.
12. Sun G., Hsueh P.-Y., Janib S. M., Hamm-Alvarez S. and MacKay J. A. (2011) Design and cellular internalization of genetically engineered polypeptide nanoparticles displaying adenovirus knob domain. *Journal of controlled release*, 155, 218-226.
13. Survase S. A., Kagliwal L. D., Annapure U. S. and Singhal R. S. (2011) Cyclosporin A-A review on fermentative production, downstream processing and pharmacological applications. *Biotechnology advances*, 29, 418-435.
14. Urry D. W. (1997) Physical chemistry of biological free energy transduction as demonstrated by elastic protein-based polymers. *The Journal of Physical Chemistry B*, 101, 11007-11028.
15. Wang W., Jashnani A., Aluri S. R., Gustafson J. A., Hsueh P.-Y., Yarber F., McKown R. L., Laurie G. W., Hamm-Alvarez S. F. and MacKay J. A. (2015) A thermo-responsive protein treatment for dry eyes. *Journal of Controlled Release*, 199, 156-167.

16. Andersson, J., et al., Effects of FK506 and cyclosporin A on cytokine production studied in vitro at a single-cell level. *Immunology*, 1992. 75(1): p. 136.
17. Tanaka, Y., Y. Sato, and T. Sasaki, Suppression of coronavirus replication by cyclophilin inhibitors. *Viruses*, 2013. 5(5): p. 1250-1260.
18. Huai, Q., et al., Crystal structure of calcineurin-cyclophilin-cyclosporin shows common but distinct recognition of immunophilin-drug complexes. *Proceedings of the National Academy of Sciences*, 2002. 99(19): p. 12037-12042.
19. D. E. Meyer, A. Chilkoti, Genetically encoded synthesis of protein-based polymers with precisely specified molecular weight and sequence by recursive directional ligation: examples from the elastin-like polypeptide system, *Biomacromolecules*, 3 (2002) 357-367.

SEQUENCE LISTING

```
Sequence total quantity: 76
SEQ ID NO: 1              moltype = AA  length = 960
FEATURE                   Location/Qualifiers
REGION                    1..960
                          note = Description of Artificial Sequence: Synthetic
                          polypeptide
source                    1..960
                          mol_type = protein
                          organism = synthetic construct
SEQUENCE: 1
VPGAGVPGAG VPGAGVPGAG VPGAGVPGAG VPGAGVPGAG VPGAGVPGAG VPGAGVPGAG  60
VPGAGVPGAG VPGAGVPGAG VPGAGVPGAG VPGAGVPGAG VPGAGVPGAG VPGAGVPGAG 120
VPGAGVPGAG VPGAGVPGAG VPGAGVPGAG VPGAGVPGAG VPGAGVPGAG VPGAGVPGAG 180
VPGAGVPGAG VPGAGVPGAG VPGAGVPGAG VPGAGVPGAG VPGAGVPGAG VPGAGVPGAG 240
VPGAGVPGAG VPGAGVPGAG VPGAGVPGAG VPGAGVPGAG VPGAGVPGAG VPGAGVPGAG 300
VPGAGVPGAG VPGAGVPGAG VPGAGVPGAG VPGAGVPGAG VPGAGVPGAG VPGAGVPGAG 360
VPGAGVPGAG VPGAGVPGAG VPGAGVPGAG VPGAGVPGAG VPGAGVPGAG VPGAGVPGAG 420
VPGAGVPGAG VPGAGVPGAG VPGAGVPGAG VPGAGVPGAG VPGAGVPGAG VPGAGVPGAG 480
VPGAGVPGAG VPGAGVPGAG VPGAGVPGAG VPGAGVPGAG VPGAGVPGAG VPGAGVPGAG 540
VPGAGVPGAG VPGAGVPGAG VPGAGVPGAG VPGAGVPGAG VPGAGVPGAG VPGAGVPGAG 600
VPGAGVPGAG VPGAGVPGAG VPGAGVPGAG VPGAGVPGAG VPGAGVPGAG VPGAGVPGAG 660
VPGAGVPGAG VPGAGVPGAG VPGAGVPGAG VPGAGVPGAG VPGAGVPGAG VPGAGVPGAG 720
VPGAGVPGAG VPGAGVPGAG VPGAGVPGAG VPGAGVPGAG VPGAGVPGAG VPGAGVPGAG 780
VPGAGVPGAG VPGAGVPGAG VPGAGVPGAG VPGAGVPGAG VPGAGVPGAG VPGAGVPGAG 840
VPGAGVPGAG VPGAGVPGAG VPGAGVPGAG VPGAGVPGAG VPGAGVPGAG VPGAGVPGAG 900
VPGAGVPGAG VPGAGVPGAG VPGAGVPGAG VPGAGVPGAG VPGAGVPGAG VPGAGVPGAG 960

SEQ ID NO: 2              moltype = AA  length = 480
FEATURE                   Location/Qualifiers
REGION                    1..480
                          note = Description of Artificial Sequence: Synthetic
                          polypeptide
source                    1..480
                          mol_type = protein
                          organism = synthetic construct
SEQUENCE: 2
VPGVGVPGVG VPGVGVPGVG VPGVGVPGVG VPGVGVPGVG VPGVGVPGVG VPGVGVPGVG  60
VPGVGVPGVG VPGVGVPGVG VPGVGVPGVG VPGVGVPGVG VPGVGVPGVG VPGVGVPGVG 120
VPGVGVPGVG VPGVGVPGVG VPGVGVPGVG VPGVGVPGVG VPGVGVPGVG VPGVGVPGVG 180
VPGVGVPGVG VPGVGVPGVG VPGVGVPGVG VPGVGVPGVG VPGVGVPGVG VPGVGVPGVG 240
VPGVGVPGVG VPGVGVPGVG VPGVGVPGVG VPGVGVPGVG VPGVGVPGVG VPGVGVPGVG 300
VPGVGVPGVG VPGVGVPGVG VPGVGVPGVG VPGVGVPGVG VPGVGVPGVG VPGVGVPGVG 360
VPGVGVPGVG VPGVGVPGVG VPGVGVPGVG VPGVGVPGVG VPGVGVPGVG VPGVGVPGVG 420
VPGVGVPGVG VPGVGVPGVG VPGVGVPGVG VPGVGVPGVG VPGVGVPGVG VPGVGVPGVG 480

SEQ ID NO: 3              moltype = AA  length = 1127
FEATURE                   Location/Qualifiers
REGION                    1..1127
                          note = Description of Artificial Sequence: Synthetic
                          polypeptide
source                    1..1127
                          mol_type = protein
                          organism = synthetic construct
SEQUENCE: 3
MVNPTVFFDI AVDGEPLGRV SFELFADKVP KTAENFRALS TGEKGFGYKG SCFHRIIPGF  60
MCQGGDFTRH NGTGGKSIYG EKFEDENFIL KHTGPGILSM ANAGPNTNGS QFFICTAKTE 120
WLDGKHVVFG KVKEGMNIVE AMERFGSRNG KTSKKITIAD CGQLEGVPGA GVPGAGVPGA 180
GVPGAGVPGA GVPGAGVPGA GVPGAGVPGA GVPGAGVPGA GVPGAGVPGA GVPGAGVPGA 240
GVPGAGVPGA GVPGAGVPGA GVPGAGVPGA GVPGAGVPGA GVPGAGVPGA GVPGAGVPGA 300
GVPGAGVPGA GVPGAGVPGA GVPGAGVPGA GVPGAGVPGA GVPGAGVPGA GVPGAGVPGA 360
GVPGAGVPGA GVPGAGVPGA GVPGAGVPGA GVPGAGVPGA GVPGAGVPGA GVPGAGVPGA 420
GVPGAGVPGA GVPGAGVPGA GVPGAGVPGA GVPGAGVPGA GVPGAGVPGA GVPGAGVPGA 480
GVPGAGVPGA GVPGAGVPGA GVPGAGVPGA GVPGAGVPGA GVPGAGVPGA GVPGAGVPGA 540
GVPGAGVPGA GVPGAGVPGA GVPGAGVPGA GVPGAGVPGA GVPGAGVPGA GVPGAGVPGA 600
GVPGAGVPGA GVPGAGVPGA GVPGAGVPGA GVPGAGVPGA GVPGAGVPGA GVPGAGVPGA 660
GVPGAGVPGA GVPGAGVPGA GVPGAGVPGA GVPGAGVPGA GVPGAGVPGA GVPGAGVPGA 720
```

```
GVPGAGVPGA GVPGAGVPGA GVPGAGVPGA GVPGAGVPGA GVPGAGVPGA GVPGAGVPGA    780
GVPGAGVPGA GVPGAGVPGA GVPGAGVPGA GVPGAGVPGA GVPGAGVPGA GVPGAGVPGA    840
GVPGAGVPGA GVPGAGVPGA GVPGAGVPGA GVPGAGVPGA GVPGAGVPGA GVPGAGVPGA    900
GVPGAGVPGA GVPGAGVPGA GVPGAGVPGA GVPGAGVPGA GVPGAGVPGA GVPGAGVPGA    960
GVPGAGVPGA GVPGAGVPGA GVPGAGVPGA GVPGAGVPGA GVPGAGVPGA GVPGAGVPGA   1020
GVPGAGVPGA GVPGAGVPGA GVPGAGVPGA GVPGAGVPGA GVPGAGVPGA GVPGAGVPGA   1080
GVPGAGVPGA GVPGAGVPGA GVPGAGVPGA GVPGAGVPGA GVPGAGY                 1127

SEQ ID NO: 4              moltype = AA   length = 647
FEATURE                   Location/Qualifiers
REGION                    1..647
                          note = Description of Artificial Sequence: Synthetic
                           polypeptide
source                    1..647
                          mol_type = protein
                          organism = synthetic construct
SEQUENCE: 4
MVNPTVFFDI AVDGEPLGRV SFELFADKVP KTAENFRALS TGEKGFGYKG SCFHRIIPGF    60
MCQGGDFTRH NGTGGKSIYG EKFEDENFIL KHTGPGILSM ANAGPNTNGS QFFICTAKTE   120
WLDGKHVVFG KVKEGMNIVE AMERFGSRNG KTSKKITIAD CGQLEGVPGV GVPGVGVPGV   180
GVPGVGVPGV GVPGVGVPGV GVPGVGVPGV GVPGVGVPGV GVPGVGVPGV GVPGVGVPGV   240
GVPGVGVPGV GVPGVGVPGV GVPGVGVPGV GVPGVGVPGV GVPGVGVPGV GVPGVGVPGV   300
GVPGVGVPGV GVPGVGVPGV GVPGVGVPGV GVPGVGVPGV GVPGVGVPGV GVPGVGVPGV   360
GVPGVGVPGV GVPGVGVPGV GVPGVGVPGV GVPGVGVPGV GVPGVGVPGV GVPGVGVPGV   420
GVPGVGVPGV GVPGVGVPGV GVPGVGVPGV GVPGVGVPGV GVPGVGVPGV GVPGVGVPGV   480
GVPGVGVPGV GVPGVGVPGV GVPGVGVPGV GVPGVGVPGV GVPGVGVPGV GVPGVGVPGV   540
GVPGVGVPGV GVPGVGVPGV GVPGVGVPGV GVPGVGVPGV GVPGVGVPGV GVPGVGVPGV   600
GVPGVGVPGV GVPGVGVPGV GVPGVGVPGV GVPGVGVPGV GVPGVGY                 647

SEQ ID NO: 5              moltype = DNA   length = 567
FEATURE                   Location/Qualifiers
misc_feature              1..567
                          note = Description of Artificial Sequence: Synthetic
                           polynucleotide
source                    1..567
                          mol_type = other DNA
                          organism = synthetic construct
SEQUENCE: 5
tctagaaata attttgttta actttaagaa ggaggagtac atatgggtat ggttaacccg    60
accgttttct tcgacatcgc tgttgacggt gaaccgctgg gtcgtgtttc tttcgaactg   120
ttcgctgaca agttccgaaa accgctgaaa acttccgtg ctctgtctac cggtgaaaaa   180
ggtttcggtt acaaaggttc ttgcttccac cgtatcatcc cgggtttcat gtgccagggt   240
ggtgacttca cccgtcacaa cggtaccggt gtaaatcta tctacggtga aaaattcgaa   300
gacgaaaact tcatcctgaa acacaccggt ccgggtatcc tgtctatggc taacgctggt   360
ccgaacacca acgttctca gttcttcatc tgcaccgcta aaaccgaatg gctggacggt   420
aaaacacgttg ttttcggtaa agttaaagaa ggtatgaaca tcgttgaagc tatggaacgt   480
ttcggttctc gtaacggtaa aacctctaaa aaaatcacca tcgctgactg cggtcagctg   540
gaaggttgat aatgatcttc aggatcc                                      567

SEQ ID NO: 6              moltype = DNA   length = 523
FEATURE                   Location/Qualifiers
misc_feature              1..523
                          note = Description of Artificial Sequence: Synthetic
                           polynucleotide
source                    1..523
                          mol_type = other DNA
                          organism = synthetic construct
SEQUENCE: 6
tatgggtatg gttaacccga ccgttttctt cgacatcgct gttgacggtg aaccgctggg    60
tcgtgtttct ttcgaactgt tcgctgacaa agttccgaaa accgctgaaa acttccgtgc   120
tctgtctacc ggtgaaaaag gtttcggtta caaaggttct tgcttccacc gtatcatccc   180
gggtttcatg tgccagggtg gtgacttcac ccgtcacaac ggtaccggtg taaatctat   240
ctacggtgaa aaattcgaag acgaaaactt catcctgaaa cacaccggtc cgggtatcct   300
gtctatggct aacgctggtc cgaacaccaa cggttctcag ttcttcatct gcaccgctaa   360
aaccgaatgg ctggacggta aaacacgttg ttttcggtaa agttaaagaa ggtatgaacat   420
cgttgaagct atggaacgtt tcggttctcg taacggtaaa acctctaaaa aaatcaccat   480
cgctgactgc ggtcagctgg aaggttactg atctcctcgg atc                    523

SEQ ID NO: 7              moltype = DNA   length = 520
FEATURE                   Location/Qualifiers
misc_feature              1..520
                          note = Description of Artificial Sequence: Synthetic
                           polynucleotide
source                    1..520
                          mol_type = other DNA
                          organism = synthetic construct
SEQUENCE: 7
catatggtta acccgaccgt tttcttcgac atcgctgttg acggtgaacc gctgggtcgt    60
gtttctttcg aactgttcgc tgacaaagtt ccgaaaaccg ctgaaaactt ccgtgctctg   120
```

```
tctaccggtg aaaaaggttt cggttacaaa ggttcttgct tccaccgtat catcccgggt   180
ttcatgtgcc agggtggtga cttcacccgt cacaacggta ccggtggtaa atctatctac   240
ggtgaaaaat tcgaagacga aaacttcatc ctgaaacaca ccggtccggg tatcctgtct   300
atggctaacg ctggtccgaa caccaacggt tctcagttct tcatctgcac cgctaaaacc   360
gaatggctgg acggtaaaca cgttgttttc ggtaaagtta agaaggtat gaacatcgtt    420
gaagctatgg aacgtttcgg ttctcgtaac ggtaaaacct ctaaaaaaat caccatcgct   480
gactgcggtc agctggaagg ttactgatct cctcggatcc                         520
```

| | | |
|---|---|---|
| SEQ ID NO: 8 | moltype = AA length = 812 | |
| FEATURE | Location/Qualifiers | |
| REGION | 1..812 | |
| | note = Description of Artificial Sequence: Synthetic polypeptide | |
| source | 1..812 | |
| | mol_type = protein | |
| | organism = synthetic construct | |

```
SEQUENCE: 8
MMVNPTVFFD IAVDGEPLGR VSFELFADKV PKTAENFRAL STGEKGFGYK GSCFHRIIPG   60
FMCQGGDFTR HNGTGGKSIY GEKFEDENFI LKHTGPGILS MANAGPNTNG SQFFICTAKT  120
EWLDGKHVVF GKVKEGMNIV EAMERFGSRN GKTSKKITIA DCGQLEGVPG AGVPGAGVPG  180
AGVPGAGVPG AGVPGAGVPG AGVPGAGVPG AGVPGAGVPG AGVPGAGVPG AGVPGAGVPG  240
AGVPGAGVPG AGVPGAGVPG AGVPGAGVPG AGVPGAGVPG AGVPGAGVPG AGVPGAGVPG  300
AGVPGAGVPG AGVPGAGVPG AGVPGAGVPG AGVPGAGVPG AGVPGAGVPG AGVPGAGVPG  360
AGVPGAGVPG AGVPGAGVPG AGVPGAGVPG AGVPGAGVPG AGVPGAGVPG AGVPGAGVPG  420
AGVPGAGVPG AGVPGAGVPG AGVPGAGVPG AGVPGAGVPG AGVPGAGVPG AGVPGAGVPG  480
AGVPGAGVPG AGVPGAGVPG AGVPGAGVPG AGVPGAGVPG AGVPGAGVPG AGVPGAGVPG  540
AGVPGAGVPG AGVPGAGVPG AGVPGAGVPG AGVPGAGVPG AGVPGAGVPG AGVPGAGVPG  600
AGVPGAGVPG AGVPGAGVPG AGVPGAGVPG AGVPGAGVPG AGVPGAGMVN PTVFFDIAVD  660
GEPLGRVSFE LFADKVPKTA ENFRALSTGE KGFGYKGSCF HRIIPGFMCQ GGDFTRHNGT  720
GGKSIYGEKF EDENFILKHT GPGILSMANA GPNTNGSQFF ICTAKTEWLD GKHVFGKVKE  780
GMNIVEAMER FGSRNGKTSK KITIADCGQL EG                                812
```

| | | |
|---|---|---|
| SEQ ID NO: 9 | moltype = AA length = 1026 | |
| FEATURE | Location/Qualifiers | |
| REGION | 1..1026 | |
| | note = Description of Artificial Sequence: Synthetic polypeptide | |
| source | 1..1026 | |
| | mol_type = protein | |
| | organism = synthetic construct | |

```
SEQUENCE: 9
MGMVNPTVFF DIAVDGEPLG RVSFELFADK VPKTAENFRA LSTGEKGFGY KGSCFHRIIP   60
GFMCQGGDFT RHNGTGGKSI YGEKFEDENF ILKHTGPGIL SMANAGPNTN GSQFFICTAK  120
TEWLDGKHVV FGKVKEGMNI VEAMERFGSR NGKTSKKITI ADCGQLEGVP GAGVPGAGVP  180
GAGVPGAGVP GAGVPGAGVP GAGVPGAGVP GAGVPGAGVP GAGVPGAGVP GAGVPGAGVP  240
GAGVPGAGVP GAGVPGAGVP GAGVPGAGVP GAGVPGAGVP GAGVPGAGMV NPTVFFDIAV  300
DGEPLGRVSF ELFADKVPKT AENFRALSTG EKGFGYKGSC FHRIIPGFMC QGGDFTRHNG  360
TGGKSIYGEK FEDENFILKH TGPGILSMAN AGPNTNGSQF FICTAKTEWL DGKHVVFGKV  420
KEGMNIVEAM ERFGSRNGKT SKKITIADCG QLEGVPGAGV PGAGVPGAGV PGAGVPGAGV  480
PGAGVPGAGV PGAGVPGAGV PGAGVPGAGV PGAGVPGAGV PGAGVPGAGV PGAGVPGAGV  540
PGAGVPGAGV PGAGVPGAGV PGAGVPGAGV PGAGMVNPTV FFDIAVDGEP LGRVSFELFA  600
DKVPKTAENF RALSTGEKGF GYKGSCFHRI IPGFMCQGGD FTRHNGTGGK SIYGEKFEDE  660
NFILKHTGPG ILSMANAGPN TNGSQFFICT AKTEWLDGKH VVFGKVKEGM NIVEAMERFG  720
SRNGKTSKKI TIADCGQLEG VPGAGVPGAG VPGAGVPGAG VPGAGVPGAG VPGAGVPGAG  780
VPGAGVPGAG VPGAGVPGAG VPGAGVPGAG VPGAGVPGAG VPGAGVPGAG VPGAGVPGAG  840
VPGAGVPGAG VPGAGVPGAG MVNPTVFFDI AVDGEPLGRV SFELFADKVP KTAENFRALS  900
TGEKGFGYKG SCFHRIIPGF MCQGGDFTRH NGTGGKSIYG EKFEDENFIL KHTGPGILSM  960
ANAGPNTNGS QFFICTAKTE WLDGKHVVFG KVKEGMNIVE AMERFGSRNG KTSKKITIAD 1020
CGQLEG                                                            1026
```

| | | |
|---|---|---|
| SEQ ID NO: 10 | moltype = AA length = 1016 | |
| FEATURE | Location/Qualifiers | |
| REGION | 1..1016 | |
| | note = Description of Artificial Sequence: Synthetic polypeptide | |
| source | 1..1016 | |
| | mol_type = protein | |
| | organism = synthetic construct | |

```
SEQUENCE: 10
MGVQVETISP GDGRTFPKRG QTCVVHYTGM LEDGKKFDSS RDRNKPFKFM LGKQEVIRGW   60
EEGVAQMSVG QRAKLTISPD YAYGATGHPG IIPPHATLVF DVELLKLEVP GAGVPGAGVP  120
GAGVPGAGVP GAGVPGAGVP GAGVPGAGVP GAGVPGAGVP GAGVPGAGVP GAGVPGAGVP  180
GAGVPGAGVP GAGVPGAGVP GAGVPGAGGV QVETISPGDG  240
RTFPKRGQTC VVHYTGMLED GKKFDSSRDR NKPFKFMLGK QEVIRGWEEG VAQMSVGQRA  300
KLTISPDYAY GATGHPGIIP PHATLVFDVE LLKLEVPGAG VPGAGVPGAG VPGAGVPGAG  360
VPGAGVPGAG VPGAGVPGAG VPGAGVPGAG VPGAGVPGAG VPGAGVPGAG VPGAGVPGAG  420
VPGAGVPGAG VPGAGVPGAG VPGAGVPGAG VPGAGGVQVE TISPGDGRTF PKRGQTCVVH  480
YTGMLEDGKK FDSSRDRNKP FKFMLGKQEV IRGWEEGVAQ MSVGQRAKLT ISPDYAYGAT  540
GHPGIIPPHA TLVFDVELLK LEVPGAGVPG AGVPGAGVPG AGVPGAGVPG AGVPGAGVPG  600
```

| | | |
|---|---|---|
| AGVPGAGVPG AGVPGAGVPG AGVPGAGVPG AGVPGAGVPG AGVPGAGVPG AGVPGAGVPG | 660 | |
| AGVPGAGVPG AGVPGAGVPG AGGVQVETIS PGDGRTFPKR GQTCVVHYTG MLEDGKKFDS | 720 | |
| SRDRNKPFKF MLGKQEVIRG WEEGVAQMSV GQRAKLTISP DYAYGATGHP GIIPPHATLV | 780 | |
| FDVELLKLEV PGAGVPGAGV PGAGVPGAGV PGAGVPGAGV PGAGVPGAGV PGAGVPGAGV | 840 | |
| PGAGVPGAGV PGAGVPGAGV PGAGVPGAGV PGAGVPGAGV PGAGVPGAGV PGAGVPGAGV | 900 | |
| PGAGVPGAGG VQVETISPGD GRTFPKRGQT CVVHYTGMLE DGKKFDSSRD RNKPFKFMLG | 960 | |
| KQEVIRGWEE GVAQMSVGQR AKLTISPDYA YGATGHPGII PPHATLVFDV ELLKLE | 1016 | |

```
SEQ ID NO: 11          moltype = AA   length = 1016
FEATURE                Location/Qualifiers
REGION                 1..1016
                       note = Description of Artificial Sequence: Synthetic
                        polypeptide
source                 1..1016
                       mol_type = protein
                       organism = synthetic construct
SEQUENCE: 11
MGVQVETISP GDGRTFPKRG QTCVVHYTGM LEDGKKFDSS RDRNKPFKFM LGKQEVIRGW   60
EEGVAQMSVG QRAKLTISPD YAYGATGHPG IIPPHATLVF DVELLKLEVP GVGVPGVGVP  120
GVGVPGVGVP GVGVPGVGVP GVGVPGVGVP GVGVPGVGVP GVGVPGVGVP GVGVPGVGVP  180
GVGVPGVGVP GVGVPGVGVP GVGVPGVGVP GVGVPGVGVP GVGVPGVGGV QVETISPGDG  240
RTFPKRGQTC VVHYTGMLED GKKFDSSRDR NKPFKFMLGK QEVIRGWEEG VAQMSVGQRA  300
KLTISPDYAY GATGHPGIIP PHATLVFDVE LLKLEVPGVG VPGVGVPGVG VPGVGVPGVG  360
VPGVGVPGVG VPGVGVPGVG VPGVGVPGVG VPGVGVPGVG VPGVGVPGVG VPGVGVPGVG  420
VPGVGVPGVG VPGVGVPGVG VPGVGVPGVG VPGVGGVQVE TISPGDGRTF PKRGQTCVVH  480
YTGMLEDGKK FDSSRDRNKP FKFMLGKQEV IRGWEEGVAQ MSVGQRAKLT ISPDYAYGAT  540
GHPGIIPPHA TLVFDVELLK LEVPGVGVPG VGVPGVGVPG VGVPGVGVPG VGVPGVGVPG  600
VGVPGVGVPG VGVPGVGVPG VGVPGVGVPG VGVPGVGVPG VGVPGVGVPG VGVPGVGVPG  660
VGVPGVGVPG VGVPGVGVPG VGGVQVETIS PGDGRTFPKR GQTCVVHYTG MLEDGKKFDS  720
SRDRNKPFKF MLGKQEVIRG WEEGVAQMSV GQRAKLTISP DYAYGATGHP GIIPPHATLV  780
FDVELLKLEV PGVGVPGVGV PGVGVPGVGV PGVGVPGVGV PGVGVPGVGV PGVGVPGVGV  840
PGVGVPGVGV PGVGVPGVGV PGVGVPGVGV PGVGVPGVGV PGVGVPGVGV PGVGVPGVGV  900
PGVGVPGVGG VQVETISPGD GRTFPKRGQT CVVHYTGMLE DGKKFDSSRD RNKPFKFMLG  960
KQEVIRGWEE GVAQMSVGQR AKLTISPDYA YGATGHPGII PPHATLVFDV ELLKLE     1016

SEQ ID NO: 12          moltype = DNA   length = 273
FEATURE                Location/Qualifiers
misc_feature           1..273
                       note = Description of Artificial Sequence: Synthetic
                        polynucleotide
source                 1..273
                       mol_type = other DNA
                       organism = synthetic construct
SEQUENCE: 12
atgggtgttc aggttgaaac catctctccg ggtgacggtc gtaccttccc gaaacgtggt   60
cagacctgcg ttgttcacta caccggtatg ctggaagacg gtaaaaaatt cgaccgtggt  120
tgggaagaag gtgttgctca gatgtctgtt ggtcagcgtg ctaaactgac catctctccg  180
gactacgctt acggtcaccc ggtatcatcc cgccgcacgc taccctggtt  240
ttcgacgttg aactgctgaa actggaaggt tac                                273

SEQ ID NO: 13          moltype = DNA   length = 360
FEATURE                Location/Qualifiers
misc_feature           1..360
                       note = Description of Artificial Sequence: Synthetic
                        polynucleotide
source                 1..360
                       mol_type = other DNA
                       organism = synthetic construct
SEQUENCE: 13
gttccgggcg ctggtgtacc aggtgcaggt gtaccgggtg ccggcgtacc tggcgcaggt   60
gtcccgggtg ccggtgttcc gggtgctggt gttccgggcg ctggtgtacc aggtgcaggt  120
gtaccgggtg ccggcgtacc tggcgcaggt gtcccgggtg ccggtgttcc gggtgctggt  180
gttccgggcg ctggtgtacc aggtgcaggt gtaccgggtg ccggcgtacc tggcgcaggt  240
gtcccgggtg ccggtgttcc gggtgctggt gttccgggcg ctggtgtacc aggtgcaggt  300
gtaccgggtg ccggcgtacc tggcgcaggt gtcccgggtg ccggtgttcc gggtgctggt  360

SEQ ID NO: 14          moltype = DNA   length = 360
FEATURE                Location/Qualifiers
misc_feature           1..360
                       note = Description of Artificial Sequence: Synthetic
                        polynucleotide
source                 1..360
                       mol_type = other DNA
                       organism = synthetic construct
SEQUENCE: 14
gttccgggcg tgggtgtacc aggtgtcggt gtaccgggtg tcggcgtacc tggcgtcggt   60
gtcccgggtg ttggtgttcc gggtgtaggt gttccgggcg tgggtgtacc aggtgtcggt  120
gtaccgggtg tcggcgtacc tggcgtcggt gtcccgggtg ttggtgttcc gggtgtaggt  180
gttccgggcg tgggtgtacc aggtgtcggt gtaccgggtg tcggcgtacc tggcgtcggt  240
```

```
gtcccgggtg ttggtgttcc gggtgtaggt gttccgggcg tgggtgtacc aggtgtcggt    300
gtaccgggtg tcggcgtacc tggcgtcggt gtcccgggtg ttggtgttcc gggtgtaggt    360
```

| | | |
|---|---|---|
| SEQ ID NO: 15 | moltype = AA length = 1009 | |
| FEATURE | Location/Qualifiers | |
| REGION | 1..1009 | |
| | note = Description of Artificial Sequence: Synthetic polypeptide | |
| source | 1..1009 | |
| | mol_type = protein | |
| | organism = synthetic construct | |

SEQUENCE: 15
```
MADEEKLPPG WEKRMSRSSG RVYYFNHITN ASQWERPSGN SSSGGKNGQG EPARVRCSHL     60
LVKHSQSRRP SSWRQEKITR TKEEALELIN GYIQKIKSGE EDFESLASQF SDCSSAKARG    120
DLGAFSRGQM QKPFEDASFA LRTGEMSGPV FTDSGIHIIL RTEVPGAGVP GAGVPGAGVP    180
GAGVPGAGVP GAGVPGAGVP GAGVPGAGVP GAGVPGAGVP GAGVPGAGVP GAGVPGAGVP    240
GAGVPGAGVP GAGVPGAGVP GAGVPGAGVP GAGVPGAGVP GAGADEEKLP PGWEKRMSRS    300
SGRVYYFNHI TNASQWERPS GNSSSGGKNG QGEPARVRCS HLLVKHSQSR RPSSWRQEKI    360
TRTKEEALEL INGYIQKIKS GEEDFESLAS QFSDCSSAKA RGDLGAFSRG QMQKPFEDAS    420
FALRTGEMSG PVFTDSGIHI ILRTEVPGAG VPGAGVPGAG VPGAGVPGAG VPGAGVPGAG    480
VPGAGVPGAG VPGAGVPGAG VPGAGVPGAG VPGAGVPGAG VPGAGVPGAG VPGAGVPGAG    540
VPGAGVPGAG VPGAGVPGAG VPGAGADEEK LPPGWEKRMS RSSGRVYYFN HITNASQWER    600
PSGNSSGGK NGQGEPARVR CSHLLVKHSQ SRRPSSWRQE KITRTKEEAL ELINGYIQKI    660
KSGEEDFESL ASQFSDCSSA KARGDLGAFS RGQMQKPFED ASFALRTGEM SGPVFTDSGI    720
HIILRTEVPG AGVPGAGVPG AGVPGAGVPG AGVPGAGVPG AGVPGAGVPG AGVPGAGVPG    780
AGVPGAGVPG AGVPGAGVPG AGVPGAGVPG AGVPGAGVPG AGVPGAGVPG AGVPGAGVPG    840
AGVPGAGADE EKLPPGWEKR MSRSSGRVYY FNHITNASQW ERPSGNSSSG GKNGQGEPAR    900
VRCSHLLVKH SQSRRPSSWR QEKITRTKEE ALELINGYIQ KIKSGEEDFE SLASQFSDCS    960
SAKARGDLGA FSRGQMQKPF EDASFALRTG EMSGPVFTDS GIHIILRTE              1009
```

| | | |
|---|---|---|
| SEQ ID NO: 16 | moltype = DNA length = 492 | |
| FEATURE | Location/Qualifiers | |
| source | 1..492 | |
| | mol_type = other DNA | |
| | organism = Homo sapiens | |

SEQUENCE: 16
```
atgggtgctg acgaagagaa gttacctcca ggctgggaaa aacgtatgtc tcgttcgagc     60
ggcagagtct attacttcaa ccacattacc aacgcatccc agtgggagcg gccctccggg    120
aattcttcta gcggtggcaa aaatggtcag ggtgaaccag ccagagtgcg ctgttcccac    180
ttgttagtta aacactctca aagccgtcgc cctcatcttg gagacagga gaaaattact    240
cggaccaagg aagaggccct tgaacttatc aatggctaca ttcagaagat taagagcggg    300
gaagaggatt tcgaatccct ggcgagtcaa ttctcggatt gttcgagtgc taaagcgcgg    360
ggagatcttt gagcattcag tcgtgggcaa atgcaaaaac cttttgagga cgcttccttt    420
gccttgagaa ctggggaaat gtccggtcca gttttcacag actctggcat ccacatcatc    480
ctgcgtactg ag                                                        492
```

| | | |
|---|---|---|
| SEQ ID NO: 17 | moltype = AA length = 245 | |
| FEATURE | Location/Qualifiers | |
| REGION | 1..245 | |
| | note = Description of Artificial Sequence: Synthetic polypeptide | |
| source | 1..245 | |
| | mol_type = protein | |
| | organism = synthetic construct | |

SEQUENCE: 17
```
QVQLQQPGAE LVKPGASVKM SCKASGYTFT SYNMHWVKQT PGRGLEWIGA IYPGNGDTSY     60
NQKFKGKATL TADKSSSTAY MQLSSLTSED SAVYYCARST YYGGDWYFNV WGAGTTVTVS    120
AGGGGSGGGG SGGGGSQIVL SQSPAILSAS PGEKVTMTCR ASSSVSYIHW FQQKPGSSPK    180
PWIYATSNLA SGVPVRFSGS GSGTSYSLTI SRVEAEDAAT YYCQQWTSNP PTFGGGTKLE    240
IKRTG                                                                245
```

| | | |
|---|---|---|
| SEQ ID NO: 18 | moltype = AA length = 250 | |
| FEATURE | Location/Qualifiers | |
| REGION | 1..250 | |
| | note = Description of Artificial Sequence: Synthetic polypeptide | |
| source | 1..250 | |
| | mol_type = protein | |
| | organism = synthetic construct | |

SEQUENCE: 18
```
QVQLQQPGAE LVKPGASVKM SCKASGYTFT SYNMHWVKQT PGRGLEWIGA IYPGNGDTSY     60
NQKFKGKATL TADKSSSTAY MQLSSLTSED SAVYYCARST YYGGDWYFNV WGAGTTVTVS    120
AGGGGSGGGG SGGGGSGGGG SQIVLSQSPA ILSASPGEKV TMTCRASSSV SYIHWFQQKP    180
GSSPKPWIYA TSNLASGVPV RFSGSGSGTS YSLTISRVEA EDAATYYCQQ WTSNPPTFGG    240
GTGLEIGRTG                                                           250
```

| | | |
|---|---|---|
| SEQ ID NO: 19 | moltype = AA length = 1208 | |
| FEATURE | Location/Qualifiers | |
| REGION | 1..1208 | |

-continued

```
                        note = Description of Artificial Sequence: Synthetic
                          polypeptide
source                  1..1208
                        mol_type = protein
                        organism = synthetic construct
SEQUENCE: 19
MGQVQLQQPG AELVKPGASV KMSCKASGYT FTSYNMHWVK QTPGRGLEWI GAIYPGNGDT    60
SYNQKFKGKA TLTADKSSST AYMQLSSLTS EDSAVYYCAR STYYGGDWYF NVWGAGTTVT   120
VSAGGGGSGG GGSGGGGSQI VLSQSPAILS ASPGEKVTMT CRASSSVSYI HWFQQKPGSS   180
PKPWIYATSN LASGVPVRFS GSGSGTSYSL TISRVEAEDA ATYYCQQWTS NPPTFGGGTK   240
LEIKRTGVPG AGVPGAGVPG AGVPGAGVPG AGVPGAGVPG AGVPGAGVPG AGVPGAGVPG   300
AGVPGAGVPG AGVPGAGVPG AGVPGAGVPG AGVPGAGVPG AGVPGAGVPG AGVPGAGVPG   360
AGVPGAGVPG AGVPGAGVPG AGVPGAGVPG AGVPGAGVPG AGVPGAGVPG AGVPGAGVPG   420
AGVPGAGVPG AGVPGAGVPG AGVPGAGVPG AGVPGAGVPG AGVPGAGVPG AGVPGAGVPG   480
AGVPGAGVPG AGVPGAGVPG AGVPGAGVPG AGVPGAGVPG AGVPGAGVPG AGVPGAGVPG   540
AGVPGAGVPG AGVPGAGVPG AGVPGAGVPG AGVPGAGVPG AGVPGAGVPG AGVPGAGVPG   600
AGVPGAGVPG AGVPGAGVPG AGVPGAGVPG AGVPGAGVPG AGVPGAGVPG AGVPGAGVPG   660
AGVPGAGVPG AGVPGAGVPG AGVPGAGVPG AGVPGAGVPG AGVPGAGVPG AGVPGAGVPG   720
AGVPGAGVPG IGVPGIGVPG IGVPGIGVPG IGVPGIGVPG IGVPGIGVPG IGVPGIGVPG   780
IGVPGIGVPG IGVPGIGVPG IGVPGIGVPG IGVPGIGVPG IGVPGIGVPG IGVPGIGVPG   840
IGVPGIGVPG IGVPGIGVPG IGVPGIGVPG IGVPGIGVPG IGVPGIGVPG IGVPGIGVPG   900
IGVPGIGVPG IGVPGIGVPG IGVPGIGVPG IGVPGIGVPG IGVPGIGVPG IGVPGIGVPG   960
IGVPGIGVPG IGVPGIGVPG IGVPGIGVPG IGVPGIGVPG IGVPGIGVPG IGVPGIGVPG  1020
IGVPGIGVPG IGVPGIGVPG IGVPGIGVPG IGVPGIGVPG IGVPGIGVPG IGVPGIGVPG  1080
IGVPGIGVPG IGVPGIGVPG IGVPGIGVPG IGVPGIGVPG IGVPGIGVPG IGVPGIGVPG  1140
IGVPGIGVPG IGVPGIGVPG IGVPGIGVPG IGVPGIGVPG IGVPGIGVPG IGVPGIGVPG  1200
IGVPGIGY                                                          1208

SEQ ID NO: 20           moltype = AA  length = 1203
FEATURE                 Location/Qualifiers
REGION                  1..1203
                        note = Description of Artificial Sequence: Synthetic
                          polypeptide
source                  1..1203
                        mol_type = protein
                        organism = synthetic construct
SEQUENCE: 20
MGQVQLQQPG AELVKPGASV KMSCKASGYT FTSYNMHWVK QTPGRGLEWI GAIYPGNGDT    60
SYNQKFKGKA TLTADKSSST AYMQLSSLTS EDSAVYYCAR STYYGGDWYF NVWGAGTTVT   120
VSAGGGGSGG GGSGGGGSQI VLSQSPAILS ASPGEKVTMT CRASSSVSYI HWFQQKPGSS   180
PKPWIYATSN LASGVPVRFS GSGSGTSYSL TISRVEAEDA ATYYCQQWTS NPPTFGGGTK   240
LEIKRTGVPG AGVPGAGVPG AGVPGAGVPG AGVPGAGVPG AGVPGAGVPG AGVPGAGVPG   300
AGVPGAGVPG AGVPGAGVPG AGVPGAGVPG AGVPGAGVPG AGVPGAGVPG AGVPGAGVPG   360
AGVPGAGVPG AGVPGAGVPG AGVPGAGVPG AGVPGAGVPG AGVPGAGVPG AGVPGAGVPG   420
AGVPGAGVPG AGVPGAGVPG AGVPGAGVPG AGVPGAGVPG AGVPGAGVPG AGVPGAGVPG   480
AGVPGAGVPG AGVPGAGVPG AGVPGAGVPG AGVPGAGVPG AGVPGAGVPG AGVPGAGVPG   540
AGVPGAGVPG AGVPGAGVPG AGVPGAGVPG AGVPGAGVPG AGVPGAGVPG AGVPGAGVPG   600
AGVPGAGVPG AGVPGAGVPG AGVPGAGVPG AGVPGAGVPG AGVPGAGVPG AGVPGAGVPG   660
AGVPGAGVPG AGVPGAGVPG AGVPGAGVPG AGVPGAGVPG AGVPGAGVPG AGVPGAGVPG   720
AGVPGAGVPG AGVPGAGVPG AGVPGAGVPG AGVPGAGVPG AGVPGAGVPG AGVPGAGVPG   780
AGVPGAGVPG AGVPGAGVPG AGVPGAGVPG AGVPGAGVPG AGVPGAGVPG AGVPGAGVPG   840
AGVPGAGVPG AGVPGAGVPG AGVPGAGVPG AGVPGAGVPG AGVPGAGVPG AGVPGAGVPG   900
AGVPGAGVPG AGVPGAGVPG AGVPGAGVPG AGVPGAGVPG AGVPGAGVPG AGVPGAGVPG   960
AGVPGAGVPG AGVPGAGVPG AGVPGAGVPG AGVPGAGVPG AGVPGAGVPG AGVPGAGVPG  1020
AGVPGAGVPG AGVPGAGVPG AGVPGAGVPG AGVPGAGVPG AGVPGAGVPG AGVPGAGVPG  1080
AGVPGAGVPG AGVPGAGVPG AGVPGAGVPG AGVPGAGVPG AGVPGAGVPG AGVPGAGVPG  1140
AGVPGAGVPG AGVPGAGVPG AGVPGAGVPG AGVPGAGVPG AGVPGAGVPG AGVPGAGVPG  1200
AGV                                                               1203

SEQ ID NO: 21           moltype = AA  length = 728
FEATURE                 Location/Qualifiers
REGION                  1..728
                        note = Description of Artificial Sequence: Synthetic
                          polypeptide
source                  1..728
                        mol_type = protein
                        organism = synthetic construct
SEQUENCE: 21
MGQVQLQQPG AELVKPGASV KMSCKASGYT FTSYNMHWVK QTPGRGLEWI GAIYPGNGDT    60
SYNQKFKGKA TLTADKSSST AYMQLSSLTS EDSAVYYCAR STYYGGDWYF NVWGAGTTVT   120
VSAGGGGSGG GGSGGGGSQI VLSQSPAILS ASPGEKVTMT CRASSSVSYI HWFQQKPGSS   180
PKPWIYATSN LASGVPVRFS GSGSGTSYSL TISRVEAEDA ATYYCQQWTS NPPTFGGGTK   240
LEIKRTGVPG SGVPGSGVPG SGVPGSGVPG SGVPGSGVPG SGVPGSGVPG SGVPGSGVPG   300
SGVPGSGVPG SGVPGSGVPG SGVPGSGVPG SGVPGSGVPG SGVPGSGVPG SGVPGSGVPG   360
SGVPGSGVPG SGVPGSGVPG SGVPGSGVPG SGVPGSGVPG SGVPGSGVPG SGVPGSGVPG   420
SGVPGSGVPG SGVPGSGVPG SGVPGSGVPG SGVPGSGVPG SGVPGSGVPG SGVPGSGVPG   480
FGVPGSGVPG IGVPGIGVPG IGVPGIGVPG IGVPGIGVPG IGVPGIGVPG IGVPGIGVPG   540
IGVPGIGVPG IGVPGIGVPG IGVPGIGVPG IGVPGIGVPG IGVPGIGVPG IGVPGIGVPG   600
IGVPGIGVPG IGVPGIGVPG IGVPGIGVPG IGVPGIGVPG IGVPGIGVPG IGVPGIGVPG   660
```

```
IGVPGIGVPG  IGVPGIGVPG  IGVPGIGVPG  IGVPGIGVPG  IGVPGIGVPG  720
IGVPGIGY                                                    728

SEQ ID NO: 23           moltype = DNA  length = 520
FEATURE                 Location/Qualifiers
misc_feature            1..520
                        note = Description of Artificial Sequence: Synthetic
                         polynucleotide
source                  1..520
                        mol_type = other DNA
                        organism = synthetic construct
SEQUENCE: 22
catatggtta acccgaccgt tttcttcgac atcgctgttg acggtgaacc gctgggtcgt   60
gtttctttcg aactgttcgc tgacaaagtt ccgaaaaccg ctgaaaactt ccgtgtcctg  120
tctaccggtg aaaaaggttt cggttacaaa ggttcttgct tccaccgtat catcccgggt  180
ttcatgtgcc aggtggtga cttcacccgt cacaacggta ccggtggtaa atctatctac  240
ggtgaaaaat tcgaagacga aaacttcatc ctgaaacaca ccggtccggg tatcctgtct  300
atggctaacg ctggtccgaa caccaaccgt tctcagttct tcatctgcac cgctaaaacc  360
gaatggctgg acggtaaaca cgttgttttc ggtaaagtta agaaggtat gaacatcgtt  420
gaagctatgg aacgtttcgg ttctcgtaac ggtaaaacct ctaaaaaaat caccatcgct  480
gactgcggtc agctggaagg ttactgatct cctcggatcc                        520

SEQ ID NO: 23           moltype = DNA  length = 498
FEATURE                 Location/Qualifiers
source                  1..498
                        mol_type = other DNA
                        organism = Homo sapiens
SEQUENCE: 23
atggtcaacc ccaccgtgtt cttcgacatt gccgtcgacg gcgagccctt gggccgcgtc   60
tcctttgagc tgtttgcaga caaggtccca aagacagca aaaattttcg tgctctgagc  120
actggagaga aaggatttgg ttataagggt tcctgctttc acagaattat tccagggttt  180
atgtgtcagg tggtgactt cacacgccat aatggcactg tggcaagtc catctatggg  240
gagaaatttg aagatgagaa cttcatccta agcatacgg gtcctggcat cttgtccatg  300
gcaaatgctg gacccaacac aaatggttcc cagtttttca tctgcactgc caagactgag  360
tggttggatg gcaagcatgt ggtgtttggc aaagtgaaag aaggcatgaa tattgtggag  420
gccatggagc gctttgggtc caggaatggc aagaccagca gaagatcac cattgctgac  480
tgtggacaac tcgaataa                                                 498

SEQ ID NO: 24           moltype = AA  length = 107
FEATURE                 Location/Qualifiers
source                  1..107
                        mol_type = protein
                        organism = Homo sapiens
SEQUENCE: 24
VQVETISPGD GRTFPKRGQT CVVHYTGMLE DGKKFDSSRD RNKPFKFMLG KQEVIRGWEE   60
GVAQMSVGQR AKLTISPDYA YGATGHPGII PPHATLVFDV ELLKLEG                107

SEQ ID NO: 25           moltype = AA  length = 1176
FEATURE                 Location/Qualifiers
REGION                  1..1176
                        note = Description of Artificial Sequence: Synthetic
                         polypeptide
source                  1..1176
                        mol_type = protein
                        organism = synthetic construct
SEQUENCE: 25
MGVQVETISP GDGRTFPKRG QTCVVHYTGM LEDGKKFDSS RDNKPFKFM LGKQEVIRGW   60
EEGVAQMSVG QRAKLTISPD YAYGATGHPG IIPPHATLVF DVELLKLEGV PGAGVPGAGV  120
PGAGVPGAGV PGAGVPGAGV PGAGVPGAGV PGAGVPGAGV PGAGVPGAGV PGAGVPGAGV  180
PGAGVPGAGV PGAGVPGAGV PGAGVPGAGV PGAGVPGAGV PGAGVPGAGV PGAGVPGAGV  240
PGAGVPGAGV PGAGVPGAGV PGAGVPGAGV PGAGVPGAGV PGAGVPGAGV PGAGVPGAGV  300
PGAGVPGAGV PGAGVPGAGV PGAGVPGAGV PGAGVPGAGV PGAGVPGAGV PGAGVPGAGV  360
PGAGVPGAGV PGAGVPGAGV PGAGVPGAGV PGAGVPGAGV PGAGVPGAGV PGAGVPGAGV  420
PGAGVPGAGV PGAGVPGAGV PGAGVPGAGV PGAGVPGAGV PGAGVPGAGV PGAGVPGAGV  480
PGAGVPGAGV PGAGVPGAGV PGAGVPGAGV PGAGVPGAGV PGAGVPGAGV PGAGVPGAGV  540
PGAGVPGAGV PGAGVPGAGV PGAGVPGAGV PGAGVPGAGV PGAGVPGAGV PGAGVPGAGV  600
PGAGVPGAGV PGAGVPGAGV PGAGVPGAGV PGAGVPGAGV PGAGVPGAGV PGAGVPGAGV  660
PGAGVPGAGV PGAGVPGAGV PGAGVPGAGV PGAGVPGAGV PGAGVPGAGV PGAGVPGAGV  720
PGAGVPGAGV PGAGVPGAGV PGAGVPGAGV PGAGVPGAGV PGAGVPGAGV PGAGVPGAGV  780
PGAGVPGAGV PGAGVPGAGV PGAGVPGAGV PGAGVPGAGV PGAGVPGAGV PGAGVPGAGV  840
PGAGVPGAGV PGAGVPGAGV PGAGVPGAGV PGAGVPGAGV PGAGVPGAGV PGAGVPGAGV  900
PGAGVPGAGV PGAGVPGAGV PGAGVPGAGV PGAGVPGAGV PGAGVPGAGV PGAGVPGAGV  960
PGAGVPGAGV PGAGVPGAGV PGAGVPGAGV PGAGVPGAGV PGAGVPGAGV PGAGVPGAGV 1020
PGAGVPGAGV PGAGVPGAGV PGAGVPGAGV PGAGVPGAGV QVETISPGDG             1080
RTFPKRGQTC VVHYTGMLED GKKFDSSRDN KPFKFMLGK QEVIRGWEEG VAQMSVGQRA 1140
KLTISPDYAY GATGHPGIIP PHATLVFDVE LLKLEG                          1176

SEQ ID NO: 26           moltype = AA  length = 195
FEATURE                 Location/Qualifiers
```

```
                        source          1..195
                                        mol_type = protein
                                        note = Human adenovirus 5
                                        organism = unidentified
SEQUENCE: 26
GAITVGNKNN DKLTLWTTPA PSPNCRLNAE KDAKLTLVLT KCGSQILATV SVLAVKGSLA    60
PISGTVQSAH LIIRFDENGV LLNNSFLDPE YWNFRNGDLT EGTAYTNAVG FMPNLSAYPK   120
SHGKTAKSNI VSQVYLNGDK TKPVTLTITL NGTQETGDTT PSAYSMSFSW DWSGHNYINE   180
IFATSSYTFS YIAQE                                                   195

SEQ ID NO: 27           moltype = AA   length = 104
FEATURE                 Location/Qualifiers
source                  1..104
                        mol_type = protein
                        organism = Homo sapiens
SEQUENCE: 27
RPEVHLLPPP SEELALNELV TLTCLARGFS PKDVLVRWLQ GSQELPREKY LTWASRQEPS    60
QGTTTFAVTS ILRVAAEDWK KGDTFSCMVG HEALPLAFTQ KTID                    104

SEQ ID NO: 28           moltype = AA   length = 16
FEATURE                 Location/Qualifiers
REGION                  1..16
                        note = Description of Artificial Sequence: Synthetic peptide
source                  1..16
                        mol_type = protein
                        organism = synthetic construct
SEQUENCE: 28
FEGFSFLAFE DFVSSI                                                    16

SEQ ID NO: 29           moltype = AA   length = 14
FEATURE                 Location/Qualifiers
REGION                  1..14
                        note = Description of Artificial Sequence: Synthetic peptide
source                  1..14
                        mol_type = protein
                        organism = synthetic construct
SEQUENCE: 29
EWCEYLGGYL RCYA                                                      14

SEQ ID NO: 30           moltype = AA   length = 17
FEATURE                 Location/Qualifiers
source                  1..17
                        mol_type = protein
                        organism = Homo sapiens
SEQUENCE: 30
NHLGDMTSEE VMSLTSS                                                   17

SEQ ID NO: 31           moltype = AA   length = 163
FEATURE                 Location/Qualifiers
source                  1..163
                        mol_type = protein
                        organism = Homo sapiens
SEQUENCE: 31
ADEEKLPPGW EKRMSRSSGR VYYFNHITNA SQWERPSGNS SSGGKNGQGE PARVRCSHLL    60
VKHSQSRRPS SWRQEKITRT KEEALELING YIQKIKSGEE DFESLASQFS DCSSAKARGD   120
LGAFSRGQMQ KPFEDASFAL RTGEMSGPVF TDSGIHIILR TEG                     163

SEQ ID NO: 32           moltype = AA   length = 453
FEATURE                 Location/Qualifiers
source                  1..453
                        mol_type = protein
                        organism = Homo sapiens
SEQUENCE: 32
QTSVSPSKVI LPRGGSVLVT CSTSCDQPKL LGIETPLPKK ELLLPGNNRK VYELSNVQED    60
SQPMCYSNCP DGQSTAKTFL TVYWTPERVE LAPLPSWQPV GKNLTLRCQV EGGAPRANLT   120
VVLLRGEKEL KREPAVGEPA EVTTTVLVRR DHHGANFSCR TELDLRPQGL ELFENTSAPY   180
QLQTFVLPAT PPQLVSPRVL EVDTQGTVVC SLDGLFPVSE AQVHLALGDQ RLNPTVTYGN   240
DSFSAKASVS VTAEDEGTQR LTCAVILGNQ SQETLQTVTI YSFPAPNVIL TKPEVSEGTE   300
VTVKCEAHPR AKVTLNGVPA QPLGPRAQLL LKATPEDNGR SFSCSATLEV AGQLIHKNQT   360
RELRVLYGPR LDERDCPGNW TWPENSQQTP MCQAWGNPLP ELKCLKDGTF PLPIGESVTV   420
TRDLEGTYLC RARSTQGEVT RKVTVNVLSP RYE                                453

SEQ ID NO: 33           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
```

```
SEQUENCE: 33
EAAAK                                                                          5

SEQ ID NO: 34           moltype = AA  length = 960
FEATURE                 Location/Qualifiers
REGION                  1..960
                        note = Description of Artificial Sequence: Synthetic
                         polypeptide
source                  1..960
                        mol_type = protein
                        organism = synthetic construct
SEQUENCE: 34
VPGAGVPGAG VPGAGVPGAG VPGAGVPGAG VPGAGVPGAG VPGAGVPGAG VPGAGVPGAG    60
VPGAGVPGAG VPGAGVPGAG VPGAGVPGAG VPGAGVPGAG VPGAGVPGAG VPGAGVPGAG   120
VPGAGVPGAG VPGAGVPGAG VPGAGVPGAG VPGAGVPGAG VPGAGVPGAG VPGAGVPGAG   180
VPGAGVPGAG VPGAGVPGAG VPGAGVPGAG VPGAGVPGAG VPGAGVPGAG VPGAGVPGAG   240
VPGAGVPGAG VPGAGVPGAG VPGAGVPGAG VPGAGVPGAG VPGAGVPGAG VPGAGVPGAG   300
VPGAGVPGAG VPGAGVPGAG VPGAGVPGAG VPGAGVPGAG VPGAGVPGAG VPGAGVPGAG   360
VPGAGVPGAG VPGAGVPGAG VPGAGVPGAG VPGAGVPGAG VPGAGVPGAG VPGAGVPGAG   420
VPGAGVPGAG VPGAGVPGAG VPGAGVPGAG VPGAGVPGAG VPGAGVPGAG VPGAGVPGAG   480
VPGAGVPGAG VPGAGVPGAG VPGAGVPGAG VPGAGVPGAG VPGAGVPGAG VPGAGVPGAG   540
VPGAGVPGAG VPGAGVPGAG VPGAGVPGAG VPGAGVPGAG VPGAGVPGAG VPGAGVPGAG   600
VPGAGVPGAG VPGAGVPGAG VPGAGVPGAG VPGAGVPGAG VPGAGVPGAG VPGAGVPGAG   660
VPGAGVPGAG VPGAGVPGAG VPGAGVPGAG VPGAGVPGAG VPGAGVPGAG VPGAGVPGAG   720
VPGAGVPGAG VPGAGVPGAG VPGAGVPGAG VPGAGVPGAG VPGAGVPGAG VPGAGVPGAG   780
VPGAGVPGAG VPGAGVPGAG VPGAGVPGAG VPGAGVPGAG VPGAGVPGAG VPGAGVPGAG   840
VPGAGVPGAG VPGAGVPGAG VPGAGVPGAG VPGAGVPGAG VPGAGVPGAG VPGAGVPGAG   900
VPGAGVPGAG VPGAGVPGAG VPGAGVPGAG VPGAGVPGAG VPGAGVPGAG VPGAGVPGAG   960

SEQ ID NO: 35           moltype = AA  length = 480
FEATURE                 Location/Qualifiers
REGION                  1..480
                        note = Description of Artificial Sequence: Synthetic
                         polypeptide
source                  1..480
                        mol_type = protein
                        organism = synthetic construct
SEQUENCE: 35
VPGAGVPGAG VPGAGVPGAG VPGAGVPGAG VPGAGVPGAG VPGAGVPGAG VPGAGVPGAG    60
VPGAGVPGAG VPGAGVPGAG VPGAGVPGAG VPGAGVPGAG VPGAGVPGAG VPGAGVPGAG   120
VPGAGVPGAG VPGAGVPGAG VPGAGVPGAG VPGAGVPGAG VPGAGVPGAG VPGAGVPGAG   180
VPGAGVPGAG VPGAGVPGAG VPGAGVPGAG VPGAGVPGAG VPGAGVPGAG VPGAGVPGAG   240
VPGAGVPGAG VPGAGVPGAG VPGAGVPGAG VPGAGVPGAG VPGAGVPGAG VPGAGVPGAG   300
VPGAGVPGAG VPGAGVPGAG VPGAGVPGAG VPGAGVPGAG VPGAGVPGAG VPGAGVPGAG   360
VPGAGVPGAG VPGAGVPGAG VPGAGVPGAG VPGAGVPGAG VPGAGVPGAG VPGAGVPGAG   420
VPGAGVPGAG VPGAGVPGAG VPGAGVPGAG VPGAGVPGAG VPGAGVPGAG VPGAGVPGAG   480

SEQ ID NO: 36           moltype = AA  length = 960
FEATURE                 Location/Qualifiers
REGION                  1..960
                        note = Description of Artificial Sequence: Synthetic
                         polypeptide
source                  1..960
                        mol_type = protein
                        organism = synthetic construct
SEQUENCE: 36
VPGAGVPGAG VPGAGVPGAG VPGAGVPGAG VPGAGVPGAG VPGAGVPGAG VPGAGVPGAG    60
VPGAGVPGAG VPGAGVPGAG VPGAGVPGAG VPGAGVPGAG VPGAGVPGAG VPGAGVPGAG   120
VPGAGVPGAG VPGAGVPGAG VPGAGVPGAG VPGAGVPGAG VPGAGVPGAG VPGAGVPGAG   180
VPGAGVPGAG VPGAGVPGAG VPGAGVPGAG VPGAGVPGAG VPGAGVPGAG VPGAGVPGAG   240
VPGAGVPGAG VPGAGVPGAG VPGAGVPGAG VPGAGVPGAG VPGAGVPGAG VPGAGVPGAG   300
VPGAGVPGAG VPGAGVPGAG VPGAGVPGAG VPGAGVPGAG VPGAGVPGAG VPGAGVPGAG   360
VPGAGVPGAG VPGAGVPGAG VPGAGVPGAG VPGAGVPGAG VPGAGVPGAG VPGAGVPGAG   420
VPGAGVPGAG VPGAGVPGAG VPGAGVPGAG VPGAGVPGAG VPGAGVPGAG VPGAGVPGAG   480
VPGIGVPGIG VPGIGVPGIG VPGIGVPGIG VPGIGVPGIG VPGIGVPGIG VPGIGVPGIG   540
VPGIGVPGIG VPGIGVPGIG VPGIGVPGIG VPGIGVPGIG VPGIGVPGIG VPGIGVPGIG   600
VPGIGVPGIG VPGIGVPGIG VPGIGVPGIG VPGIGVPGIG VPGIGVPGIG VPGIGVPGIG   660
VPGIGVPGIG VPGIGVPGIG VPGIGVPGIG VPGIGVPGIG VPGIGVPGIG VPGIGVPGIG   720
VPGIGVPGIG VPGIGVPGIG VPGIGVPGIG VPGIGVPGIG VPGIGVPGIG VPGIGVPGIG   780
VPGIGVPGIG VPGIGVPGIG VPGIGVPGIG VPGIGVPGIG VPGIGVPGIG VPGIGVPGIG   840
VPGIGVPGIG VPGIGVPGIG VPGIGVPGIG VPGIGVPGIG VPGIGVPGIG VPGIGVPGIG   900
VPGIGVPGIG VPGIGVPGIG VPGIGVPGIG VPGIGVPGIG VPGIGVPGIG VPGIGVPGIG   960

SEQ ID NO: 37           moltype = AA  length = 120
FEATURE                 Location/Qualifiers
REGION                  1..120
                        note = Description of Artificial Sequence: Synthetic
                         polypeptide
source                  1..120
```

```
                        mol_type = protein
                        organism = synthetic construct
SEQUENCE: 37
VPGAGVPGAG VPGAGVPGAG VPGAGVPGAG VPGAGVPGAG VPGAGVPGAG VPGAGVPGAG    60
VPGAGVPGAG VPGAGVPGAG VPGAGVPGAG VPGAGVPGAG VPGAGVPGAG VPGAGVPGAG   120

SEQ ID NO: 38           moltype = AA   length = 121
FEATURE                 Location/Qualifiers
REGION                  1..121
                        note = Description of Artificial Sequence: Synthetic
                         polypeptide
source                  1..121
                        mol_type = protein
                        organism = synthetic construct
SEQUENCE: 38
GVPGVGVPGV GVPGVGVPGV GVPGVGVPGV GVPGVGVPGV GVPGVGVPGV GVPGVGVPGV    60
GVPGVGVPGV GVPGVGVPGV GVPGVGVPGV GVPGVGVPGV GVPGVGVPGV GVPGVGVPGV   120
G                                                                   121

SEQ ID NO: 39           moltype = AA   length = 11
FEATURE                 Location/Qualifiers
REGION                  1..11
                        note = Description of Unknown: Cyclosporin A peptide
SITE                    1
                        note = D-Alanine
MOD_RES                 6
                        note = Abu
MOD_RES                 7
                        note = Sar
source                  1..11
                        mol_type = protein
                        organism = unidentified
SEQUENCE: 39
ALLVTXXLVL A                                                         11

SEQ ID NO: 40           moltype = AA   length = 365
FEATURE                 Location/Qualifiers
source                  1..365
                        mol_type = protein
                        organism = Homo sapiens
SEQUENCE: 40
MALLLCFVLL CGVVDFARSL SITTPEEMIE KAKGETAYLP CKFTLSPEDQ GPLDIEWLIS    60
PADNQKVDQV IILYSGDKIY DDYYPDLKGR VHFTSNDLKS GDASINVTNL QLSDIGTYQC   120
KVKKAPGVAN KKIHLVVLVK PSGARCYVDG SEEIGSDFKI KCEPKEGSLP LQYEWQKLSD   180
SQKMPTSWLA EMTSSVISVK NASSEYSGTY SCTVRNRVGS DQCLLRLNVV PPSNKAGLIA   240
GAIIGTLLAL ALIGLIIFCC RKKRREEKYE KEVHHDIRED VPPPKSRTST ARSYIGSNHS   300
SLGSMSPSNM EGYSKTQYNQ VPSEDFERTP QSPTLPPAKV AAPNLSRMGA IPVMIPAQSK   360
DGSIV                                                               365

SEQ ID NO: 41           moltype = AA   length = 344
FEATURE                 Location/Qualifiers
source                  1..344
                        mol_type = protein
                        organism = Homo sapiens
SEQUENCE: 41
MALLLCFVLL CGVVDFARSL SITTPEEMIE KAKGETAYLP CKFTLSPEDQ GPLDIEWLIS    60
PADNQKVDQV IILYSGDKIY DDYYPDLKGR VHFTSNDLKS GDASINVTNL QLSDIGTYQC   120
KVKKAPGVAN KKIHLVVLVK PSGARCYVDG SEEIGSDFKI KCEPKEGSLP LQYEWQKLSD   180
SQKMPTSWLA EMTSSVISVK NASSEYSGTY SCTVRNRVGS DQCLLRLNVV PPSNKAGLIA   240
GAIIGTLLAL ALIGLIIFCC RKKRREEKYE KEVHHDIRED VPPPKSRTST ARSYIGSNHS   300
SLGSMSPSNM EGYSKTQYNQ VPSEDFERTP QSPTLPPAKF KYPY                    344

SEQ ID NO: 42           moltype = AA   length = 89
FEATURE                 Location/Qualifiers
source                  1..89
                        mol_type = protein
                        organism = Homo sapiens
SEQUENCE: 42
MALLLCFVLL CGVVDFARSL SITTPEEMIE KAKGETAYLP CKFTLSPEDQ GPLDIEWLIS    60
PADNQKVDQV GRCATSKEPY VHCQKLHRQ                                      89

SEQ ID NO: 43           moltype = AA   length = 200
FEATURE                 Location/Qualifiers
source                  1..200
                        mol_type = protein
                        organism = Homo sapiens
SEQUENCE: 43
MALLLCFVLL CGVVDFARSL SITTPEEMIE KAKGETAYLP CKFTLSPEDQ GPLDIEWLIS    60
PADNQKVDQV IILYSGDKIY DDYYPDLKGR VHFTSNDLKS GDASINVTNL QLSDIGTYQC   120
```

```
KVKKAPGVAN KKIHLVVLGK MCHLQRAVRP LPEATSAVII HPWGPCLLPT WKDIPRLSIT   180
KYQVKTLNAL LRVRLSHLLR                                              200

SEQ ID NO: 44           moltype = AA  length = 250
FEATURE                 Location/Qualifiers
source                  1..250
                        mol_type = protein
                        organism = Homo sapiens
SEQUENCE: 44
MALLLCFVLL CGVVDFARSL SITTPEEMIE KAKGETAYLP CKFTLSPEDQ GPLDIEWLIS    60
PADNQKVDQV IILYSGDKIY DDYYPDLKGR VHFTSNDLKS GDASINVTNL QLSDIGTYQC   120
KVKKAPGVAN KKIHLVVLVK PSGARCYVDG SEEIGSDFKI KCEPKEGSLP LQYEWQKLSD   180
SQKMPTSWLA GKMCHLQRAV RPLPEATSAV IIHPWGPCLL PTWKDIPRLS ITKYQVKTLN   240
ALLRVRLSHL                                                         250

SEQ ID NO: 45           moltype = AA  length = 350
FEATURE                 Location/Qualifiers
source                  1..350
                        mol_type = protein
                        organism = Homo sapiens
SEQUENCE: 45
MALLLCFVLL CGVVDFARSL SITTPEEMIE KAKGETAYLP CKFTLSPEDQ GPLDIEWLIS    60
PADNQKVDQV IILYSGDKIY DDYYPDLKGR VHFTSNDLKS GDASINVTNL QLSDIGTYQC   120
KVKKAPGVAN KKIHLVVLVK PSGARCYVDG SEEIGSDFKI KCEPKEGSLP LQYEWQKLSD   180
SQKMPTSWLA EMTSSVISVK NASSEYSGTY SCTVRNRVGS DQCLLRLNVV PPSNKAGLIA   240
GAIIGTLLAL ALIGLIIFCC RKKRREEKYE KEVHHDIRED VPPPKSRTST ARSYIGSNHS   300
SLGSMSPSNM EGYSKTQYNQ VPSEDFERTP QSPTLPPAKF KYPYKTDGIT              350

SEQ ID NO: 46           moltype = AA  length = 324
FEATURE                 Location/Qualifiers
source                  1..324
                        mol_type = protein
                        organism = Homo sapiens
SEQUENCE: 46
MALLLCFVLL CGVVDFARSL SITTPEEMIE KAKGETAYLP CKFTLSPEDQ GPLDIEWLIS    60
PADNQKVDQV IILYSGDKIY DDYYPDLKGR VHFTSNDLKS GDASINVTNL QLSDIGTYQC   120
KVKKAPGVAN KKIHLVVLVK PSGARCYVDG SEEIGSDFKI KCEPKEGSLP LQYEWQKLSD   180
SQKMPTSWLA ASNKAGLIAG AIIGTLLALA LIGLIIFCCR KKRREEKYEK EVHHDIREDV   240
PPPKSRTSTA RSYIGSNHSS LGSMSPSNME GYSKTQYNQV PSEDFERTPQ SPTLPPAKVA   300
APNLSRMGAI PVMIPAQSKD GSIV                                         324

SEQ ID NO: 47           moltype = AA  length = 764
FEATURE                 Location/Qualifiers
source                  1..764
                        mol_type = protein
                        organism = Homo sapiens
SEQUENCE: 47
MLLFVLTCLL AVFPAISTKS PIFGPEEVNS VEGNSVSITC YYPPTSVNRH TRKYWCRQGA    60
RGGCITLISS EGYVSSKYAG RANLTNFPEN GTFVVNIAQL SQDDSGRYKC GLGINSRGLS   120
FDVSLEVSQG PGLLNDTKVY TVDLGRTVTI NCPFKTENAQ KRKSLYKQIG LYPVLVIDSS   180
GYVNPNYTGR IRLDIQGTGQ LLFSVVINQL RLSDAGQYLC QAGDDSNSNK KNADLQVLKP   240
EPELVYEDLR GSVTFHCALG PEVANVAKFL CRQSSGENCD VVVNTLGKRA PAFEGRILLN   300
PQDKDGSFSV VITGLRKEDA GRYLCGAHSD GQLQEGSPIQ AWQLFVNEES TIPRSPTVVK   360
GVAGGSVAVL CPYNRKESKS IKYWCLWEGA QNGRCPLLVD SEGWVKAQYE GRLSLLEEPG   420
NGTFTVILNQ LTSRDAGFYW CLTNGDTLWR TTVEIKIIEG EPNLKVPGNV TAVLGETLKV   480
PCHFPCKFSS YEKYWCKWNN TGCQALPSQD EGPSKAFVNC DENSRLVSLT LNLVTRADEG   540
WYWCGVKQGH FYGETAAVYV AVEERKAAGS RDVSLAKADA APDEKVLDSG FREIENKAIQ   600
DPRLFAEEKA VADTRDQADG SRASVDSGSS EEQGGSSRAL VSTLVPLGLV LAVGAVAVGV   660
ARARHRKNVD RVSIRSYRTD ISMSDFENSR EFGANDNMGA SSITQETSLG GKEEFVATTE   720
STTETKEPKK AKRSSKEEAE MAYKDFLLQS STVAAEAQDG PQEA                   764

SEQ ID NO: 48           moltype = AA  length = 19
FEATURE                 Location/Qualifiers
source                  1..19
                        mol_type = protein
                        organism = Homo sapiens
SEQUENCE: 48
TWASRQEPSQ GTTTFAVTS                                                19

SEQ ID NO: 49           moltype = AA  length = 19
FEATURE                 Location/Qualifiers
source                  1..19
                        mol_type = protein
                        organism = Homo sapiens
SEQUENCE: 49
TWASRQEPSQ GTTTFAVTS                                                19

SEQ ID NO: 50           moltype = AA  length = 5
FEATURE                 Location/Qualifiers
```

```
                        REGION          1..5
                                        note = Description of Artificial Sequence: Synthetic peptide
                        source          1..5
                                        mol_type = protein
                                        organism = synthetic construct
SEQUENCE: 50
GGGGS                                                                           5

SEQ ID NO: 51           moltype = AA   length = 5
FEATURE                 Location/Qualifiers
REGION                  1..5
                        note = Description of Artificial Sequence: Synthetic peptide
VARIANT                 4
                        note = X can be any amino acid
source                  1..5
                        mol_type = protein
                        organism = synthetic construct
SEQUENCE: 51
VPGXG                                                                           5

SEQ ID NO: 52           moltype = AA   length = 6
FEATURE                 Location/Qualifiers
REGION                  1..6
                        note = Description of Artificial Sequence: Synthetic peptide
VARIANT                 5
                        note = X can be any amino acid
source                  1..6
                        mol_type = protein
                        organism = synthetic construct
SEQUENCE: 52
GVPGXZ                                                                          6

SEQ ID NO: 53           moltype = AA   length = 10
FEATURE                 Location/Qualifiers
REGION                  1..10
                        note = Description of Artificial Sequence: Synthetic peptide
source                  1..10
                        mol_type = protein
                        organism = synthetic construct
SEQUENCE: 53
VPGAGVPGIG                                                                     10

SEQ ID NO: 54           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 54
VPGAG                                                                           5

SEQ ID NO: 55           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 55
VPGVG                                                                           5

SEQ ID NO: 56           moltype = AA   length = 6
FEATURE                 Location/Qualifiers
REGION                  1..6
                        note = Description of Artificial Sequence: Synthetic peptide
source                  1..6
                        mol_type = protein
                        organism = synthetic construct
SEQUENCE: 56
HHHHHH                                                                          6

SEQ ID NO: 57           moltype = AA   length = 854
FEATURE                 Location/Qualifiers
REGION                  1..854
                        note = Description of Artificial Sequence: Synthetic
                          polypeptide
source                  1..854
                        mol_type = protein
```

```
                            organism = synthetic construct
SEQUENCE: 57
MGMVNPTVFF DIAVDGEPLG RVSFELFADK VPKTAENFRA LSTGEKGFGY KGSCFHRIIP    60
GFMCQGGDFT RHNGTGGKSI YGEKFEDENF ILKHTGPGIL SMANAGPNTN GSQFFICTAK   120
TEWLKHVVFG KVKEGMNIVE AMERFGSRNG KTSKKITIAD CGQLEGVPGA GVPGAGVPGA   180
GVPGAGVPGA GVPGAGVPGA GVPGAGVPGA GVPGAGVPGA GVPGAGVPGA GVPGAGVPGA   240
GVPGAGVPGA GVPGAGVPGA GVPGAGVPGA GVPGAGVPGA GVPGAGMVNP TVFFDIAVDG   300
EPLGRVSFEL FADKVPKTAE NFRALSTGEK GFGYKGSCFH RIIPGFMCQG GDFTRHNGTG   360
GKSIYGEKFE DENFILKHTG PGILSMANAG PNTNGSQFFI CTAKTEWLKH VVFGKVKEGM   420
NIVEAMERFG SRNGKTSKKI TIADCGQLEG VPGAGVPGAG VPGAGVPGAG VPGAGVPGAG   480
VPGAGVPGAG VPGAGVPGAG VPGAGVPGAG VPGAGVPGAG VPGAGVPGAG VPGAGVPGAG   540
VPGAGVPGAG VPGAGVPGAG VPGAGVPGAG MVNPTVFFDI AVDGEPLGRV SFELFADKVP   600
KTAENFRALS TGEKGFGYKG SCFHRIIPGF MCQGGDFTRH NGTGGKSIYG EKFEDENFIL   660
KHTGPGILSM ANAGPNTNGS QFFICTAKTE WLKHVVFGKV KEGMNIVEAM ERFGSRNGKT   720
SKKITIADCG QLEGVPGAGV PGAGVPGAGV PGAGVPGAGV PGAGVPGAGV PGAGVPGAGV   780
PGAGVPGAGV PGAGVPGAGV PGAGVPGAGV PGAGVPGAGV PGAGVPGAGV PGAGVPGAGV   840
PGAGVPGAGV PGAG                                                    854

SEQ ID NO: 58           moltype = AA   length = 6
FEATURE                 Location/Qualifiers
REGION                  1..6
                        note = Description of Artificial Sequence: Synthetic peptide
VARIANT                 5
                        note = X can be any amino acid
source                  1..6
                        mol_type = protein
                        organism = synthetic construct
SEQUENCE: 58
GVPGXG                                                               6

SEQ ID NO: 59           moltype = AA   length = 7
FEATURE                 Location/Qualifiers
REGION                  1..7
                        note = Description of Artificial Sequence: Synthetic peptide
VARIANT                 5
                        note = X can be any amino acid
source                  1..7
                        mol_type = protein
                        organism = synthetic construct
SEQUENCE: 59
GVPGXGY                                                              7

SEQ ID NO: 60           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 60
VPGSG                                                                5

SEQ ID NO: 61           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 61
VPGAG                                                                5

SEQ ID NO: 62           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
SEQUENCE: 62
VPGVG                                                                5

SEQ ID NO: 63           moltype = AA   length = 5
FEATURE                 Location/Qualifiers
REGION                  1..5
                        note = Description of Artificial Sequence: Synthetic peptide
source                  1..5
                        mol_type = protein
                        organism = synthetic construct
```

```
SEQUENCE: 63
VPGIG                                                                        5

SEQ ID NO: 64           moltype = DNA  length = 520
FEATURE                 Location/Qualifiers
misc_feature            1..520
                        note = Description of Artificial Sequence: Synthetic
                          polynucleotide
source                  1..520
                        mol_type = other DNA
                        organism = synthetic construct
SEQUENCE: 64
catatggtta acccgaccgt tttcttcgac atcgctgttg acggtgaacc gctgggtcgt    60
gtttctttcg aactgttcgc tgacaaagtt ccgaaaaccg ctgaaaactt ccgtgctctg   120
tctaccggtg aaaaaggttt cggttacaaa ggttcttgct tccaccgtat catcccgggt   180
ttcatgtgcc agggtggtga cttcacccgt cacaacggta ccggtggtaa atctatctac   240
ggtgaaaaat tcgaagacga aaacttcatc ctgaaacaca ccggtccggg tatcctgtct   300
atggctaacg ctggtccgaa caccaacggt tctcagttct catctgcac cgctaaaacc   360
gaatggctgg acgtaaaca cgttgttttc ggtaaagtta agaaggtat gaacatcgtt     420
gaagctatgg aacgtttcgg ttctcgtaac ggtaaaacct ctaaaaaat caccatcgct   480
gactgcggtc agctggaagg ttactgatct cctcggatcc                         520

SEQ ID NO: 65           moltype = AA  length = 962
FEATURE                 Location/Qualifiers
REGION                  1..962
                        note = Description of Artificial Sequence: Synthetic
                          polypeptide
source                  1..962
                        mol_type = protein
                        organism = synthetic construct
SEQUENCE: 65
GVPGAGVPGA GVPGAGVPGA GVPGAGVPGA GVPGAGVPGA GVPGAGVPGA GVPGAGVPGA    60
GVPGAGVPGA GVPGAGVPGA GVPGAGVPGA GVPGAGVPGA GVPGAGVPGA GVPGAGVPGA   120
GVPGAGVPGA GVPGAGVPGA GVPGAGVPGA GVPGAGVPGA GVPGAGVPGA GVPGAGVPGA   180
GVPGAGVPGA GVPGAGVPGA GVPGAGVPGA GVPGAGVPGA GVPGAGVPGA GVPGAGVPGA   240
GVPGAGVPGA GVPGAGVPGA GVPGAGVPGA GVPGAGVPGA GVPGAGVPGA GVPGAGVPGA   300
GVPGAGVPGA GVPGAGVPGA GVPGAGVPGA GVPGAGVPGA GVPGAGVPGA GVPGAGVPGA   360
GVPGAGVPGA GVPGAGVPGA GVPGAGVPGA GVPGAGVPGA GVPGAGVPGA GVPGAGVPGA   420
GVPGAGVPGA GVPGAGVPGA GVPGAGVPGA GVPGAGVPGA GVPGAGVPGA GVPGAGVPGA   480
GVPGAGVPGA GVPGAGVPGA GVPGAGVPGA GVPGAGVPGA GVPGAGVPGA GVPGAGVPGA   540
GVPGAGVPGA GVPGAGVPGA GVPGAGVPGA GVPGAGVPGA GVPGAGVPGA GVPGAGVPGA   600
GVPGAGVPGA GVPGAGVPGA GVPGAGVPGA GVPGAGVPGA GVPGAGVPGA GVPGAGVPGA   660
GVPGAGVPGA GVPGAGVPGA GVPGAGVPGA GVPGAGVPGA GVPGAGVPGA GVPGAGVPGA   720
GVPGAGVPGA GVPGAGVPGA GVPGAGVPGA GVPGAGVPGA GVPGAGVPGA GVPGAGVPGA   780
GVPGAGVPGA GVPGAGVPGA GVPGAGVPGA GVPGAGVPGA GVPGAGVPGA GVPGAGVPGA   840
GVPGAGVPGA GVPGAGVPGA GVPGAGVPGA GVPGAGVPGA GVPGAGVPGA GVPGAGVPGA   900
GVPGAGVPGA GVPGAGVPGA GVPGAGVPGA GVPGAGVPGA GVPGAGVPGA GVPGAGVPGA   960
GY                                                                  962

SEQ ID NO: 66           moltype = AA  length = 482
FEATURE                 Location/Qualifiers
REGION                  1..482
                        note = Description of Artificial Sequence: Synthetic
                          polypeptide
source                  1..482
                        mol_type = protein
                        organism = synthetic construct
SEQUENCE: 66
GVPGVGVPGV GVPGVGVPGV GVPGVGVPGV GVPGVGVPGV GVPGVGVPGV GVPGVGVPGV    60
GVPGVGVPGV GVPGVGVPGV GVPGVGVPGV GVPGVGVPGV GVPGVGVPGV GVPGVGVPGV   120
GVPGVGVPGV GVPGVGVPGV GVPGVGVPGV GVPGVGVPGV GVPGVGVPGV GVPGVGVPGV   180
GVPGVGVPGV GVPGVGVPGV GVPGVGVPGV GVPGVGVPGV GVPGVGVPGV GVPGVGVPGV   240
GVPGVGVPGV GVPGVGVPGV GVPGVGVPGV GVPGVGVPGV GVPGVGVPGV GVPGVGVPGV   300
GVPGVGVPGV GVPGVGVPGV GVPGVGVPGV GVPGVGVPGV GVPGVGVPGV GVPGVGVPGV   360
GVPGVGVPGV GVPGVGVPGV GVPGVGVPGV GVPGVGVPGV GVPGVGVPGV GVPGVGVPGV   420
GVPGVGVPGV GVPGVGVPGV GVPGVGVPGV GVPGVGVPGV GVPGVGVPGV GVPGVGVPGV   480
GY                                                                  482

SEQ ID NO: 67           moltype = AA  length = 120
FEATURE                 Location/Qualifiers
REGION                  1..120
                        note = Description of Artificial Sequence: Synthetic
                          polypeptide
source                  1..120
                        mol_type = protein
                        organism = synthetic construct
SEQUENCE: 67
VPGVGVPGVG VPGVGVPGVG VPGVGVPGVG VPGVGVPGVG VPGVGVPGVG VPGVGVPGVG    60
VPGVGVPGVG VPGVGVPGVG VPGVGVPGVG VPGVGVPGVG VPGVGVPGVG VPGVGVPGVG   120
```

```
SEQ ID NO: 68              moltype = AA  length = 5
FEATURE                    Location/Qualifiers
source                     1..5
                           mol_type = protein
                           organism = synthetic construct
REGION                     1..5
                           note = The amino acid residues at position 1-5 can be
                            repeated 2-400 times
VARIANT                    4
                           note = X can be any amino acid or alternatively G or A or S
                            or I or V
SEQUENCE: 68
VPGXG                                                                            5

SEQ ID NO: 69              moltype = AA  length = 10
FEATURE                    Location/Qualifiers
source                     1..10
                           mol_type = protein
                           organism = synthetic construct
REGION                     1..10
                           note = The amino acid residues at position 1-10 can be
                            repeated 2-400 times
SEQUENCE: 69
VPGAGVPGIG                                                                      10

SEQ ID NO: 70              moltype = AA  length = 5
FEATURE                    Location/Qualifiers
source                     1..5
                           mol_type = protein
                           organism = synthetic construct
REGION                     1..5
                           note = The amino acid residues at position 1-5 can be
                            repeated 2-400 times
SEQUENCE: 70
VPGAG                                                                            5

SEQ ID NO: 71              moltype = AA  length = 5
FEATURE                    Location/Qualifiers
source                     1..5
                           mol_type = protein
                           organism = synthetic construct
REGION                     1..5
                           note = The amino acid residues at position 1-5 can be
                            repeated 2-400 times
SEQUENCE: 71
VPGVG                                                                            5

SEQ ID NO: 72              moltype = AA  length = 6
FEATURE                    Location/Qualifiers
source                     1..6
                           mol_type = protein
                           organism = synthetic construct
REGION                     2..6
                           note = The amino acid residues at position 2-6 can be
                            repeated 5 -400 times
VARIANT                    5
                           note = X can be any amino acid or alternatively A or S or I
                            or V
SEQUENCE: 72
GVPGXG                                                                           6

SEQ ID NO: 73              moltype = AA  length = 7
FEATURE                    Location/Qualifiers
source                     1..7
                           mol_type = protein
                           organism = synthetic construct
REGION                     2..6
                           note = The amino acid residues at position 2-6 can be
                            repeated 5 -400 times
VARIANT                    5
                           note = X can be any amino acid or alternatively A or S or I
                            or V
SEQUENCE: 73
GVPGXGY                                                                          7

SEQ ID NO: 74              moltype = AA  length = 177
FEATURE                    Location/Qualifiers
source                     1..177
```

```
                        mol_type = protein
                        organism = synthetic construct
SEQUENCE: 74
LWTTPAPSPN  CRLNAEKDAK  LTLVLTKCGS  QILATVSVLA  VKGSLAPISG  TVQSAHLIIR   60
FDENGVLLNN  SFLDPEYWNF  RNGDLTEGTA  YTNAVGFMPN  LSAYPKSHGK  TAKSNIVSQV  120
YLNGDKTKPV  TLTITLNGTQ  ETGDTTPSAY  SMSFSWDWSG  HNYINEIFAT  SSYTFSY     177

SEQ ID NO: 75           moltype = AA  length = 5
FEATURE                 Location/Qualifiers
source                  1..5
                        mol_type = protein
                        organism = synthetic construct
REGION                  1..5
                        note = The amino acid residues at position 1-5 can be
                          repeated 2-10 times
SEQUENCE: 75
GGGGS                                                                     5

SEQ ID NO: 76           moltype = AA  length = 5
FEATURE                 Location/Qualifiers
source                  1..5
                        mol_type = protein
                        organism = synthetic construct
REGION                  1..5
                        note = The amino acid residues at position 1-5 can be
                          repeated 2-10 times
SEQUENCE: 76
EAAAK                                                                     5
```

What is claimed is:

1. An agent comprising an elastin-like peptide (ELP) that comprises the amino acid sequence set forth in SEQ ID NO: 11 fused to an intracellular adhesion molecule 1 (ICAM-1) targeting peptide selected from an ICAM-1 targeting peptide that comprises EWCEYLGGYLRCYA (SEQ ID NO: 29) or FEGFSFLAFEDFVSSI (SEQ ID NO:28).

2. The agent of claim 1, further comprising a therapeutic agent.

3. The agent of claim 1, further comprising an FK506 binding protein (FKBP).

4. The agent of claim 1, further comprising a drug binding domain selected from the group consisting of a knob ligand comprising the amino acid sequence set forth in SEQ ID NO: 26, an mIgA ligand comprising the amino acid sequence set forth in SEQ ID NO: 27, and a peptidyl-prolyl cis/trans isomerase (PIN1) comprising the amino acid sequence set forth in SEQ ID NO: 31.

5. The agent of claim 4, wherein the drug binding domain comprises a peptidyl-prolyl cis/trans isomerase (PIN1) comprising the amino acid sequence set forth in SEQ ID NO: 31.

6. The agent of claim 2, wherein the therapeutic agent is a cyclosporin A comprising the amino acid sequence set forth in SEQ ID NO:22 or SEQ ID NO: 23, a prodrug thereof, or a pharmaceutically acceptable salt thereof.

7. The agent of claim 2, wherein the therapeutic agent is bound or trapped by the ELP or coacervate formed by the ELP.

8. The agent of claim 1, further comprising a detectable label.

9. The agent of claim 1, further comprising a rapamycin or an analog thereof selected from the group consisting of Everolimus, Temsirolimus, Ridaforolimus, and Tacrolimus.

10. The agent of claim 3, wherein the FK506 binding protein (FKBP) comprises the amino acid sequence set forth in SEQ ID NO: 12.

11. The agent of claim 2, further comprising a rapamycin or an analog thereof selected from the group consisting of Everolimus, Temsirolimus, Ridaforolimus, and Tacrolimus.

12. The agent of claim 3, further comprising a rapamycin or an analog thereof selected from the group consisting of Everolimus, Temsirolimus, Ridaforolimus, and Tacrolimus.

13. An isolated polynucleotide that encodes the agent of claim 1.

14. A method for delivering a therapeutic agent in vitro comprising contacting a tissue with the agent of claim 2.

15. A method for delivering a therapeutic agent in vivo comprising administering an effective amount of the agent of claim 2 to a subject.

16. A method for delivering a therapeutic agent in vivo comprising administering an effective amount of the agent of claim 1 to a subject.

17. A method for delivering a therapeutic agent in vivo comprising administering an effective amount of the agent of claim 3 to a subject.

18. A method for delivering a therapeutic agent in vivo comprising administering an effective amount of the agent of claim 12 to a subject.

* * * * *